(12) United States Patent
Carabalona et al.

(10) Patent No.: US 9,004,550 B2
(45) Date of Patent: *Apr. 14, 2015

(54) MAGNETIC LATCH MECHANISM

(75) Inventors: Eric Carabalona, Kenilworth (GB); Robin Talukdar, Chittenango, NY (US); Kevin A. McCloskey, Hatboro, PA (US); Robert Benson Speers, Jr., West Chester, PA (US)

(73) Assignee: Southco, Inc., Concordville, PA (US)

( * ) Notice: Subject to any disclaimer, the term of this patent is extended or adjusted under 35 U.S.C. 154(b) by 2114 days.

This patent is subject to a terminal disclaimer.

(21) Appl. No.: 11/913,924

(22) PCT Filed: May 8, 2006

(86) PCT No.: PCT/US2006/017985
§ 371 (c)(1),
(2), (4) Date: Nov. 8, 2007

(87) PCT Pub. No.: WO2006/122151
PCT Pub. Date: Nov. 16, 2006

(65) Prior Publication Data
US 2008/0231060 A1 Sep. 25, 2008

Related U.S. Application Data

(60) Provisional application No. 60/679,274, filed on May 8, 2005, provisional application No. 60/683,981, filed on May 23, 2005.

(51) Int. Cl.
*E05C 17/56* (2006.01)
*E05B 81/20* (2014.01)
(Continued)

(52) U.S. Cl.
CPC .............. *E05B 81/20* (2013.01); *E05B 77/06* (2013.01); *E05B 83/30* (2013.01); *E05B 83/32* (2013.01); *E05B 79/20* (2013.01); *B60R 2011/0094* (2013.01); *E05B 47/00* (2013.01)

(58) Field of Classification Search
USPC .................. 292/44–55, 216, 251.5, DIG. 21, 292/DIG. 71
See application file for complete search history.

(56) References Cited

U.S. PATENT DOCUMENTS 1,320,444 A 11/1919 Buczynski et al.
2,219,186 A 10/1940 Hornfeck
(Continued)

FOREIGN PATENT DOCUMENTS

BE 669664 12/1965
DE 145325 12/1902
(Continued)

OTHER PUBLICATIONS

Tech-Train Bulletin—Steven E. Young, Issue #16, 2002, 3 pages.
(Continued)

*Primary Examiner* — Carlos Lugo
(74) *Attorney, Agent, or Firm* — RatnerPrestia

(57) ABSTRACT

A latch with dual rotary magnets is particularly suited for releasably securing dual doors of a compartment in the closed position. Each rotary magnet holds in a closed position a magnetic insert attached to a respective door by magnetic attraction to secure both doors in the closed position relative to the compartment. Mechanical hook-like rotary pawls supplement the action of the magnets. In addition, the latch is provided with a safety feature that prevents the latch from opening in the event that the vehicle in which the latch is installed is involved in a collision.

20 Claims, 146 Drawing Sheets

(51) Int. Cl.
  *E05B 77/06*  (2014.01)
  *E05B 83/30*  (2014.01)
  *E05B 83/32*  (2014.01)
  *E05B 79/20*  (2014.01)
  *E05C 19/16*  (2006.01)
  *B60R 11/00*  (2006.01)
  *E05B 47/00*  (2006.01)

(56) References Cited

U.S. PATENT DOCUMENTS

| | | | |
|---|---|---|---|
| 2,288,688 A * | 7/1942 | Dubilier | 292/144 |
| 2,342,848 A | 2/1944 | Endter | |
| 2,446,336 A * | 8/1948 | Mark et al. | 49/395 |
| 2,565,891 A * | 8/1951 | Sherman | 292/251.5 |
| 2,797,655 A * | 7/1957 | Morehouse | 109/63.5 |
| 2,586,900 A | 2/1958 | Alderman | |
| 2,889,164 A | 6/1959 | Clark | |
| 2,898,138 A | 8/1959 | Noord | |
| 3,184,654 A * | 5/1965 | Bey | 335/295 |
| 3,288,511 A * | 11/1966 | Tavano | 292/251.5 |
| 3,332,713 A | 7/1967 | DeClaire et al. | |
| 3,516,701 A | 6/1970 | Graham | |
| 3,596,958 A * | 8/1971 | Bowerman | 292/201 |
| 3,860,277 A | 1/1975 | Wang | |
| 4,195,236 A | 3/1980 | Kalinichenko et al. | |
| 4,262,830 A | 4/1981 | Haves | |
| 4,268,076 A | 5/1981 | Itoi | |
| 4,355,837 A | 10/1982 | Shimizu et al. | |
| 4,518,180 A | 5/1985 | Kleefeldt et al. | |
| 4,518,181 A | 5/1985 | Yamada | |
| 4,569,544 A | 2/1986 | Escaravage | |
| 4,597,598 A | 7/1986 | Bascou | |
| 4,732,432 A | 3/1988 | Keil | |
| 4,763,936 A | 8/1988 | Rogakos et al. | |
| 4,796,932 A | 1/1989 | Tame | |
| 4,848,809 A | 7/1989 | Escaravage | |
| 4,861,089 A | 8/1989 | Compeau et al. | |
| 4,867,496 A | 9/1989 | Thomas | |
| 4,875,723 A | 10/1989 | Compeau et al. | |
| 4,892,340 A | 1/1990 | Matumoto | |
| 4,927,196 A | 5/1990 | Girard et al. | |
| 4,958,508 A | 9/1990 | Lin | |
| 4,978,478 A | 12/1990 | Vonderau et al. | |
| 5,033,789 A | 7/1991 | Hayashi et al. | |
| 5,046,340 A | 9/1991 | Weinerman | |
| 5,180,198 A | 1/1993 | Nakamura et al. | |
| 5,188,406 A | 2/1993 | Sterzenbach et al. | |
| 5,222,775 A | 6/1993 | Kato | |
| 5,305,623 A | 4/1994 | Kello | |
| 5,309,680 A | 5/1994 | Kiel | |
| 5,389,920 A | 2/1995 | DeLand et al. | |
| 5,411,302 A | 5/1995 | Shimada | |
| 5,413,391 A | 5/1995 | Clavin et al. | |
| 5,429,400 A | 7/1995 | Kawaguchi et al. | |
| 5,498,040 A | 3/1996 | Silye | |
| 5,544,925 A | 8/1996 | Ikeda | |
| 5,549,337 A | 8/1996 | McCulloch | |
| 5,620,226 A | 4/1997 | Sautter, Jr. | |
| 5,632,515 A | 5/1997 | Dowling | |
| 5,642,636 A | 7/1997 | Mitsui | |
| 5,765,884 A | 6/1998 | Armbruster | |
| 5,816,080 A | 10/1998 | Jeziorowski | |
| 5,915,766 A | 6/1999 | Baumeister et al. | |
| 5,927,772 A | 7/1999 | Antonucci et al. | |
| 5,941,104 A | 8/1999 | Sadler | |
| 5,975,661 A * | 11/1999 | Jeziorowski et al. | 312/296 |
| 5,984,383 A | 11/1999 | Parikh et al. | |
| 6,048,006 A | 4/2000 | Antonucci et al. | |
| 6,076,868 A | 6/2000 | Roger, Jr. et al. | |
| 6,113,161 A | 9/2000 | Jung et al. | |
| 6,139,073 A | 10/2000 | Heffner et al. | |
| 6,176,528 B1 | 1/2001 | Taga | |
| 6,267,420 B1 | 7/2001 | Miyagawa | |
| 6,279,972 B1 | 8/2001 | Brill | |
| 6,327,879 B1 | 12/2001 | Malsom | |
| 6,341,807 B2 | 1/2002 | Cetnar et al. | |
| 6,386,599 B1 | 5/2002 | Chevalier | |
| 6,460,902 B1 | 10/2002 | Kyle | |
| 6,463,773 B1 | 10/2002 | Dimig | |
| 6,471,260 B1 | 10/2002 | Weinerman et al. | |
| 6,588,811 B1 | 7/2003 | Ferguson | |
| 6,705,140 B1 | 3/2004 | Dimig et al. | |
| 6,715,815 B2 | 4/2004 | Toppani | |
| 6,719,333 B2 | 4/2004 | Rice et al. | |
| 6,730,867 B2 | 5/2004 | Hyp | |
| 6,761,278 B2 | 7/2004 | Hyp | |
| 6,761,382 B2 | 7/2004 | Ji et al. | |
| 6,832,793 B2 | 12/2004 | Bingle et al. | |
| 6,843,085 B2 | 1/2005 | Dimig | |
| D506,120 S | 6/2005 | Straka, Jr. et al. | |
| 6,942,259 B2 | 9/2005 | Marzolf et al. | |
| 6,948,745 B2 | 9/2005 | Chevalier | |
| 6,966,583 B2 | 11/2005 | Ji et al. | |
| 6,997,488 B2 | 2/2006 | Kurten et al. | |
| 7,004,517 B2 | 2/2006 | Vitry et al. | |
| 7,029,040 B2 | 4/2006 | Lippoldt et al. | |
| 7,065,992 B2 | 6/2006 | Talukdar et al. | |
| 7,080,531 B2 | 7/2006 | Vitry et al. | |
| 7,185,927 B2 | 3/2007 | Talukdar et al. | |
| 7,234,739 B2 | 6/2007 | Saitoh et al. | |
| 7,267,378 B2 | 9/2007 | Drumm | |
| 7,332,990 B2 * | 2/2008 | Lo et al. | 335/205 |
| 2002/0084666 A1 | 7/2002 | Toppani | |
| 2002/0167175 A1 | 11/2002 | Weyerstall et al. | |
| 2003/0025339 A1 | 2/2003 | Vitry et al. | |
| 2003/0094024 A1 | 5/2003 | Dimig | |
| 2003/0193199 A1 | 10/2003 | Talukdar et al. | |
| 2005/0067840 A1 | 3/2005 | Koveal et al. | |
| 2005/0200137 A1 | 9/2005 | Nelsen et al. | |
| 2007/0007775 A1 * | 1/2007 | Gallas et al. | 292/251.5 |
| 2007/0216173 A1 | 9/2007 | Vitry | |
| 2008/0191494 A1 * | 8/2008 | Carabalona et al. | 292/2 |
| 2008/0265588 A1 * | 10/2008 | Carabalona | 292/251.5 |
| 2009/0230699 A1 * | 9/2009 | Carabalona | 292/48 |
| 2010/0197811 A1 | 8/2010 | Suzuki | |

FOREIGN PATENT DOCUMENTS

| | | | |
|---|---|---|---|
| DE | 1553544 | | 7/1969 |
| DE | 1505721 | | 7/1970 |
| DE | 2455520 | * | 5/1976 |
| DE | 3333746 A1 | | 6/1985 |
| DE | 19953898 | | 8/2001 |
| DE | 100009370 A1 | | 9/2001 |
| EP | 0239229 A3 | | 9/1987 |
| EP | 0408951 A2 | | 1/1991 |
| EP | 0546668 B1 | | 6/1993 |
| FR | 1201673 | | 1/1960 |
| FR | 1302936 | | 9/1962 |
| FR | 2860023 A1 | | 3/2005 |
| JP | 3612595 | | 5/1961 |
| JP | 54013000 A | * | 1/1979 |
| JP | 54102046 A | * | 8/1979 |
| JP | 56118260 | | 9/1981 |
| JP | 5340149 | | 11/2013 |
| WO | WO0138671 A2 | | 5/2001 |
| WO | 0204773 | | 1/2002 |
| WO | WO2006034057 A1 | | 3/2006 |
| WO | WO2006088775 A2 | | 8/2006 |
| WO | WO2006122151 A2 | | 11/2006 |
| WO | WO2008086256 A1 | | 7/2008 |

OTHER PUBLICATIONS

TrMark Website print out—www.trimarkcorp.com, 050-0410 Floating Striker Single Rotor Latch Single Position, 19 pages. Printed out on Apr. 13, 2004.

Photographs showing a TriMark latch similar to those shown in TriMark's Website.

European Extended Search Report mailed May 30, 2014 in corresponding European Application No. 06770150.8.

* cited by examiner

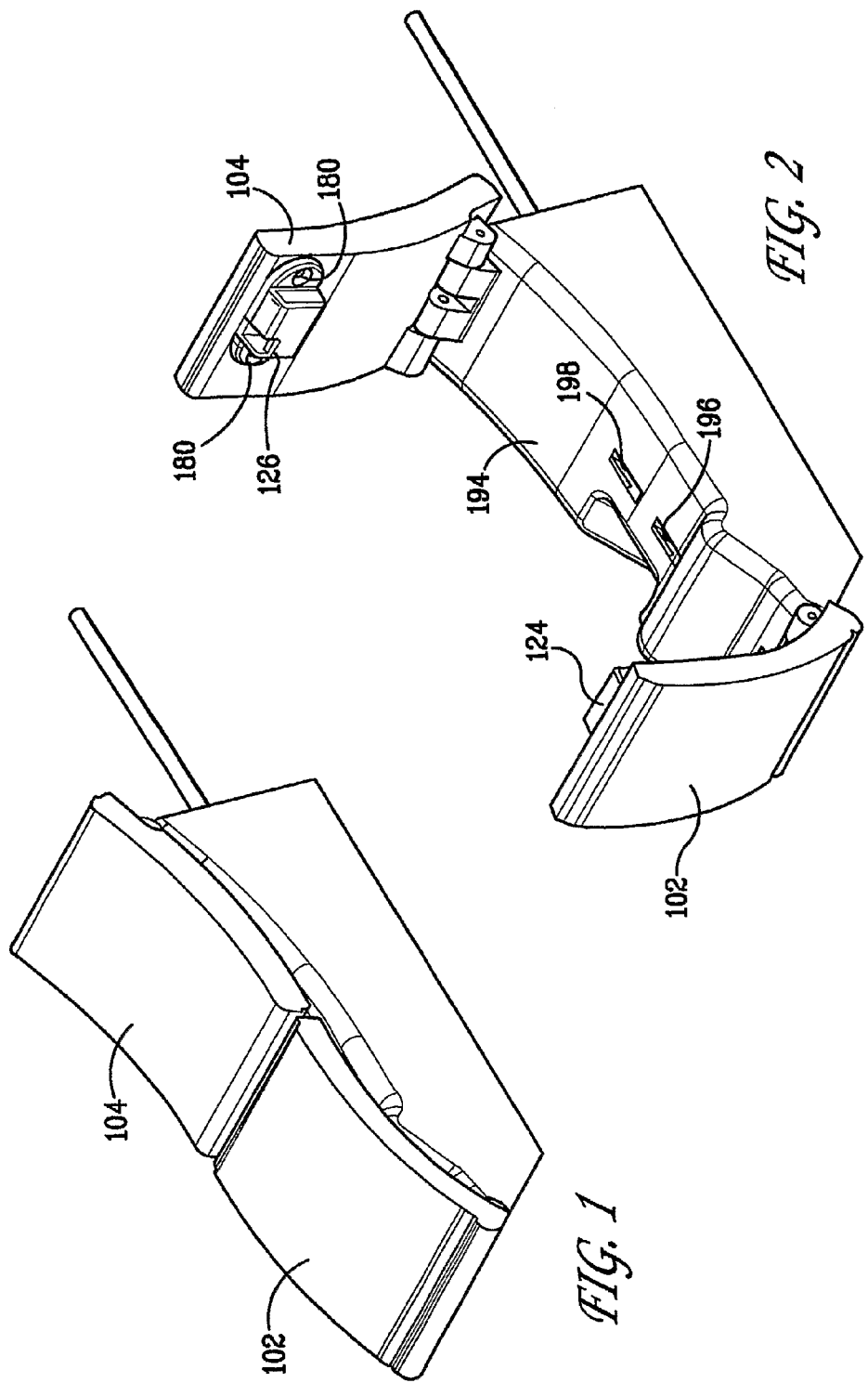

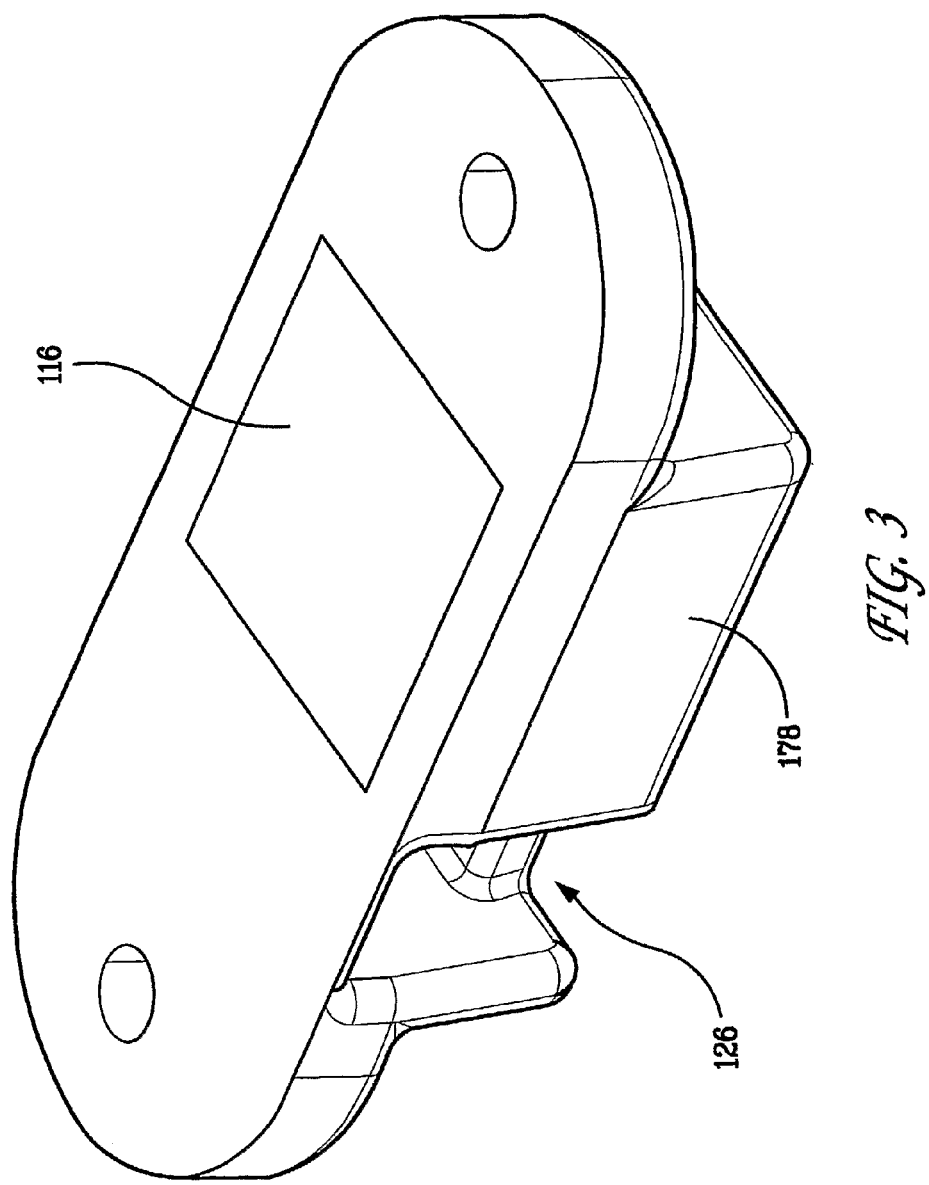

Ball Bearing Locking Feature

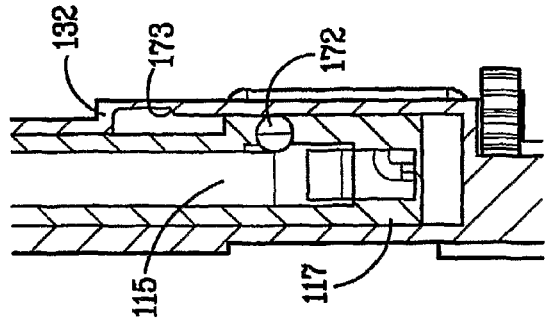

FIG. 8

1 – CLOSED POSITION

BALL BEARING LOCKS THE RACK TO THE HOUSING. PREVENTING MOVEMENT OF THE PAWLS.

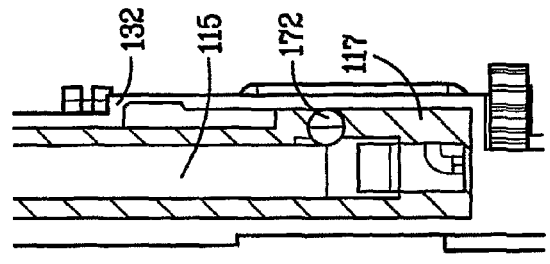

FIG. 9

2 – LOCKED POSITION

SLIDER MOVED 4MM BY THE MOTOR OR CABLE. THIS ALLOWS THE BALL BEARING TO MOVE OUT OF THE HOUSING.

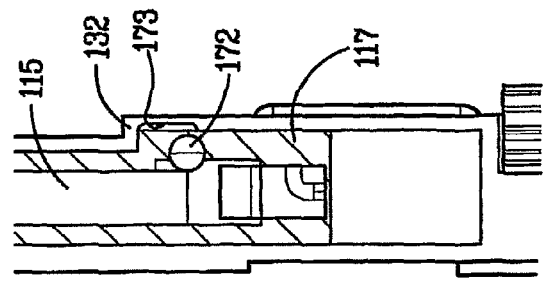

FIG. 10

3 – LATCH ACTUATED

WITH BALL BEARING OUT OF HOUSING, THE SLIDER PUSHES THE RACK ACROSS TO RETRACT THE PAWLS.

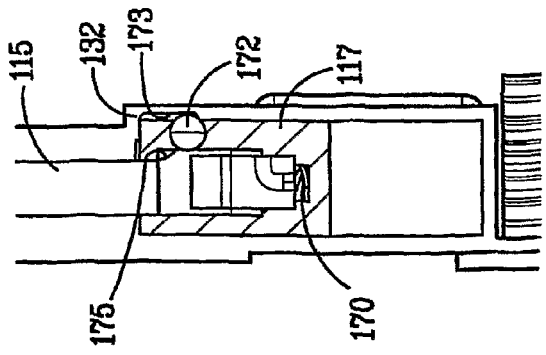

FIG. 11

4 – LATCH OPEN

THE WORM GEAR AND SLEEVE RETURN TO ITS ORIGINAL POSITION. HOWEVER, THE PAWL MAGNETS KEEP THE RACK AND SLIDER IN THE POSITION SHOWN.

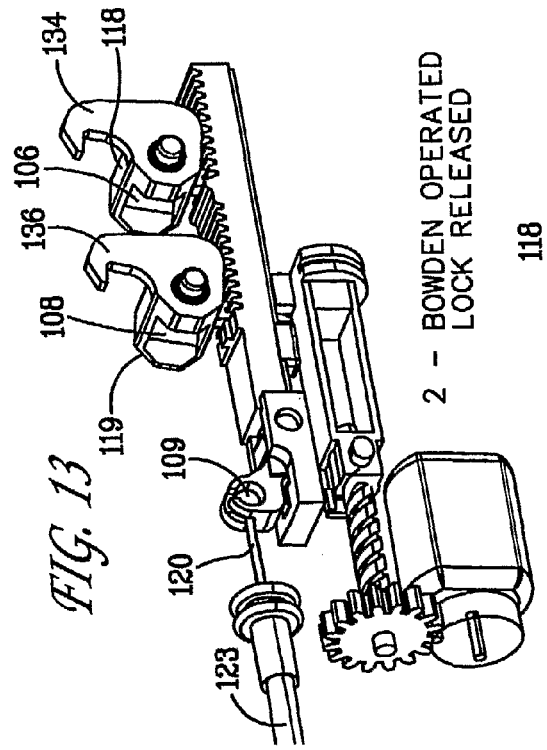
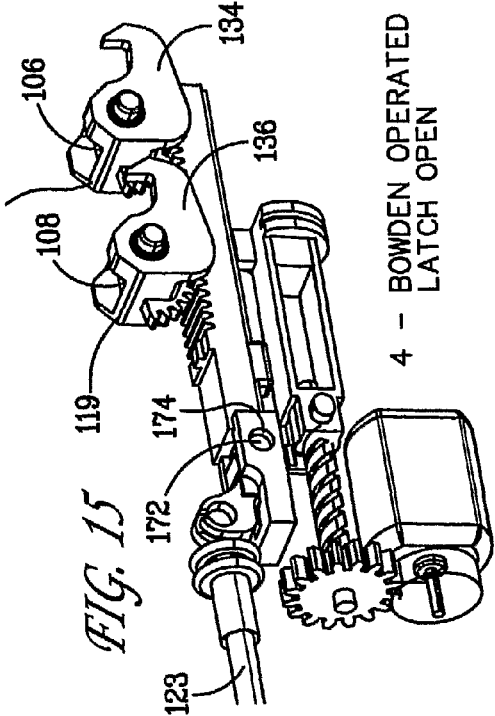
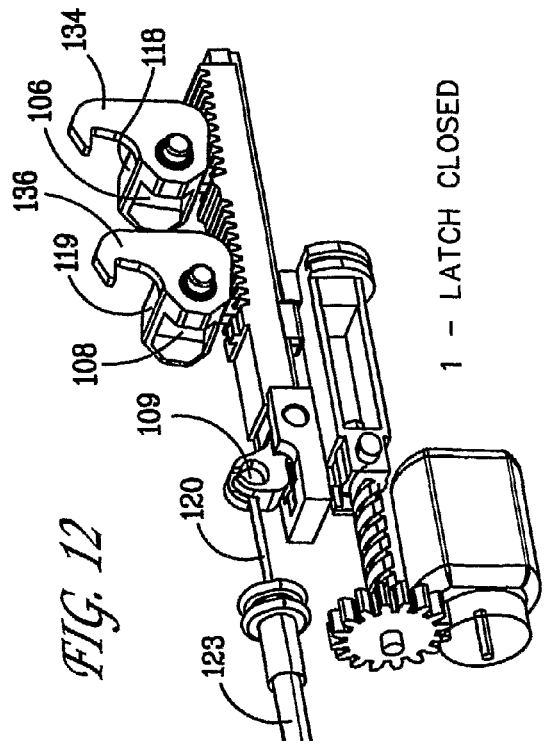
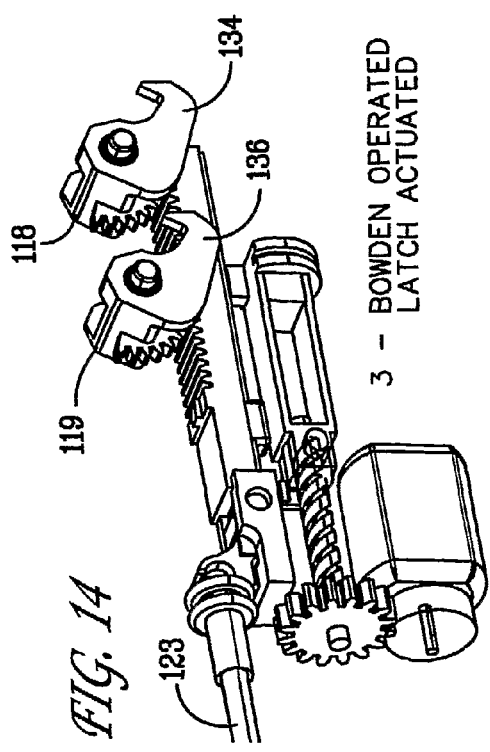

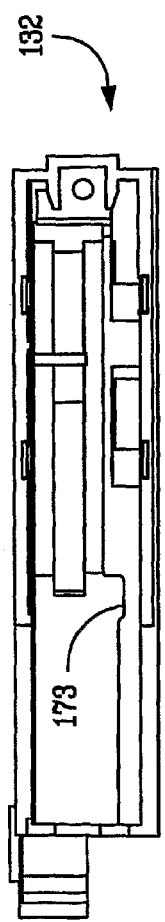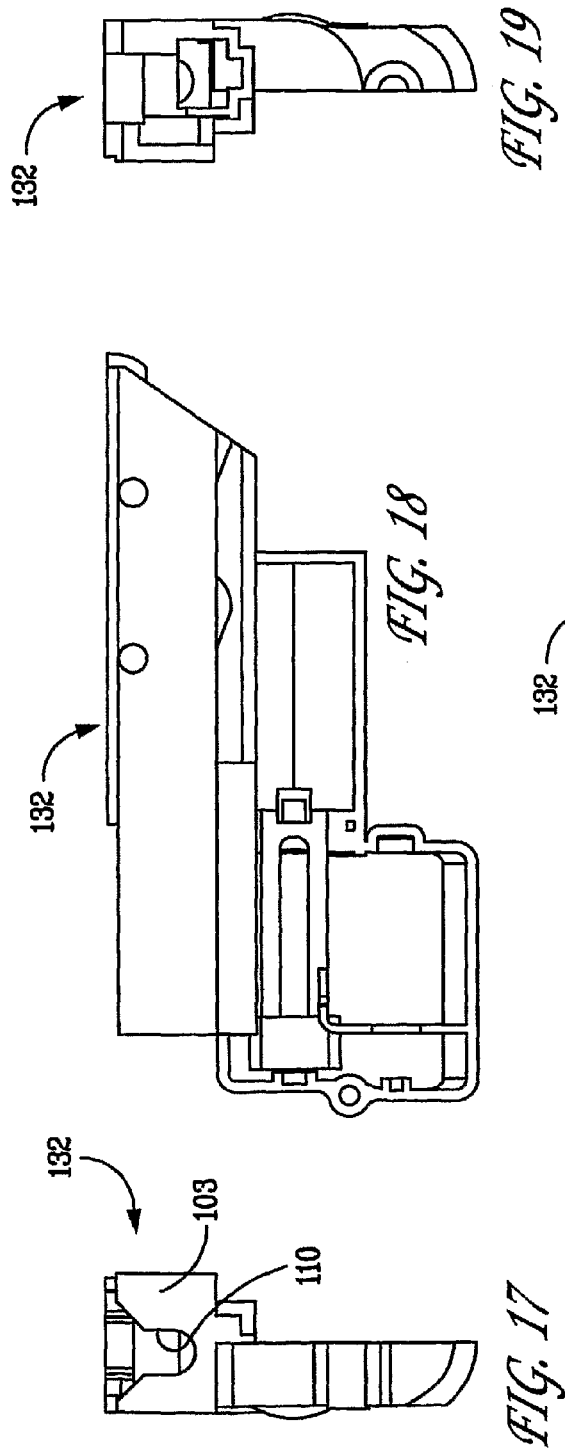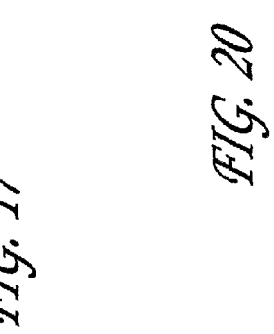

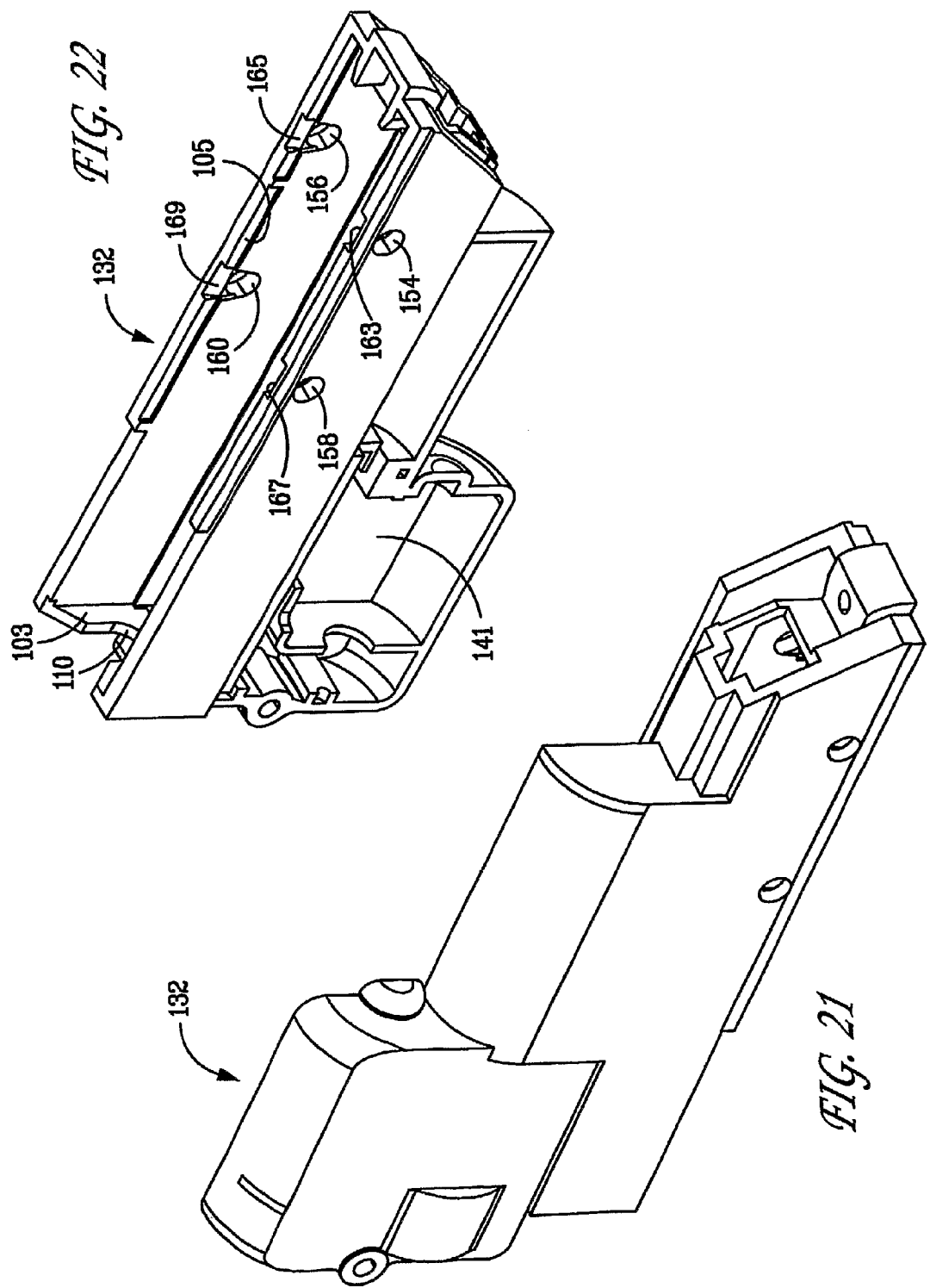

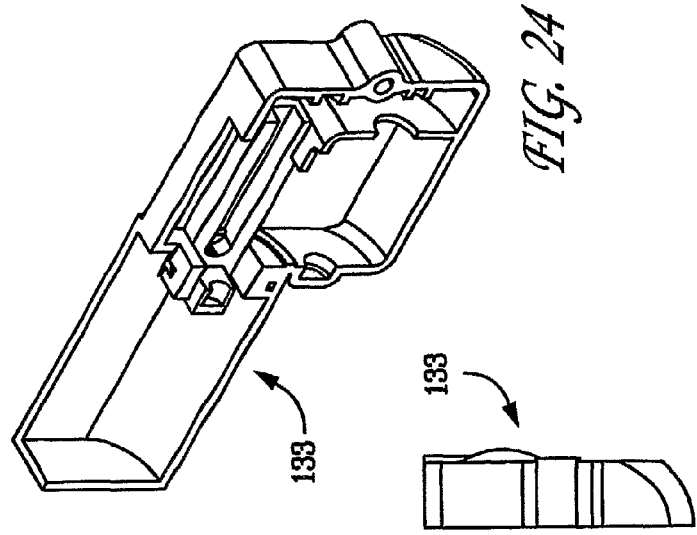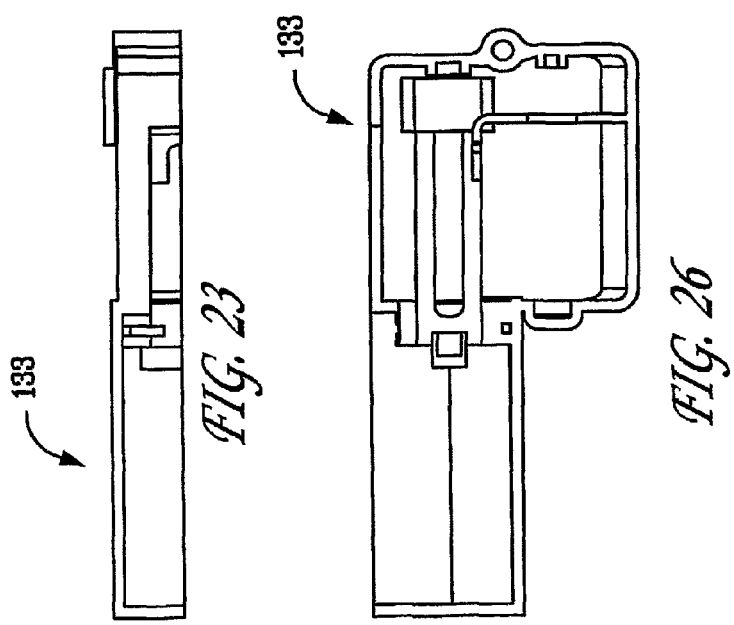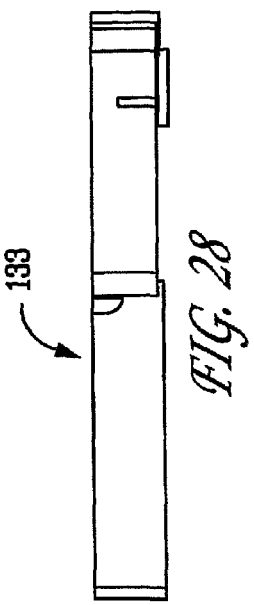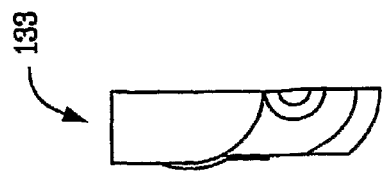

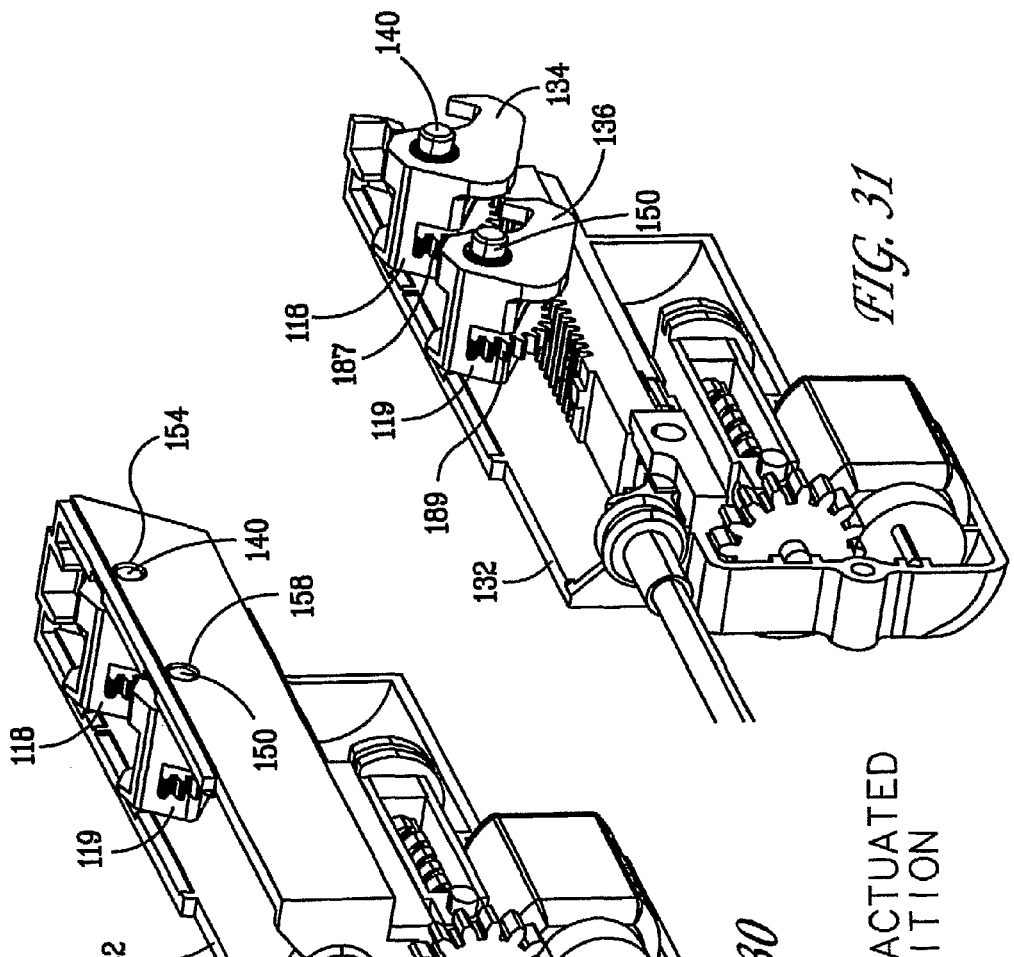
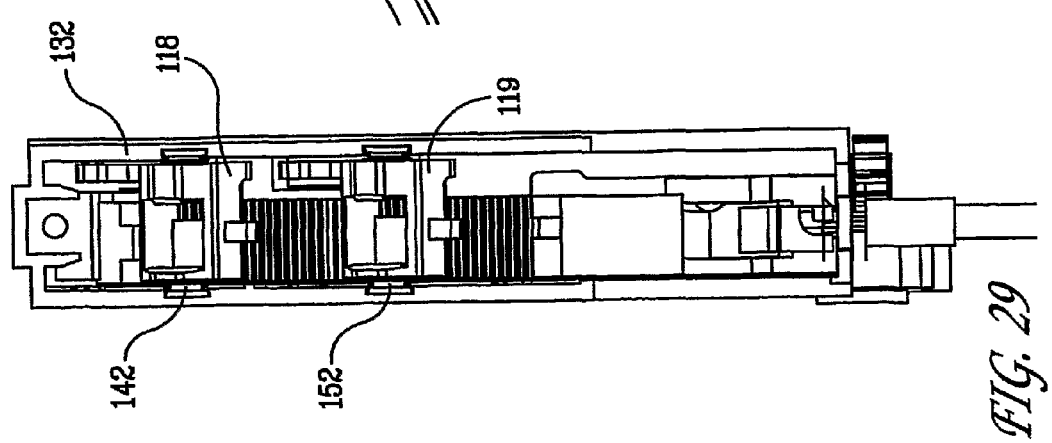

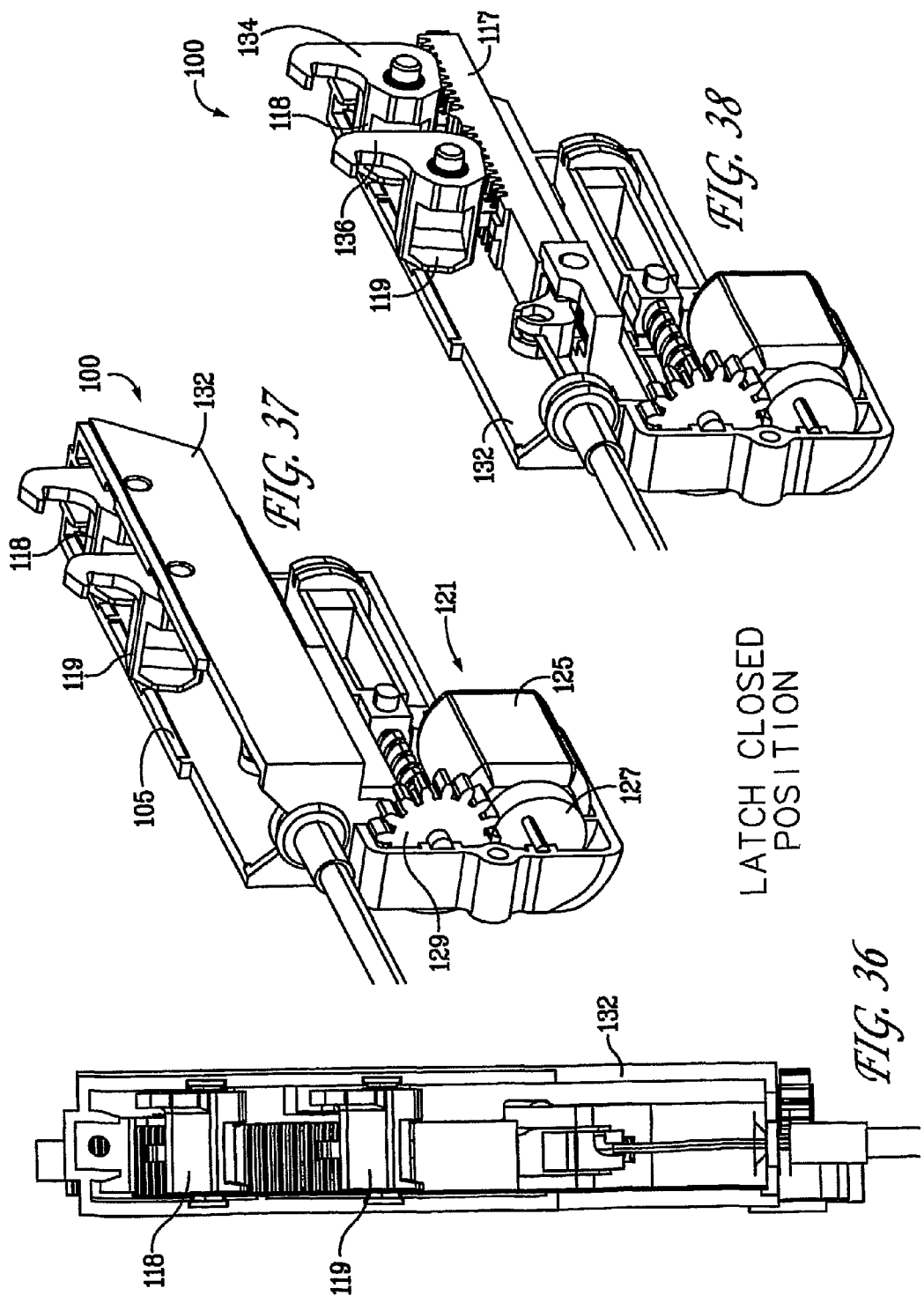

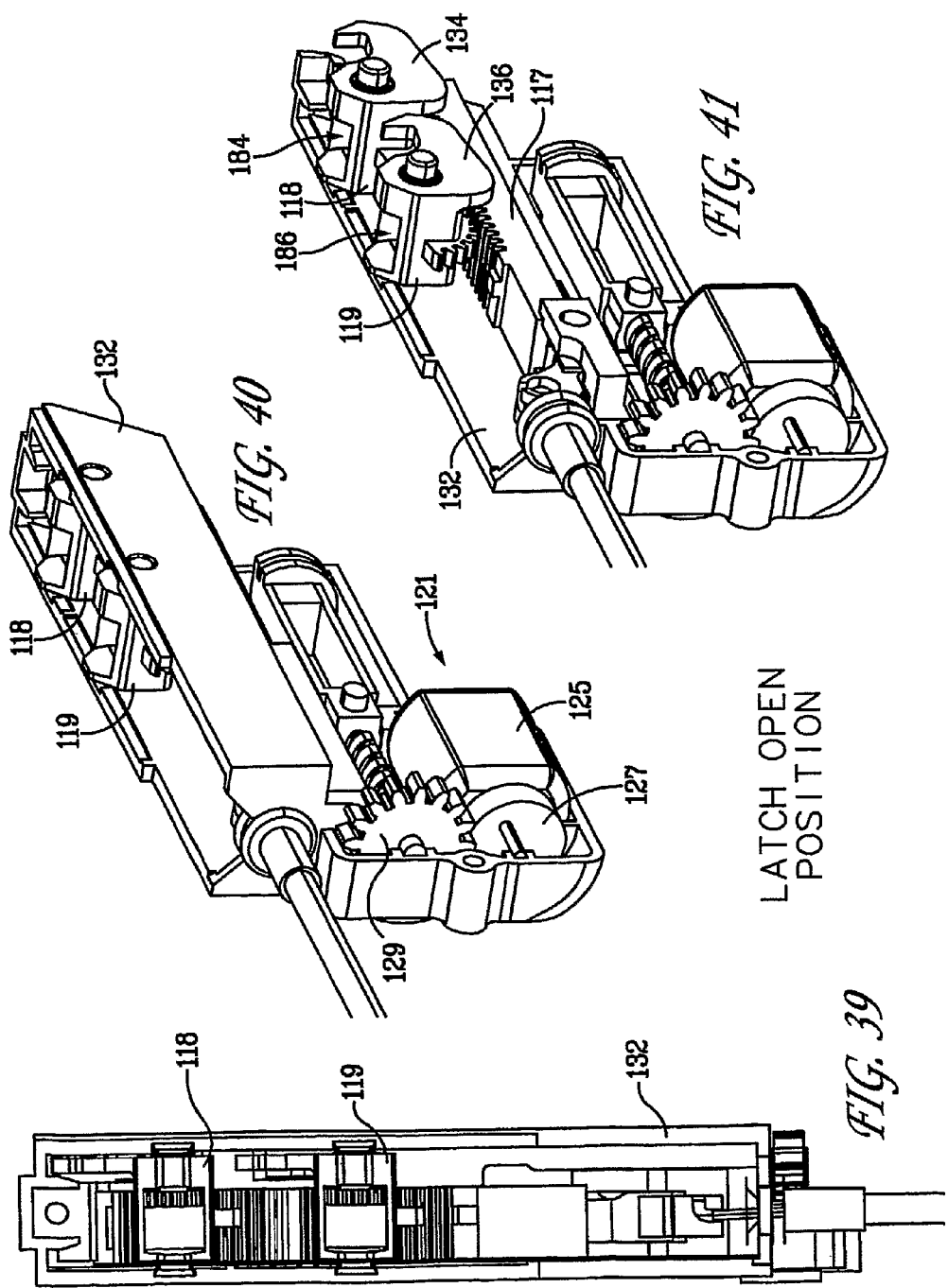

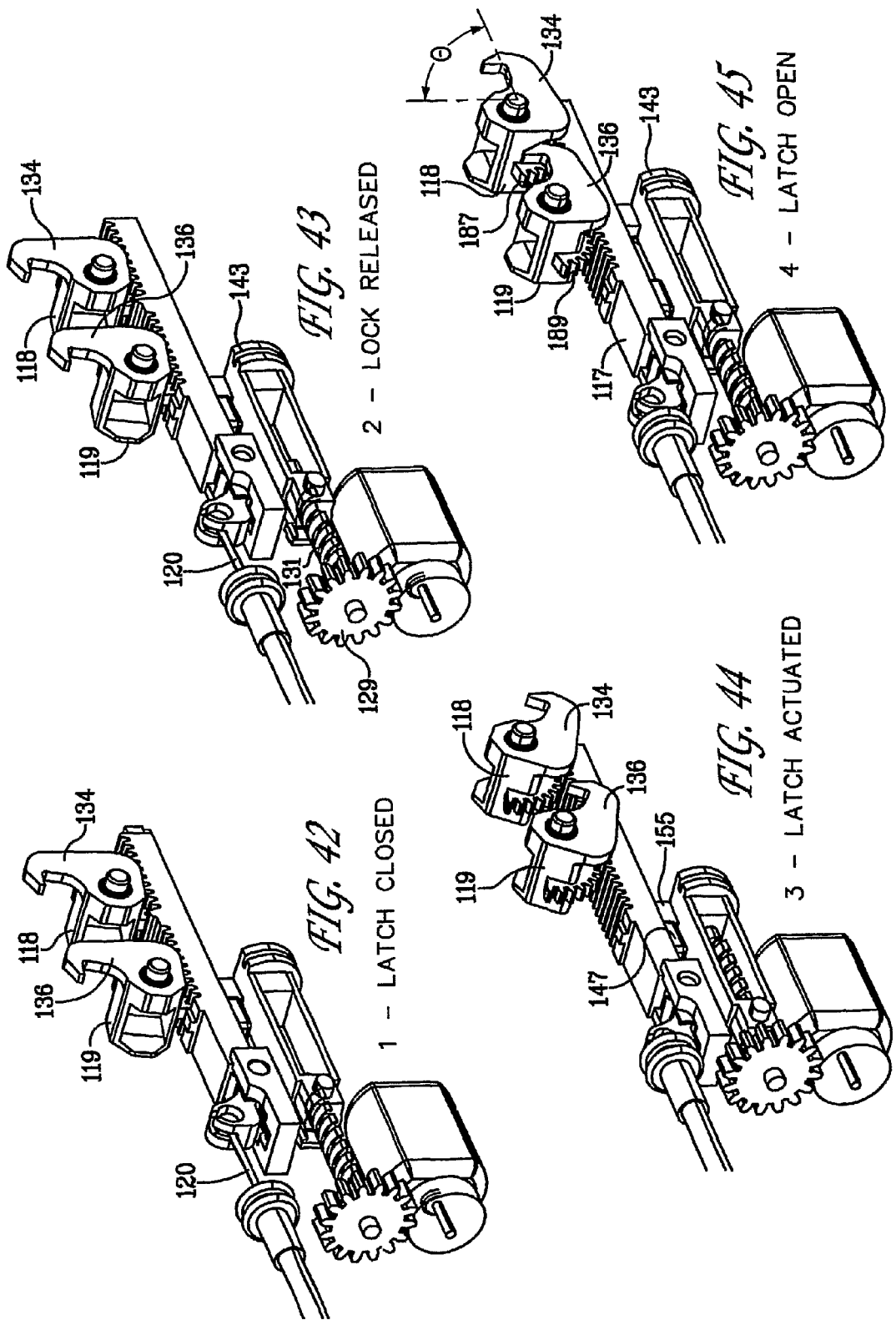

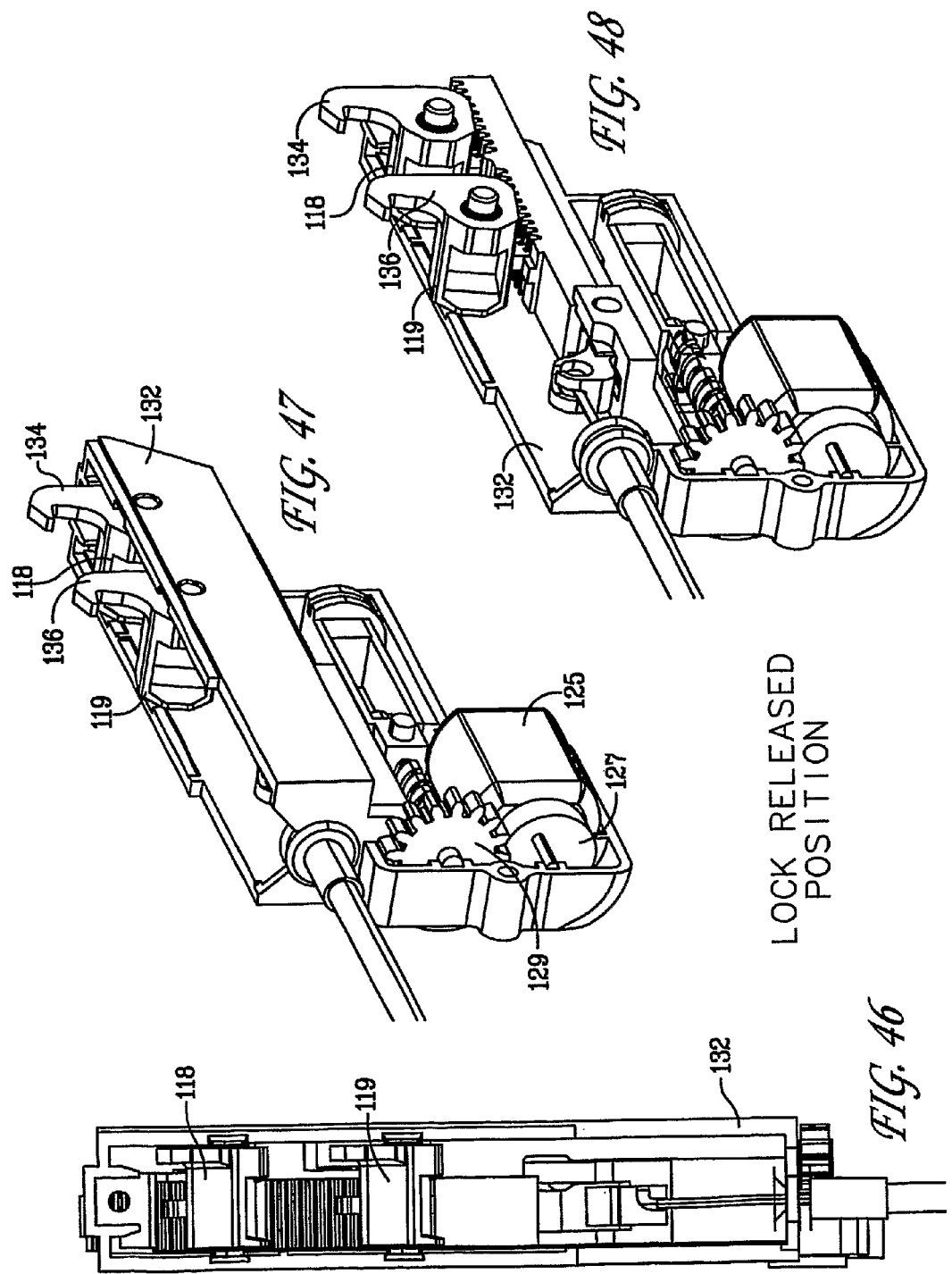

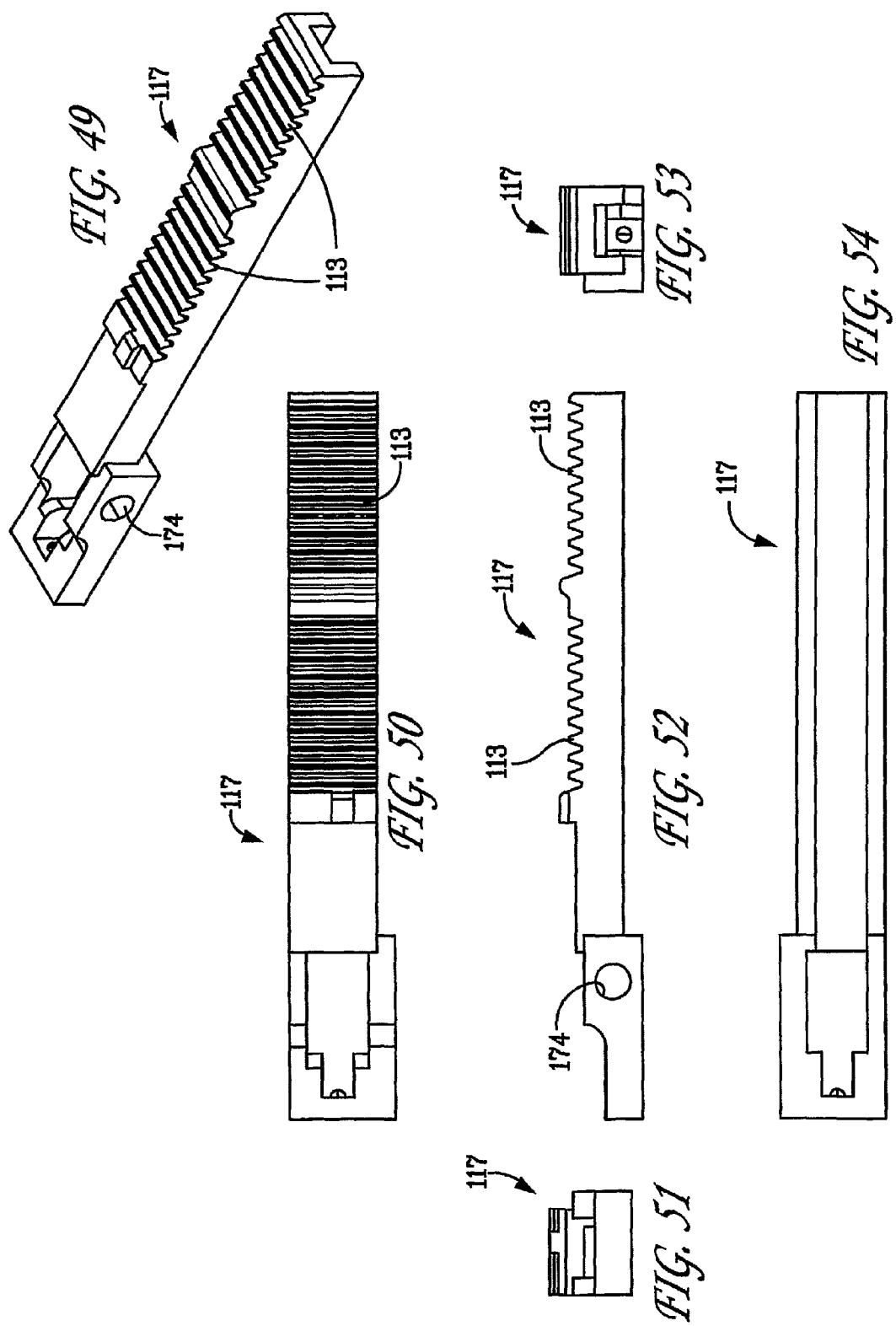

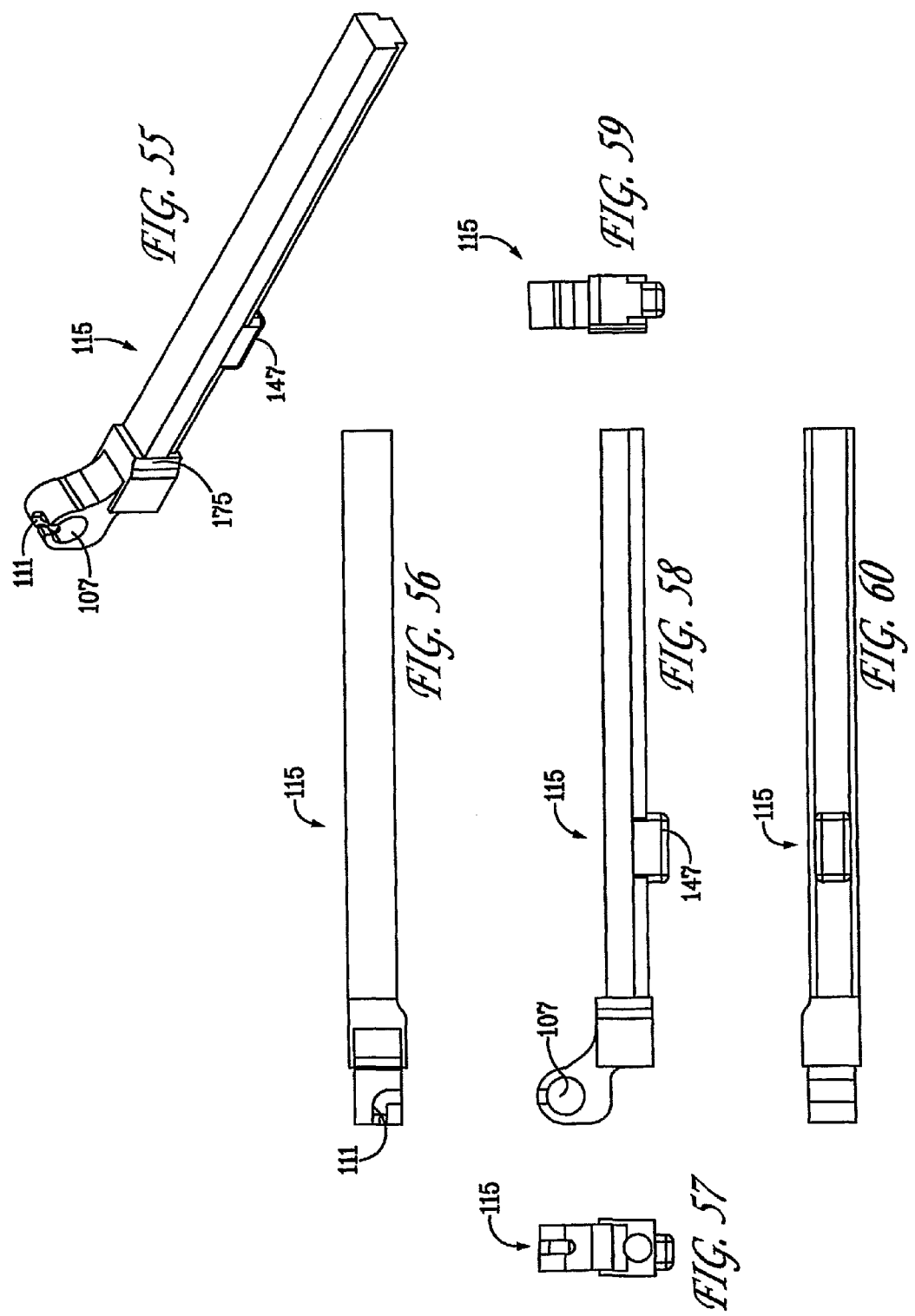

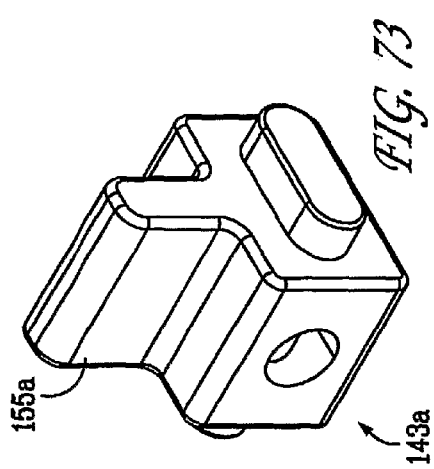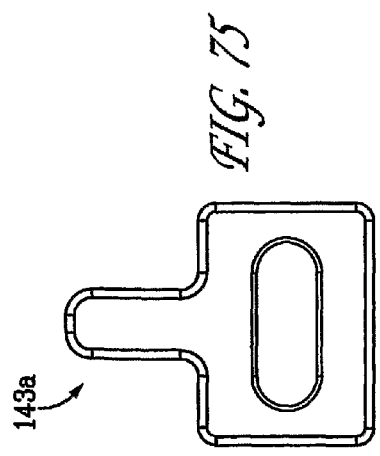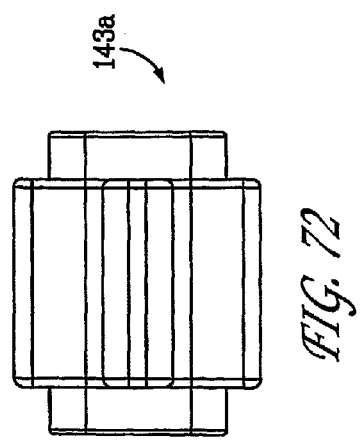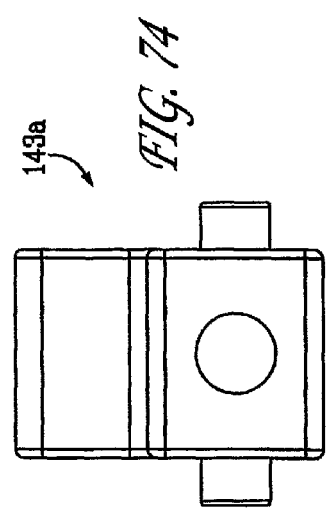

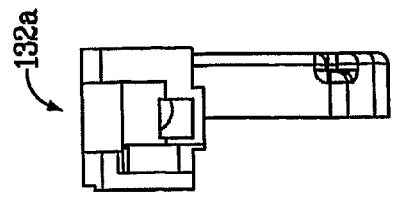
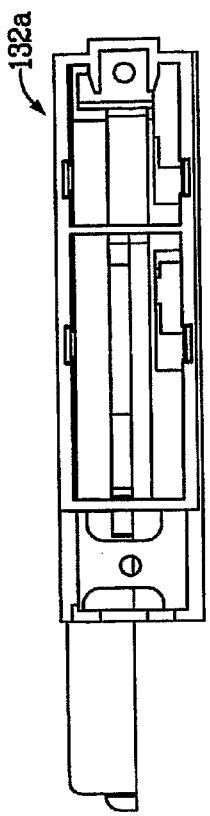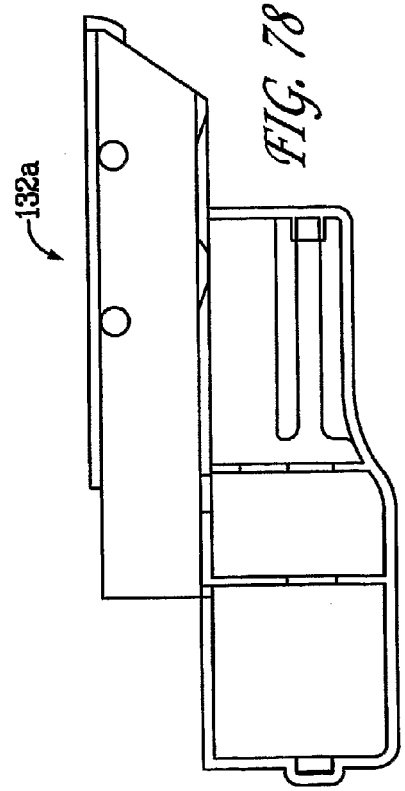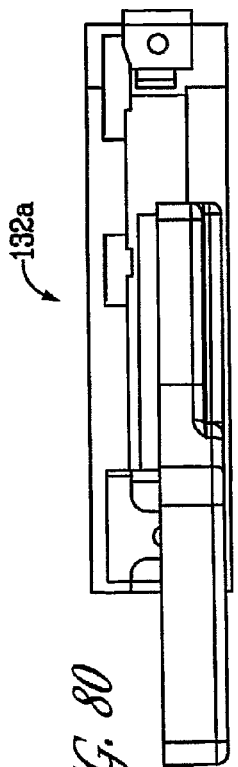
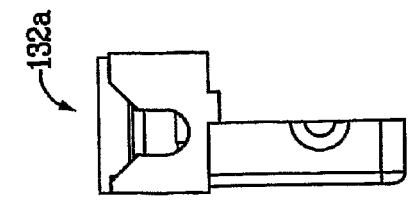

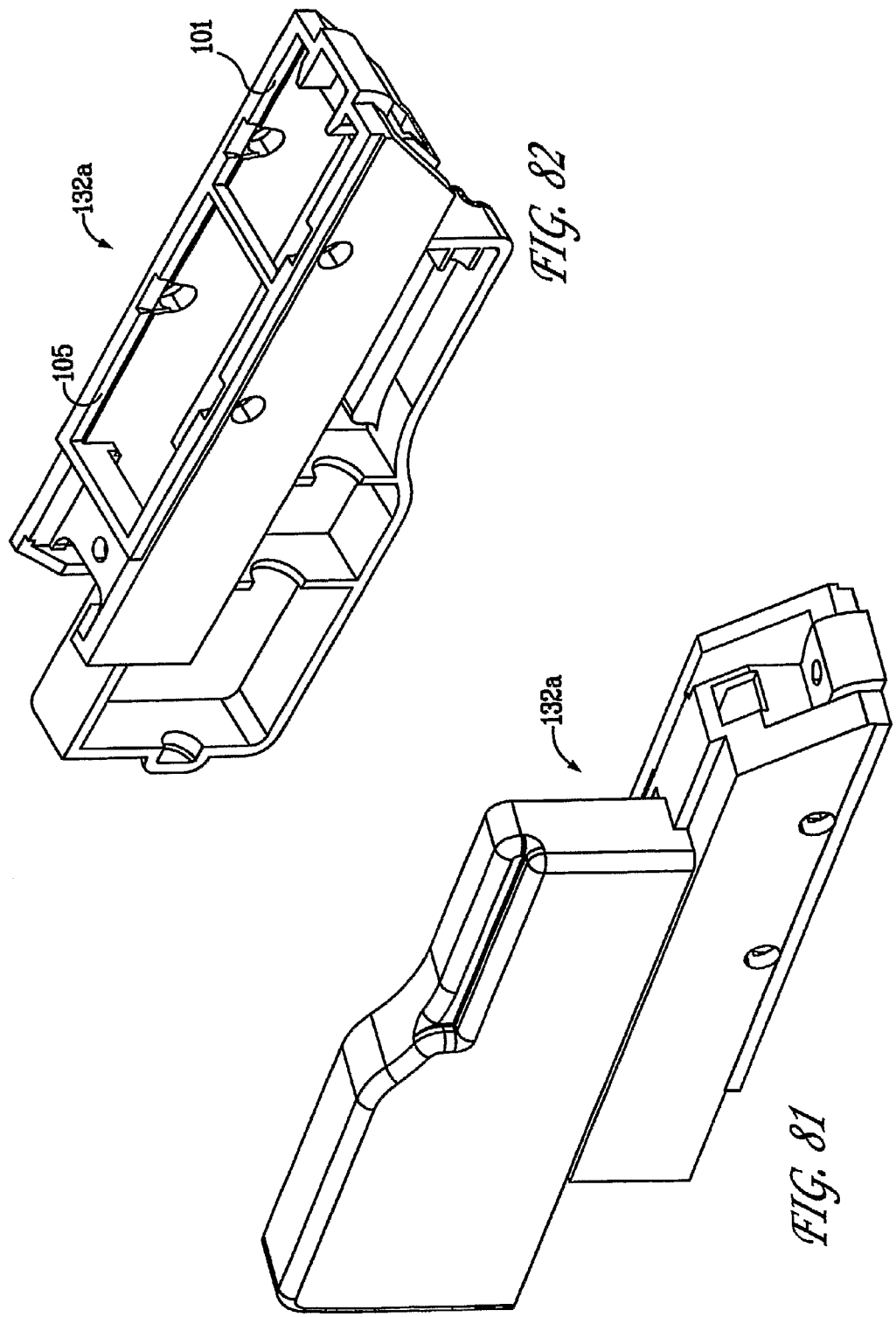

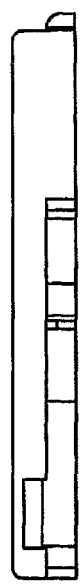
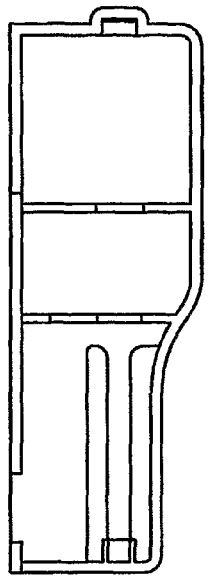
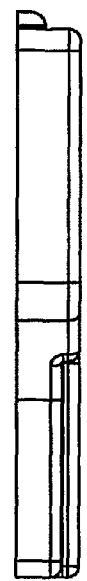
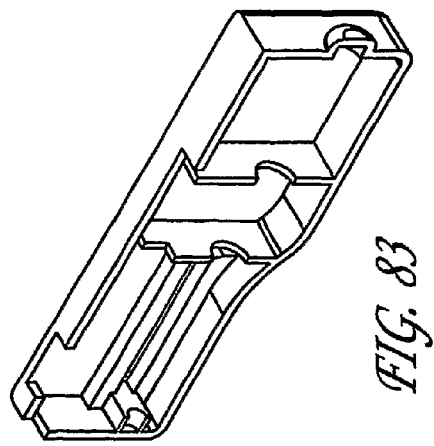

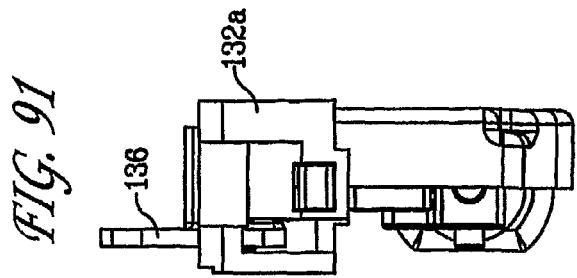
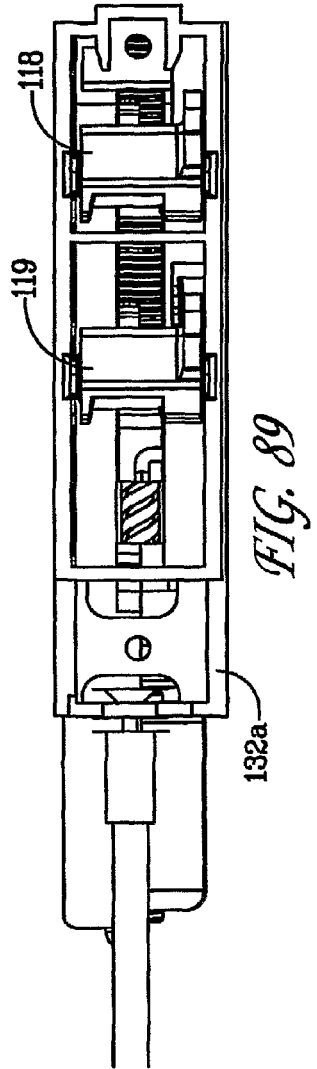
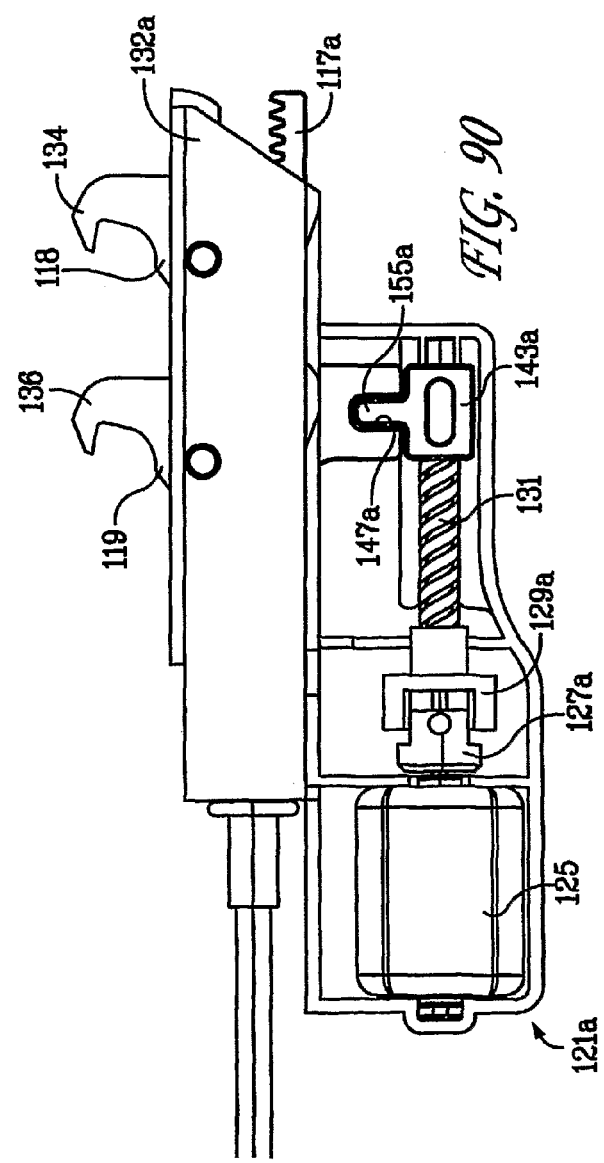

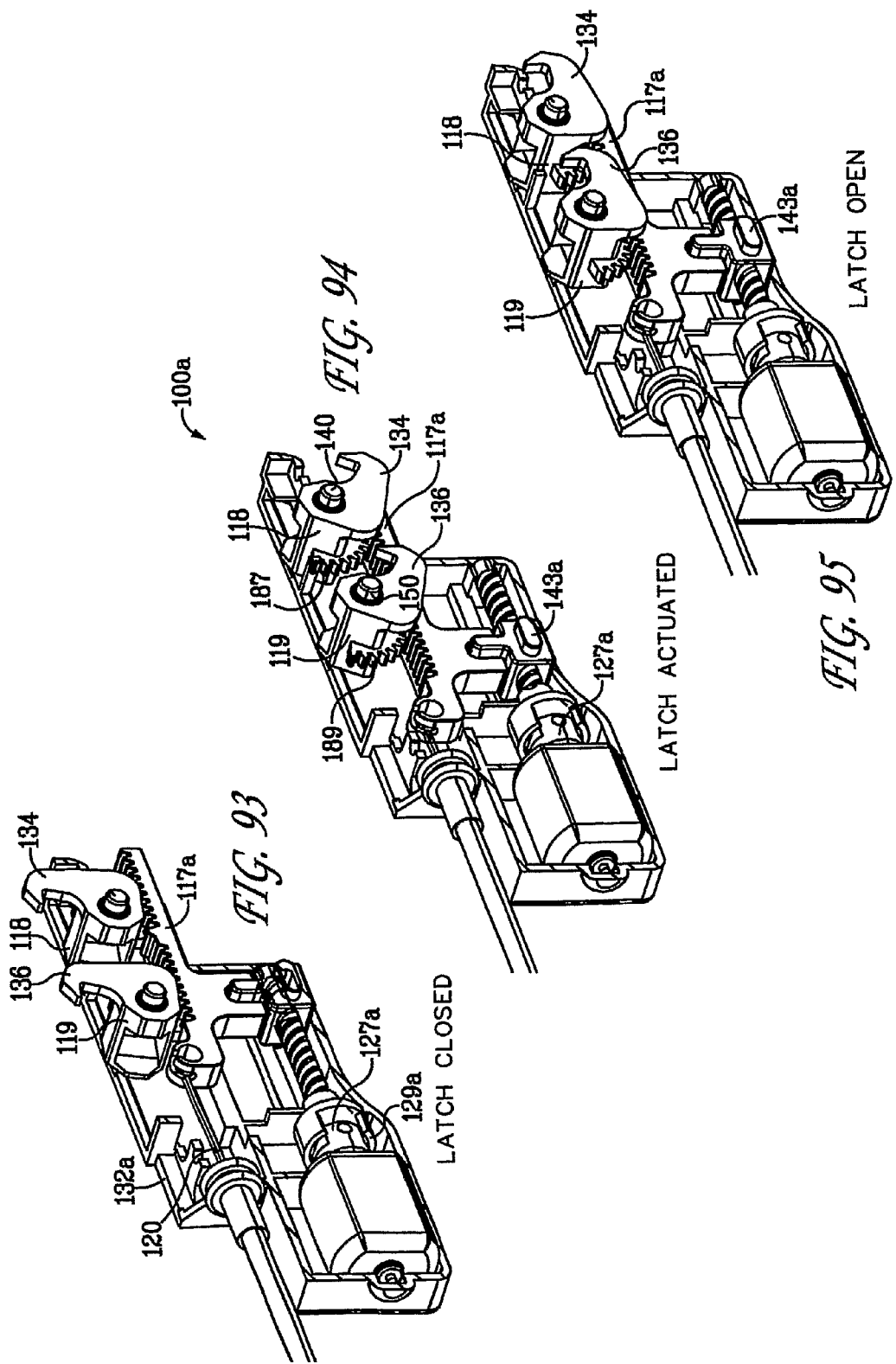

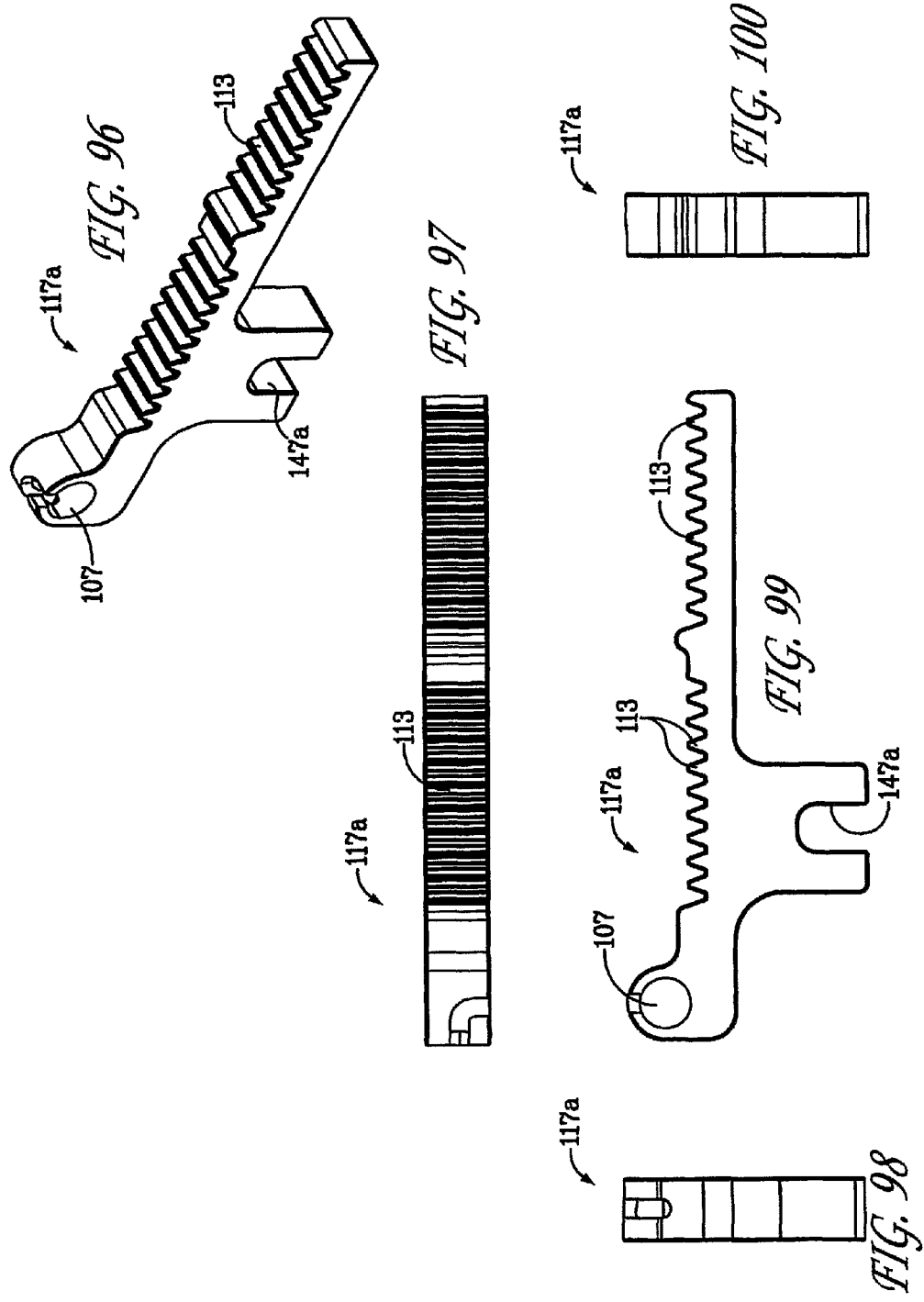

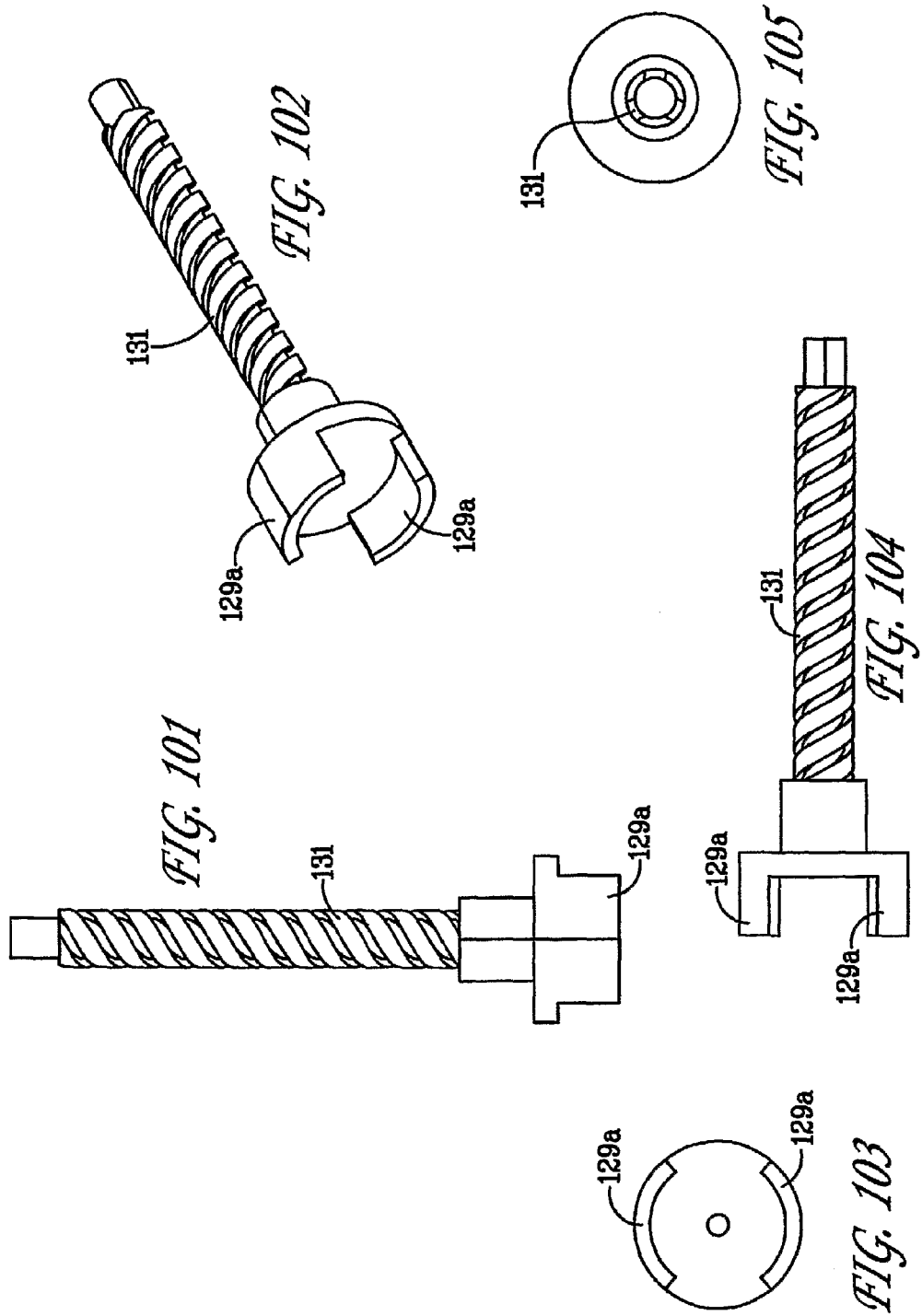

1 - LATCH CLOSED

2 - BOWDEN OPERATED LOCK RELEASED

3 - BOWDEN OPERATED LATCH ACTUATED

4 - LATCH OPEN

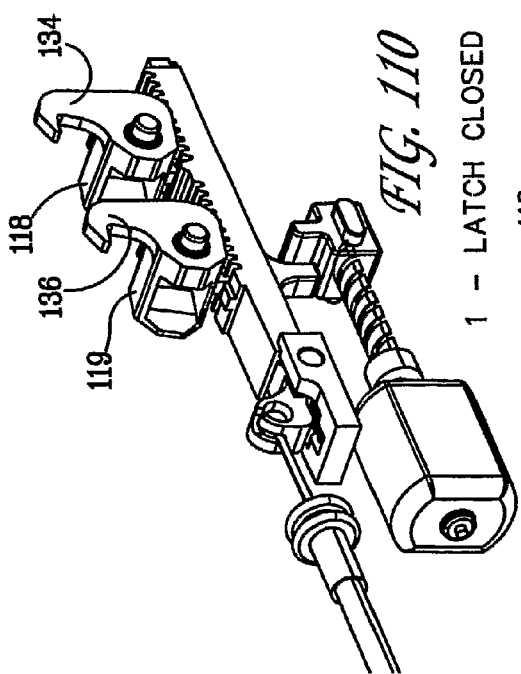
FIG. 110  1 - LATCH CLOSED
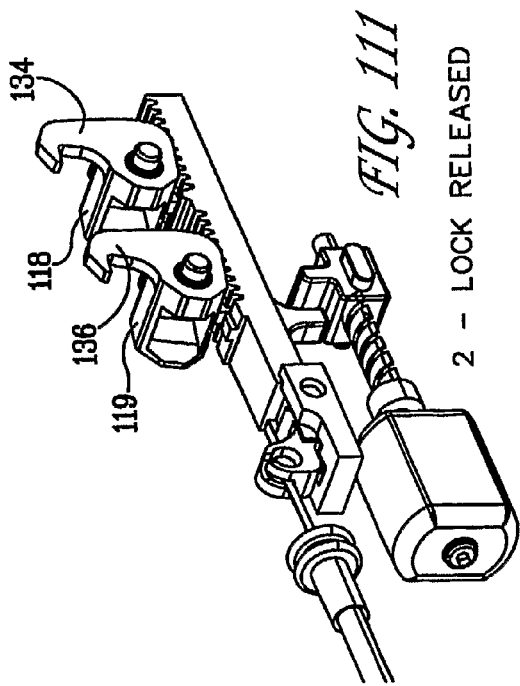
FIG. 111  2 - LOCK RELEASED
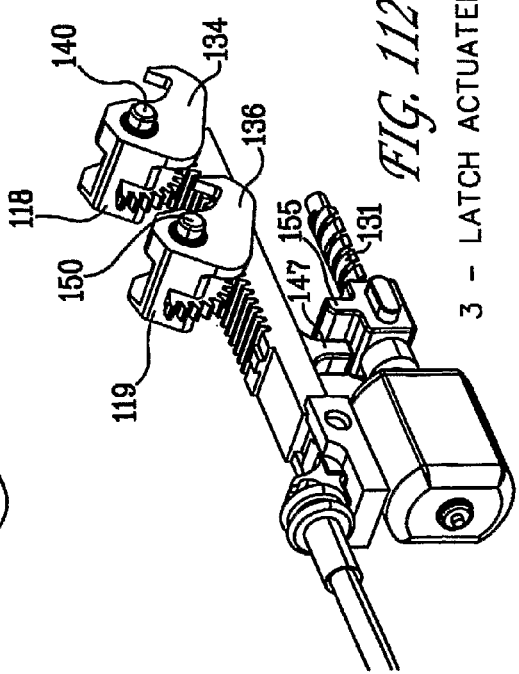
FIG. 112  3 - LATCH ACTUATED
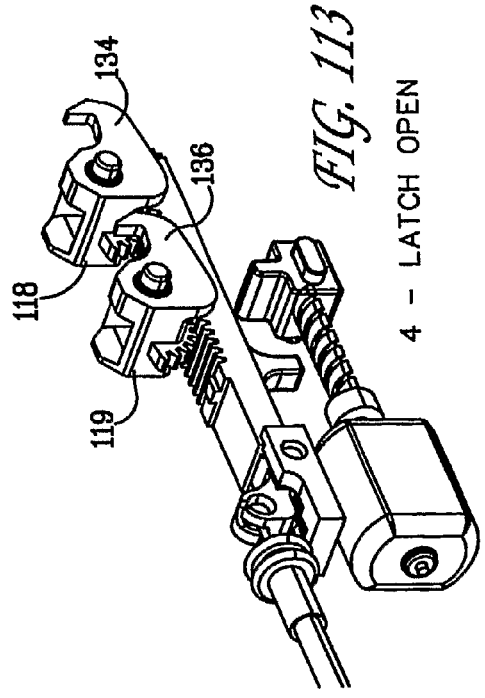
FIG. 113  4 - LATCH OPEN

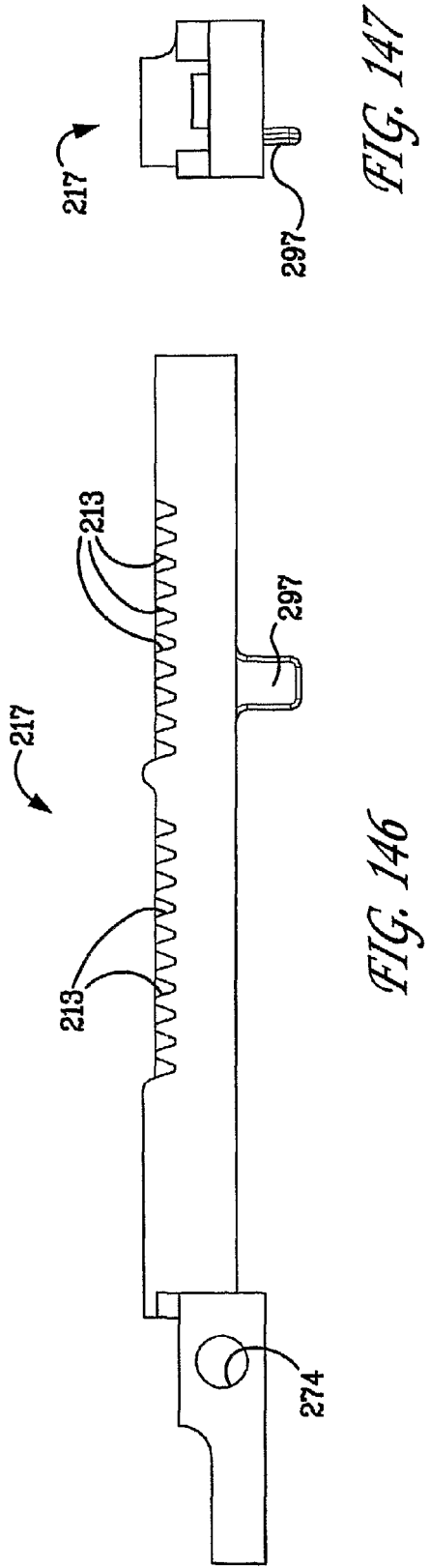

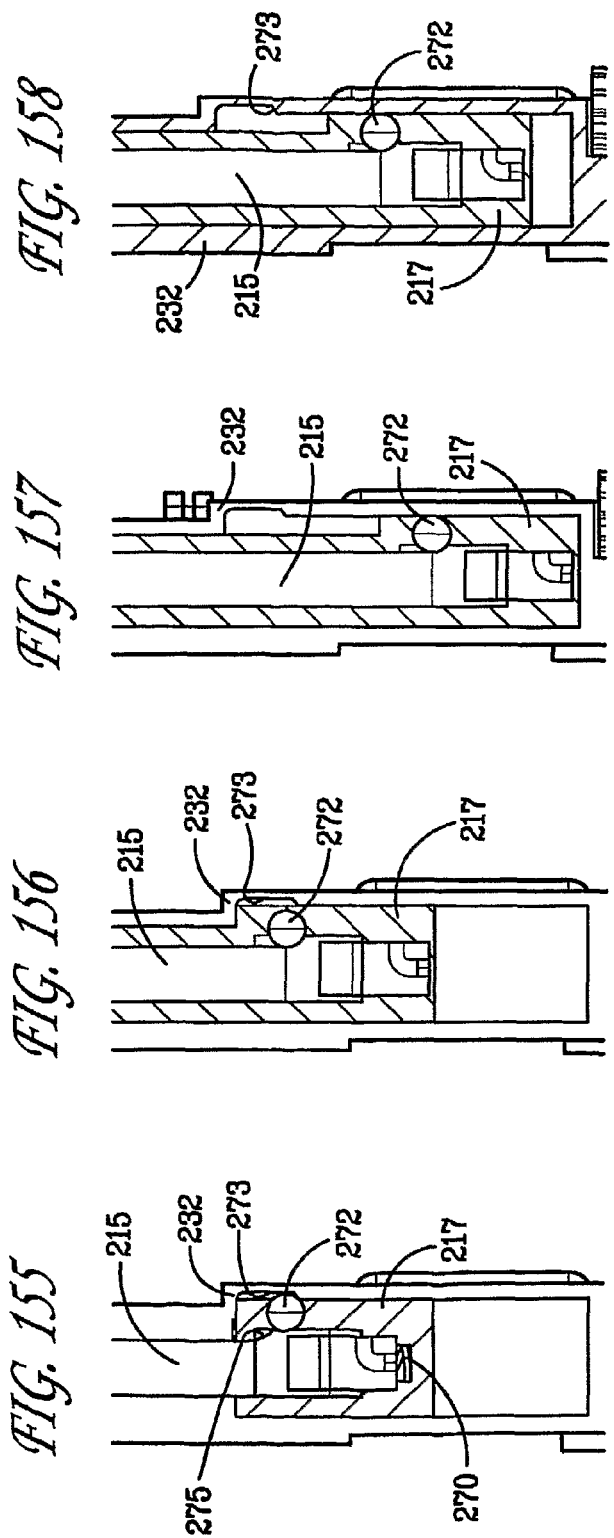

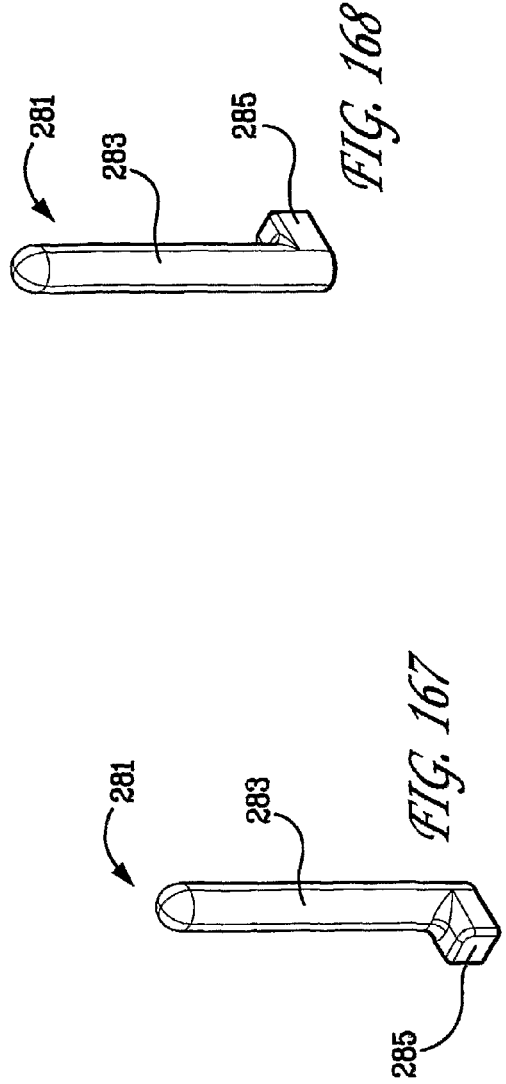
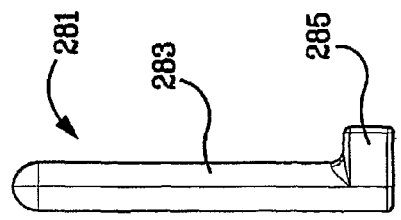
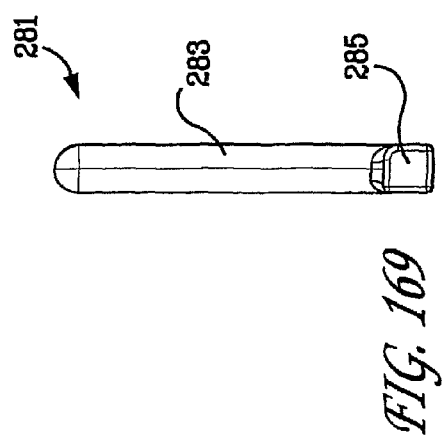
FIG. 167
FIG. 168
FIG. 169
FIG. 170

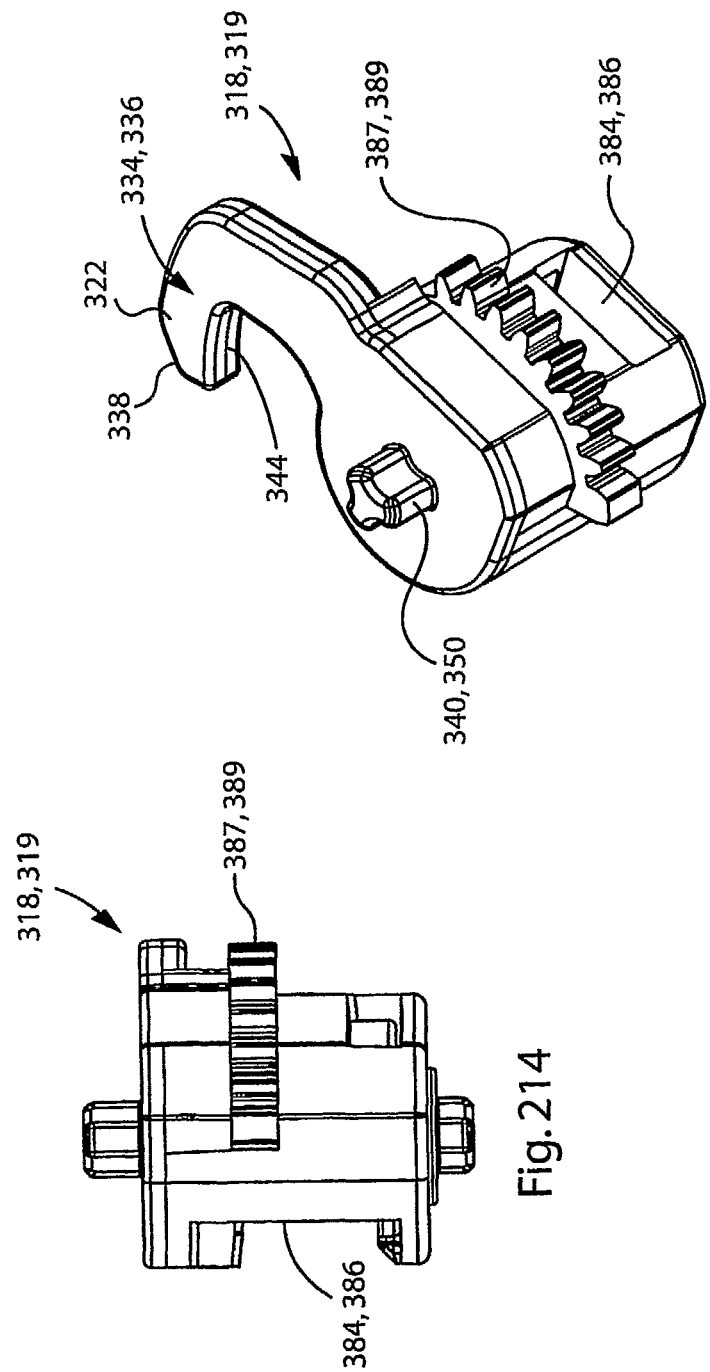

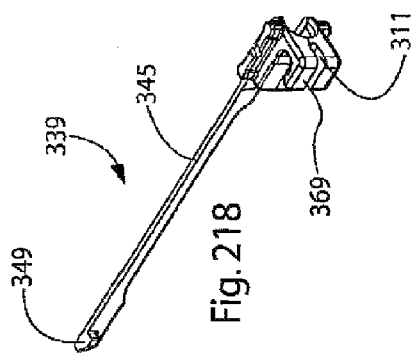
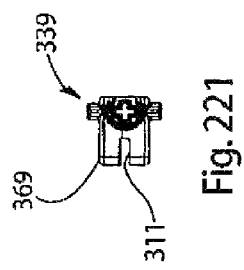
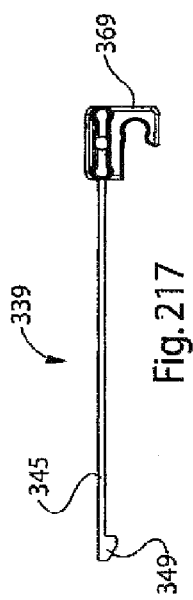
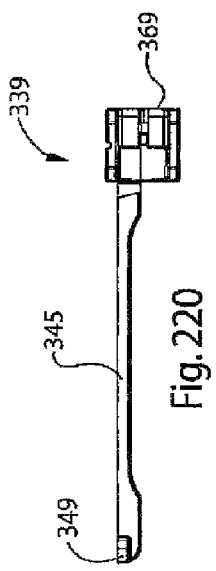
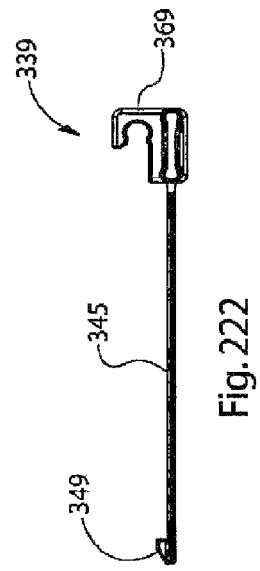
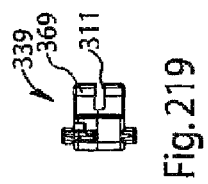

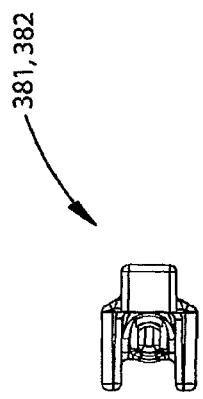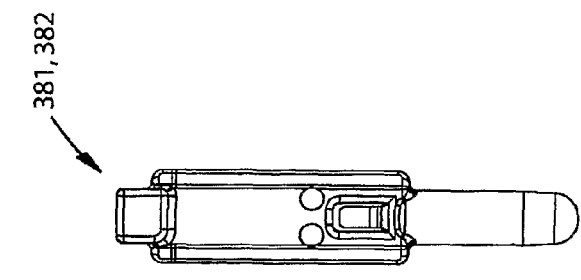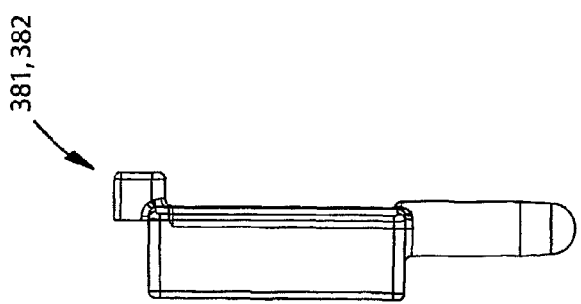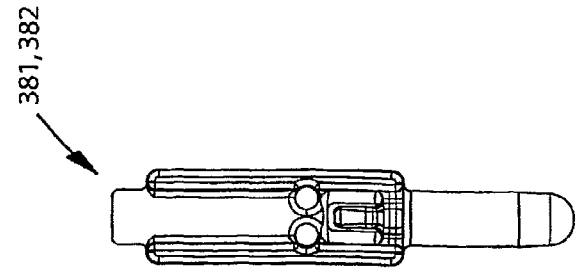

US 9,004,550 B2

MAGNETIC LATCH MECHANISM

CROSS REFERENCE TO RELATED APPLICATIONS

This application claims the benefit of U.S. Provisional Application for Patent Ser. No. 60/679,274, filed on May 8, 2005, and of U.S. Provisional Application for Patent Ser. No. 60/683,981, filed on May 23, 2005, all of which are incorporated herein by reference in their entirety.

BACKGROUND OF THE INVENTION

1. Field of Invention This invention relates to latch having magnets for use in securing one or more closure panels of a compartment in the closed position.

2. Brief Description of the Related Art

In many applications the need arises to secure a panel in a closed position relative to a compartment opening or another panel. For example, in the automotive industry the panels acting as closures for the interior compartments of the vehicle must be secured in the closed position when the compartment is not being accessed. Examples of such compartments include the vehicle's glove compartment and the center console compartment between a vehicle's front seats. The closure members for such compartments are selectively secured in the closed position by latches in order to secure the contents of the compartments while allowing a user to selectively open the closure members to access the contents of the compartments. Many latches for this purpose have been proposed in the art. Examples of such latches can be seen in U.S. Pat. Nos. 5,927,772 and 6,761,278. However, none of the known latches are seen to teach or suggest the novel and unique latch of the present invention.

SUMMARY OF THE INVENTION

The present invention is directed to a latch mechanism that is particularly advantageous for, but is not limited to, releasably securing dual doors of a compartment in the closed position. The latch has two rotary magnets, and each rotary magnet holds a respective one of the doors securely in the closed position relative to the compartment by magnetically attracting a magnetic insert attached to the respective door. Mechanical hook-like rotary pawls supplement the action of the magnets. The latch according to the present invention is well suited for use in applications where the dual doors are linked. In such applications closing one of the doors also moves the other door to the closed position. However, the mechanical linkage between the doors is not perfect and the closing of the doors is not always simultaneous. Often one door will slightly lag behind the other door in closing. The latch of the present invention is designed to effect proper securing of the doors in the closed position even when one door lags behind the other. In addition, the latch is provided with a safety feature that prevents the latch from opening in the event that the vehicle in which the latch is installed is involved in a collision.

BRIEF DESCRIPTION OF THE DRAWINGS

FIGS. 1-71 show a first embodiment of the present invention.

FIGS. 72-105 show a second embodiment of the present invention.

FIGS. 106-113 show a third embodiment of the present invention.

FIGS. 146-149 are views of the rack bar of the magnetic latch mechanism of FIGS. 119-122.

FIGS. 155-158 are views illustrating the operation of the ball bearing lock of the magnetic latch mechanism of FIGS. 119-122.

FIGS. 167-174 are views of the control pins of the magnetic latch mechanism of FIGS. 119-122.

Like reference numerals indicate like elements throughout the several views.

DETAILED DESCRIPTION OF THE INVENTION

The disclosures of U.S. Provisional Application for Patent Ser. No. 60/652,295, filed on Feb. 12, 2005, U.S. Provisional Application for Patent Ser. No. 60/666,694, filed on Mar. 29, 2005, U.S. Provisional Application for Patent Ser. No. 60/679,274, filed on May 8, 2005, and U.S. Provisional Application for Patent Ser. No. 60/683,981, filed on May 23, 2005, are incorporated herein by reference in their entirety.

The present invention is directed to a magnetic latch mechanism for securing a first member in a closed position relative to a second member, the first member being movable between the closed position and an open position relative to the second member. The first member may, for example, be a door and the second member may, for example, be a compartment or a doorframe. In the illustrated example, the one or more doors provide closures for the compartment. The latch according to the present invention is particularly well suited for use in applications where dual doors that are mechanically linked are to be secured in the closed position. In such applications closing one of the doors also moves the other door to the closed position. However, the mechanical linkage between the doors is not perfect and the closing of the doors is not always simultaneous. Often one door will slightly lag behind the other door in closing. With the magnetic latch of the present invention, once the door is within the region of the influence of the magnetic field of the latch magnet, the door will be pulled to the final closed position by magnetic attraction. Therefore, movement of each door to the final closed position in a dual door application will be properly effected regardless of significant variations in relative positions of the doors as the doors approach their closed positions. Accordingly, the latch of the present invention is designed to effect proper securing of the doors in the closed position even when one door lags behind the other.

Figure 4:
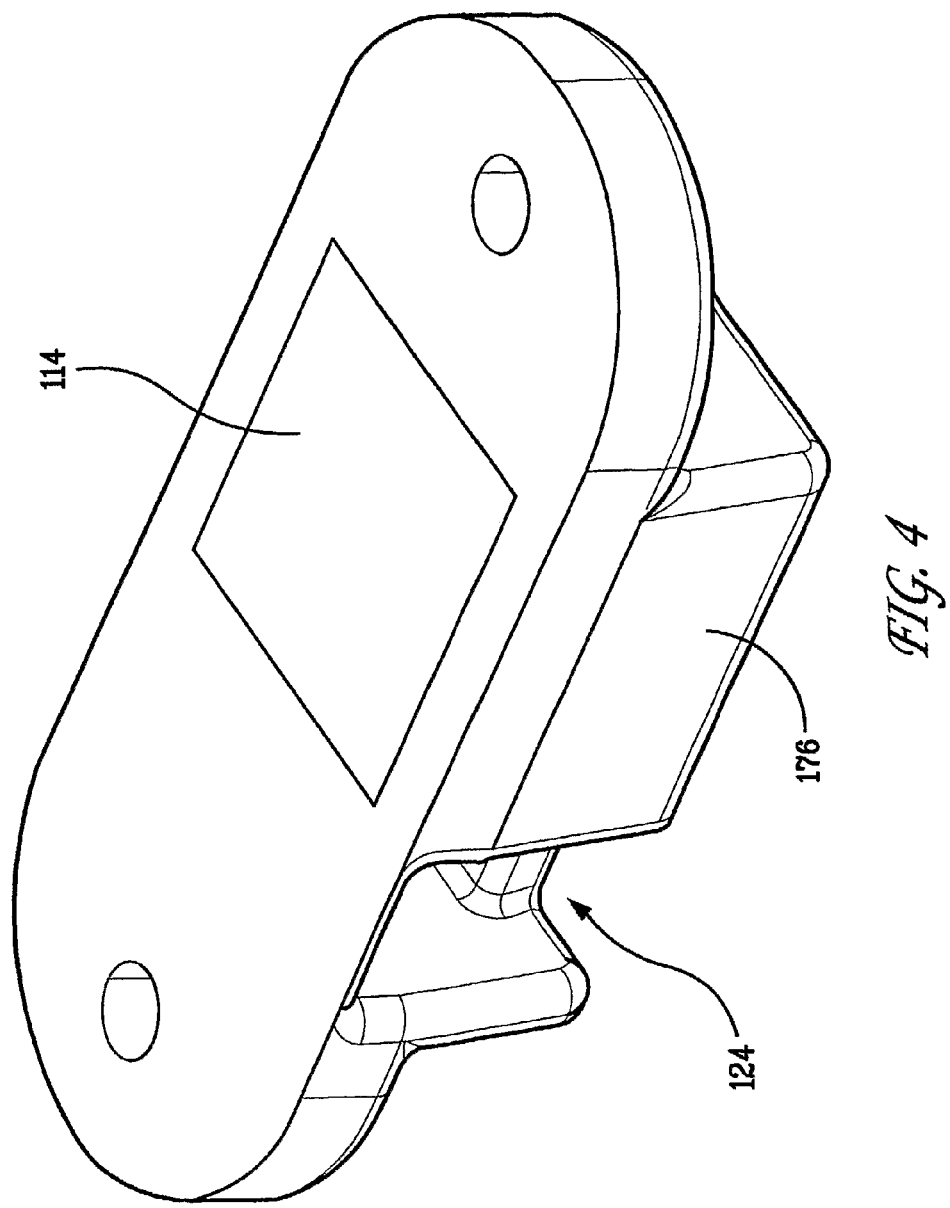
Figure 5:
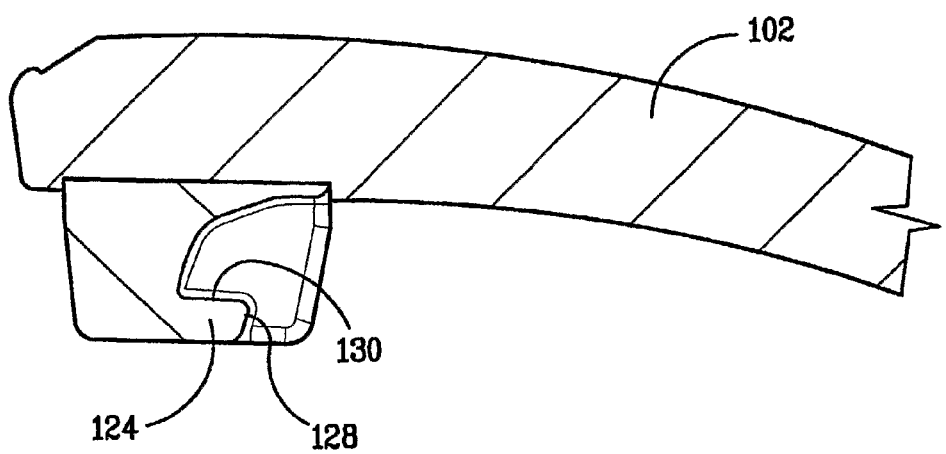
Figure 6:
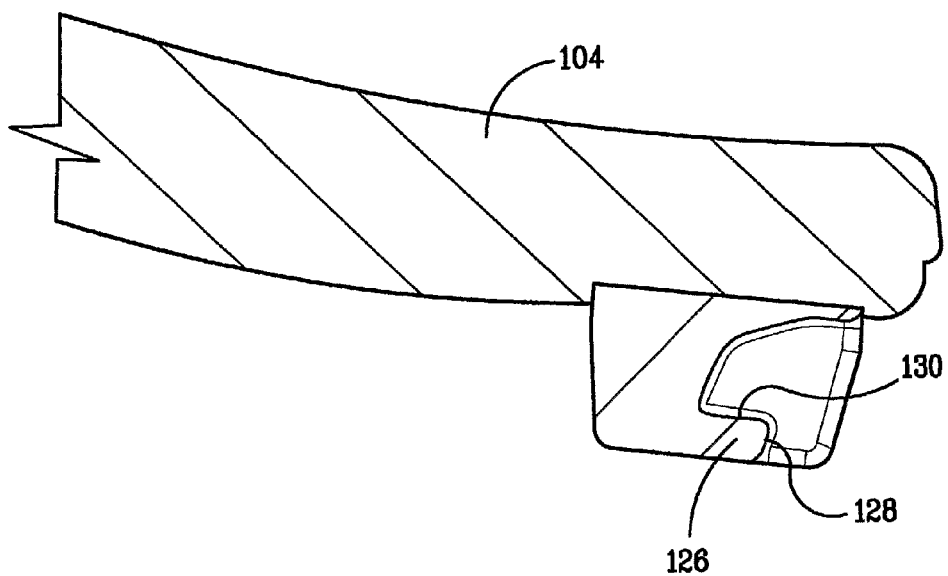
Figure 7:
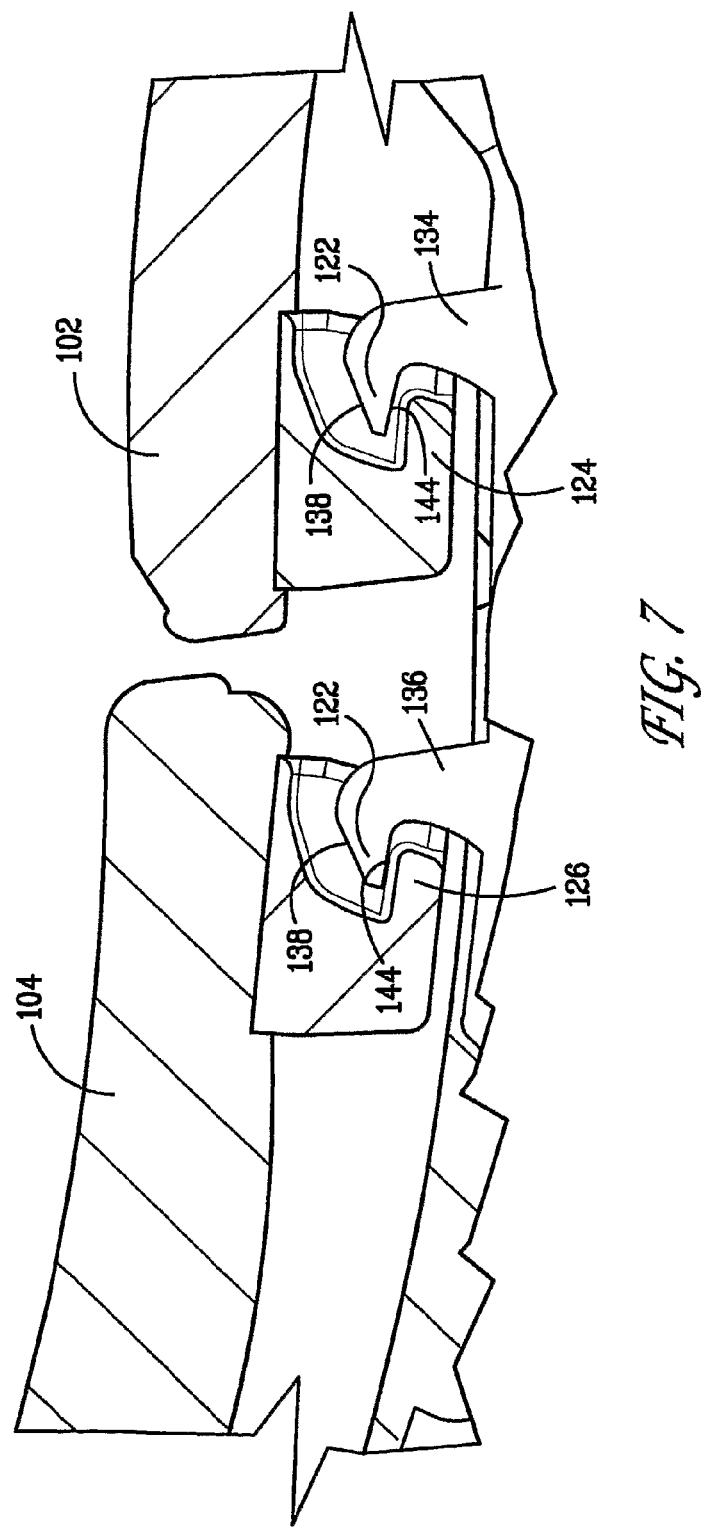
Figure 34:
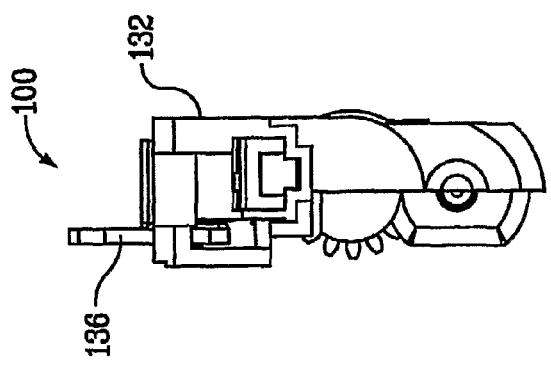
Figure 32:
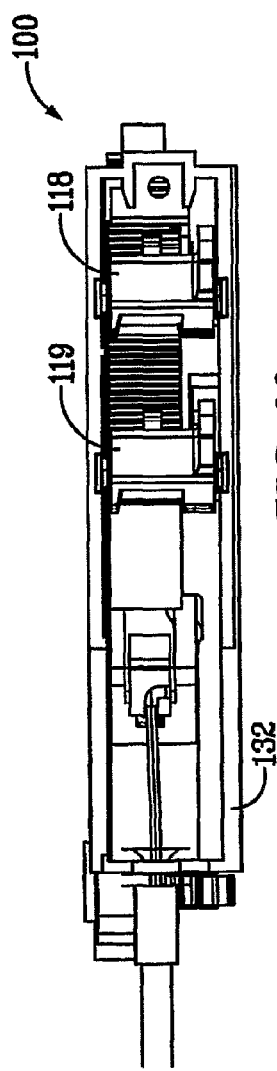
Figure 33:
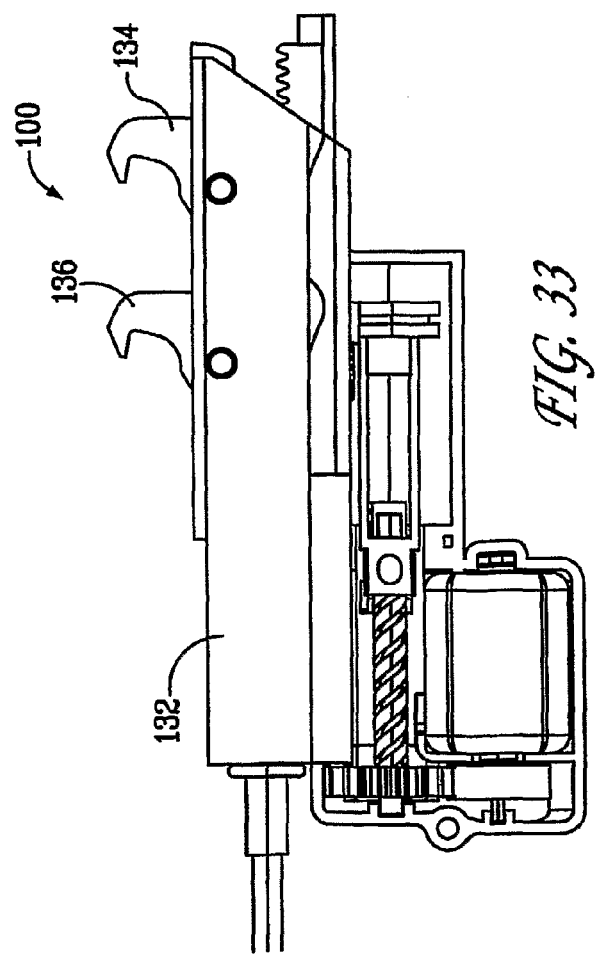
Figure 35:
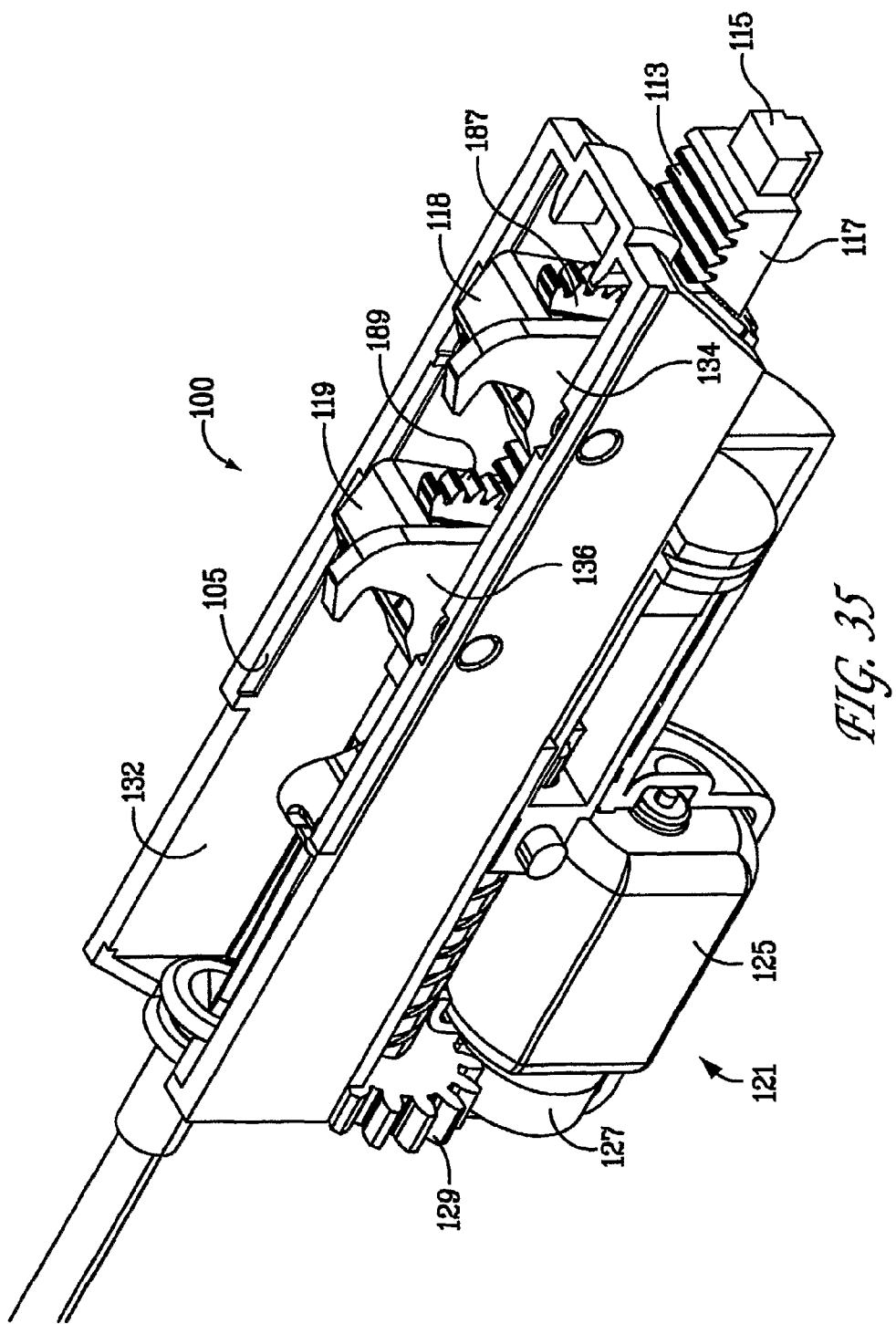
Figure 65:
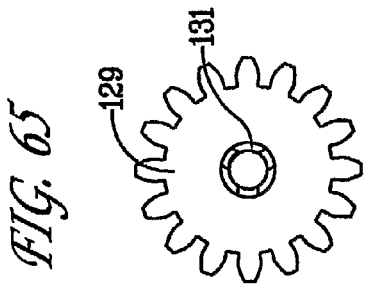
Figure 62:
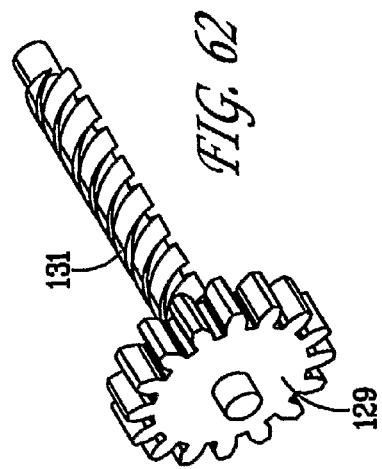
Figure 64:
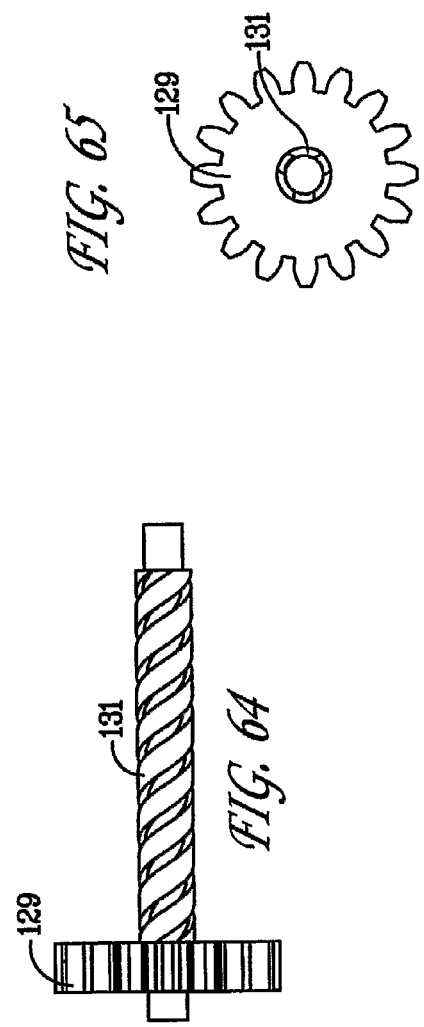
Figure 61:
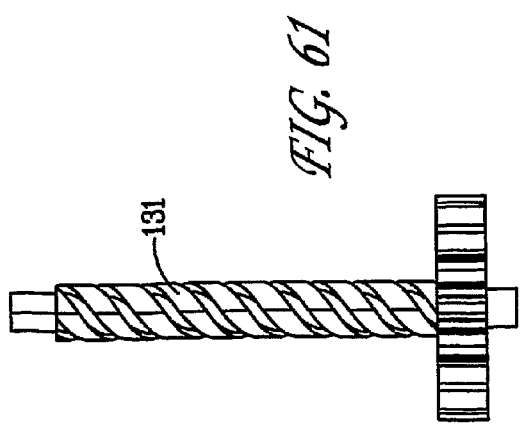
Figure 63:
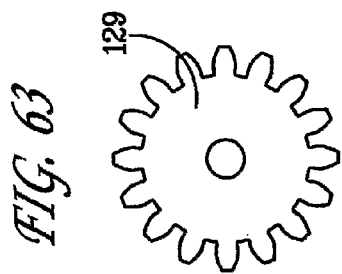
Figure 66:
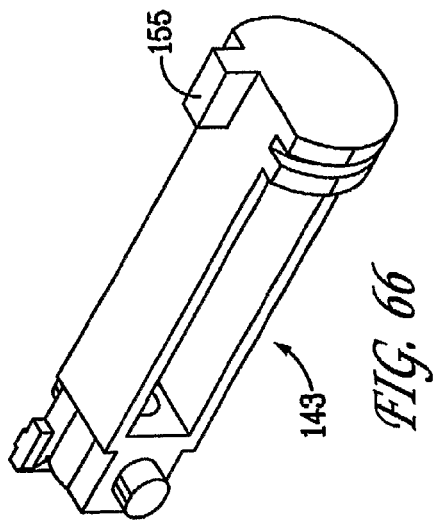
Figure 70:
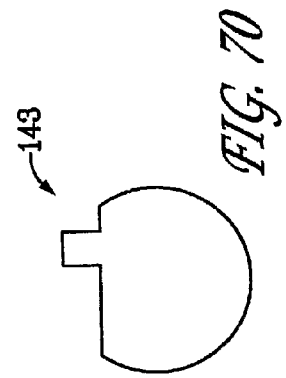
Figure 67:
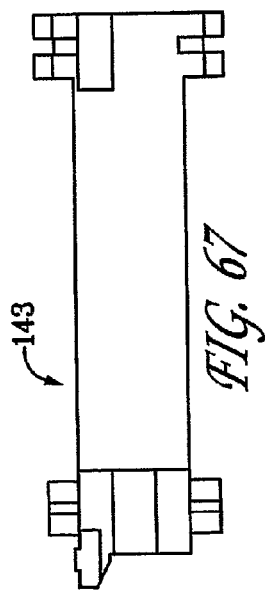
Figure 69:
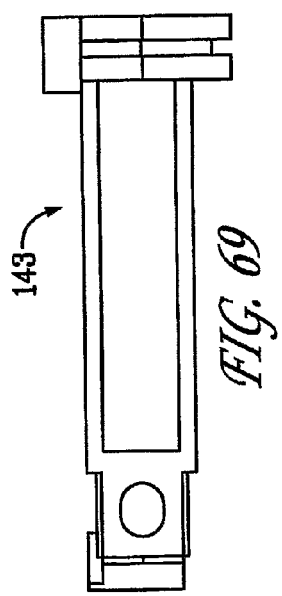
Figure 71:
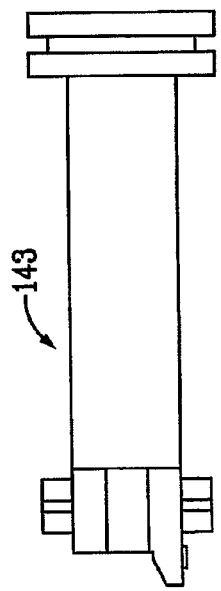
Figure 68:
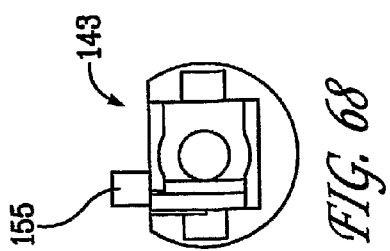
Figure 92:
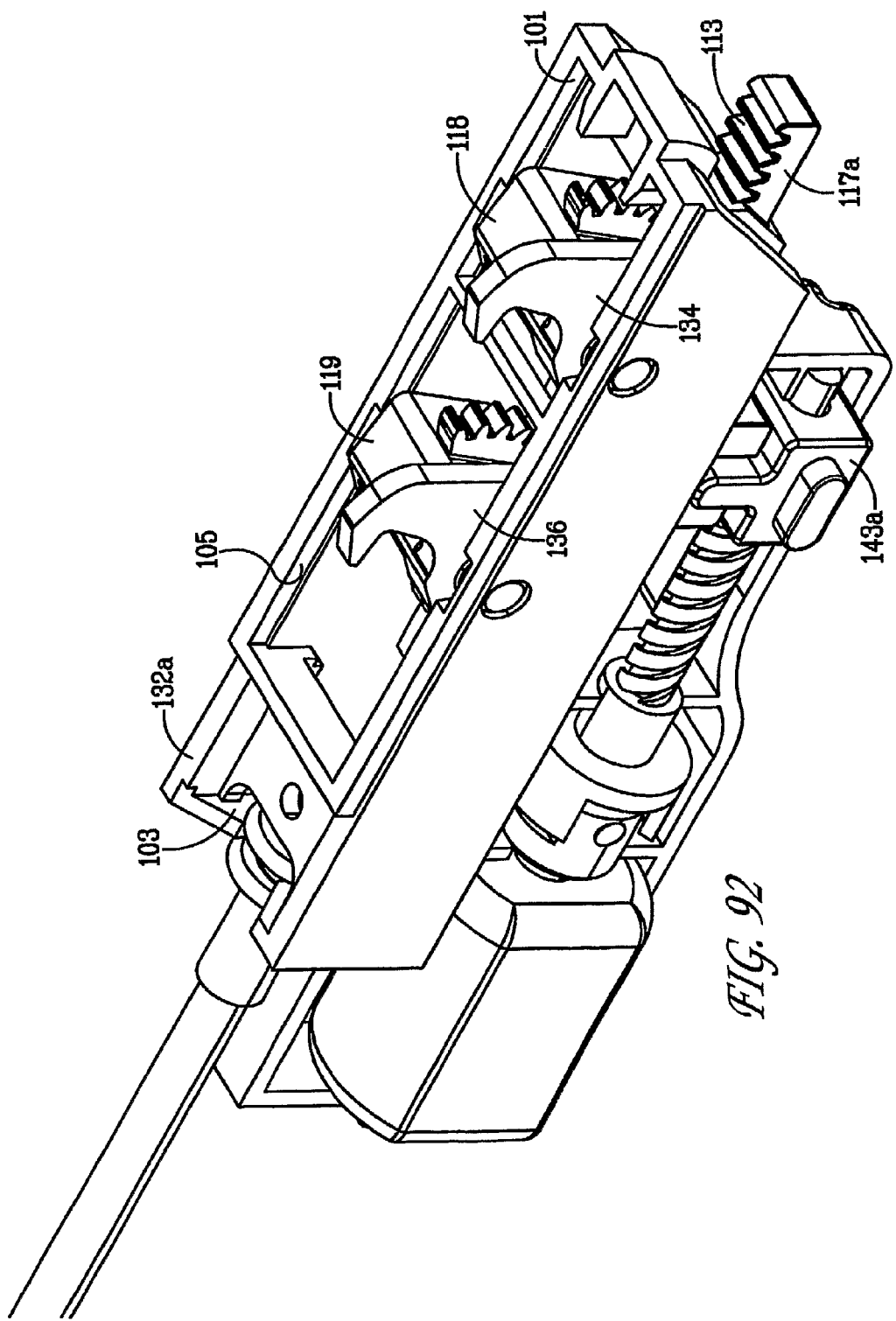
Figure 106:
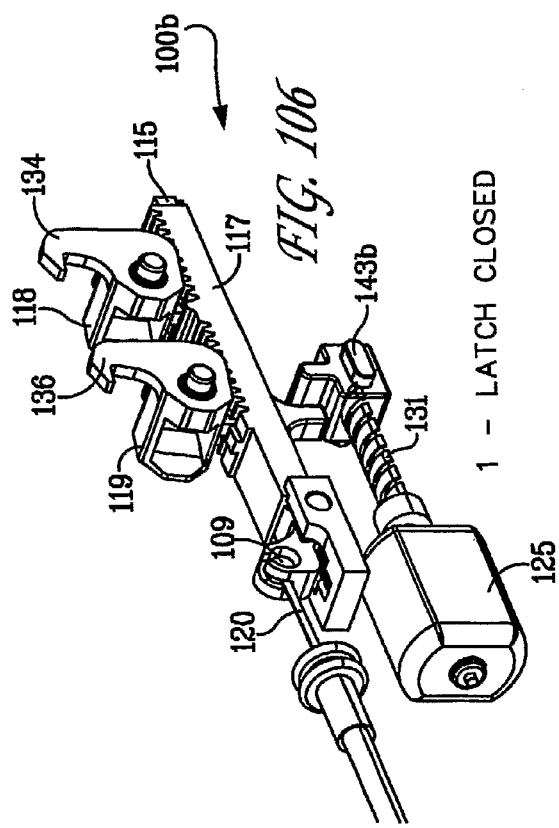
Figure 107:
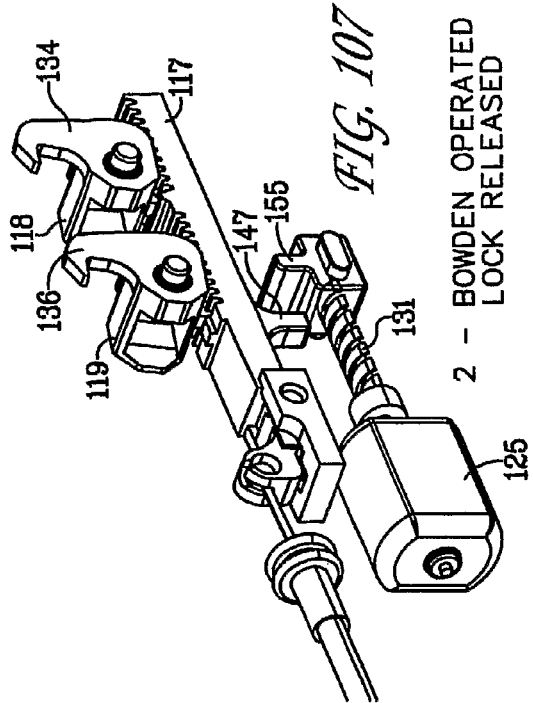
Figure 108:
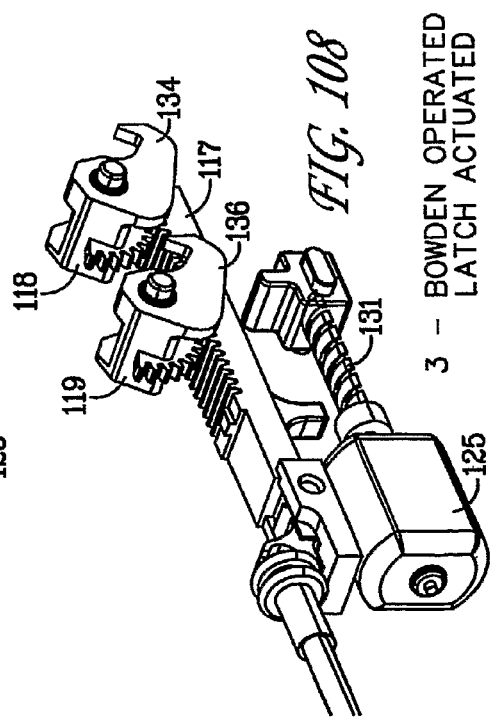
Figure 109:
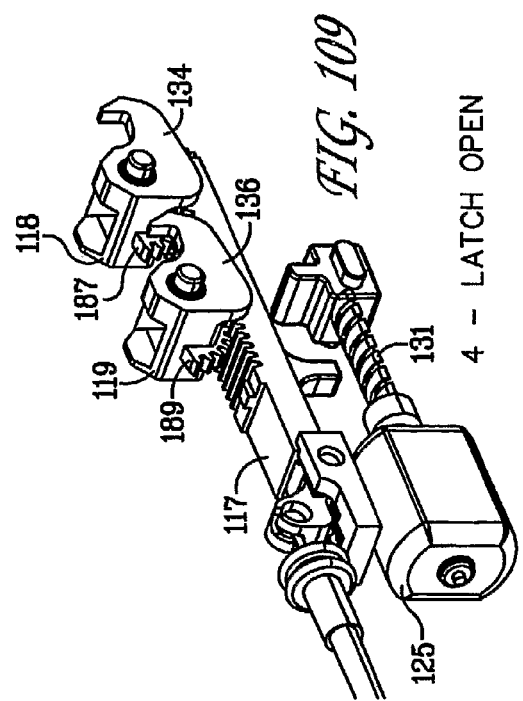

Referring to FIGS. 1-71, an embodiment 100 of the magnetic latch mechanism with dual rotary magnets according to the present invention can be seen. The latch mechanism 100 is a remotely operated latch mechanism designed to secure two doors 102 and 104 in the closed position substantially simultaneously, using two rotating magnets 106 and 108. The latch mechanism 100 is designed to be installed between the pivots or hinges of the doors 102, 104 with the rotary magnets 106, 108 supported for rotation about parallel and spaced-apart axes of rotation. Also, the rotary magnets 106, 108 rotate in the same direction. Each of the rotary magnets 106 and 108 are supported by a separate magnet carrier 118, 119, respectively. Each magnet carrier 118, 119 is rotationally supported by the housing 132. Each of the rotary magnets 106, 108 are attached to the respective magnet carrier 118, 119 such that the rotary magnet and its respective magnet carrier rotate as one unit. Each of the rotary magnets 106, 108, and their respective magnet carriers 118, 119, are rotationally movable between respective latched and unlatched positions.

The magnetic latch mechanism 100 also includes a pair of hook-shaped pawls 134, 136. Each hook-shaped pawl 134, 136 is supported by a respective magnet carrier 118, 119 such that the hook-shaped pawl 134, 136 and the respective magnet carrier 118, 119 rotate as a unit. Each hook-shaped pawl 134, 136 has a hooked head 122 with a beveled cam surface 138 that faces away from the respective magnet carrier 118, 119 and a catch surface 144 that faces toward the respective magnet carrier 118, 119.

The magnetic latch mechanism 100 also includes magnetic inserts 114 and 116 that can be attached to the doors 102 and 104, respectively. Each of the magnetic inserts 114 and 116 corresponds to a respective one of the rotary magnets 106, 108. When the rotary magnets 106, 108 are in their latched positions and the doors 102 and 104 are in their closed positions, the pole of each of each of the rotary magnets 106, 108 facing the respective magnetic insert 114, 116 is of an opposite type (i.e. north, south) as compared to the pole of the magnetic insert 114, 116 facing its respective rotary magnet 106, 108. In the illustrated example, the magnetic inserts 114, 116 are positioned such that their south poles face their respective rotary magnet 106, 108 when the doors 102 and 104 are in their closed positions. Also in the illustrated example, the rotary magnets 106, 108 are positioned in their carriers 118, 119 such that their north poles face their respective magnetic inserts 114, 116 when the rotary magnets 106, 108 and their carriers are in their latched positions and the doors 102 and 104 are in their closed positions. Accordingly, an attractive force is exerted between each rotary magnet 106, 108 and its respective magnetic insert 114, 116 with the result that the doors 102; 104 to which the magnetic inserts 114, 116 are attached are held in the closed position.

Furthermore, the hook-shaped pawls 134, 136 engage respective strikers 124, 126 to mechanically block the movement of the doors 102, 104 from the closed position to the open position. This feature prevents the doors 102, 104 from being forcibly pried open from the exterior of the compartment being secured by the doors 102, 104.

The magnetic latch mechanism 100 includes the pair of strikers 124, 126 each of which corresponds to a respective one of the pair of hook-shaped pawls 134, 136. Each striker 124, 126 is supported by a respective door 102, 104 such that the striker is spaced apart from the respective door's interior surface and the head 122 of the hook-shaped pawl 134, 136 can fit between the respective striker 124, 126 and the respective door 102, 104. Each striker 124, 126 has a cam surface 128 that faces away from the respective door 102, 104 and a catch surface 130 that faces toward the respective door 102, 104. The cam surface 128 of each striker can interact with the cam surface 138 of the respective hook-shaped pawl 134, 136 to move the pawl out of the way of the striker 124, 126 and allow the respective door to move to the closed position if the respective hook-shaped pawl happens to be in the latched position when the respective door is being moved to the closed position. Once the door 102, 104 is in the closed position, the magnetic attraction between the respective rotary magnet 106, 108 and the respective magnetic insert 114, 116 moves the respective hook-shaped pawl 134, 136 to the latched position. In the latched position, the head 122 of the respective hook-shaped pawl 134, 136 is positioned between the respective striker 124, 126 and the respective door 102, 104, where the catch surface 144 of the respective hook-shaped pawl 134, 136 can engage the catch surface 130 of the respective striker 124, 126 to thereby mechanically block the movement of the respective door 102, 104 from the closed position to the open position.

When the rotary magnets 106, 108 are in their unlatched positions (illustrated in FIGS. 14 and 44) and the doors 102 and 104 are in their closed positions (illustrated in FIG. 1), the pole of each of each of the rotary magnets 106, 108 that is of an opposite type compared to the pole of the respective magnetic insert 114, 116 facing the rotary magnet 106, 108, is positioned farther from the respective magnetic insert 114, 116, while the pole of each of each of the rotary magnets 106, 108 that is of the same type compared to the pole of the respective magnetic insert 114, 116 facing the rotary magnet 106, 108, is positioned closer to the respective magnetic insert 114, 116, relative to the latched position of the rotary magnets 106, 108. In the unlatched position, the repulsive force between the like poles of each rotary magnet 106, 108 and the respective magnetic insert 114, 116 overcomes the attractive force between the opposite poles of each rotary magnet 106, 108 and the respective magnetic insert 114, 116. Accordingly, a net repulsive force is exerted between each rotary magnet 106, 108 and its respective magnetic insert 114, 116. In addition, the hook-shaped pawls 134, 136 rotate to their unlatched positions along with the rotary magnets 106, 108 and their magnet carriers 118, 119, which removes the mechanical impediment to the opening of the doors 102, 104, with the result that the doors 102, 104 to which the magnetic inserts 114, 116 are attached are moved from the closed position toward the open position.

Recall that in the illustrated example, the magnetic inserts 114, 116 are positioned such that their south poles face their respective rotary magnet 106, 108 when the doors 102 and 104 are in their closed positions. In the illustrated example, the north poles of the rotary magnets 106, 108 move away from the south poles of their respective magnetic inserts 114, 116 and the south poles of the rotary magnets 106, 108 move toward the south poles of their respective magnetic inserts 114, 116 as the rotary magnets 106, 108 and their carriers 118, 119 move from the latched position to the unlatched position, such that a net repulsive force is exerted between each rotary magnet 106, 108 and its respective magnetic insert 114, 116 when the rotary magnets 106, 108 reach their unlatched positions.

The rotary magnets 106, 108 and their carriers 118, 119 move through an angle in the range of greater than 10° and less than or equal to 180° as they move from the latched position to the unlatched position. More preferably, the rotary magnets 106, 108 and their carriers 118, 119 move through an angle in the range of greater than or equal to 30° and less than or equal to 180° as they move from the latched position to the unlatched position. Even more preferably, the rotary magnets 106, 108 and their carriers 118, 119 move through an angle in the range of greater than or equal to 45° and less than or equal to 145° as they move from the latched position to the unlatched position. Yet even more preferably, the rotary magnets 106, 108 and their carriers 118, 119 move through an angle in the range of greater than or equal to 60° and less than or equal to 120° as they move from the latched position to the unlatched position. Yet even more preferably, the rotary magnets 106, 108 and their carriers 118, 119 move through an angle in the range of greater than or equal to 80° and less than or equal to 115° as they move from the latched position to the unlatched position. In the illustrated example, the rotary magnets 106, 108 and their carriers 118, 119 move through an angle of roughly 110°(110°±10°) as they move from the latched position to the unlatched position. More precisely, in the illustrated example the rotary magnets 106, 108 and their carriers 118, 119 move through an angle of about 110° as they move from the latched position to the unlatched position.

The opposite type pole of the respective rotary magnet 106, 108 need not directly face the pole of the magnetic insert 114, 116 facing its respective rotary magnet 106, 108 in the latched position. The rotary magnets 106, 108 may deviate from the direct facing relationship between the opposite type poles of the rotary magnets and of their respective magnetic inserts by an angle θ in the range of 0°≤θ<90°. The position of the hook-shaped pawls relative to the rotary magnets 106, 108 would of course have to be adjusted accordingly. Of course, the direct facing relationship between the opposite type poles of the rotary magnets and of their respective magnetic inserts (i.e. at or about 0°) gives the greatest holding power to the latch mechanism and it would be desirable for the north poles of the rotary magnets 106, 108 to approach the direct facing relationship with the south poles of their respective magnetic inserts as closely as possible in the latched position. The key consideration is that the angular position of the rotary magnets 106, 108 in the latched position must be selected such that the north poles of the rotary magnets 106, 108 are closer to the south poles of their respective magnetic inserts as compared to the south poles of the rotary magnets 106, 108 to such an extent that the net attractive force between the rotary magnets 106, 108 and their respective magnetic inserts is strong enough for the rotary magnets to draw in and hold the doors 102, 104 in the closed position as described herein. In the illustrated example, the north poles of the rotary magnets 106, 108 deviate from the direct facing relationship with the south poles of their respective magnetic inserts by a few degrees in the latched position.

Each magnetic insert 114, 116 is attached to a respective one of the doors 102, 104 by being inserted in a magnetic insert housing 176, 178, respectively, which in turn are attached to a respective one of the doors 102, 104. In the illustrated example, the magnetic insert housings 176, 178 are attached to the doors 102, 104 by screws 180.

The means for attaching the magnetic insert housings 176, 178 to the doors 102, 104 is not critical to the present invention and any suitable fastening means including screws, rivets, pins, nails and adhesives may be used. Furthermore, the magnetic insert housings 176, 178 may be of unitary construction with the doors 102, 104. The magnetic insert housings 176, 178 may also be dispensed with entirely and the magnetic inserts 114, 116 may be attached to the doors 102, 104 directly. As with the housings 176, 178, any suitable fastening means including screws, rivets, pins, nails and adhesives may be used to attach the magnetic inserts 114, 116 to the doors 102, 104. As yet another alternative, the magnetic inserts 114, 116 may be embedded in the material of the doors 102, 104.

In the illustrated embodiment, the strikers 124, 126 are of unitary construction with the magnetic insert housings 176, 178, respectively. As with the housings 176, 178, the means for attaching the strikers 124, 126 to the doors 102, 104 are not critical to the present invention. Any suitable structure that supports the striker 124, 126 such that the striker is spaced apart a sufficient amount from the respective door's interior surface in order for the head 122 of the hook-shaped pawl 134, 136 to fit between the respective striker 124, 126 and the respective door 102, 104 may be employed and any suitable fastening means including screws, rivets, pins, nails and adhesives may be used to attach the structure to the respective door. Furthermore, the strikers 124, 126 may be of unitary construction with the doors 102, 104.

The magnetic latch mechanism 100 includes a housing 132 that rotationally supports the magnet carriers 118, 119 having the rotary magnets 106, 108, respectively, attached thereto. The top openings 101 and 105 (there may be one large top opening 105 in place of the two openings 101 and 105 in some embodiments) of the housing 132 allow the hook-shaped pawls 134, 136 to extend out of the housing 132 to engage the strikers 124, 126 in the latched position.

Each magnet carrier 118, 119 includes a receptacle 184, 186 for receiving the respective rotary magnet 106, 108. Each magnet carrier 118, 119 has a pair of spindles, 140, 142 and 150, 152, respectively, with each pair of spindles projecting outward on opposite sides of the respective receptacle 184, 186. The receptacles 184, 186, and consequently carriers 118, 119, are positioned in tandem along the longitudinal axis of the housing 132 with their axes of rotation being transverse, i.e. perpendicular, to the longitudinal axis of the housing 132. The spindles 140, 142, 150, 152 are received in and rotationally supported by the holes 154, 156, 158, 160 in the sides of the housing 132, respectively. The holes 154, 156, 158, 160 are provided with lead-in ramps 163, 165, 167, 169, respectively, such that the carriers 118, 119 can be snap-fitted into the housing 132, with the spindles 140, 142, 150, 152 snapping into the holes 154, 156, 158, 160. The housing 132 has a motor compartment 141. A cover 133 is provided for the motor compartment 141. Thus the magnet carriers 118, 119 are rotationally supported by the housing 132. The particular modality used for rotationally supporting the magnet carriers 118, 119 in the housing 132 is not critical to the present invention. The illustrated modality for rotationally supporting the carriers 118, 119 in the housing 132 was selected for ease of assembly. Alternatively, the carriers 118, 119 could be supported for rotation by the housing 132 through the use of axles, shafts, or pins, or with other types of bearing arrangements used in place of the holes 154, 156, 158, 160. As yet another alternative, the housing 132 can be of clam-shell design with the spindles 140, 142, 150, 152 being inserted into appropriate bearing structures that rotationally support the spindles as the halves of the clam shell are assembled together.

Each hook-shaped pawl 134, 136 is integrally formed with its respective magnet carrier 118, 119. Thus, there is no relative rotation between each receptacle 184, 186 and the respective hook-shaped pawl 134, 136 and each hook-shaped pawl 134, 136 and the respective receptacle 184, 186, and consequently the respective magnet carrier 118, 119, rotate as a unit.

Alternatively, the hook-shaped pawls 134, 136 may be made separately from the magnet carriers 118, 119, and attached to the magnetic carriers in a way that provides for each hook-shaped pawl to rotate with its respective magnet carrier as a unit. As yet another alternative, some range of relative motion between each carrier 118, 119 and the respective hook-shaped pawl 134, 136 may be provided for in the case where the hook-shaped pawls and the magnet carriers are made as separate pieces. In such a case each hook-shaped pawl 134, 136 would need to be spring biased toward their current position illustrated in the drawings relative to the respective carrier 118, 119. This relative motion would allow each hook-shaped pawl 134, 136 to move out of the way of the respective striker 124, 126, and allow the respective door to move to the closed position if the respective hook-shaped pawl happens to be in the latched position when the respective door is being moved to the closed position, without necessarily moving the respective rotary magnet 106, 108.

Each magnet carrier 118, 119 also has a plurality of gear teeth 187 and 189, respectively. Each set of gear teeth 187,189 is distributed along an arc defined by a sector of a circle centered at the axis of rotation of the respective magnet carrier 118, 119. The axis of rotation of each magnet carrier 118, 119 is of course defined by the central axis of the respective pair of spindles 140,142 or 150,152 of each magnet carrier 118, 119. The gear teeth 187,189 of each magnet carrier 118, 119 are supported by, and are integral with, the respective receptacle 184,186 of each magnet carrier. The gear teeth 113 of the rack bar 117 engage the gear teeth 187, 189.

The latch mechanism 100 includes a rack bar 117 that has one set of gear teeth 113 distributed along its length. The set of gear teeth 113 includes a plurality of gear teeth. The gear teeth 113 are in constant mesh with the gear teeth 187, 189 such that the magnet carriers 118, 119 are linked by the rack bar 117. The rack bar 117 is supported for rectilinear motion back and forth in the direction of its longitudinal axis between a latched position, illustrated in FIGS. 12, 35, 38, and 42, and an unlatched position, illustrated in FIGS. 14, 31, and 44. The rack bar 117 causes the magnet carriers 118, 119 to move in unison such that they and the rotary magnets 106, 108 can be moved from the latched position to the unlatched position by a common actuation mechanism in order to provide for the simultaneous opening of the dual doors 102, 104. The rack bar 117 supports a sliding bar 115 for limited rectilinear movement relative to the rack bar 117. A portion of the sliding bar 115 is at least partially surrounded by the rack bar 117 such that the gear teeth 113 are positioned intermediate the sliding bar 115 and the gear teeth 187, 189. Another portion of the sliding bar 115 projects outward from a slot in the rack bar 117 and has a receptacle 107 adapted for receiving the cylindrical dowel 109 at the end of a Bowden cable 120 for actuating the latch mechanism 100. The sliding bar 115 is movable rectilinearly between a locked position and an unlocked position relative to the rack bar 117. A spring 170 is provided intermediate the sliding bar 115 and the rack bar 117 that biases the sliding bar 115 toward the locked position. When the sliding bar 115 is in the locked position it pushes one or more ball bearings 172 outward from openings 174 on either side of the rack bar 117 such that the ball bearings 172 project outward from either side of the rack bar 117. When the sliding bar 115 is in the locked position and the rack bar 117 is in the latched position, the ball bearings 172 engage recesses 173 in the housing 132 such that the rack bar 117 cannot move unless the sliding bar 115 is moved to the unlocked position. The rate of the spring 170 is selected such that the sliding bar 115 cannot move due to its own inertia under the forces expected during collisions. Thus, the engagement of the ball bearings 172 with the recesses 173 essentially prevents the latch 100 from unlatching during a collision and makes the latch 100 resistant to unlatching due to collisions.

The sliding bar 115 has recesses 175 that register with the openings 174 when the sliding bar 115 is in the unlocked position. The recesses 175 allow the ball bearings 172 to retract into the rack bar 117 once the sliding bar 115 is in the unlocked position, which in turn frees the rack bar 117 for movement to the unlatched position.

The receptacle 107 is in the form of a cylindrical barrel or sleeve that is open at least at one end. An L-shaped slot 111 cuts through the wall of the barrel-shaped receptacle 107. The L-shaped slot 111 extends along the length of the receptacle 107 from the open end of the receptacle 107 to about the middle of the receptacle 107. From that position the L-shaped slot 111 extends along an arc perpendicular to the longitudinal direction of the barrel of the receptacle 107, thus forming an 'L' shape. The slot 111 is wide enough to allow the Bowden cable 120 to extend through the slot 111. The dowel 109 may also be spherical or have any other shape and size such that it will not fit through the slot 111 but that it will fit into the receptacle 107.

The housing 132 has a bracket 103 with a U-shaped slot 110 that can support one end of the sheath 123 of the Bowden cable 120. The Bowden cable 120 allows the remote operation of the latch mechanism 100. With the one end of the sheath 123 of the Bowden cable 120 installed in the U-shaped slot 110 of the bracket 103 and with the dowel 109 positioned in the receptacle 107, pulling the remote end (not illustrated) of the Bowden cable 120 will cause the rectilinear movement of the sliding bar 115 from the locked position to the unlocked position. This initial movement of the sliding bar 115 frees the rack bar 117 for movement to the unlatched position. The range of motion of the sliding bar 115 from the locked position to the unlocked position is relatively limited, and further pulling the remote end (not illustrated) of the Bowden cable 120 will cause the rectilinear movement of both the sliding bar 115 and the rack bar 117 together such that the rack bar 117 is moved from the latched position to the unlatched position. Consequently, the rotary magnets 106, 108, magnet carriers 118, 119, and hook-shaped pawls 134, 136 are caused to rotate from their latched positions, assuming them to initially be in the latched position, to their unlatched positions.

The remote end of the Bowden cable 120 can be pulled manually or by using an electrical actuator. Generally some type of remotely located handle or push button would be provided as a user interface for the manual or electrical operation of the latch mechanism 100, respectively.

The latch mechanism 100 is mounted to the frame or compartment 194 by mounting the housing 132 to the frame or compartment 194. The rotary magnets 106 and 108 need not be exposed or visible when viewed from the position of the magnetic inserts 114, 116. However, slots 196 and 198 or the like must be provided in the doorframe 194 allow the hook-shaped pawls 134, 136 to extend through the doorframe 194 to engage the strikers 124, 126 as they rotate to their latched positions. The means for attaching the housing 132 to the doorframe 194 is not critical to the present invention and any suitable fastening means including screws, rivets, pins, nails and adhesives may be used. Furthermore, the housing 132 may be of unitary construction with the doorframe 194.

The magnets 106, 108 pull the doors 102, 104 in to ensure they both latch correctly. The magnets 106, 108 control the final movement and position and the gap conditions of the doors 102, 104 in the closed position. The magnets 106, 108 also aid the opening of the doors 102, 104 when the mechanism is unlatched.

To open the latch mechanism 100 the button (not shown), for example, is pushed. This would cause the remote end of the Bowden cable 120 to be pulled by one of the mechanisms previously mentioned. The pulling of the Bowden cable 120 causes the rotation of the rotary magnets 106, 108, magnet carriers 118, 119, and hook-shaped pawls 134, 136 from their latched positions to their unlatched positions. This action disengages the hook-shaped pawls 134, 136 from their respective strikers 124, 126, which mechanically releases the doors 102 and 104. In addition, the magnets 106, 108 are rotated to their unlatched positions where these magnets repel the magnetic inserts 114, 116 attached to the doors 102, 104, forcing the doors to swing open. Once the magnets 106, 108 are clear of the influence of the magnetic field of the magnetic inserts 114, 116 and the Bowden cable 120 is released, the magnetic attraction of the north pole of one of the magnets 106, 108 for the south pole of the other one of the magnets 106, 108, or vice versa, will maintain the rotary magnets 106, 108, the magnet carriers 118, 119, and the hook-shaped pawls 134, 136 in first intermediate positions (shown in FIGS. 15 and 41) near their unlatched positions ready for latching the doors 102, 104 as the doors 102, 104 move to the closed position. In the illustrated embodiment, the magnetic attraction of the north pole of the rotary magnet 106 for the south pole of the rotary magnet 108 maintains the rotary magnets 106, 108, the magnet carriers 118, 119, and the hook-shaped pawls 134, 136 in their first intermediate positions.

To close the doors 102, 104, one of the doors 102, 104 is pushed closed. This action pulls the other door shut through the mechanical linkage between the doors (not shown), however, one door will lag behind the other due to the free play of the linkage. Once the doors 102, 104 are almost closed the rotary magnets 106, 108, the magnet carriers 118, 119, and the hook-shaped pawls 134, 136 will begin to rotate toward their latched positions under the influence of the magnetic field of the magnetic inserts 114, 116, such that they will be in a second intermediate position nearer their latched positions. At this point the strong magnetic attraction between the magnetic inserts 114, 116 and their respective rotary magnets 106, 108 causes the lagging door to accelerate such that both doors close simultaneously, and the rotary magnets 106, 108 and the hook-shaped pawls 134, 136 simultaneously rotate to their latched positions. At this point the hook-shaped pawls 134, 136 engage the strikers 124, 126 and there is strong magnetic attraction between the magnetic inserts 114, 116 and their respective rotary magnets 106, 108. Accordingly, both doors are held in the closed position mechanically and magnetically. Thus, the magnetic latch mechanism 100 provides a latching system that tolerates the free play of the mechanical linkage of the doors 102, 104 and the positional difference between the doors near closing, but still closes the doors flush and simultaneously.

If the lag between the doors 102, 104 is great enough, one door may close completely, causing both rotary magnets 106, 108 and both hook-shaped pawls 134, 136 to move to their respective latched positions, before the lagging door reaches its closed position. In such an event, the striker of the lagging door will move the respective hook-shaped pawl out of the way as previously described and allow the lagging door to move to the closed position where upon the respective hook-shaped pawl and respective rotary magnet return to their latched positions to secure the previously lagging door in the closed position. Because of the linkage between the magnet carriers 118 and 119, the hook-shaped pawl corresponding to the leading door that is already closed may be temporarily disengaged from its respective striker, but the leading door will remain closed due to magnetic attraction such that the leading door's respective hook-shaped pawl can reengage its respective striker once the lagging door is fully closed. It should be evident from the relative proportions of the hook-shaped pawls and their respective strikers, that the movement of the rotary magnets during the closing of the lagging door will be slight enough such that a strong enough attraction exists at all times during the closing of the lagging door between the striker of the lagging door and the respective rotary magnet to accomplish the closing of the lagging door as just described.

The magnetic latch mechanism 100 may also include a motor drive 121 for selectively moving the rack bar 117 in the direction of its longitudinal axis between the latched position and the unlatched position. Thus the motor drive 121 serves the same function as the Bowden cable 120 and is provided as an adjunct system to the Bowden cable 120 for use in applications where, for example, the motor drive 121 is provided to allow the magnetic latch mechanism 100 to be electrically actuated while the Bowden cable provides a manual override. It is also possible for the Bowden cable 120 to be electrically actuated for applications where a redundant electrical actuation system is desirable.

The motor drive 121 includes a motor 125 that drives an output gear 127. The gear 127 is diagrammatically shown as a disk in some drawings, but of course it is a gear with teeth distributed along its circumference. The gear 127 is driven by the output shaft of the motor 125. The gear 127 is in constant mesh with the gear 129. The gear 129 is of unitary construction with the drive screw 131. The drive screw 131 is rotationally supported by the housing 132. The drive screw 131 has at least one male helical thread that is in engagement with a matching female groove or thread in a bore formed in the slider 143. The slider 143 is supported for rectilinear motion by the housing 132 in response to the rotation of the drive screw 131. The slider 143 has a projection 155 that can engage the projection 147 of the sliding bar 115.

With the rack bar 117 in the latched position and the sliding bar 115 in the locked position the projection 147 of the sliding bar 115 will be positioned near the projection 155 with the slider 143 located distally from the gear 129. This is the latched position of the slider 143. When the motor 125 is energized it causes rotation of gear 127, which in turn causes rotation of the gear 129 and the drive screw 131. Rotation of the drive screw 131 in this first direction causes rectilinear motion of the slider 143 and brings the projection 155 into engagement with the projection 147. Continued rotation of the drive screw 131 will cause continued rectilinear motion of the slider 143 toward the gear 129, which in turn will cause the rectilinear movement of the sliding bar 115 from the locked position to the unlocked position. This initial movement of the sliding bar 115 frees the rack bar 117 for movement to the unlatched position. The range of motion of the sliding bar 115 from the locked position to the unlocked position is relatively limited, and further rotation of the drive screw 131 will cause continued rectilinear motion of the slider 143 toward the gear 129, which in turn will cause the rectilinear movement of both the sliding bar 115 and the rack bar 117 together such that the rack bar 117 is moved from the latched position to the unlatched position. Consequently, the rotary magnets 106, 108, magnet carriers 118, 119, and hook-shaped pawls 134, 136 are caused to rotate from their latched positions, assuming them to initially be in the latched position, to their unlatched positions. The slider 143 will then be in its unlatched position. Movement of the rack bar 117 and the magnet carriers 118, 119 to their unlatched positions in turn allows opening of the doors 102, 104.

Once the unlatching operation is complete, using appropriate control circuitry and software, the current to the motor 125 is reversed to rotate the drive screw 131 in a second direction that is the reverse of the first direction and return the slider 143 to its latched position ready to repeat the latching cycle again. Returning the slider 143 to its latched position, disengages the projection 155 from the projection 147, and the magnetic attraction of the north pole of one of the magnets 106, 108 for the south pole of the other one of the magnets 106, 108, or vice versa, will maintain the rotary magnets 106, 108, the magnet carriers 118, 119, and the hook-shaped pawls 134, 136 in the first intermediate positions ready for latching the doors 102, 104 as the doors 102, 104 move to the closed position.

Also as previously described, in the unlatched position the attraction between the opposite poles of the magnets 106, 108 will maintain the magnet carriers 118, 119 near their unlatched positions until the doors 102, 104 are once again moved toward their closed positions. The latch 100 will then be ready to repeat its operating cycle the next time the doors 102, 104 are moved toward their closed positions.

Referring to FIGS. 72-105, a second embodiment 100*a* of the invention can be seen. Embodiment 100*a* is essentially similar to the embodiment 100, except for the differences which are detailed below.

The latch mechanism 100*a* includes a rack bar 117*a* that has one set of gear teeth 113 distributed along its length. The set of gear teeth 113 includes a plurality of gear teeth. The gear teeth 113 are in constant mesh with the gear teeth 187, 189 such that the magnet carriers 118, 119 are linked by the rack bar 117*a*. The rack bar 117*a* is supported for rectilinear motion back and forth in the direction of its longitudinal axis between a latched position, illustrated in FIGS. 90 and 93, and an unlatched position, illustrated in FIG. 94. The rack bar 117*a* causes the magnet carriers 118, 119 to move in unison such that they and the rotary magnets 106, 108 can be moved from the latched position to the unlatched position by a common actuation mechanism in order to provide for the simultaneous opening of the dual doors 102, 104. The rack bar 117*a* has a receptacle 107 adapted for receiving the cylindrical dowel 109 at the end of a Bowden cable 120 for actuating the latch mechanism 100*a*. With the dowel 109 positioned in the receptacle 107, pulling the remote end (not illustrated) of the Bowden cable 120 will directly cause the rectilinear movement of the rack bar 117*a* from the latched position to the unlatched position. Consequently, the rotary magnets 106, 108, magnet carriers 118, 119, and hook-shaped pawls 134, 136 are caused to rotate from their latched positions, assuming them to initially be in the latched position, to their unlatched positions.

The magnetic latch mechanism 100*a* also includes a motor drive 121*a* for selectively moving the rack bar 117*a* in the direction of its longitudinal axis between the latched position and the unlatched position. The motor drive 121*a* includes a motor 125 that drives a centrifugal clutch 127*a*. The centrifugal clutch 127*a* is of a well-known type and will not be discussed here in detail. The centrifugal clutch 127*a* is driven by the output shaft of the motor 125. When the output shaft of the motor 125 spins elongated rods (not shown) project out from opening on either side of the centrifugal clutch 127*a* and mesh with the arcuate fins 129*a* to couple the output shaft of the motor 125 with the drive screw 131. When the output shaft of the motor 125 is not spinning, the elongated rods retract back into the centrifugal clutch 127*a* thereby disengaging the drive screw 131 from the motor 125 such that the drive screw 131 can spin freely without any resistance due to the motor 125. The arcuate fins 129*a* are of unitary construction with the drive screw 131. The drive screw 131 is rotationally supported by the housing 132*a*. The drive screw 131 has at least one male helical thread that is in engagement with a matching female groove or thread in a bore formed in the slider 143*a*. The slider 143*a* is supported for rectilinear motion by the housing 132*a* in response to the rotation of the drive screw 131. The slider 143*a* has a projection 155*a* that is engaged to the notch 147*a* of the rack bar 117*a*.

With the rack bar 117*a* in the latched position, the slider 143*a* will also be in the latched position. When the motor 125 is energized it causes engagement of the centrifugal clutch 127*a* with the arcuate fins 129*a*, which in turn causes rotation of the drive screw 131. Rotation of the drive screw 131 in this first direction causes rectilinear motion of the slider 143*a* toward the motor 125, which in turn will cause the rectilinear movement of the rack bar 117*a* from the latched position to the unlatched position. Consequently, the rotary magnets 106, 108, magnet carriers 118, 119, and hook-shaped pawls 134, 136 are caused to rotate from their latched positions, assuming them to initially be in the latched position, to their unlatched positions. The slider 143*a* will then be in its unlatched position. Movement of the rack bar 117*a* and the magnet carriers 118, 119 to their unlatched positions in turn allows opening of the doors 102, 104.

Once the unlatching operation is complete, the current to the motor 125 is turn off and the motor 125 is de-energized resulting in the de-coupling of the clutch 127*a* from the arcuate fins 129*a* and the drive screw 131. The magnetic attraction of the north pole of one of the magnets 106, 108 for the south pole of the other one of the magnets 106, 108, or vice versa, will maintain the rotary magnets 106, 108, the magnet carriers 118, 119, and the hook-shaped pawls 134, 136 in the first intermediate positions ready for latching the doors 102, 104 as the doors 102, 104 move to the closed position.

As the doors 102, 104 are closed, the rotary magnets 106, 108 and the hook-shaped pawls 134, 136 rotate to their latched positions. This action causes the slider 143*a* to return to its latched position. During the rectilinear movement of the slider 143*a* to its latched position, the drive screw 131 rotates freely because the clutch 127*a* is de-coupled from the screw 131, and there will be no resistance to the movement of the slider 143*a* to its latched position due to the motor 125.

In the event of a crash or collision, where the inertia is great enough to push the rack bar 117*a* toward the unlatched position and release the latch, the motor will be energised in the reverse direction relative to the direction of rotation of the output shaft of the motor 125 during normal unlatching; using, for example, the air-bag sensor or a tilt sensor integrated into the appropriate control circuitry. This reverse motor action will engage the clutch 127*a* with the fins 129*a* and the drive screw 131 to keep the pawls and rotary magnets in their latched positions, thus making the latch 100*a* resistant to becoming unlatched in a collision.

Referring to FIGS. 106-113, a third embodiment 100*b* of the invention can be seen. Embodiment 100*b* is essentially similar to the embodiment 100, except for the differences which are detailed below. In the embodiment 100*b*, the longitudinal axis of the output shaft of the motor 125 is in line with the longitudinal axis of the drive screw 131 and the output shaft of the motor 125 is directly coupled to the drive screw 131 eliminating the need for the gears 127 and 129. Also, the slider 143*b* has a somewhat different shape compared to the slider 143, but functions in exactly the same way. Otherwise the embodiments 100 and 100*b* are identical.

In addition to the embodiments presented above, a myriad of other ways for making the latch resistant to becoming unlatched in a collision have been contemplated as part of the present invention. These include but are not limited to:

1) Integrating a silicon damper at the rack bar. This will result in the system being damped during closing and opening. The resistance of the damper to movement of the rack bar is much greater in response to the impulsive forces encountered in a crash. This will increase effective system mass inertia under crash conditions.

2) Design the hook, magnet carrier, rotary magnet assembly such that the center of mass of the complete assembly with magnets is as close as possible to the pivot axis of the assembly. This minimizes inertial moments that would tend to unlatch the rotary magnet assemblies in a crash. Also, the rectilinearly moving rack could be replaced by balanced rotationally moving gears. This would further eliminate parts that have a tendency to move due to their own inertia in a crash. (see FIG. 114).

Figure 114:
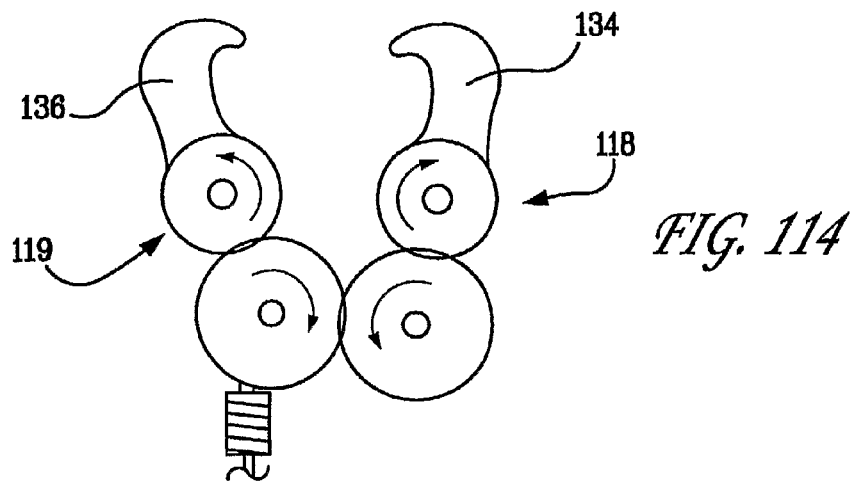
FIG. 114 shows a fourth embodiment of the present invention.

3) Rotate one latching point by 180 degrees such that the hooks face each other as illustrated in FIG. 114. Forces that would tend to unlatch one hook tend to keep the other latched. This will ensure that at least one hook and rotary magnet remain latched at all times. The linkage between the doors would then keep the doors from flying open in a crash.

Figure 117:
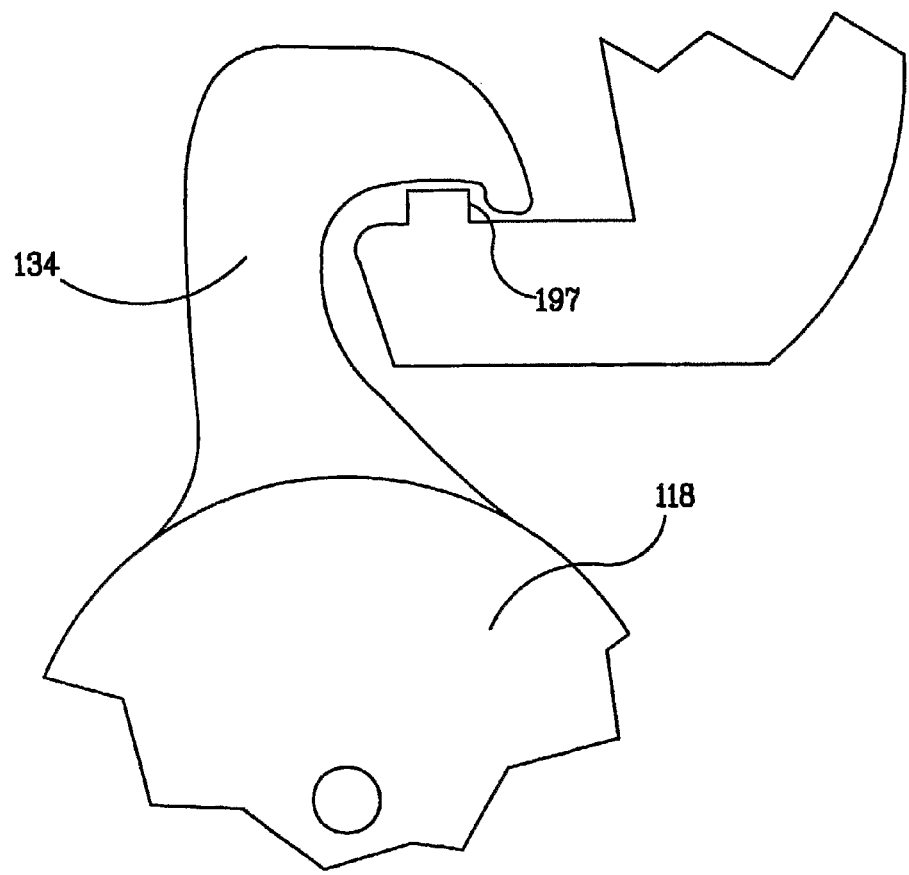
FIG. 117 shows a seventh embodiment of the present invention.

4) Design hooks and keeper with a recess/undercut 197 such that when the doors tend to fly open then the keepers would tend to pull the hooks back into their latched positions. (see FIG. 117).

Figure 115:
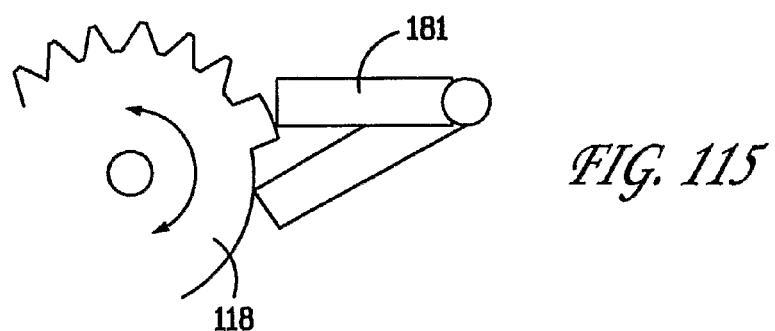
FIG. 115 shows a fifth embodiment of the present invention.

5) Add a secondary catch that will be opened through motor travel before hooks and rotary magnets are moved during normal opening and closing. In some implementations the rack bar may need to move a few millimeters without moving the hooks. An example can be seen in FIG. 115. Here a blocking lever 181 blocks magnet holder rotation in the unlatching direction. The blocking lever is pushed out of the way by the motor.

Figure 116:
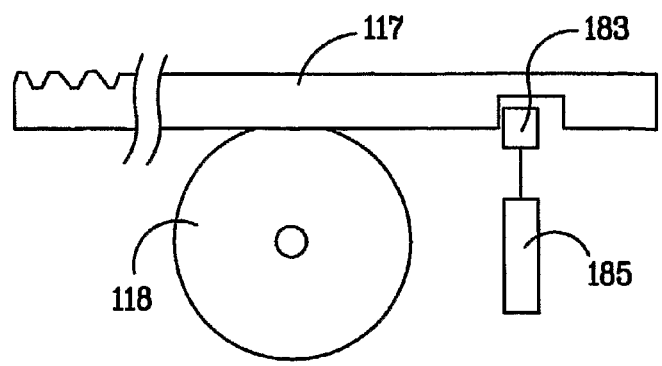
FIG. 116 shows a sixth embodiment of the present invention.

6) Add a secondary catch member 183 that will be operated by an independent solenoid 185 as shown in FIG. 116. The catch member is moved out of engagement with the rack bar 117*c* before the hooks and rotary magnets are moved during normal opening and closing. The direction of motion of the catch member 183 is perpendicular to the direction of motion of the rack bar such that forces tending to move the rack bar will not move the catch member and vice versa.

Figure 118:
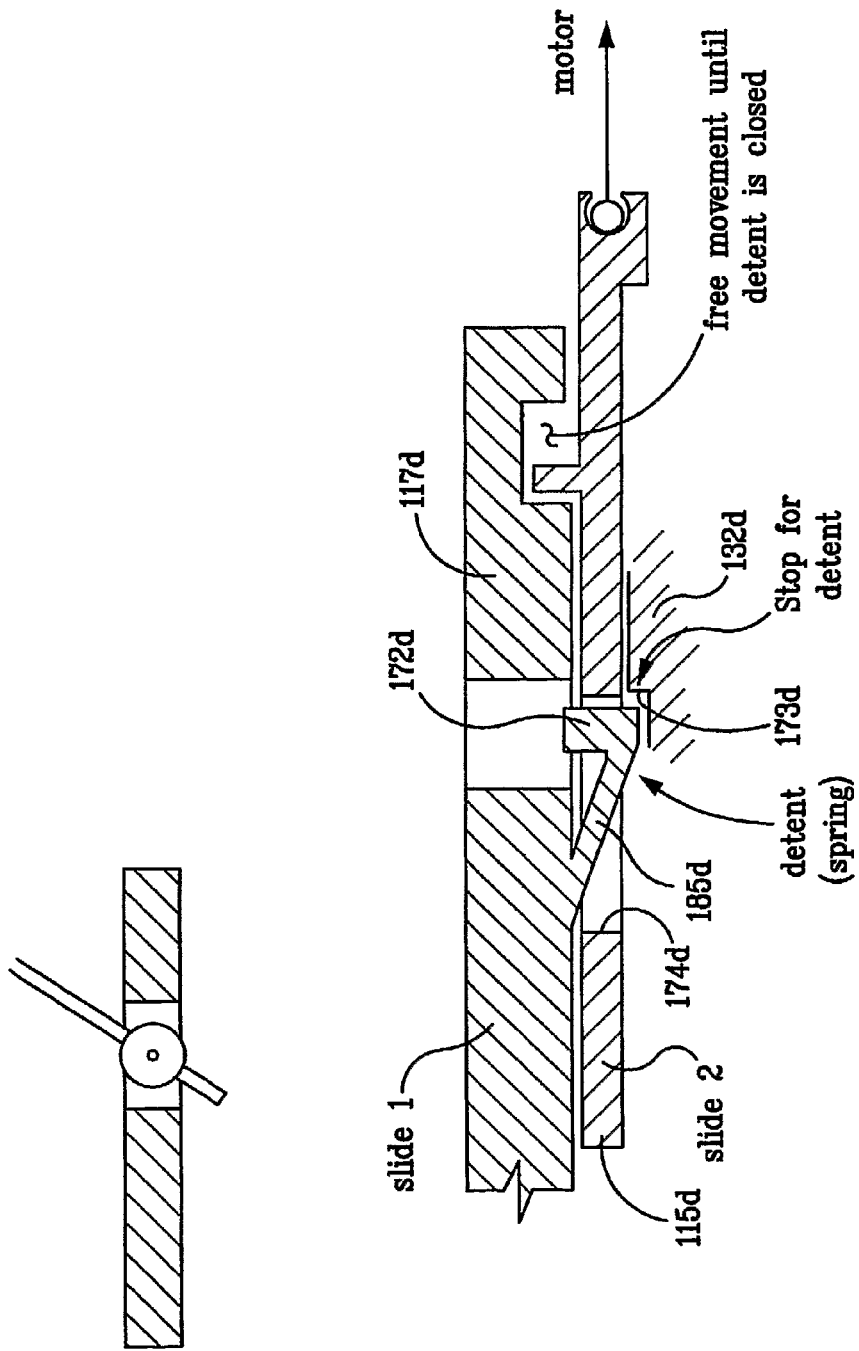
FIG. 118 shows an eighth embodiment of the present invention.

7) Add a secondary catch that will be opened through motor operation before hooks and rotary magnets are moved during normal opening and closing. The embodiment 100 is an example of this. FIG. 118 shows another example. Here the sliding bar 115*d* at least partially surrounds the rack bar 117*d*. The rack bar 117*d* has a catch member 172*d* in place of ball bearings that are supported by cantilever spring arms 185*d*. The sliding bar 115*d* has holes 174*d* through which the catch member 172 passes to engage the recess 173*d* in the housing 132*d* when the sliding bar 115*d* is in the locked position. As the sliding bar 115*d* is moved to the unlocked position the edges of the hole 174*d* act like cams to move the catch member 172*d* out of engagement with the recesses 173*d* (the catch member 172*d* would preferably be provided on both sides of the rack bar 117*d*) in order to free the rack bar 117*d* for movement.

Figure 119:
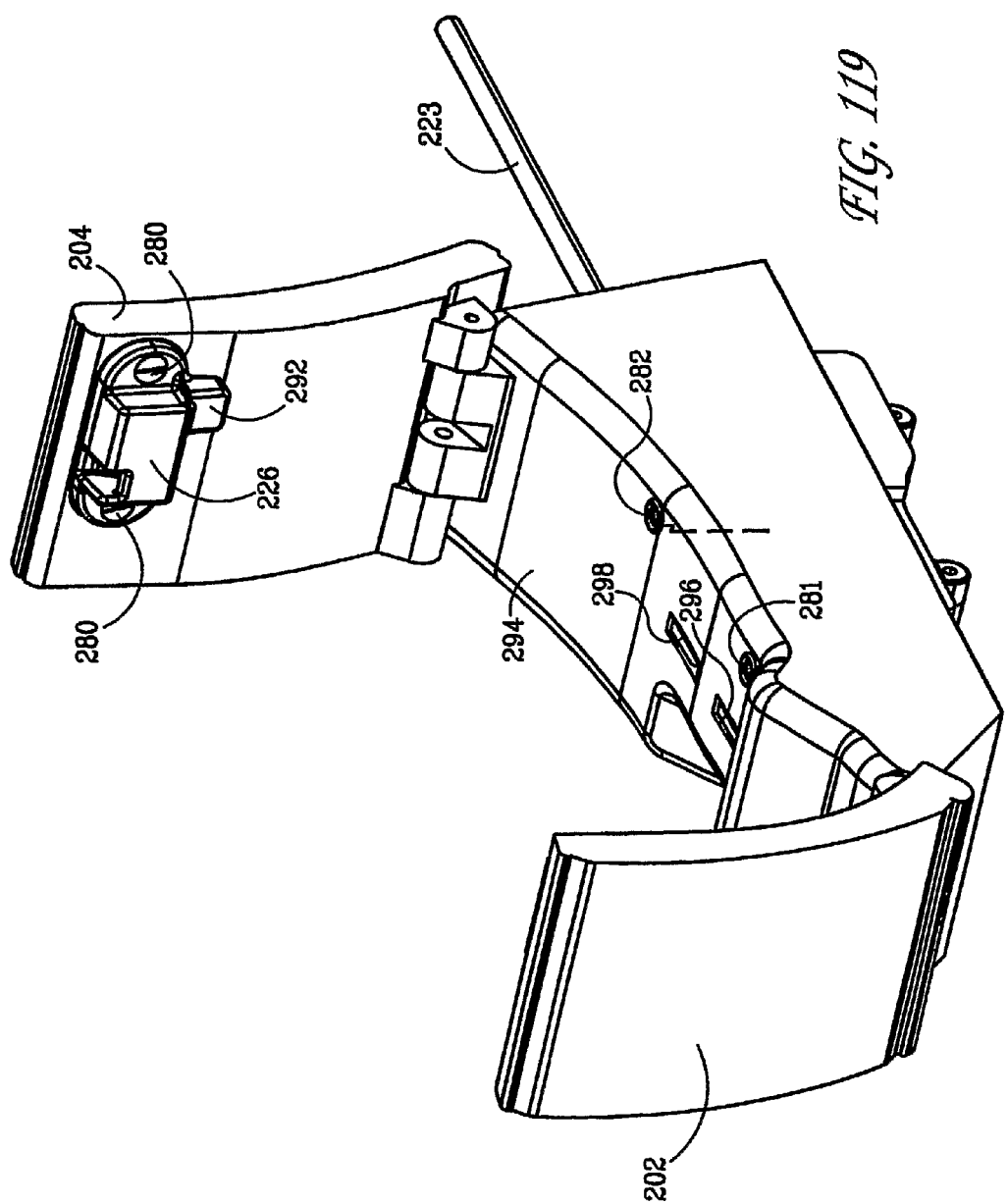
FIGS. 119-122 are environmental views showing yet another magnetic latch mechanism according to the present invention being used with an automotive glove box. The glove box doors are shown in the open position and the magnetic latch mechanism is in the actuated, a.k.a. unlatched, configuration. Only a portion of the glove box doors sufficient to illustrate the operation of the magnetic latch mechanism are shown.
Figure 120:
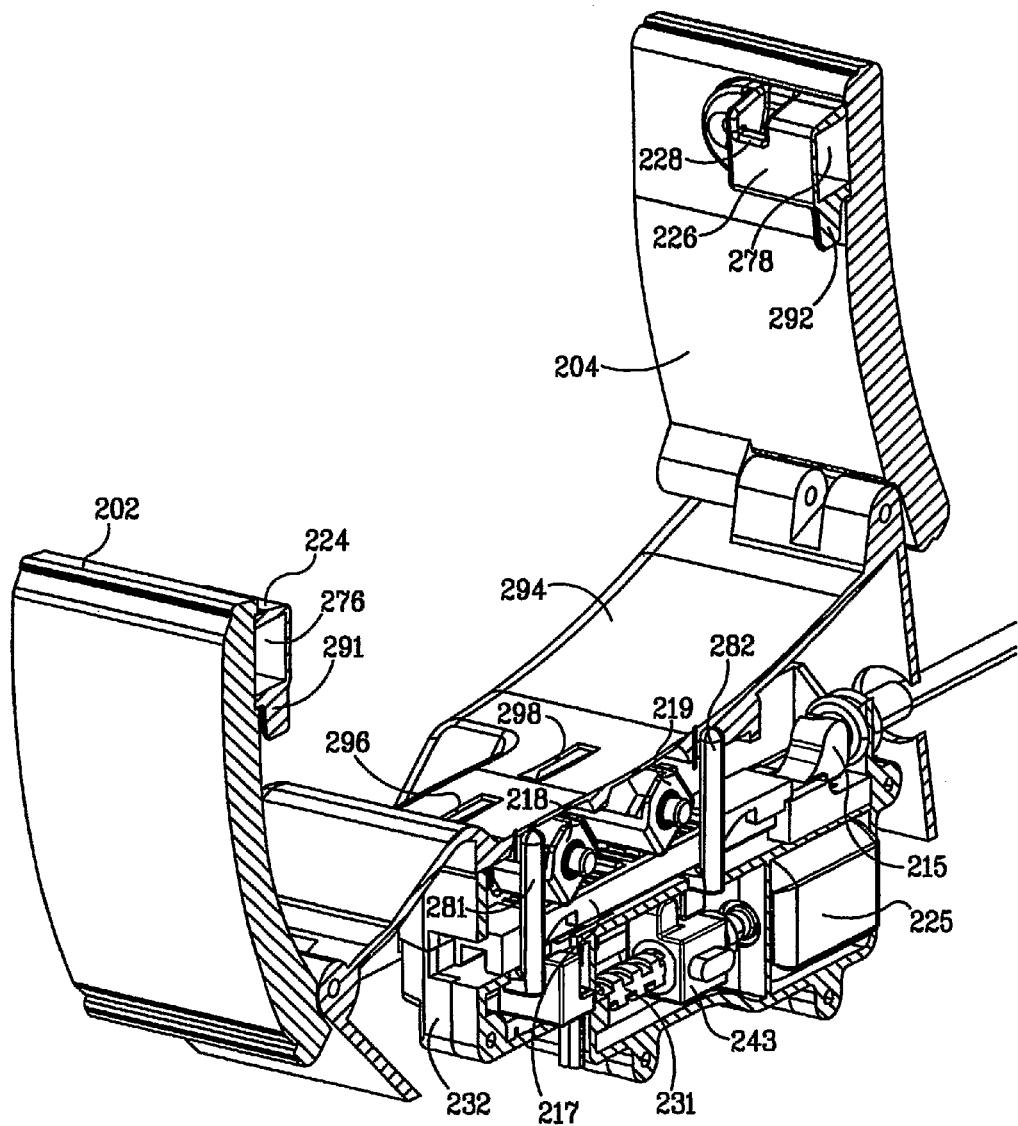
Figure 121:
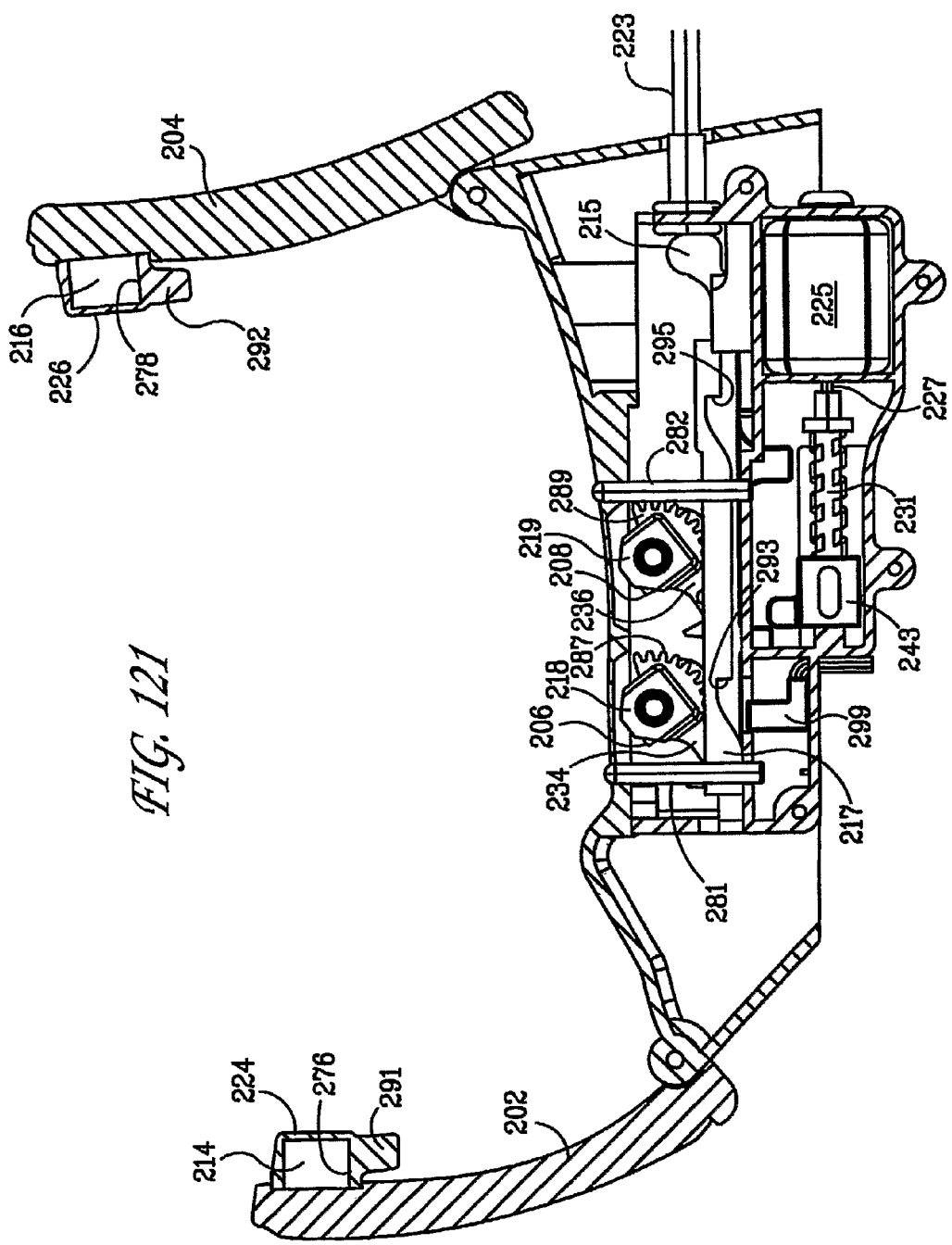
Figure 122:
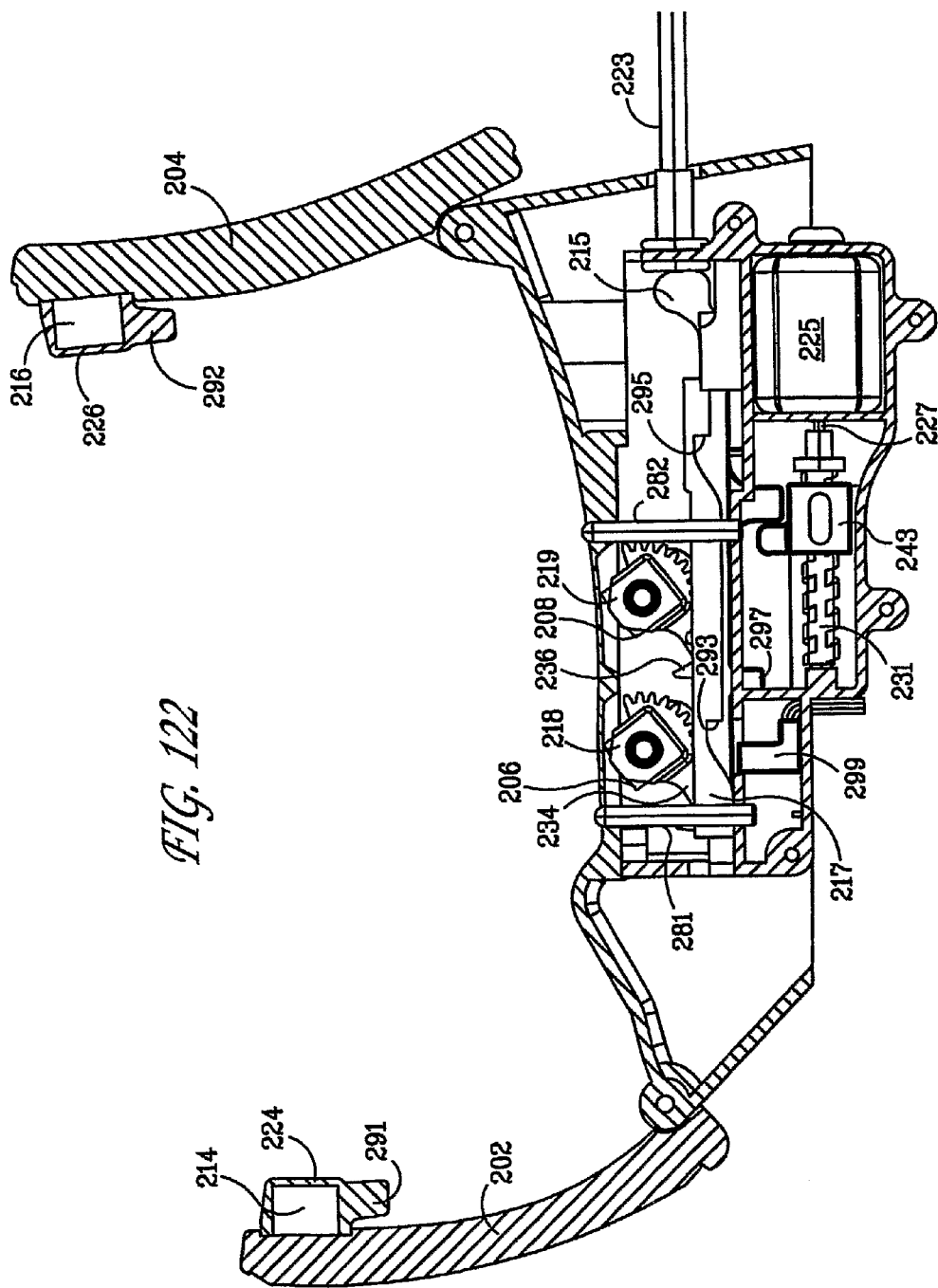
Figure 123:
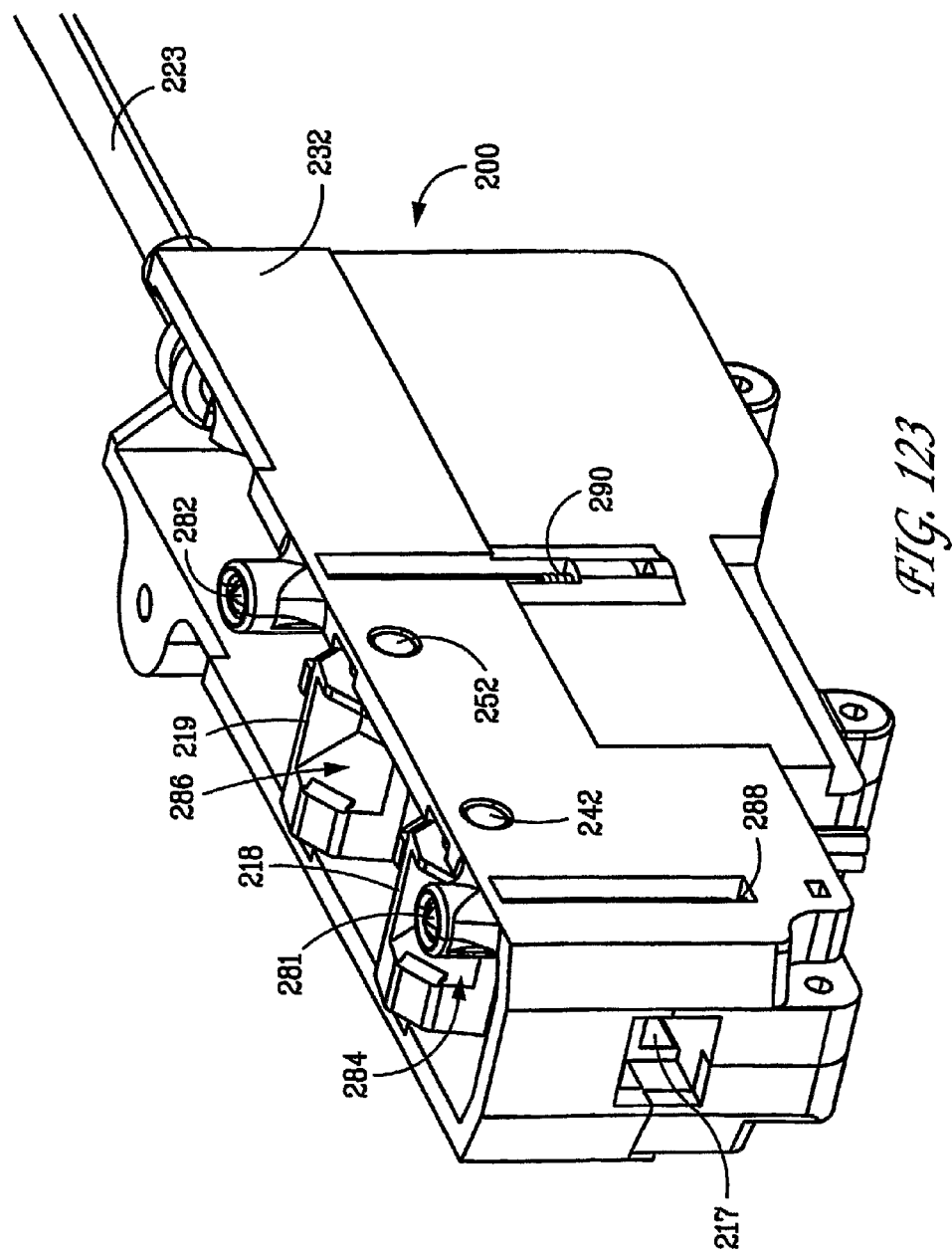
FIG. 123 is a perspective view showing the magnetic latch mechanism of FIGS. 119-122 in the actuated, a.k.a. unlatched, configuration.
Figure 174:
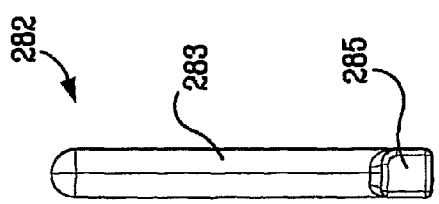
Figure 173:
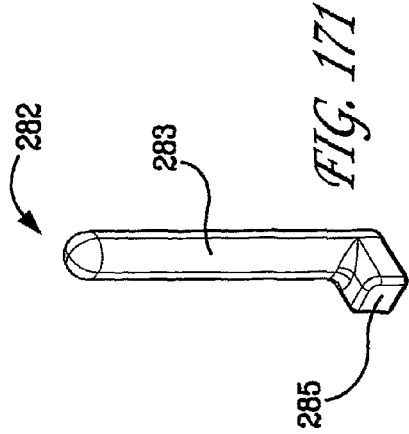

Referring to FIGS. 119-174, the present invention is directed to a magnetic latch mechanism for securing a first member in a closed position relative to a second member, the first member being movable between the closed position and an open position relative to the second member. The first member may, for example, be a door and the second member may, for example, be a compartment or a doorframe. In the illustrated example, the one or more doors provide closures for the compartment. The latch according to the present invention is particularly well suited for use in applications where dual doors that are mechanically linked are to be secured in the closed position. In such applications closing one of the doors also moves the other door to the closed position. However, the mechanical linkage between the doors is not perfect and the closing of the doors is not always simultaneous. Often one door will slightly lag behind the other door in closing. With the magnetic latch of the present invention, once the door is within the region of the influence of the magnetic field of the latch magnet, the door will be pulled to the final closed position by magnetic attraction. Therefore, movement of each door to the final closed position in a dual door application will be properly effected regardless of significant variations in relative positions of the doors as the doors approach their closed positions. Accordingly, the latch of the present invention is designed to effect proper securing of the doors in the closed position even when one door lags behind the other.

Referring to FIGS. 119-174, an embodiment 200 of the magnetic latch mechanism with dual rotary magnets according to the present invention can be seen. The latch mechanism 200 is a remotely operated latch mechanism designed to secure two doors 202 and 204 in the closed position substantially simultaneously, using two rotating magnets 206 and 208. The latch mechanism 200 is designed to be installed between the pivots or hinges of the doors 202, 204 with the rotary magnets 206, 208 supported for rotation about parallel and spaced-apart axes of rotation. Also, the rotary magnets 206, 208 rotate in the same direction. Each of the rotary magnets 206 and 208 are supported by a separate magnet carrier 218, 219, respectively. Each magnet carrier 218, 219 is rotationally supported by the housing 232. Each of the rotary magnets 206, 208 are attached to the respective magnet carrier 218, 219 such that the rotary magnet and its respective magnet carrier rotate as one unit. Each of the rotary magnets 206, 208, and their respective magnet carriers 218, 219, are rotationally movable between respective latched and unlatched positions.

The magnetic latch mechanism 200 also includes a pair of hook-shaped pawls 234, 236. Each hook-shaped pawl 234, 236 is supported by a respective magnet carrier 218, 219 such that the hook-shaped pawl 234, 236 and the respective magnet carrier 218, 219 rotate as a unit. Each hook-shaped pawl 234, 236 has a hooked head 222 with a beveled cam surface 238 that faces away from the respective magnet carrier 218, 219 and a catch surface 244 that faces toward the respective magnet carrier 218, 219.

The magnetic latch mechanism 200 also includes magnetic inserts 214 and 216 that can be attached to the doors 202 and 204, respectively. Each of the magnetic inserts 214 and 216 corresponds to a respective one of the rotary magnets 206, 208. When the rotary magnets 206, 208 are in their latched positions and the doors 202 and 204 are in their closed positions, the pole of each of each of the rotary magnets 206, 208 facing the respective magnetic insert 214, 216 is of an opposite type (i.e. north, south) as compared to the pole of the magnetic insert 214, 216 facing its respective rotary magnet 206, 208. In the illustrated example, the magnetic inserts 214, 216 are positioned such that their south poles face their respective rotary magnet 206, 208 when the doors 202 and 204 are in their closed positions. Also in the illustrated example, the rotary magnets 206, 208 are positioned in their carriers 218, 219 such that their north poles face their respective magnetic inserts 214, 216 when the rotary magnets 206, 208 and their carriers are in their latched positions and the doors 202 and 204 are in their closed positions. Accordingly, an attractive force is exerted between each rotary magnet 206, 208 and its respective magnetic insert 214, 216 with the result that the doors 202, 204 to which the magnetic inserts 214, 216 are attached are held in the closed position.

Furthermore, the hook-shaped pawls 234, 236 engage respective strikers 224, 226 to mechanically block the movement of the doors 202, 204 from the closed position to the open position. This feature prevents the doors 202, 204 from being forcibly pried open from the exterior of the compartment being secured by the doors 202, 204.

The magnetic latch mechanism 200 includes the pair of strikers 224, 226 each of which corresponds to a respective one of the pair of hook-shaped pawls 234, 236. Each striker 224, 226 is supported by a respective door 202, 204 such that the striker is spaced apart from the respective door's interior surface and the head 222 of the hook-shaped pawl 234, 236 can fit between the respective striker 224, 226 and the respective door 202, 204. Each striker 224, 226 has a cam surface 228 that faces away from the respective door 202, 204 and a catch surface 230 that faces toward the respective door 202, 204. The cam surface 228 of each striker can interact with the cam surface 238 of the respective hook-shaped pawl 234, 236 to move the pawl out of the way of the striker 224, 226 and allow the respective door to move to the closed position if the respective hook-shaped pawl happens to be near the latched position, illustrated in FIGS. 128-131, when the respective door is being moved to the closed position. Once the door 202, 204 is in the closed position, the magnetic attraction between the respective rotary magnet 206, 208 and the respective magnetic insert 214, 216 moves the respective hook-shaped pawl 234, 236 to the latched position. In the latched position, the head 222 of the respective hook-shaped pawl 234, 236 is positioned between the respective striker 224, 226 and the respective door 202, 204, where the catch surface 244 of the respective hook-shaped pawl 234, 236 can engage the catch surface 230 of the respective striker 224, 226 to thereby mechanically block the movement of the respective door 202, 204 from the closed position to the open position.

Figure 132:
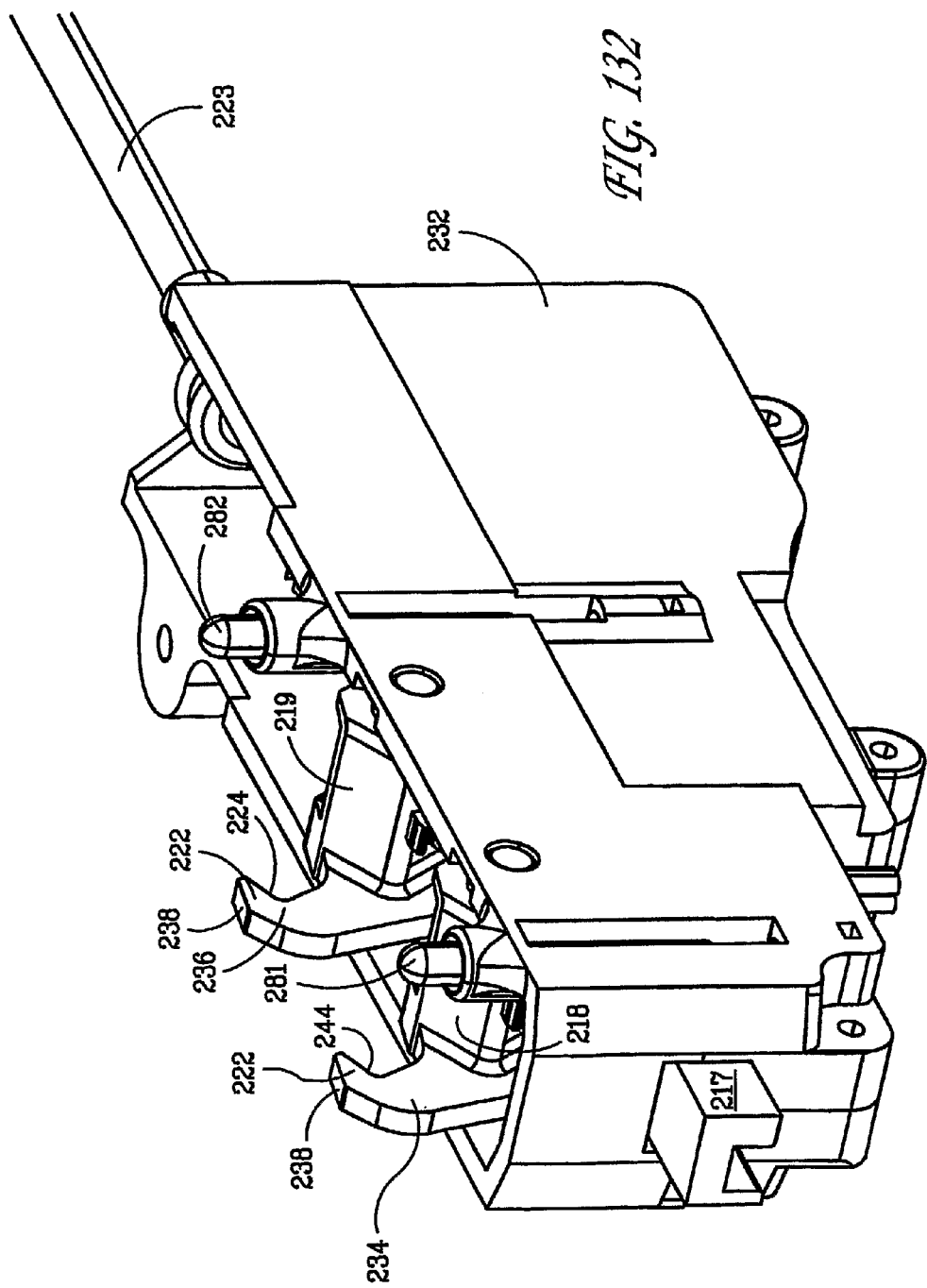
FIG. 132 is a perspective view showing the magnetic latch mechanism of FIGS. 119-122 in the partially closed configuration.
Figure 133:
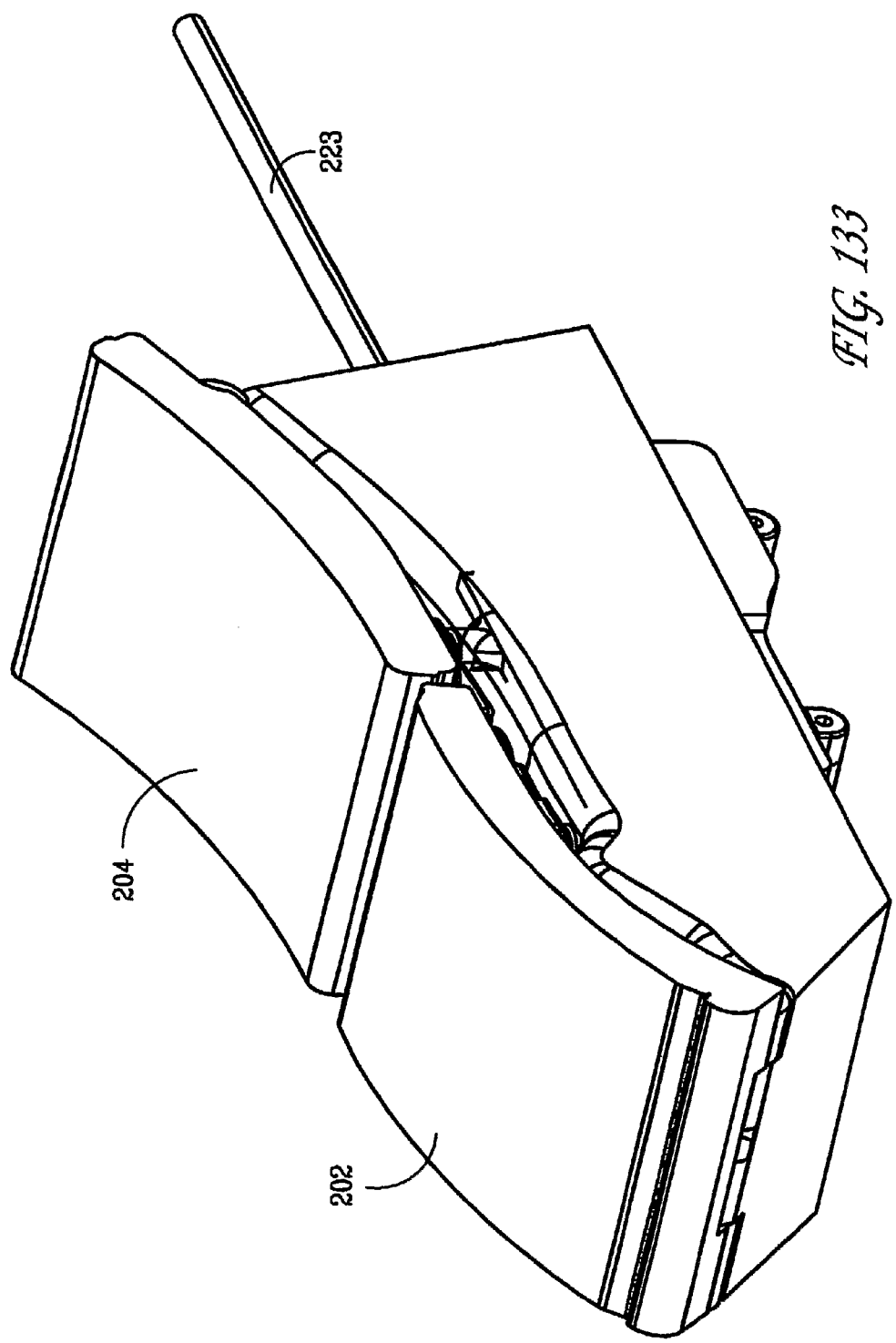
FIGS. 133-135 are environmental views showing the magnetic latch mechanism of FIGS. 119-122 being used with an automotive glove box. The glove box doors are shown in the fully closed position and the magnetic latch mechanism is in the fully closed, a.k.a. latched, configuration. Only a portion of the glove box doors sufficient to illustrate the operation of the magnetic latch mechanism are shown.
Figure 134:
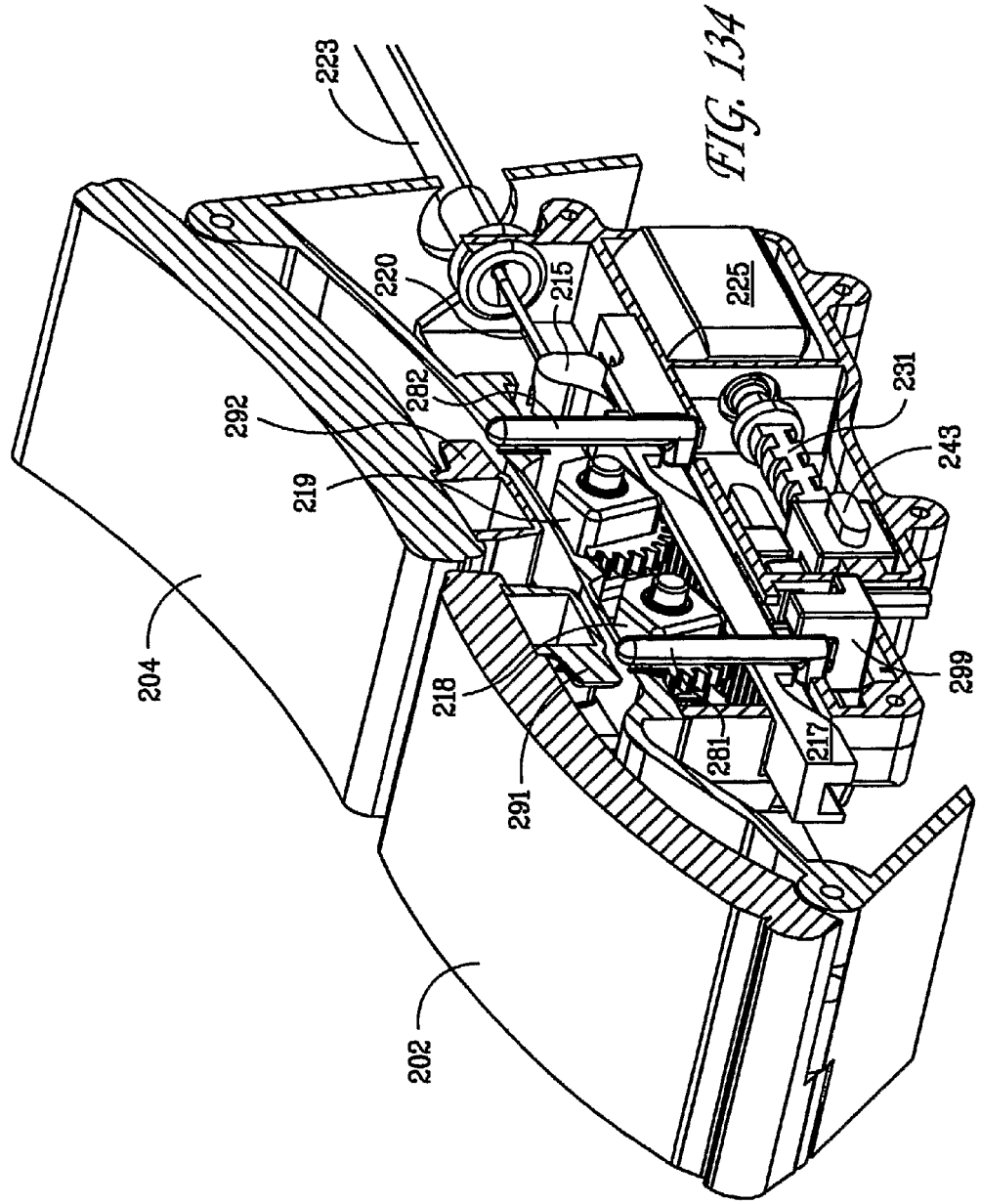
Figure 135:
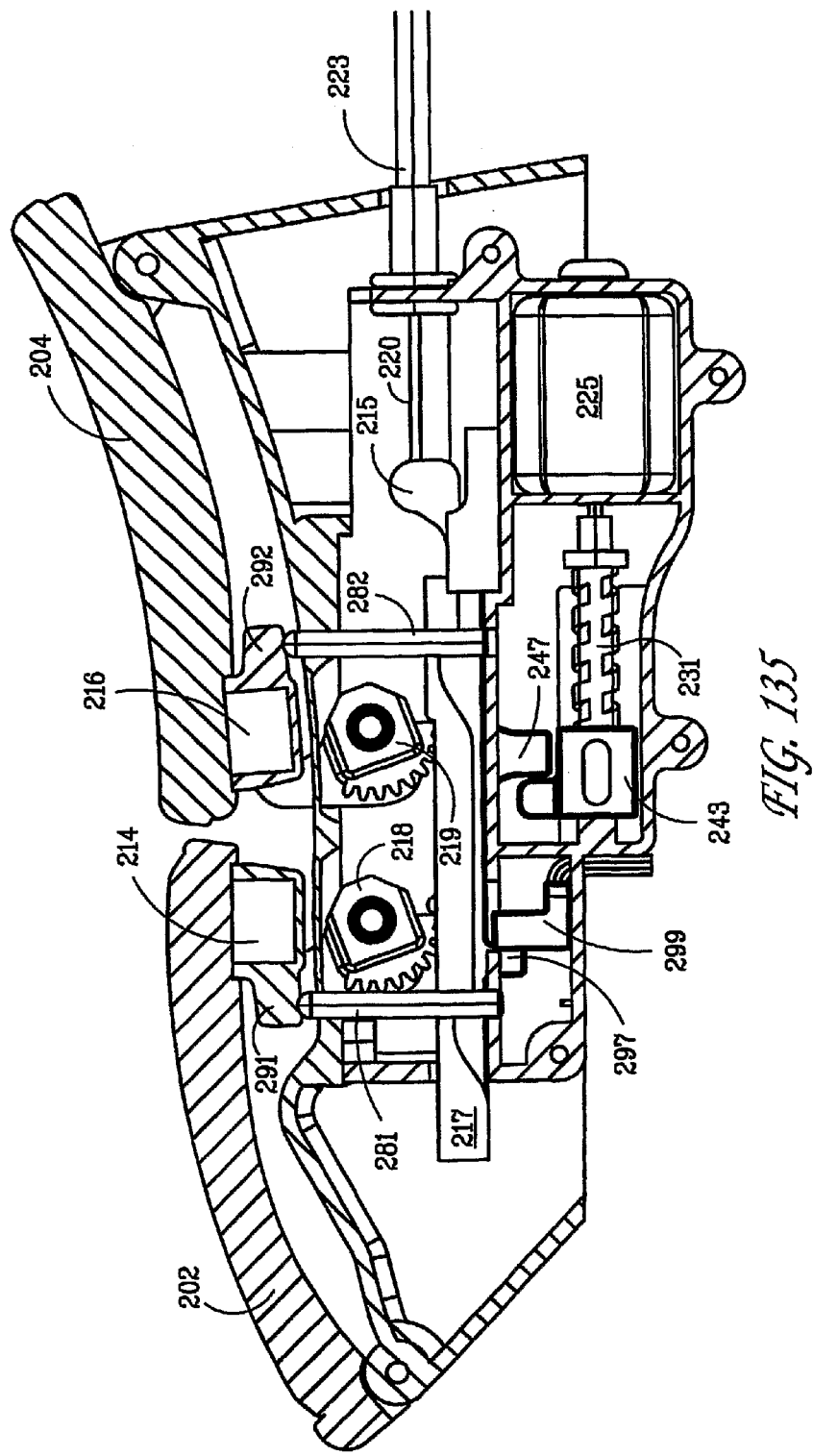
Figure 136:
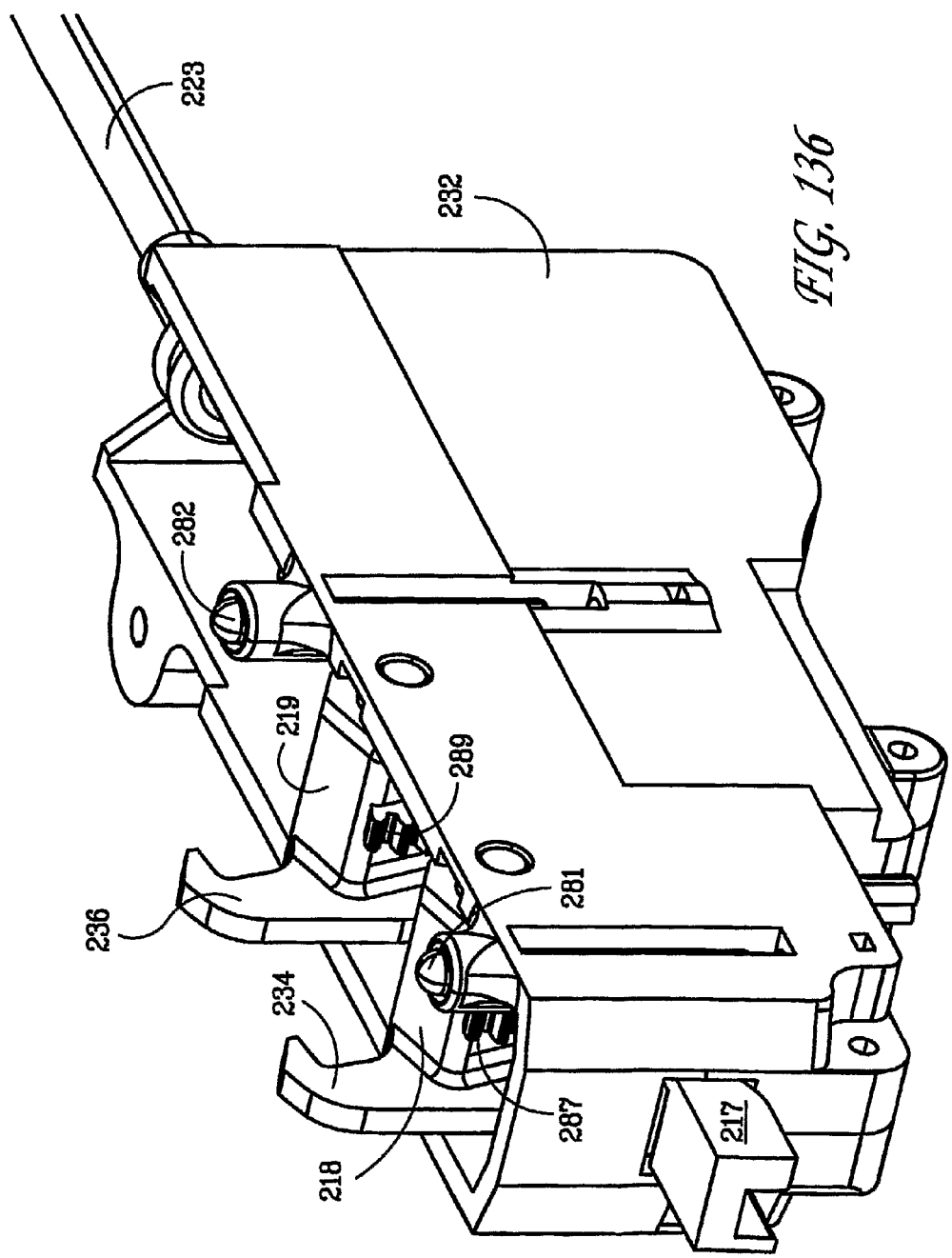
FIGS. 136-141 are views of the magnetic latch mechanism of FIGS. 119-122 in the fully closed, a.k.a. latched, configuration.
Figure 137:
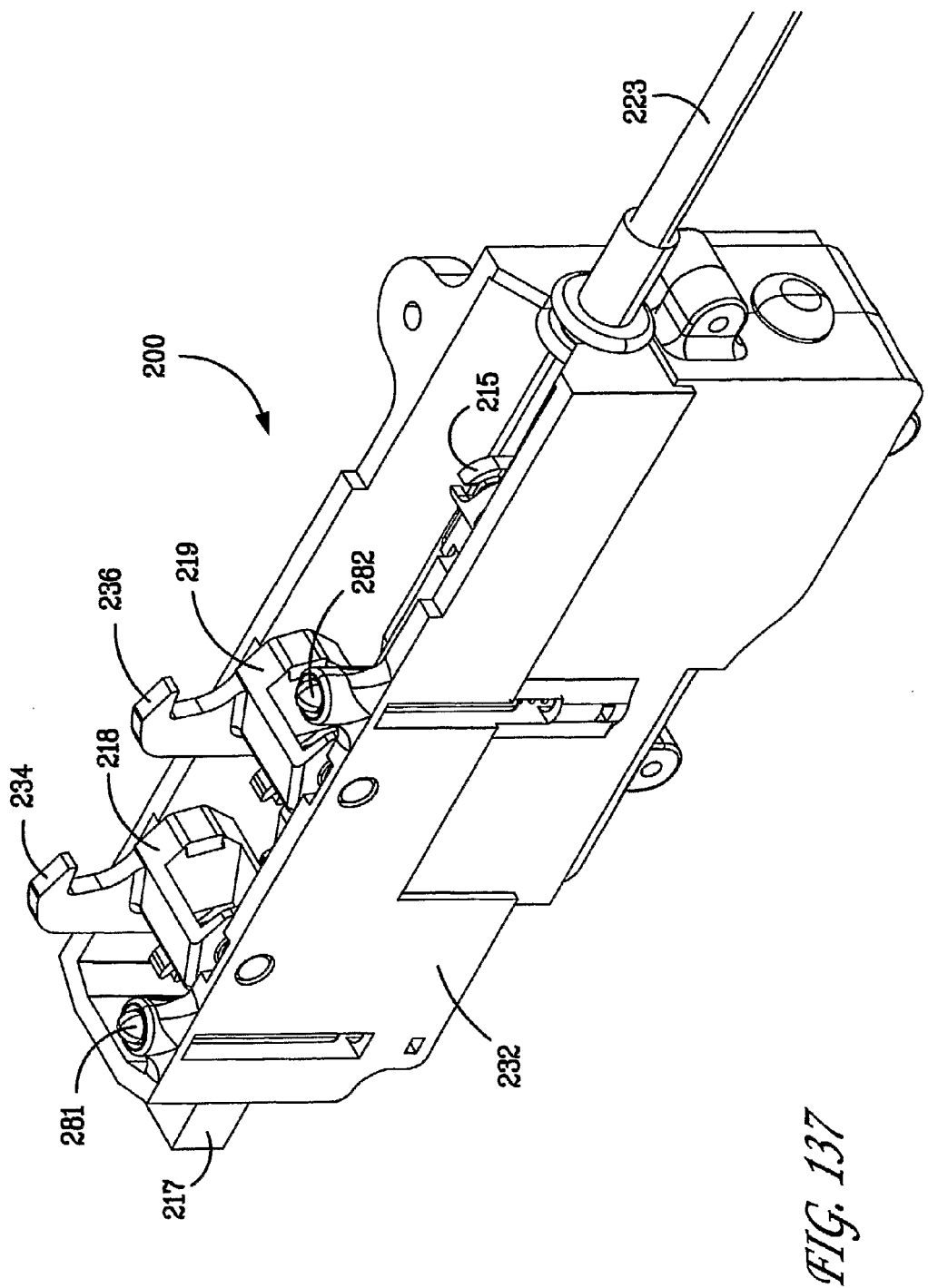
Figure 138:
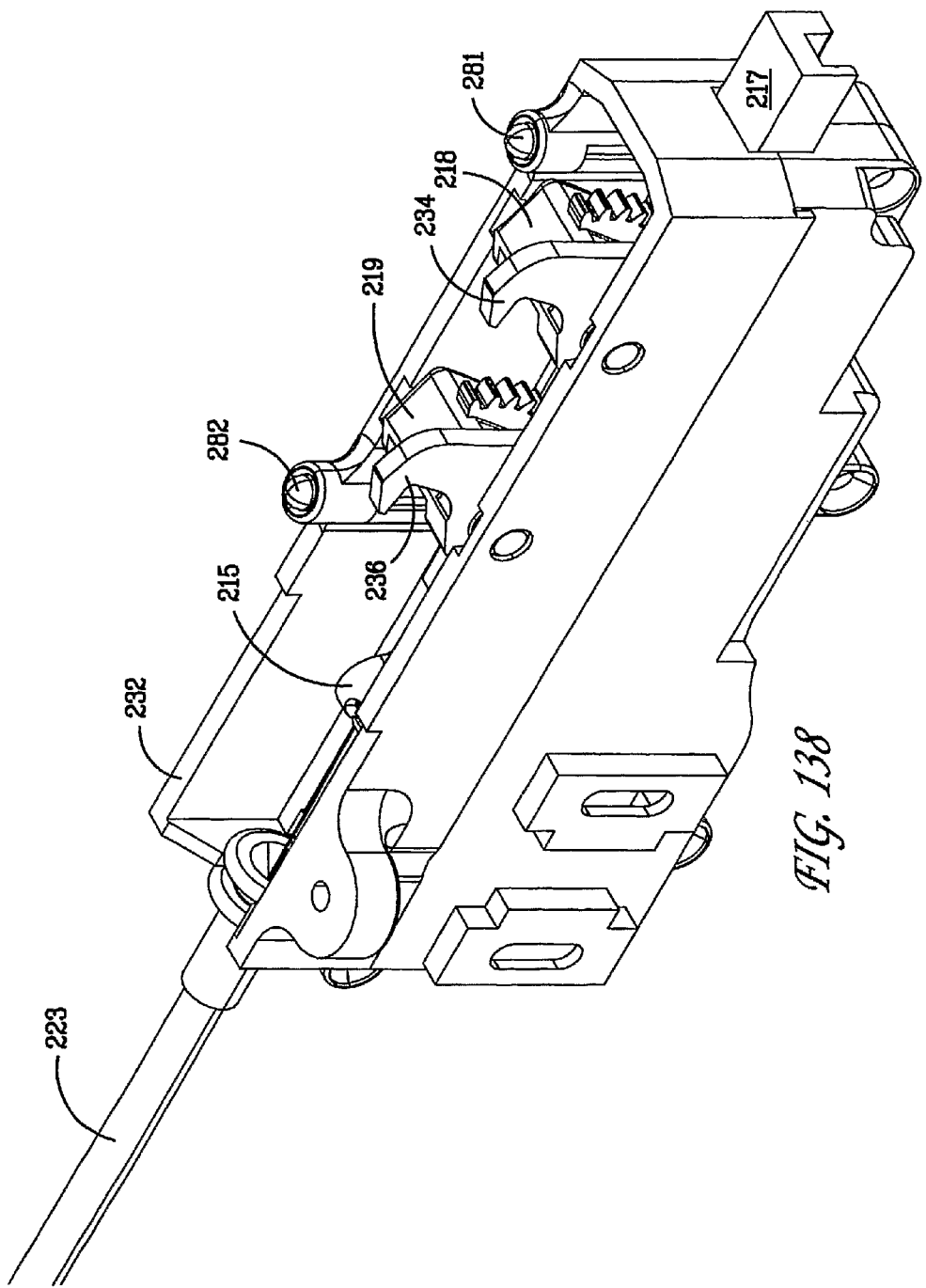
Figure 139:
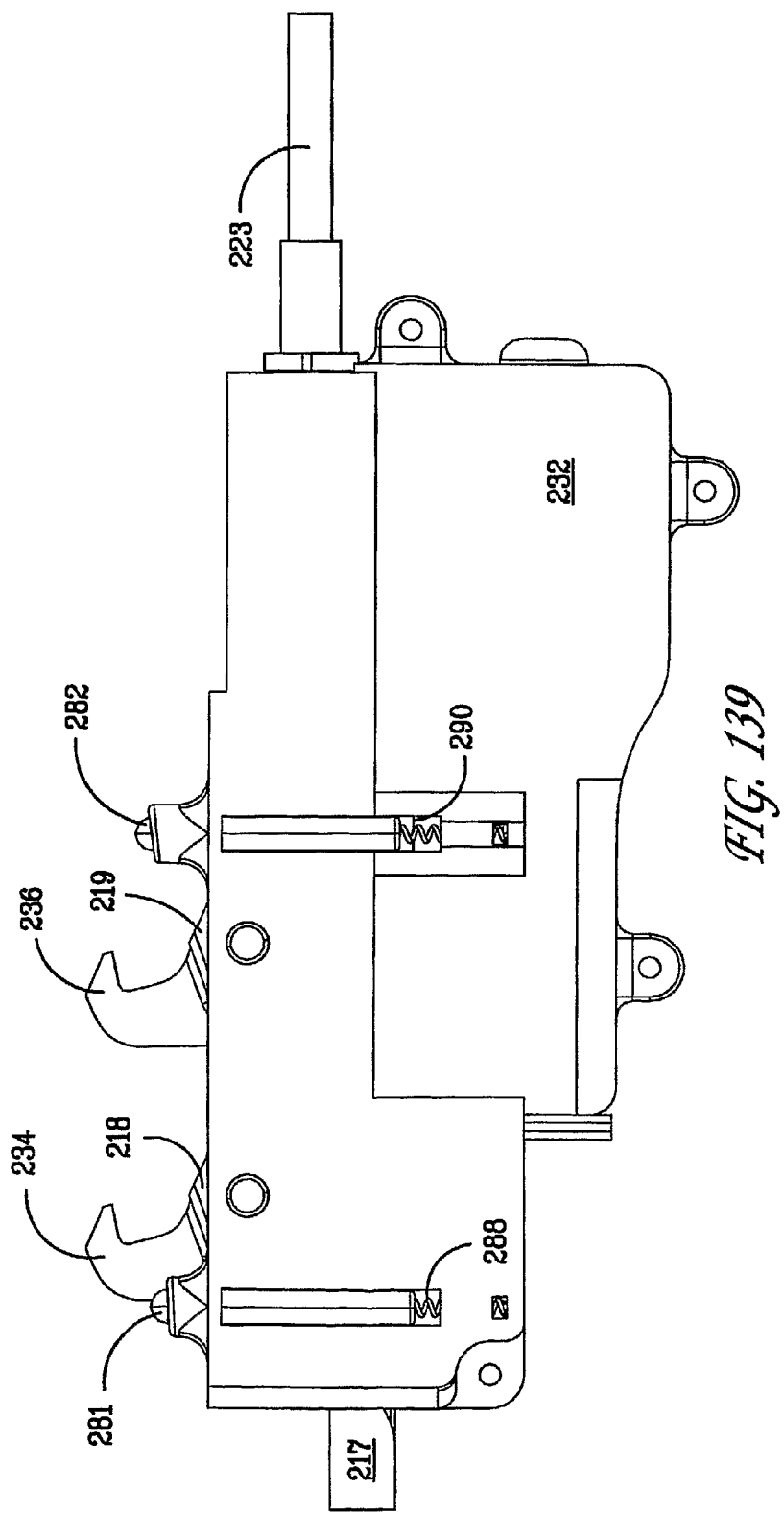
Figure 140:
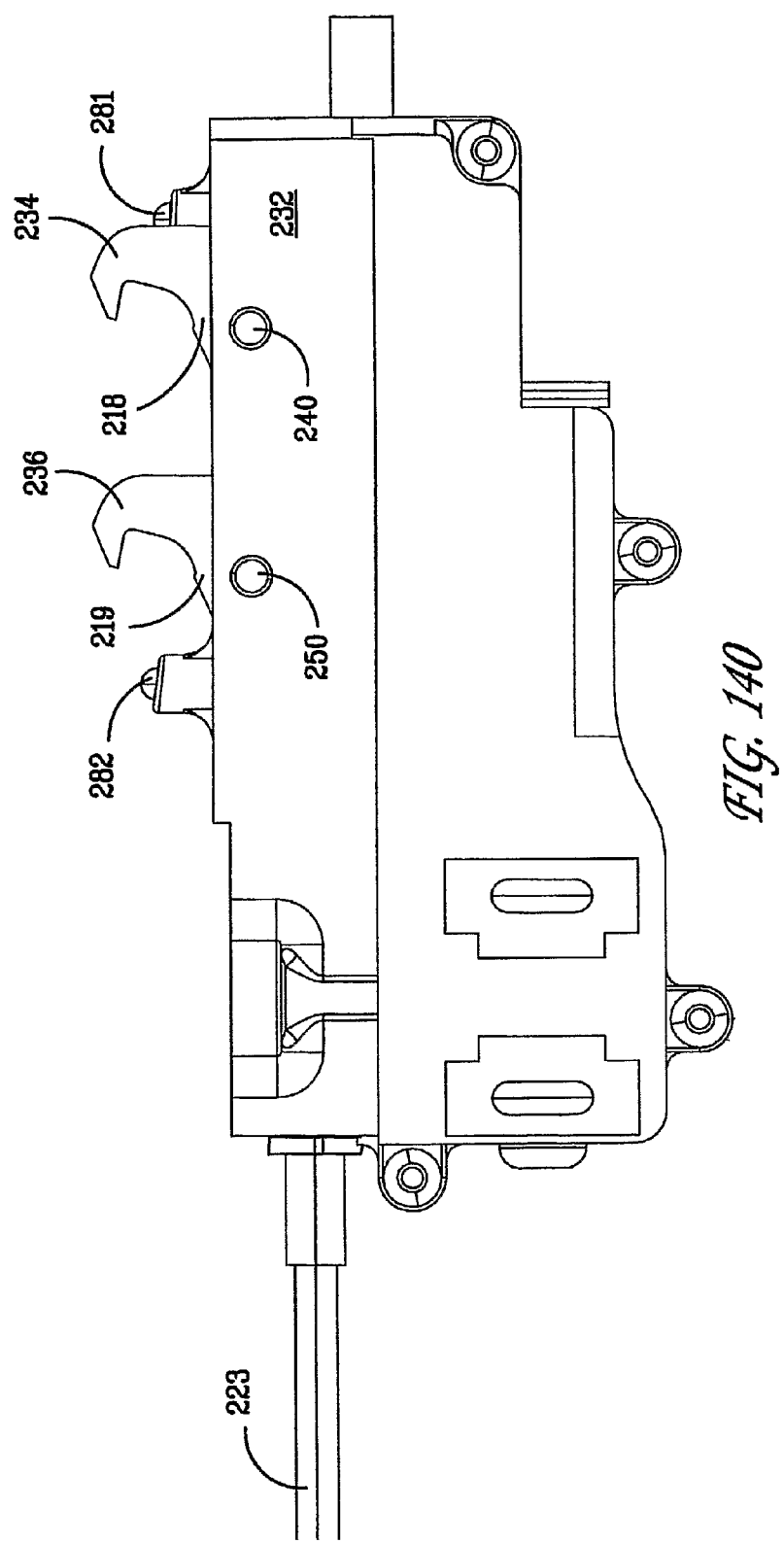
Figure 141:
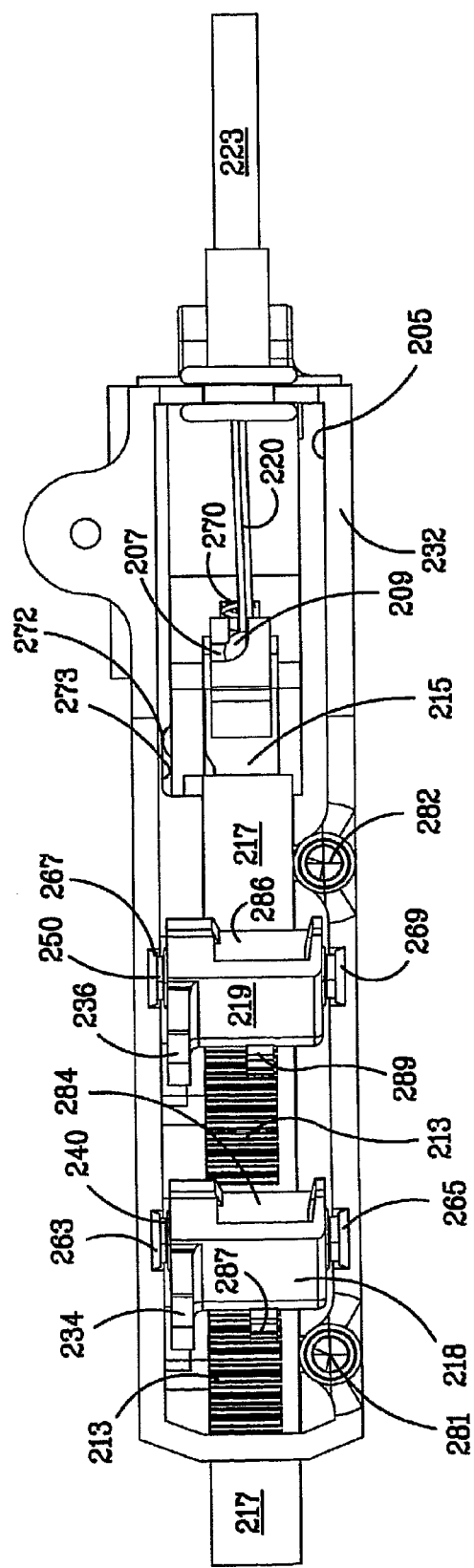
Figure 142:
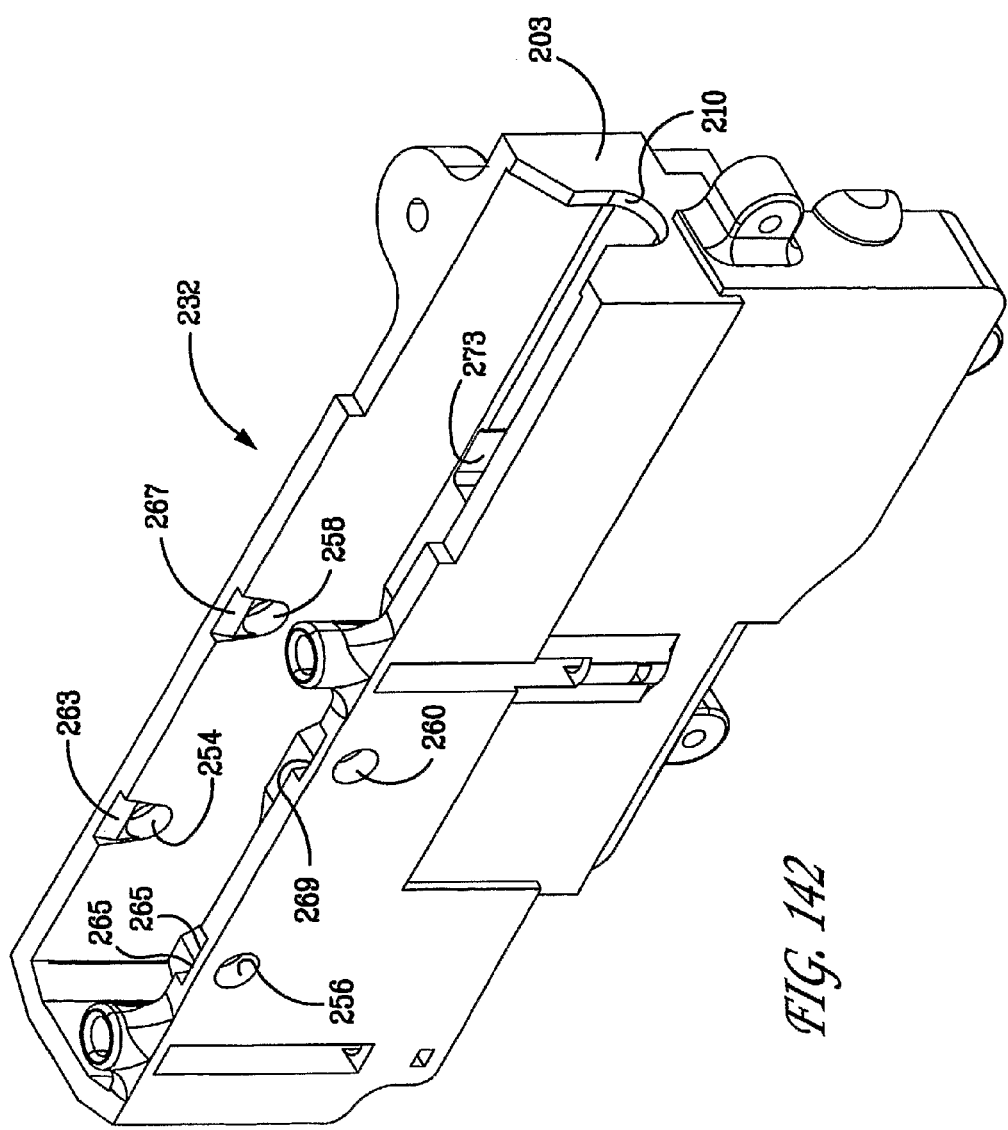
FIGS. 142-143 are views of the housing of the magnetic latch mechanism of FIGS. 119-122.
Figure 143:
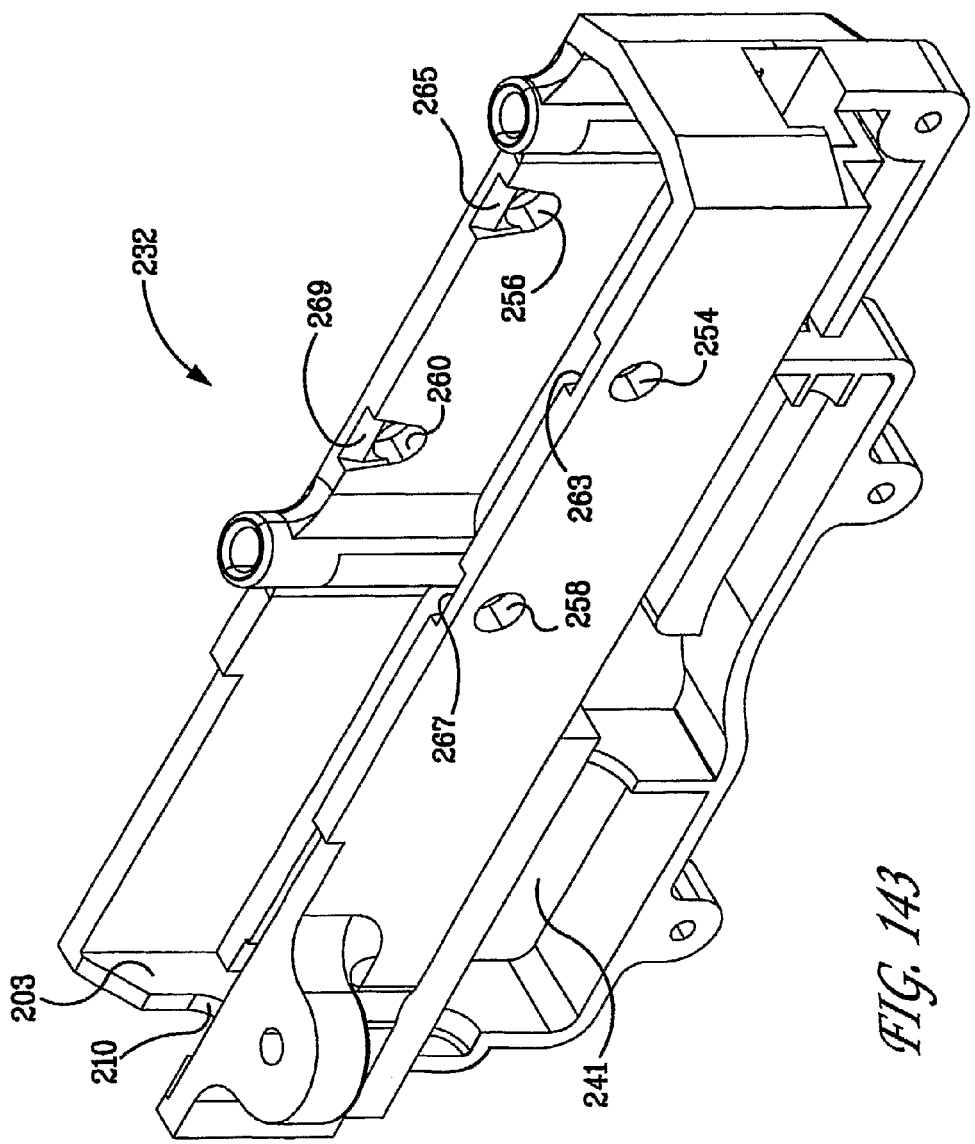
Figure 144:
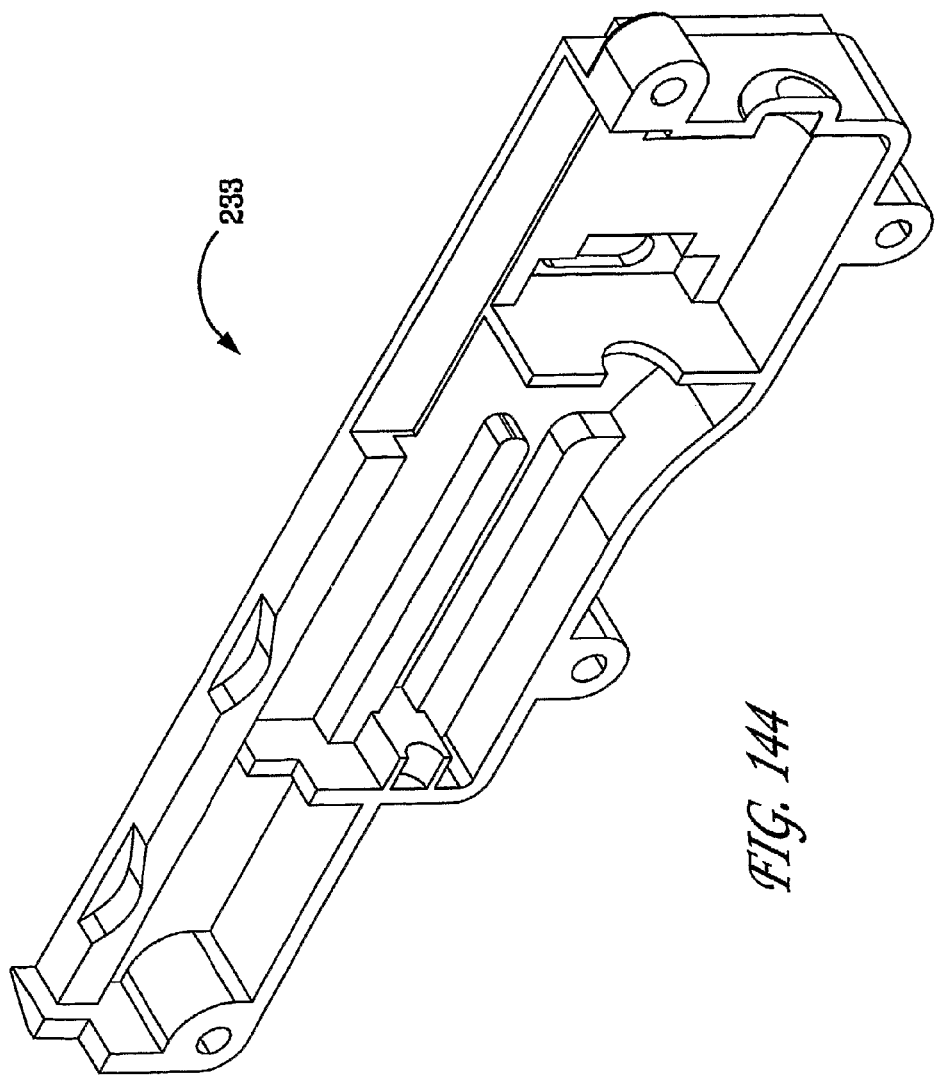
FIGS. 144-145 are views of the motor drive cover of the magnetic latch mechanism of FIGS. 119-122.
Figure 145:
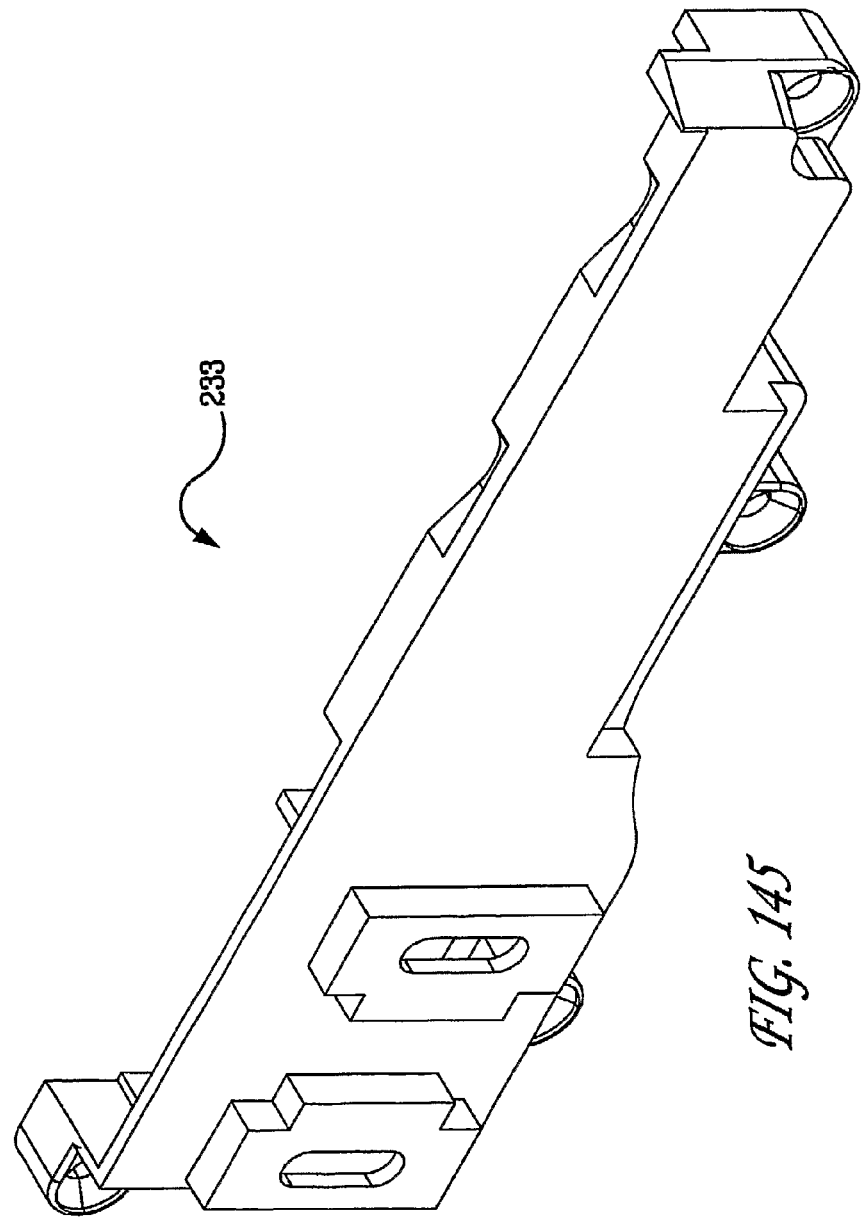
Figure 148:
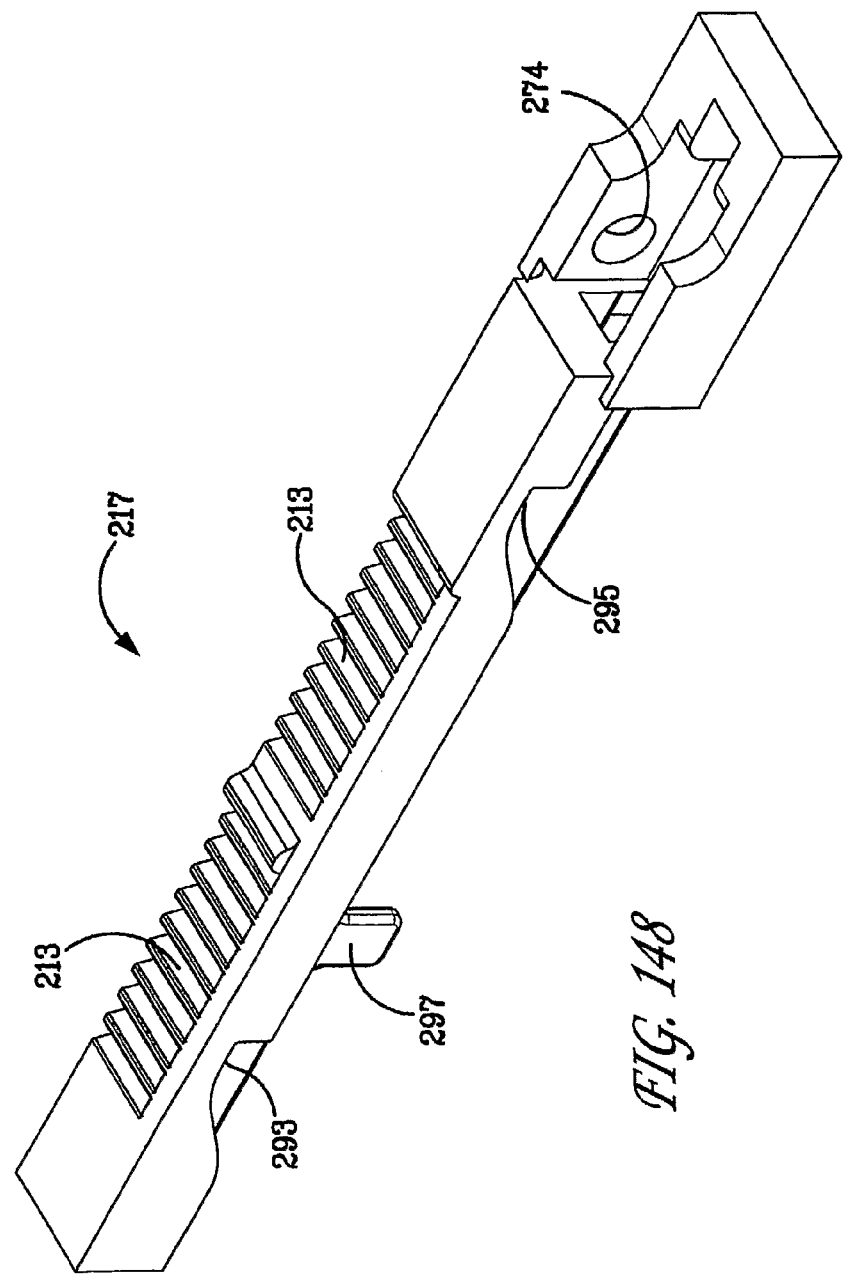
Figure 162:
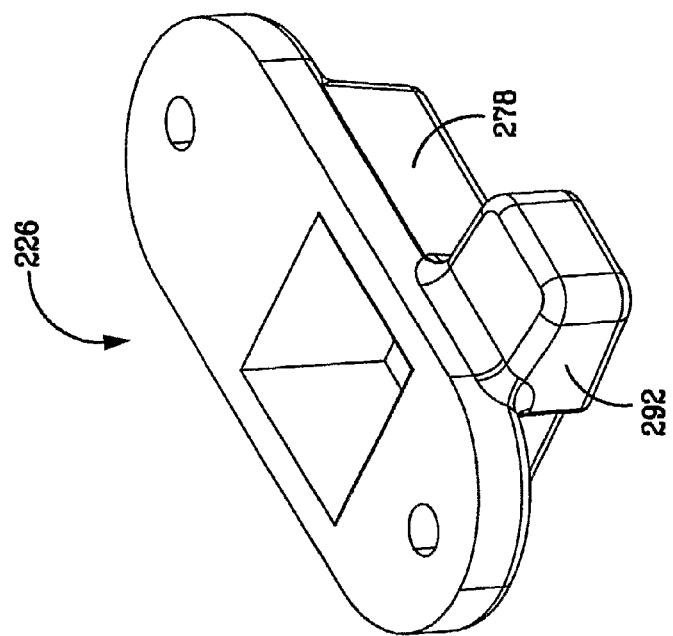
FIGS. 161-164 are views of one of the strikers of the magnetic latch mechanism of FIGS. 119-122.
Figure 161:
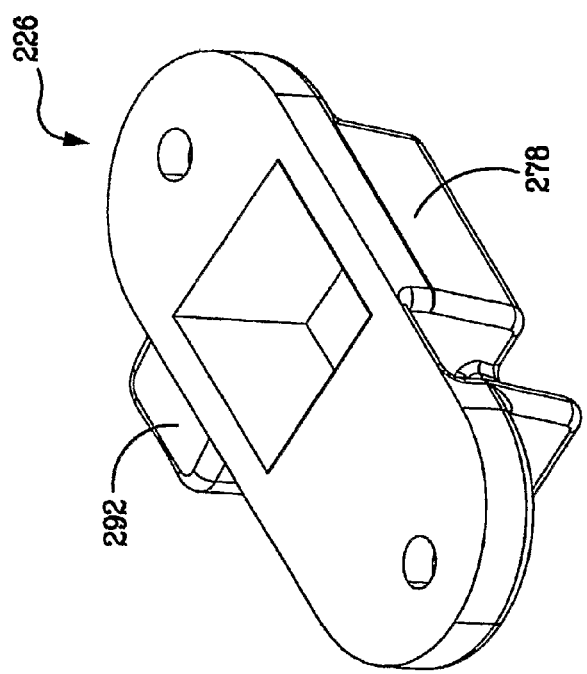
Figure 163:
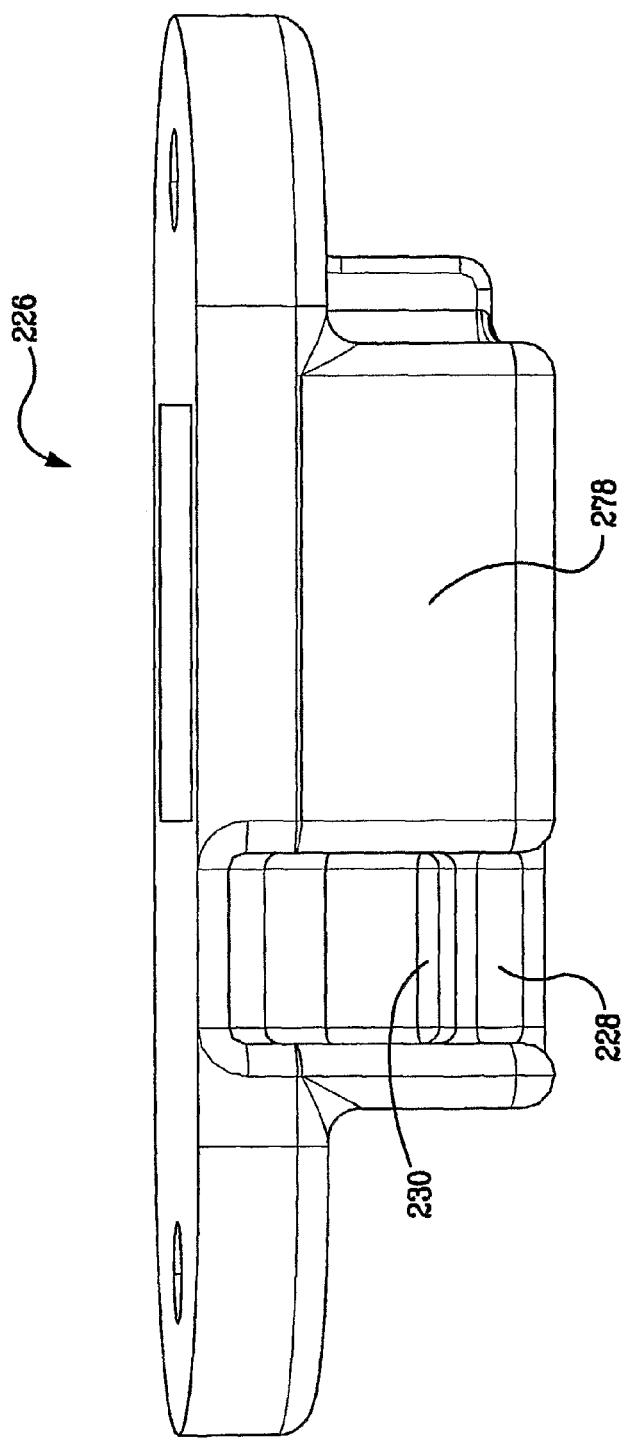
Figure 164:
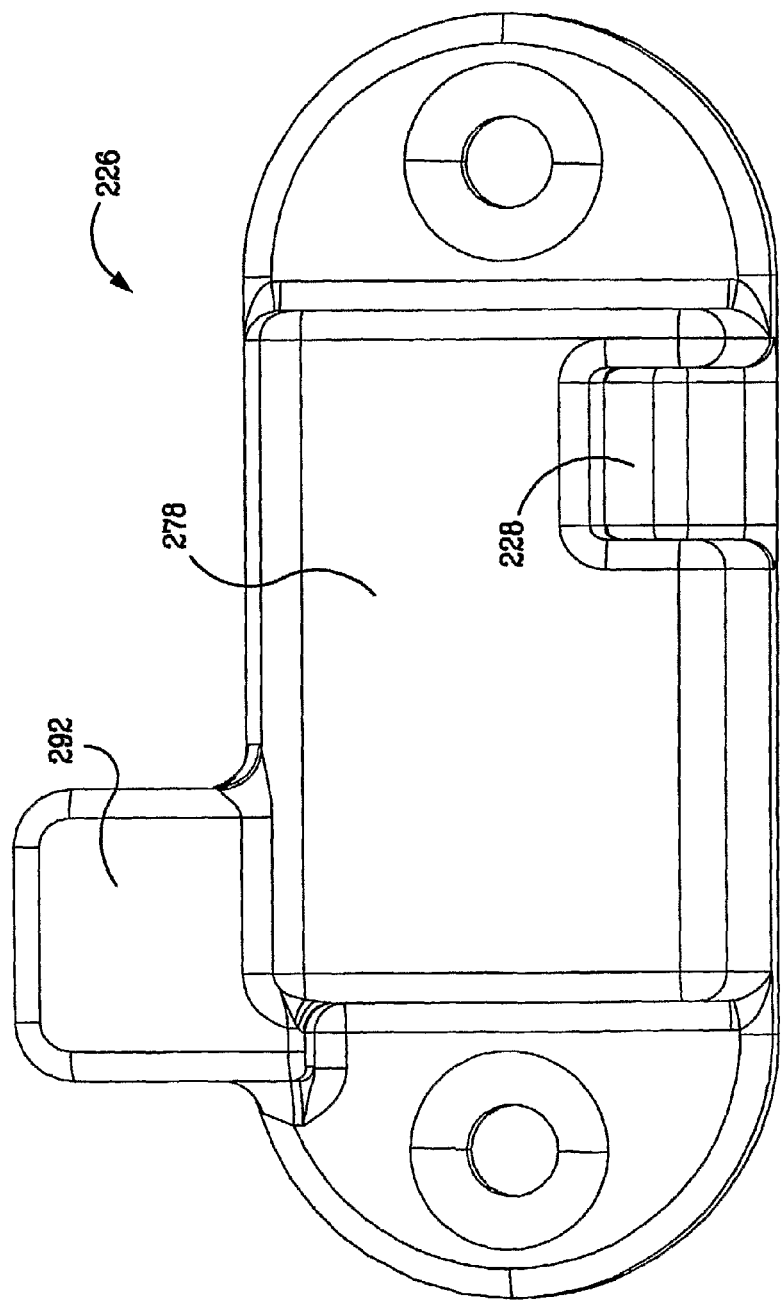
Figure 165:
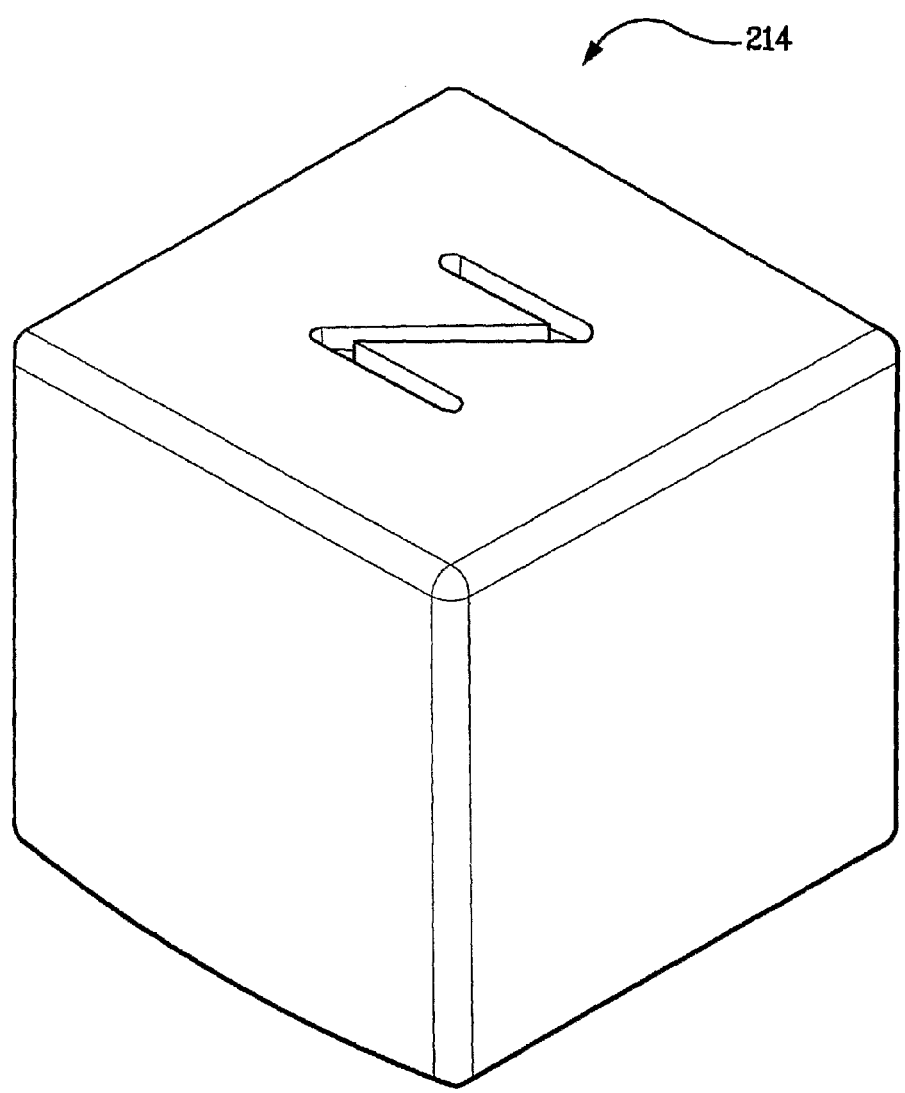
FIGS. 165-166 are views of the magnetic inserts of the strikers of the magnetic latch mechanism of FIGS. 119-122 shown in isolation.
Figure 166:
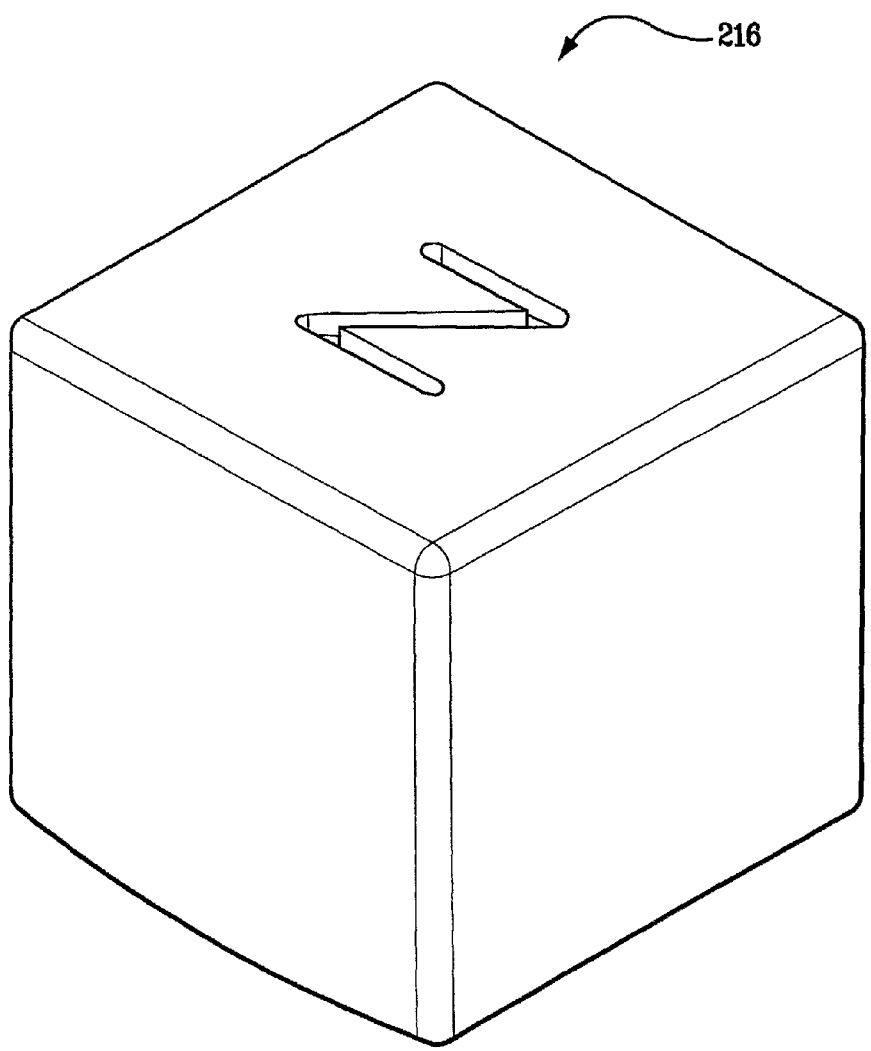
Figure 172:
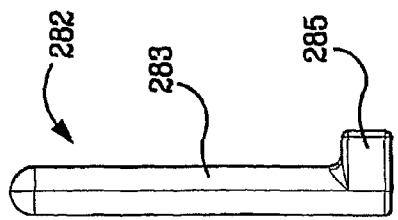
Figure 171:
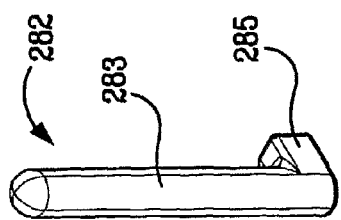

When the rotary magnets 206, 208 are in their unlatched positions (illustrated in FIGS. 132 and 162) and the doors 202 and 204 are in their closed positions (illustrated in FIG. 119), the pole of each of each of the rotary magnets 206, 208 that is of an opposite type compared to the pole of the respective magnetic insert 214, 216 facing the rotary magnet 206, 208, is positioned farther from the respective magnetic insert 214, 216, while the pole of each of each of the rotary magnets 206, 208 that is of the same type compared to the pole of the respective magnetic insert 214, 216 facing the rotary magnet 206, 208, is positioned closer to the respective magnetic insert 214, 216, relative to the latched position of the rotary magnets 206, 208. In the unlatched position, the repulsive force between the like poles of each rotary magnet 206, 208 and the respective magnetic insert 214, 216 overcomes the attractive force between the opposite poles of each rotary magnet 206, 208 and the respective magnetic insert 214, 216. Accordingly, a net repulsive force is exerted between each rotary magnet 206, 208 and its respective magnetic insert 214, 216. In addition, the hook-shaped pawls 234, 236 rotate to their unlatched positions along with the rotary magnets 206, 208 and their magnet carriers 218, 219, which removes the mechanical impediment to the opening of the doors 202, 204, with the result that the doors 202, 204 to which the magnetic inserts 214, 216 are attached are moved from the closed position toward the open position.

Recall that in the illustrated example, the magnetic inserts 214, 216 are positioned such that their south poles face their respective rotary magnet 206, 208 when the doors 202 and 204 are in their closed positions. In the illustrated example, the north poles of the rotary magnets 206, 208 move away from the south poles of their respective magnetic inserts 214, 216 and the south poles of the rotary magnets 206, 208 move toward the south poles of their respective magnetic inserts 214, 216 as the rotary magnets 206, 208 and their carriers 218, 219 move from the latched position to the unlatched position, such that a net repulsive force is exerted between each rotary magnet 206, 208 and its respective magnetic insert 214, 216 when the rotary magnets 206, 208 reach their unlatched positions.

The rotary magnets 206, 208 and their carriers 218, 219 move through an angle in the range of greater than 10° and less than or equal to 180° as they move from the latched position to the unlatched position. More preferably, the rotary magnets 206, 208 and their carriers 218, 219 move through an angle in the range of greater than or equal to 30° and less than or equal to 180° as they move from the latched position to the unlatched position. Even more preferably, the rotary magnets 206, 208 and their carriers 218, 219 move through an angle in the range of greater than or equal to 45° and less than or equal to 145° as they move from the latched position to the unlatched position. Yet even more preferably, the rotary magnets 206, 208 and their carriers 218, 219 move through an angle in the range of greater than or equal to 60° and less than or equal to 120° as they move from the latched position to the unlatched position. Yet even more preferably, the rotary magnets 206, 208 and their carriers 218, 219 move through an angle in the range of greater than or equal to 80° and less than or equal to 115° as they move from the latched position to the unlatched position. In the illustrated example, the rotary magnets 206, 208 and their carriers 218, 219 move through an angle of roughly 110° (110°±10°) as they move from the latched position to the unlatched position. More precisely, in the illustrated example the rotary magnets 206, 208 and their carriers 218, 219 move through an angle of about 110° as they move from the latched position to the unlatched position.

The opposite type pole of the respective rotary magnet 206, 208 need not directly face the pole of the magnetic insert 214, 216 facing its respective rotary magnet 206, 208 in the latched position. The rotary magnets 206, 208 may deviate from the direct facing relationship between the opposite type poles of the rotary magnets and of their respective magnetic inserts by an angle $\theta$ in the range of $0° \leq \theta < 90°$. The position of the hook-shaped pawls relative to the rotary magnets 206, 208 would of course have to be adjusted accordingly. Of course, the direct facing relationship between the opposite type poles of the rotary magnets and of their respective magnetic inserts (i.e. at or about 0°) gives the greatest holding power to the latch mechanism and it would be desirable for the north poles of the rotary magnets 206, 208 to approach the direct facing relationship with the south poles of their respective magnetic inserts as closely as possible in the latched position. The key consideration is that the angular position of the rotary magnets 206, 208 in the latched position must be selected such that the north poles of the rotary magnets 206, 208 are closer to the south poles of their respective magnetic inserts as compared to the south poles of the rotary magnets 206, 208 to such an extent that the net attractive force between the rotary magnets 206, 208 and their respective magnetic inserts is strong enough for the rotary magnets to draw in and hold the doors 202, 204 in the closed position as described herein. In the illustrated example, the north poles of the rotary magnets 206, 208 deviate from the direct facing relationship with the south poles of their respective magnetic inserts by a few degrees in the latched position.

Each magnetic insert 214, 216 is attached to a respective one of the doors 202, 204 by being inserted in a magnetic insert housing 276, 278, respectively, which in turn are attached to a respective one of the doors 202, 204. In the illustrated example, the magnetic insert housings 276, 278 are attached to the doors 202, 204 by screws 280.

The means for attaching the magnetic insert housings 276, 278 to the doors 202, 204 is not critical to the present invention and any suitable fastening means including screws, rivets, pins, nails and adhesives may be used. Furthermore, the magnetic insert housings 276, 278 may be of unitary construction with the doors 202, 204. The magnetic insert housings 276, 278 may also be dispensed with entirely and the magnetic inserts 214, 216 may be attached to the doors 202, 204 directly. As with the housings 276, 278, any suitable fastening means including screws, rivets, pins, nails and adhesives may be used to attach the magnetic inserts 214, 216 to the doors 202, 204. As yet another alternative, the magnetic inserts 214, 216 may be embedded in the material of the doors 202, 204.

In the illustrated embodiment, the strikers 224, 226 are of unitary construction with the magnetic insert housings 276, 278, respectively. As with the housings 276, 278, the means for attaching the strikers 224, 226 to the doors 202, 204 are not critical to the present invention. Any suitable structure that supports the striker 224, 226 such that the striker is spaced apart a sufficient amount from the respective door's interior surface in order for the head 222 of the hook-shaped pawl 234, 236 to fit between the respective striker 224, 226 and the respective door 202, 204 may be employed and any suitable fastening means including screws, rivets, pins, nails and adhesives may be used to attach the structure to the respective door. Furthermore, the strikers 224, 226 may be of unitary construction with the doors 202, 204.

The magnetic latch mechanism 200 includes a housing 232 that rotationally supports the magnet carriers 218, 219 having the rotary magnets 206, 208, respectively, attached thereto. The top opening 205 of the housing 232 allows the hook-shaped pawls 234, 236 to extend out of the housing 232 to engage the strikers 224, 226 in the latched position.

Each magnet carrier 218, 219 includes a receptacle 284, 286 for receiving the respective rotary magnet 206, 208. Each magnet carrier 218, 219 has a pair of spindles, 240, 242 and 250, 252, respectively, with each pair of spindles projecting outward on opposite sides of the respective receptacle 284, 286. The receptacles 284, 286, and consequently carriers 218, 219, are positioned in tandem along the longitudinal axis of the housing 232 with their axes of rotation being transverse, i.e. perpendicular, to the longitudinal axis of the housing 232. The spindles 240, 242, 250, 252 are received in and rotationally supported by the holes 254, 256, 258, 260 in the sides of the housing 232, respectively. The holes 254, 256, 258, 260 are provided with lead-in ramps 263, 265, 267, 269, respectively, such that the carriers 218, 219 can be snap-fitted into the housing 232, with the spindles 240, 242, 250, 252 snapping into the holes 254, 256, 258, 260. The housing 232 has a motor compartment 241. A cover 233 is provided for the motor compartment 241. Thus the magnet carriers 218, 219 are rotationally supported by the housing 232. The particular modality used for rotationally supporting the magnet carriers 218, 219 in the housing 232 is not critical to the present invention. The illustrated modality for rotationally supporting the carriers 218, 219 in the housing 232 was selected for ease of assembly. Alternatively, the carriers 218, 219 could be supported for rotation by the housing 232 through the use of axles, shafts, or pins, or with other types of bearing arrangements used in place of the holes 254, 256, 258, 260. As yet another alternative, the housing 232 can be of clam-shell design with the spindles 240, 242, 250, 252 being inserted into appropriate bearing structures that rotationally support the spindles as the halves of the clam shell are assembled together.

Each hook-shaped pawl 234, 236 is integrally formed with its respective magnet carrier 218, 219. Thus, there is no relative rotation between each receptacle 284, 286 and the respective hook-shaped pawl 234, 236 and each hook-shaped pawl 234, 236 and the respective receptacle 284, 286, and consequently the respective magnet carrier 218, 219, rotate as a unit.

Alternatively, the hook-shaped pawls 234, 236 may be made separately from the magnet carriers 218, 219, and attached to the magnetic carriers in a way that provides for each hook-shaped pawl to rotate with its respective magnet carrier as a unit. As yet another alternative, some range of relative motion between each carrier 218, 219 and the respective hook-shaped pawl 234, 236 may be provided for in the case where the hook-shaped pawls and the magnet carriers are made as separate pieces. In such a case each hook-shaped pawl 234, 236 would need to be spring biased toward their current position illustrated in the drawings relative to the respective carrier 218, 219. This relative motion would allow each hook-shaped pawl 234, 236 to move out of the way of the respective striker 224, 226, and allow the respective door to move to the closed position if the respective hook-shaped pawl happens to be in the latched position when the respective door is being moved to the closed position, without necessarily moving the respective rotary magnet 206, 208.

Each magnet carrier 218, 219 also has a plurality of gear teeth 287 and 289, respectively. Each set of gear teeth 287, 289 is distributed along an arc defined by a sector of a circle centered at the axis of rotation of the respective magnet carrier 218, 219. The axis of rotation of each magnet carrier 218, 219 is of course defined by the central axis of the respective pair of spindles 240, 242 or 250, 252 of each magnet carrier 218, 219. The gear teeth 287, 289 of each magnet carrier 218, 219 are supported by, and are integral with, the respective receptacle 284, 286 of each magnet carrier. The gear teeth 213 of the rack bar 217 engage the gear teeth 287, 289.

Figure 149:
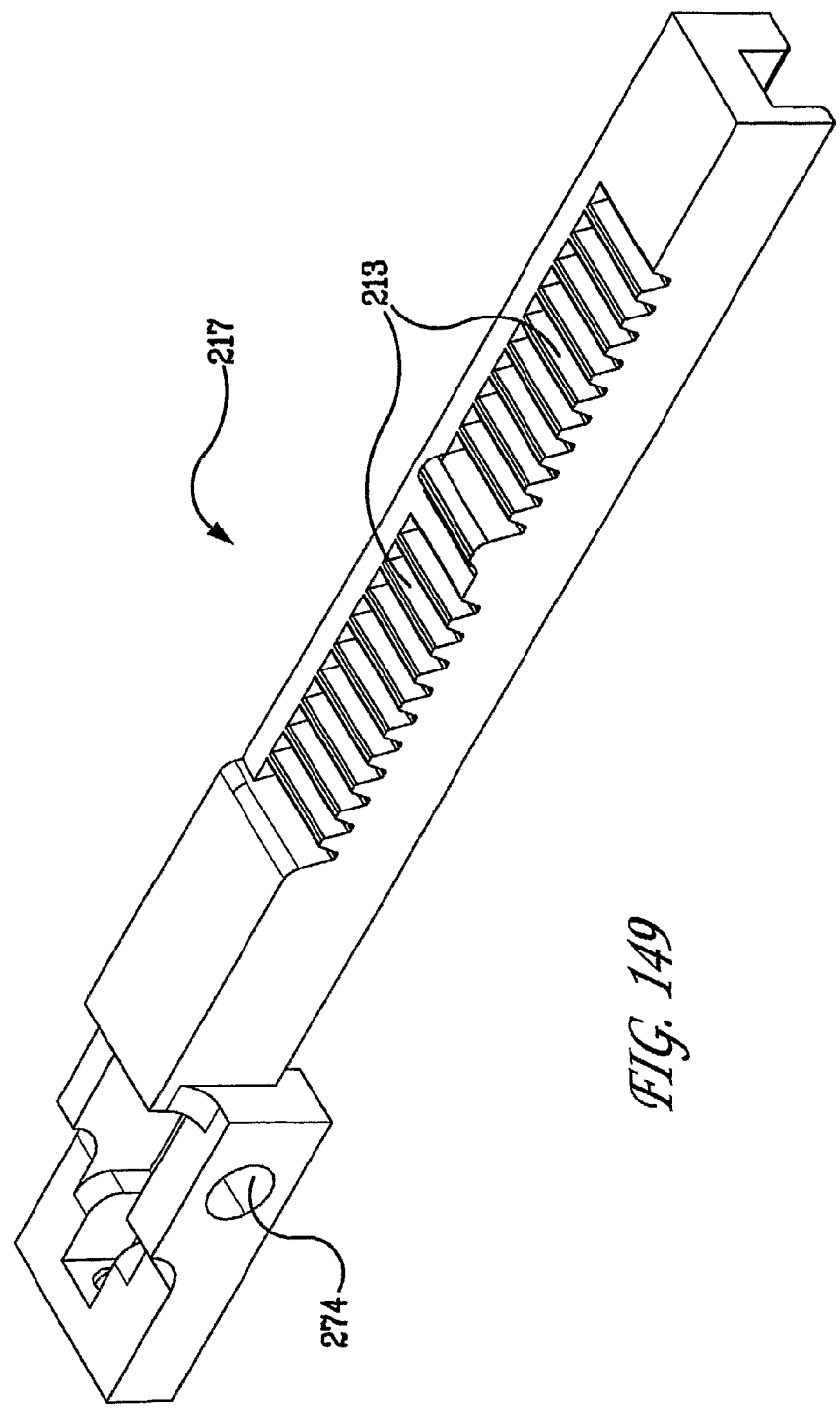
Figure 150:
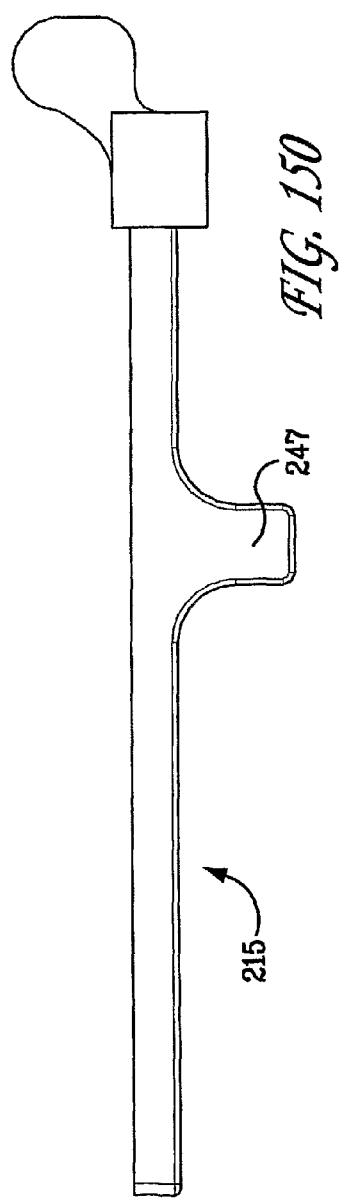
FIGS. 150-154 are views of the sliding bar of the magnetic latch mechanism of FIGS. 119-122.
Figure 151:
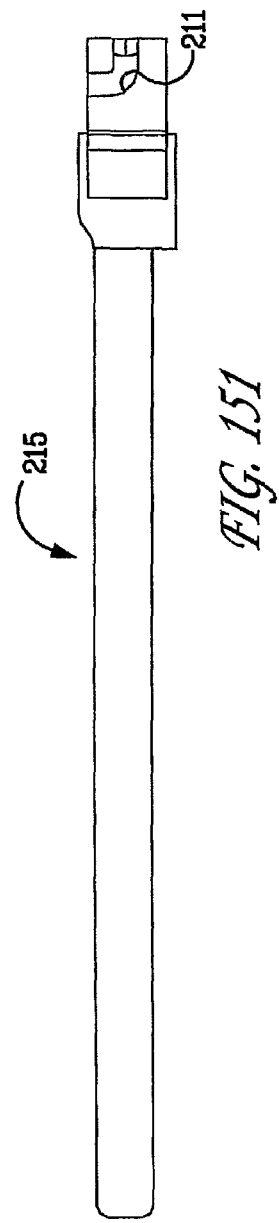
Figure 152:
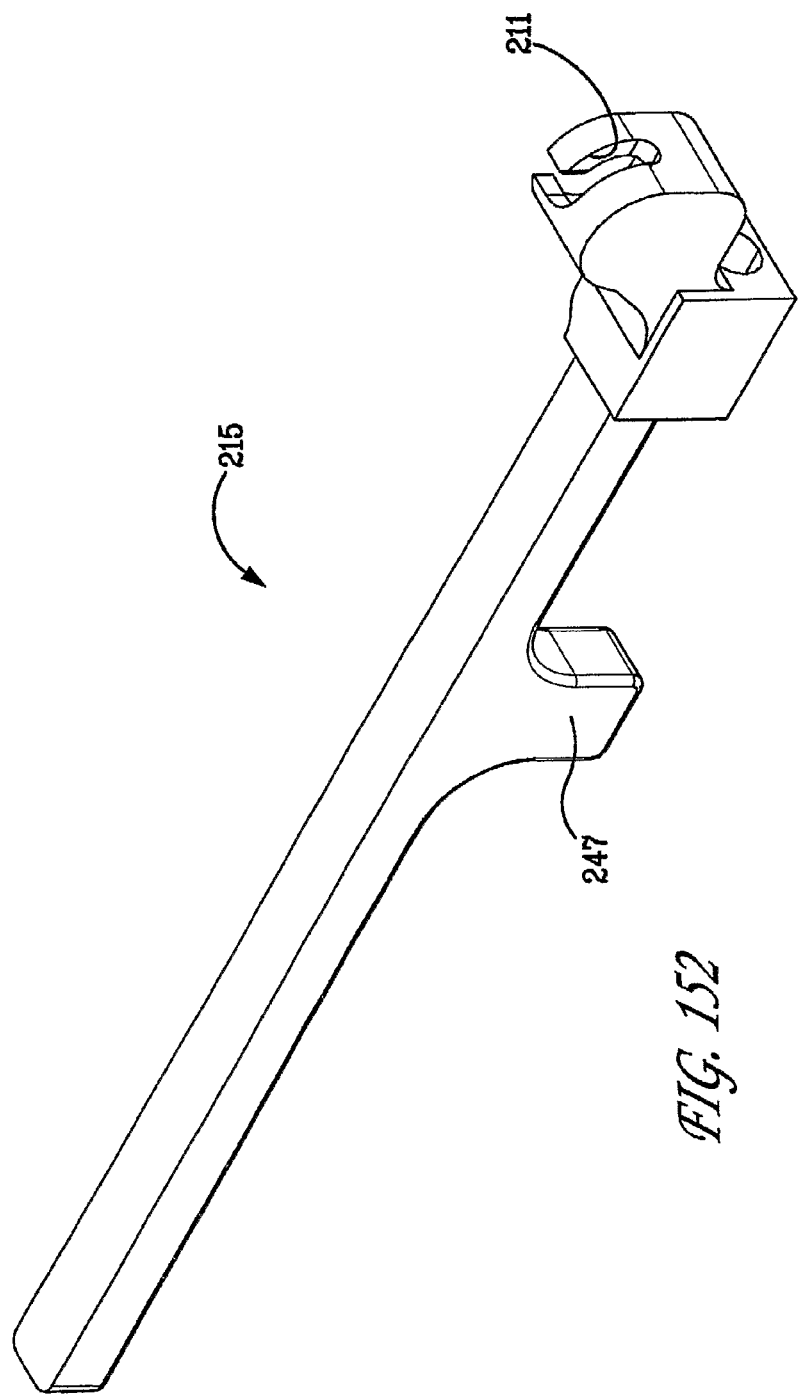
Figure 153:
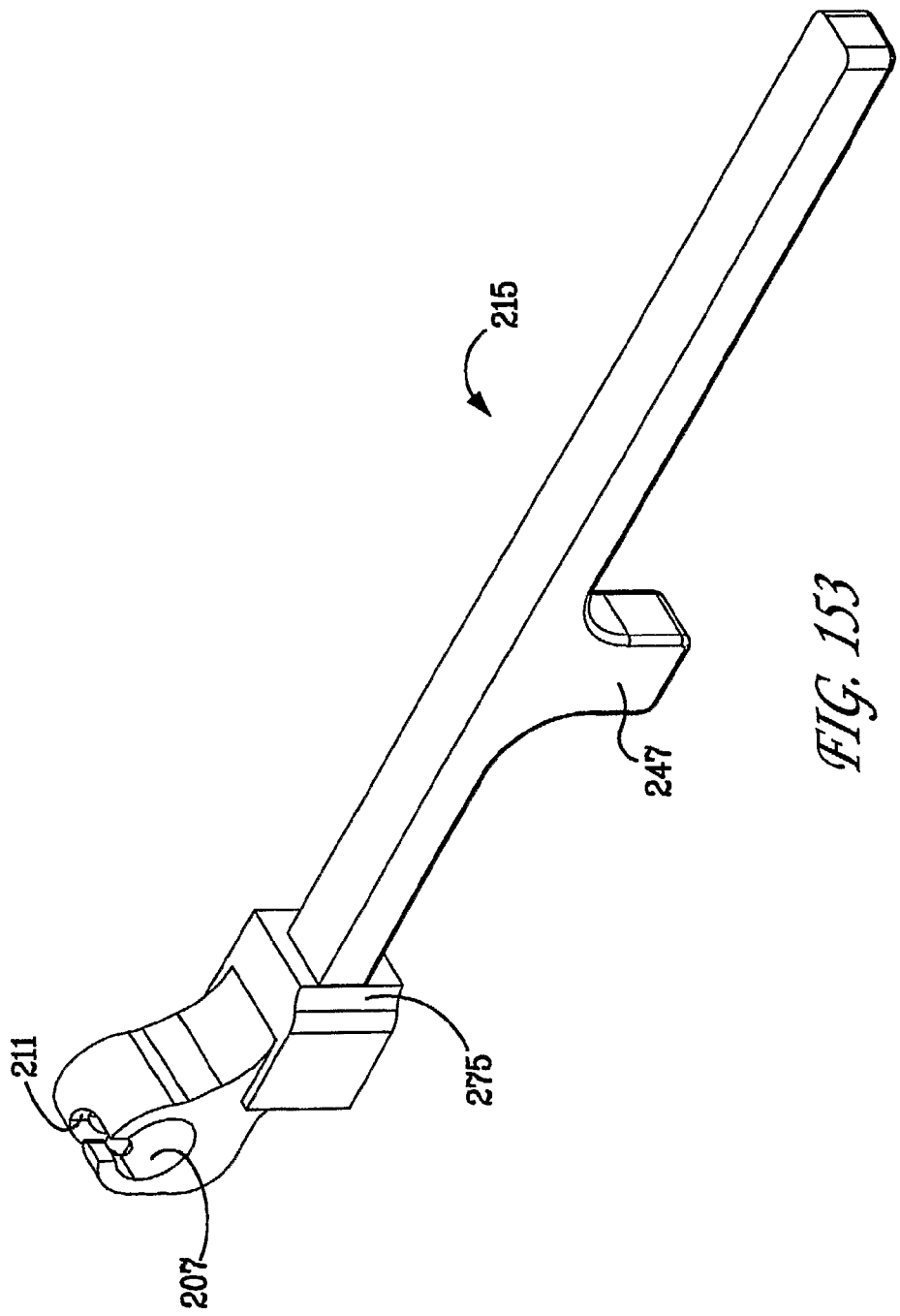
Figure 154:
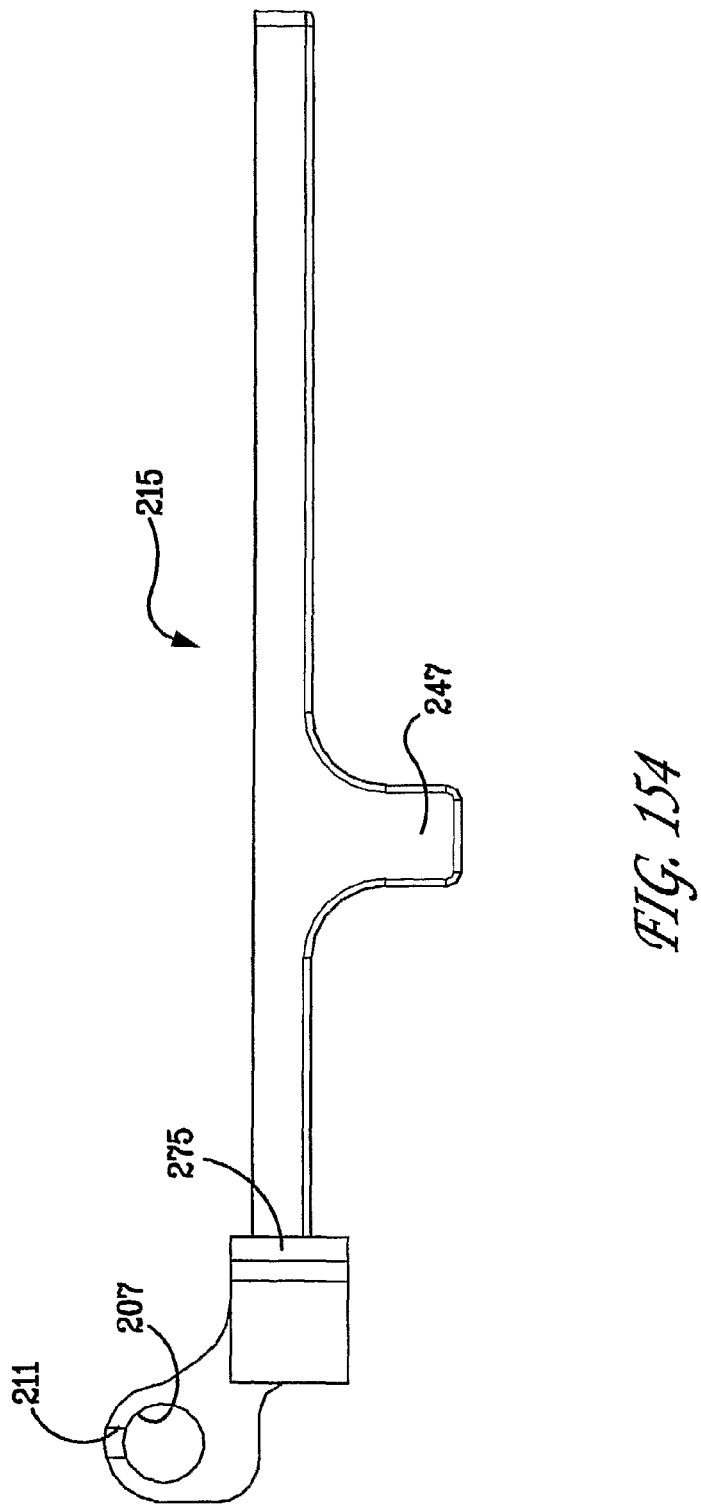
Figure 159:
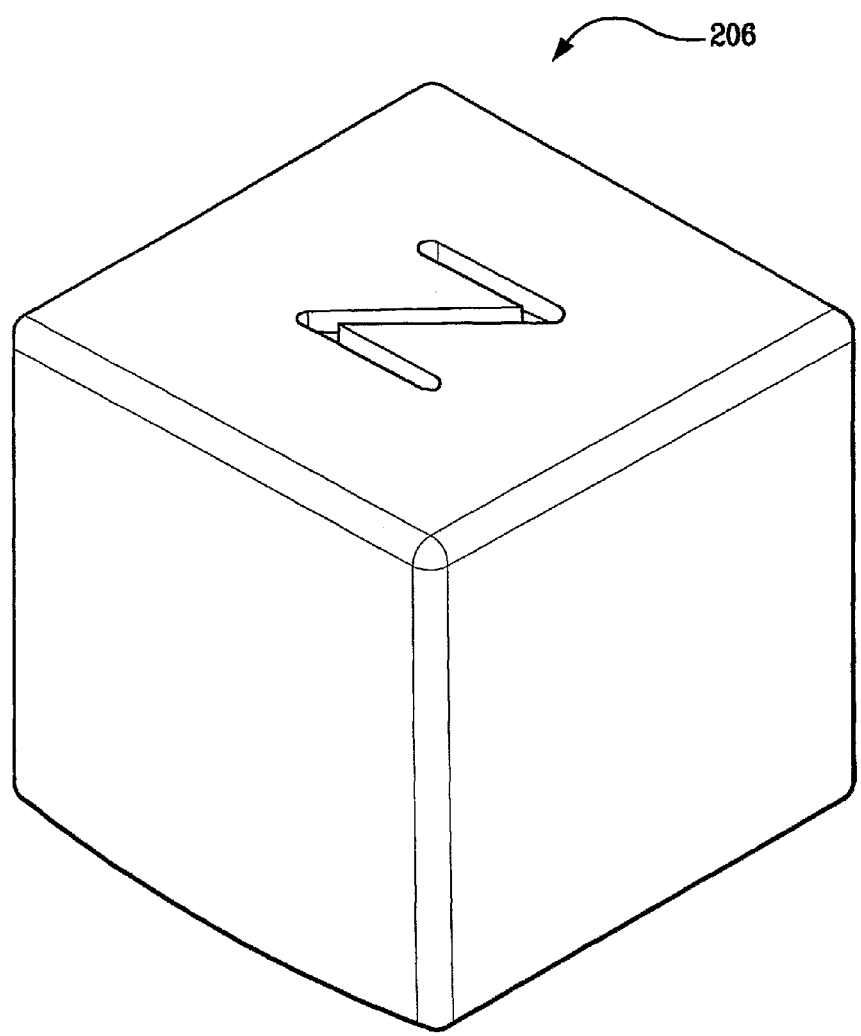
FIGS. 159-160 are views of the rotary magnets of the magnetic latch mechanism of FIGS. 119-122 shown in isolation.
Figure 160:
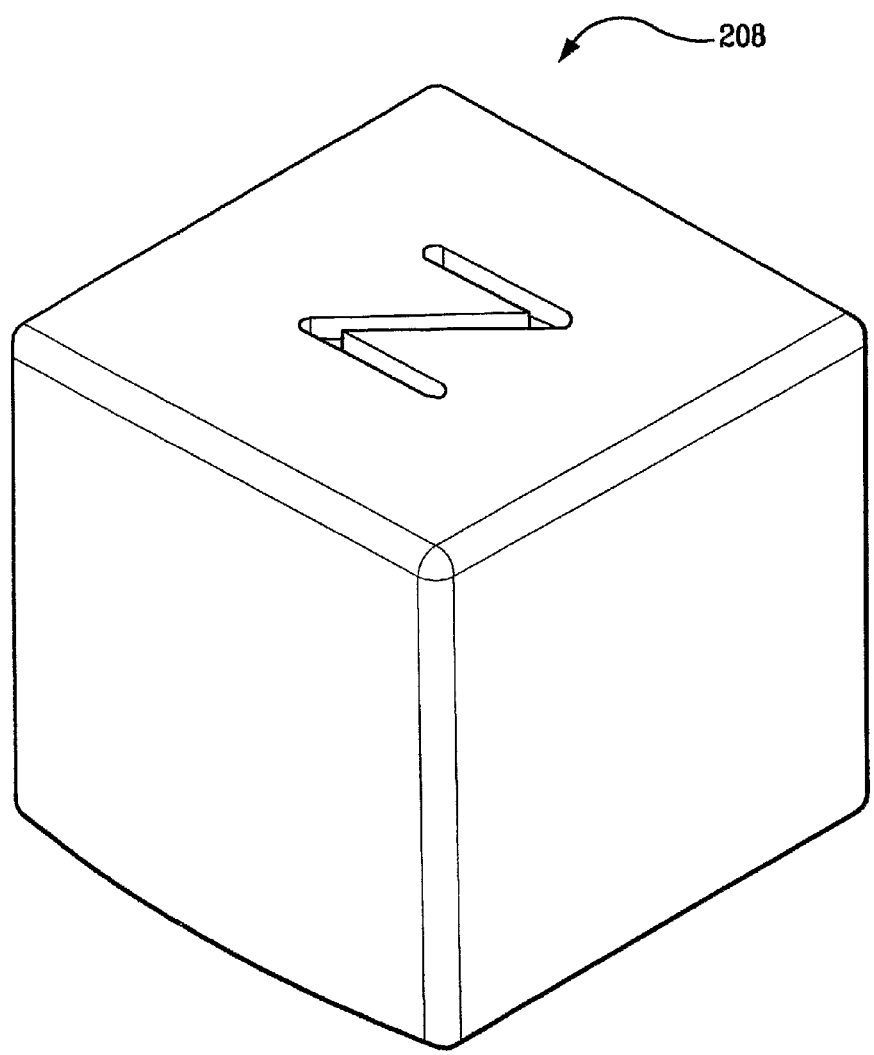

The latch mechanism 200 includes a rack bar 217 that has one set of gear teeth 213 distributed along its length. The set of gear teeth 213 includes a plurality of gear teeth. The gear teeth 213 are in constant mesh with the gear teeth 287, 289 such that the magnet carriers 218, 219 are linked by the rack bar 217. The rack bar 217 is supported for rectilinear motion back and forth in the direction of its longitudinal axis between a latched position, illustrated in FIGS. 130, 153, 156, and 160, and an unlatched position, illustrated in FIGS. 132, 149, and 162. The rack bar 217 causes the magnet carriers 218, 219 to move in unison such that they and the rotary magnets 206, 208 can be moved from the latched position to the unlatched position by a common actuation mechanism in order to provide for the simultaneous opening of the dual doors 202, 204. The rack bar 217 supports a sliding bar 215 for limited rectilinear movement relative to the rack bar 217. A portion of the sliding bar 215 is at least partially surrounded by the rack bar 217 such that the gear teeth 213 are positioned intermediate the sliding bar 215 and the gear teeth 287, 289. Another portion of the sliding bar 215 projects outward from a slot in the rack bar 217 and has a receptacle 207 adapted for receiving the spherical enlargement 209 at the end of a Bowden cable 220 for actuating the latch mechanism 200. The sliding bar 215 is movable rectilinearly between a locked position and an unlocked position relative to the rack bar 217. A spring 270 is provided intermediate the sliding bar 215 and the rack bar 217 that biases the sliding bar 215 toward the locked position. When the sliding bar 215 is in the locked position it pushes one or more ball bearings 272 outward from openings 274 on either side of the rack bar 217 such that the ball bearings 272 project outward from either side of the rack bar 217. When the sliding bar 215 is in the locked position and the rack bar 217 is in the latched position, the ball bearings 272 engage recesses 273 in the housing 232 such that the rack bar 217 cannot move unless the sliding bar 215 is moved to the unlocked position. The rate of the spring 270 is selected such that the sliding bar 215 cannot move due to its own inertia under the forces expected during collisions. Thus, the engagement of the ball bearings 272 with the recesses 273 essentially prevents the latch 200 from unlatching during a collision and makes the latch 200 resistant to unlatching due to collisions. In the illustrated embodiment only a single ball bearing 272, a single openings 274, and a single recess 273 are provided.

The sliding bar 215 has one or more recesses 275 that register with the openings 274 when the sliding bar 215 is in the unlocked position. The recesses 275 allow the ball bearings 272 to retract into the rack bar 217 once the sliding bar 215 is in the unlocked position, which in turn frees the rack bar 217 for movement to the unlatched position. In the illustrated embodiment only a single recess 275 is provided.

The receptacle 207 is in the form of a cylindrical barrel or sleeve that is open at least at one end. An L-shaped slot 211 cuts through the wall of the barrel-shaped receptacle 207. The L-shaped slot 211 extends along the length of the receptacle 207 from the open end of the receptacle 207 to about the middle of the receptacle 207. From that position the L-shaped slot 211 extends along an arc perpendicular to the longitudinal direction of the barrel of the receptacle 207, thus forming an 'L' shape. The slot 211 is wide enough to allow the Bowden cable 220 to extend through the slot 211. The spherical enlargement 209 may have any other shape and size such that it will not fit through the slot 211 but that it will fit into the receptacle 207.

The housing 232 has a bracket 203 with a U-shaped slot 210 that can support one end of the sheath 223 of the Bowden cable 220. The Bowden cable 220 allows the remote operation of the latch mechanism 200. With the one end of the sheath 223 of the Bowden cable 220 installed in the U-shaped slot 210 of the bracket 203 and with the dowel 209 positioned in the receptacle 207, pulling the remote end (not illustrated) of the Bowden cable 220 will cause the rectilinear movement of the sliding bar 215 from the locked position to the unlocked position. This initial movement of the sliding bar 215 frees the rack bar 217 for movement to the unlatched position. The range of motion of the sliding bar 215 from the locked position to the unlocked position is relatively limited, and further pulling the remote end (not illustrated) of the Bowden cable 220 will cause the rectilinear movement of both the sliding bar 215 and the rack bar 217 together such that the rack bar 217 is moved from the latched position to the unlatched position. Consequently, the rotary magnets 206, 208, magnet carriers 218, 219, and hook-shaped pawls 234, 236 are caused to rotate from their latched positions, assuming them to initially be in the latched position, to their unlatched positions.

The remote end of the Bowden cable 220 can be pulled manually or by using an electrical actuator. Generally some type of remotely located handle or push button would be provided as a user interface for the manual or electrical operation of the latch mechanism 200, respectively.

The latch mechanism 200 is mounted to the frame or compartment 294 by mounting the housing 232 to the frame or compartment 294. The rotary magnets 206 and 208 need not be exposed or visible when viewed from the position of the magnetic inserts 214, 216. However, slots 296 and 298 or the like must be provided in the doorframe 294 allow the hook-shaped pawls 234, 236 to extend through the doorframe 294 to engage the strikers 224, 226 as they rotate to their latched positions. The means for attaching the housing 232 to the doorframe 294 is not critical to the present invention and any suitable fastening means including screws, rivets, pins, nails and adhesives may be used. Furthermore, the housing 232 may be of unitary construction with the doorframe 294.

The magnets 206, 208 pull the doors 202, 204 in to ensure they both latch correctly. The magnets 206, 208 control the final movement and position and the gap conditions of the doors 202, 204 in the closed position. The magnets 206, 208 also aid the opening of the doors 202, 204 when the mechanism is unlatched.

Figure 124:
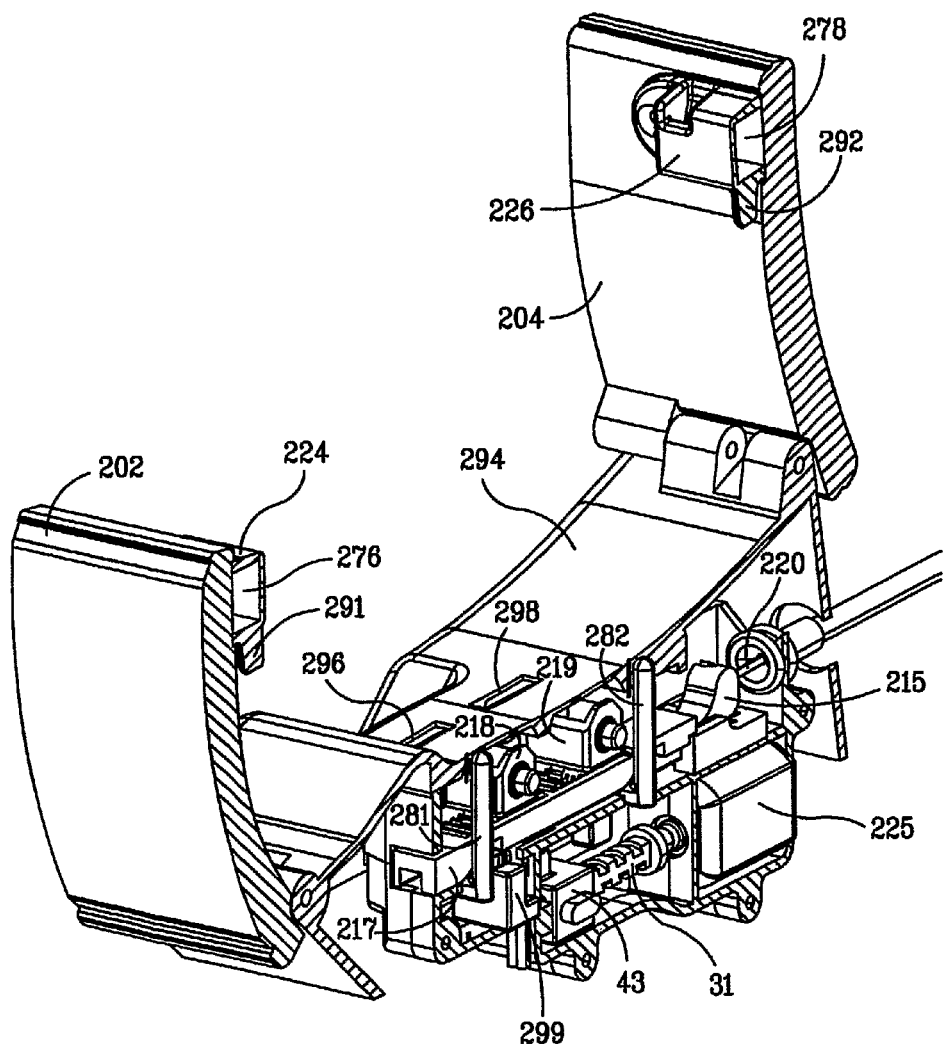
FIGS. 124 and 125 are environmental views showing the magnetic latch mechanism of FIGS. 119-122 being used with an automotive glove box. The glove box doors are shown in the open position and the magnetic latch mechanism is in the open but un-actuated configuration. Only a portion of the glove box doors sufficient to illustrate the operation of the magnetic latch mechanism are shown.
Figure 125:
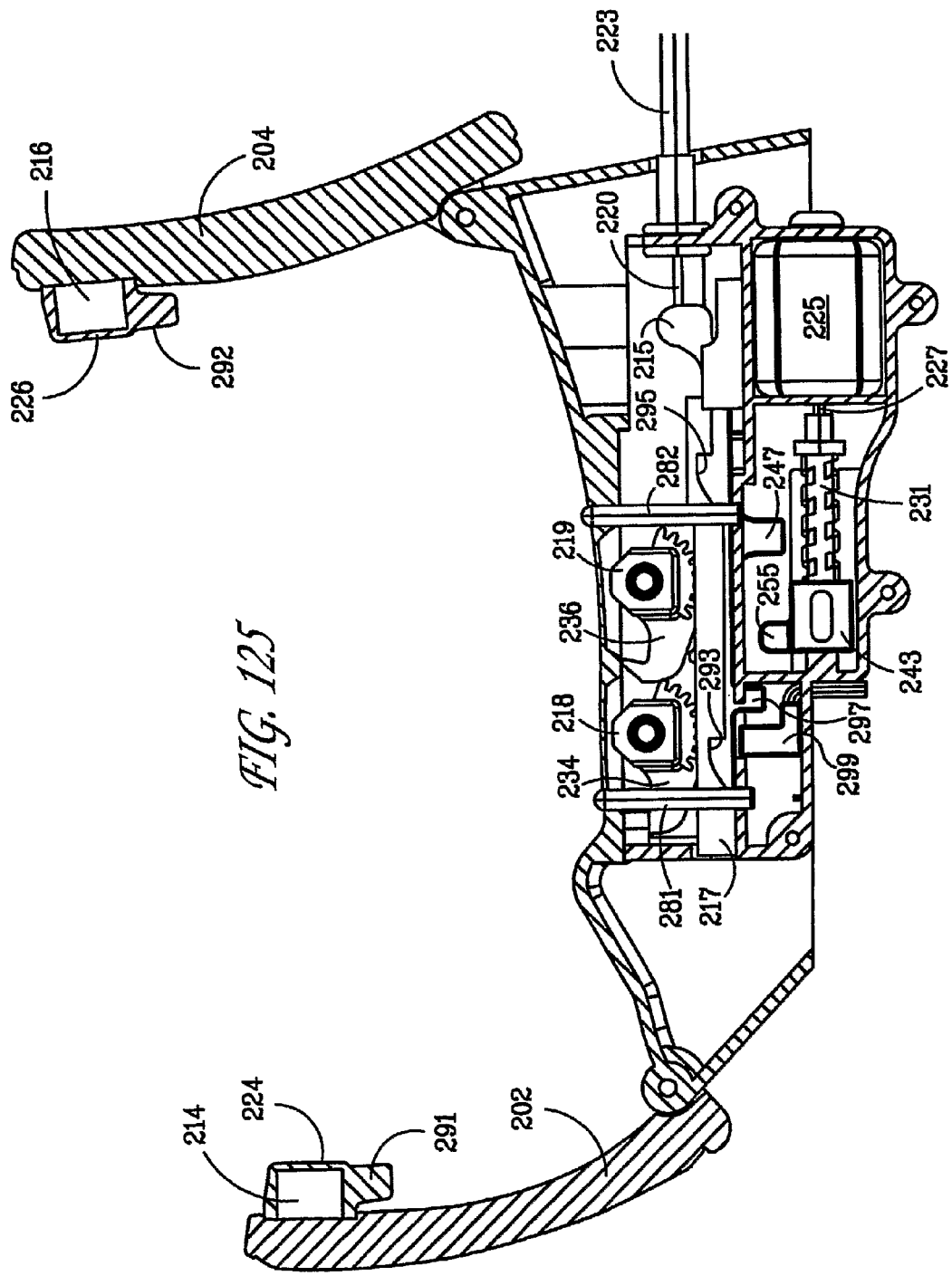
Figure 126:
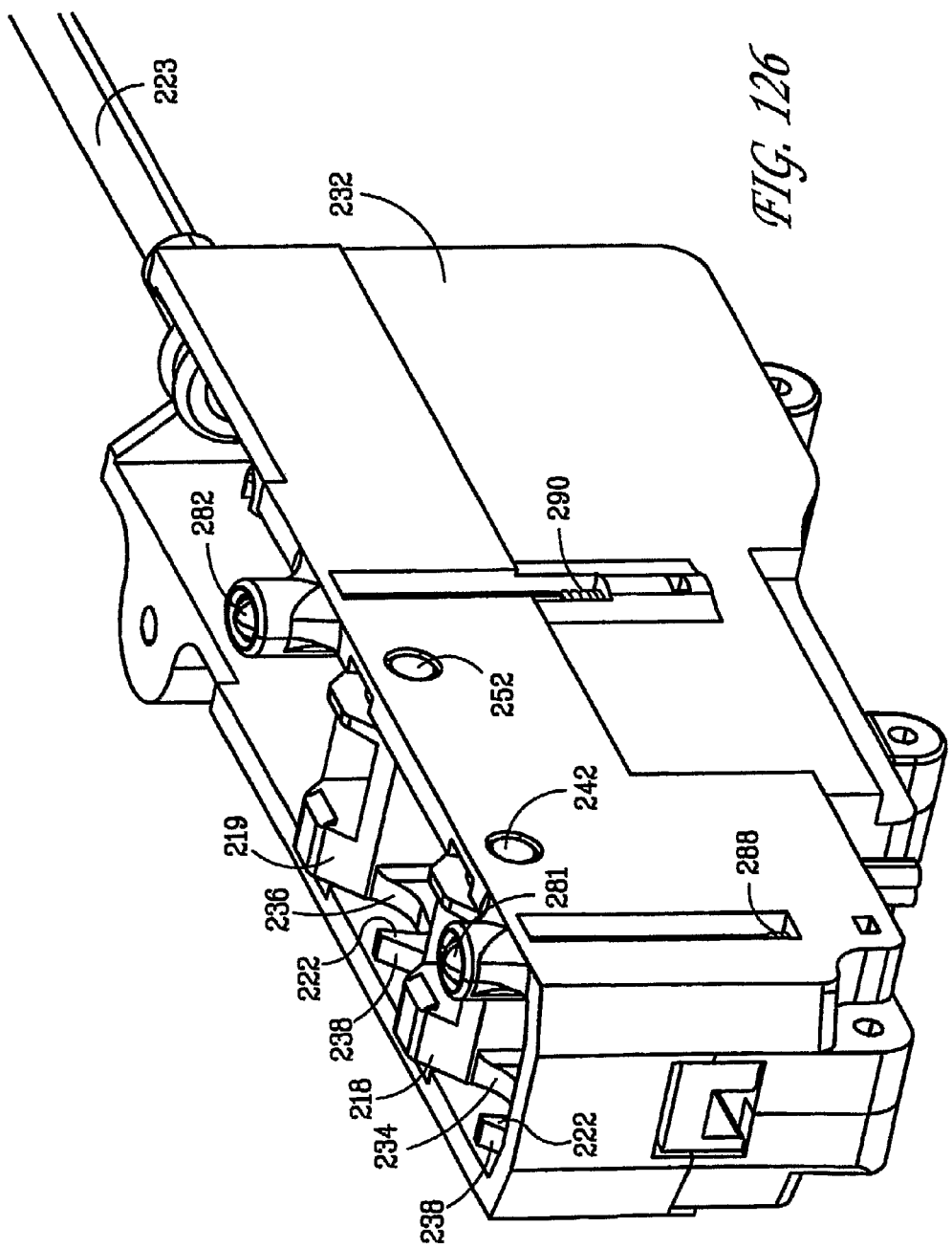
FIG. 126 is a perspective view showing the magnetic latch mechanism of FIGS. 119-122 in the open but un-actuated configuration.
Figure 127:
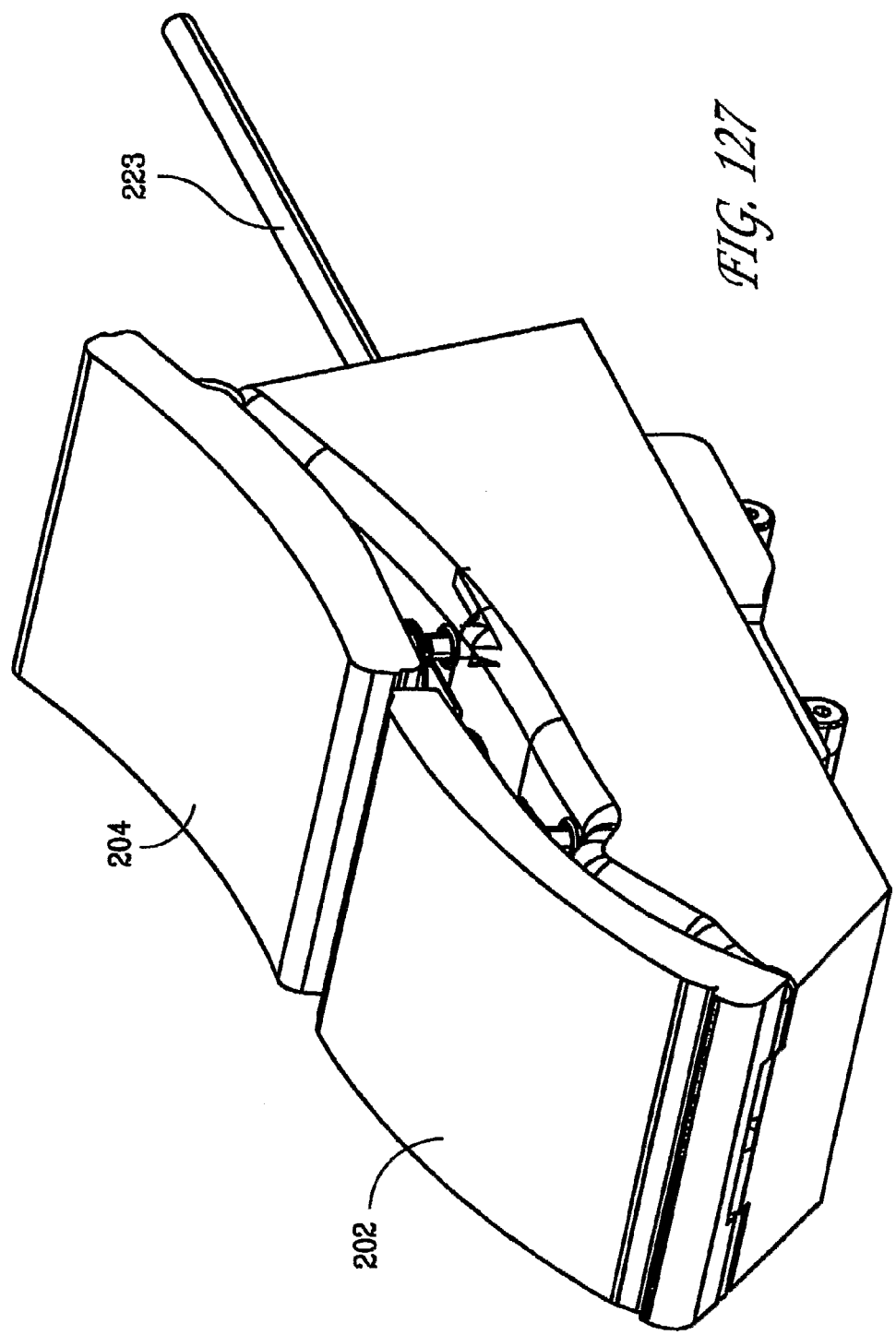
FIGS. 127-131 are environmental views showing the magnetic latch mechanism of FIGS. 119-122 being used with an automotive glove box. The glove box doors are shown in the partially closed position and the magnetic latch mechanism is in the partially closed configuration. Only a portion of the glove box doors sufficient to illustrate the operation of the magnetic latch mechanism are shown.
Figure 128:
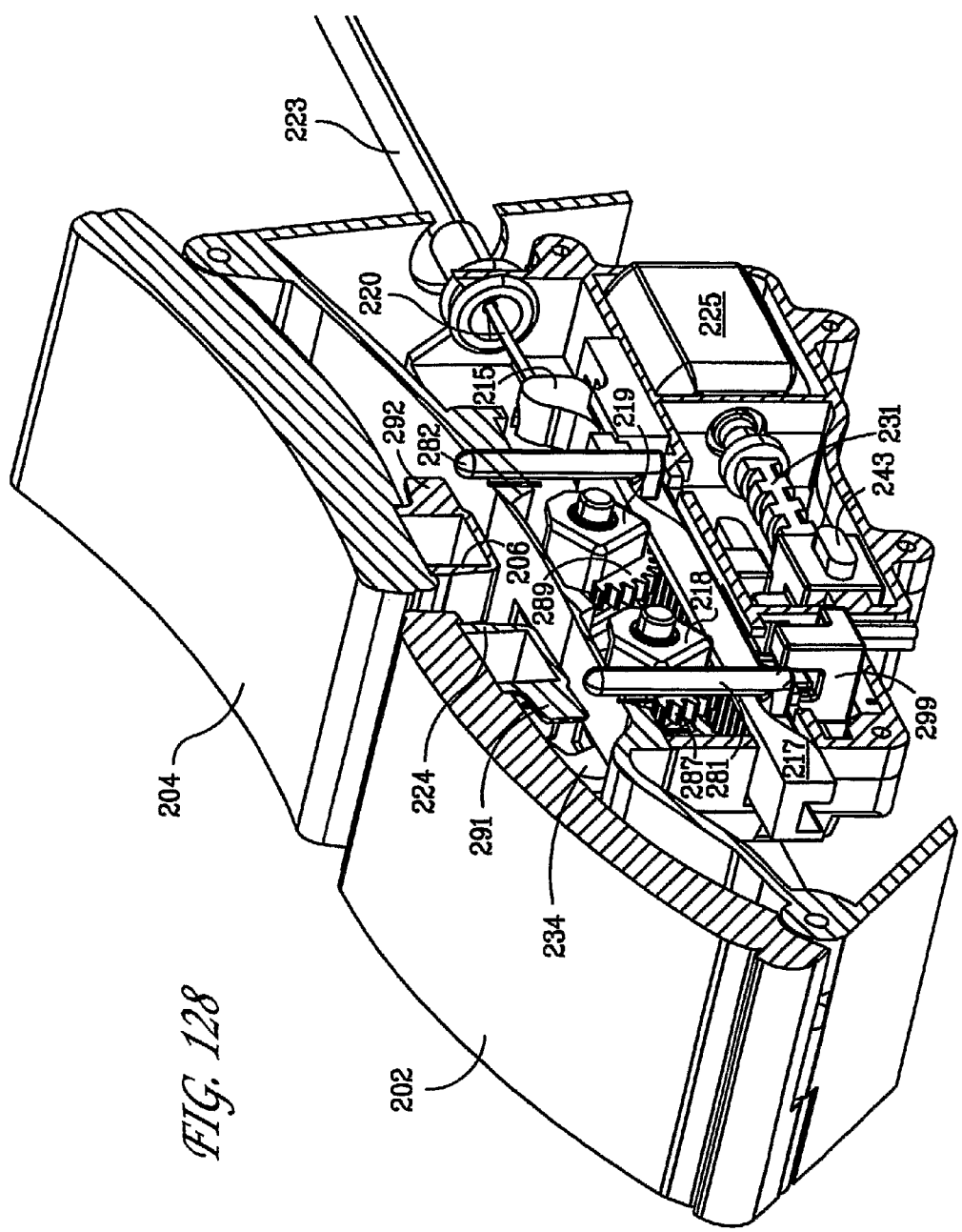
Figure 129:
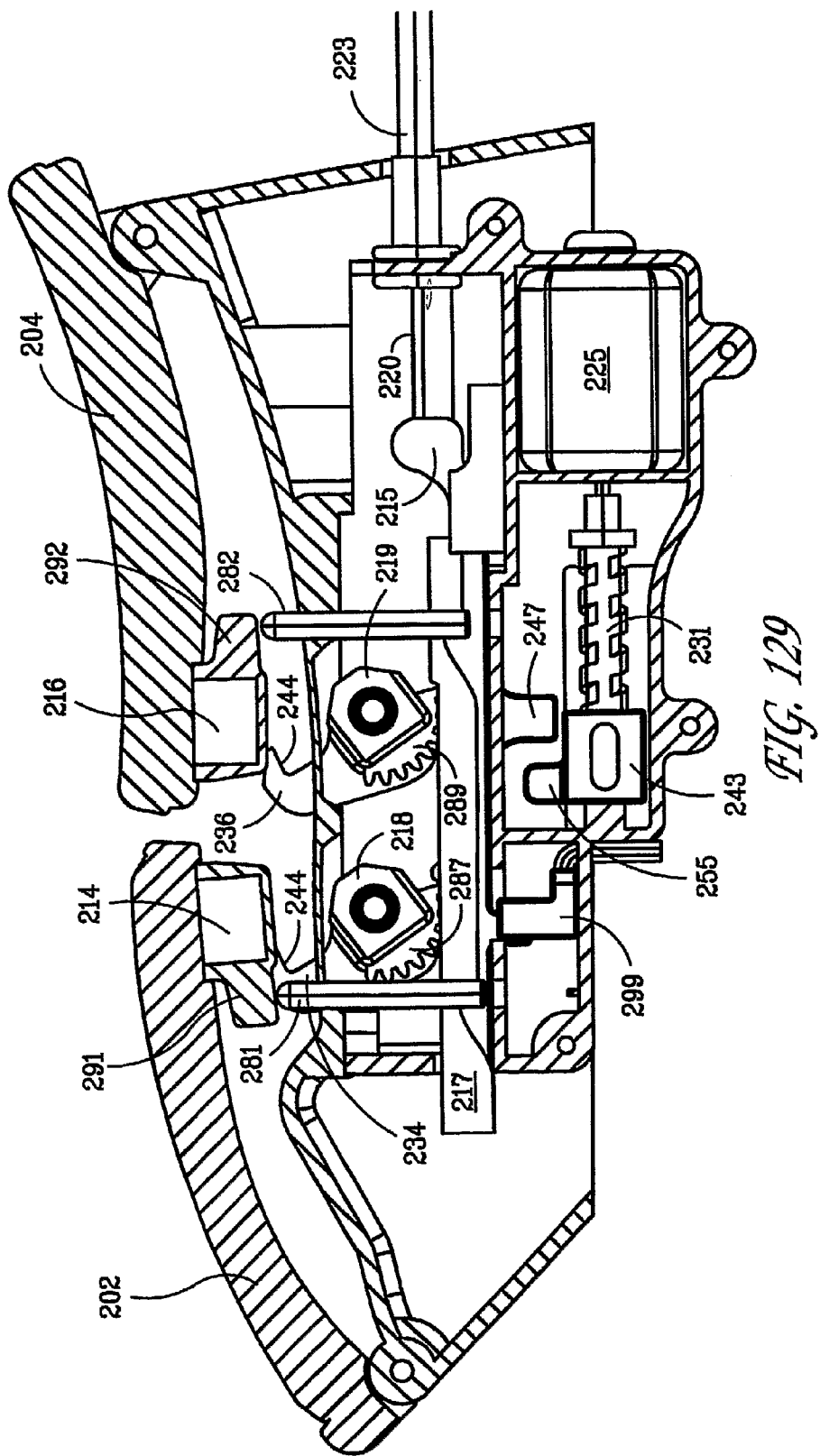

To open the latch mechanism 200 the button (not shown), for example, is pushed. This would cause the remote end of the Bowden cable 220 to be pulled by one of the mechanisms previously mentioned. The pulling of the Bowden cable 220 causes the rotation of the rotary magnets 206, 208, magnet carriers 218, 219, and hook-shaped pawls 234, 236 from their latched positions to their unlatched positions. This action disengages the hook-shaped pawls 234, 236 from their respective strikers 224, 226, which mechanically releases the doors 202 and 204. In addition, the magnets 206, 208 are rotated to their unlatched positions where these magnets repel the magnetic inserts 214, 216 attached to the doors 202, 204, forcing the doors to swing open. Once the magnets 206, 208 are clear of the influence of the magnetic field of the magnetic inserts 214, 216 and the Bowden cable 220 is released, the magnetic attraction of the north pole of one of the magnets 206, 208 for the south pole of the other one of the magnets 206, 208, or vice versa, will maintain the rotary magnets 206, 208, the magnet carriers 218, 219, and the hook-shaped pawls 234, 236 in first intermediate positions (corresponding to the open but un-actuated condition of the magnetic latch mechanism illustrated in FIGS. 124-126) near their unlatched positions ready for latching the doors 202, 204 as the doors 202, 204 move to the closed position. In the illustrated embodiment, the magnetic attraction of the north pole of the rotary magnet 206 for the south pole of the rotary magnet 208 maintains the rotary magnets 206, 208, the magnet carriers 218, 219, and the hook-shaped pawls 234, 236 in their first intermediate positions.

To close the doors 202, 204, one of the doors 202, 204 is pushed closed. This action pulls the other door shut through the mechanical linkage between the doors (not shown), however, one door will sometimes lag behind the other due to the free play of the linkage. Once the doors 202, 204 are almost closed the rotary magnets 206, 208, the magnet carriers 218, 219, and the hook-shaped pawls 234, 236 will begin to rotate toward their latched positions under the influence of the magnetic field of the magnetic inserts 214, 216, such that they will be in a second intermediate position nearer their latched positions. At this point the strong magnetic attraction between the magnetic inserts 214, 216 and their respective rotary magnets 206, 208 causes the lagging door to accelerate such that both doors close simultaneously, and the rotary magnets 206, 208 and the hook-shaped pawls 234, 236 simultaneously rotate to their latched positions. At this point the hook-shaped pawls 234, 236 engage the strikers 224, 226 and there is strong magnetic attraction between the magnetic inserts 214, 216 and their respective rotary magnets 206, 208. Accordingly, both doors are held in the closed position mechanically and magnetically. This condition is illustrated in FIGS. 133-141. Thus, the magnetic latch mechanism 200 provides a latching system that tolerates the free play of the mechanical linkage of the doors 202, 204 and the positional difference between the doors near closing, but still closes the doors flush and simultaneously. In addition, at this time the ball bearing 272 engages the recess 273 in the housing 232 such that the rack bar 217 is locked in place and cannot move unless the sliding bar 215 is moved to the unlocked position.

Figure 130:
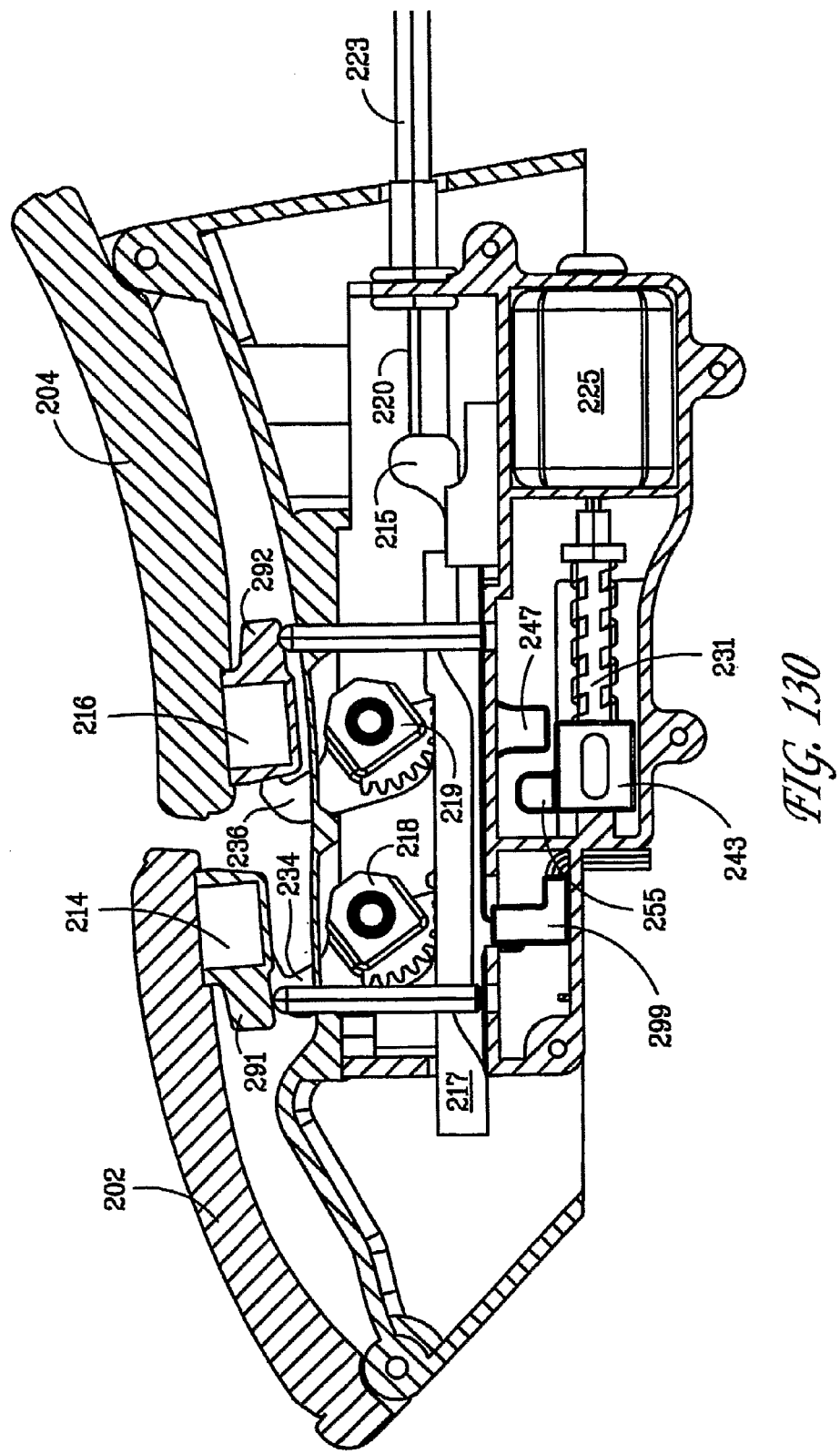
Figure 131:
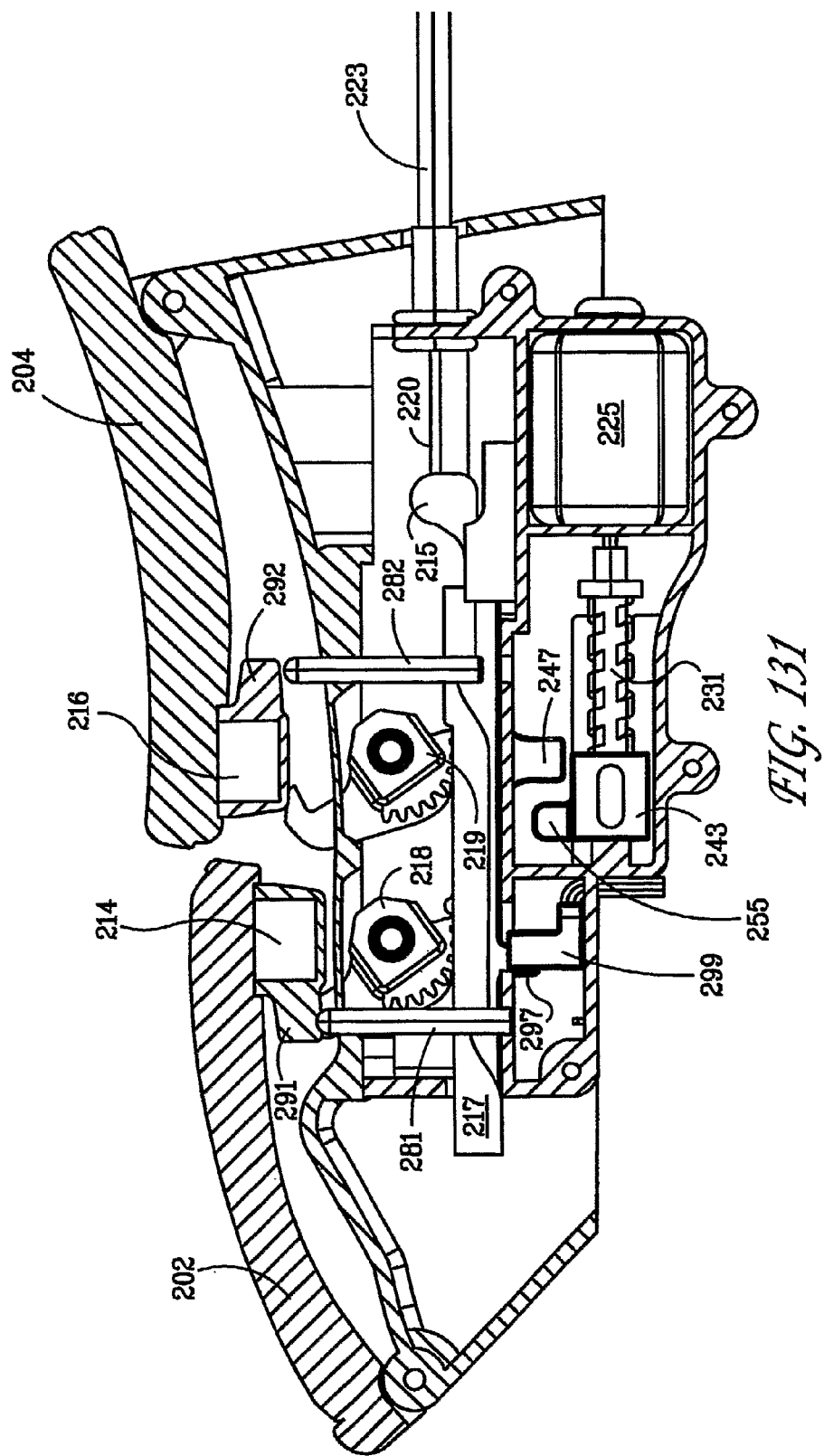

If the lag between the doors 202, 204 is great enough, one door may close completely, causing both rotary magnets 206, 208 and both hook-shaped pawls 234, 236 to move to their respective latched positions, before the lagging door reaches its closed position. This condition is illustrated in FIGS. 130 and 131. In such an event, the ball bearing 272 will lock the rack bar 217 and consequently the hook-shaped pawls 234, 236 in the latched position. The striker of the lagging door will collide with the top of the respective hook-shaped pawl and the lagging door cannot move to the fully closed position. To prevent this outcome the control pins 281 and 282 are provided. Each of the control pins 281 and 282 is in the form of an elongated shaft 283 having a projecting lug 285 at one end thereof. The control pins 281 and 282 are supported by the housing 232 for rectilinear movement in the direction of the longitudinal axes of the shafts 283 between extended and retracted positions. The control pins 281 and 282 are spring biased toward the extended position by springs 288 and 290, respectively. The strikers 224, 226 are each provided with a portion or pad 291 and 292, respectively, that engage and move the respective control pin 281, 282 to the retracted position when the corresponding door 202, 204 is moved to the fully closed position.

With the control pins 281, 282 in the retracted position, the rack bar 217 is free to move between the latched and unlatched positions. The rack bar 217 is provided with notches 293 and 295 each of which registers with the lug 285 of a respective control pin 281, 282 when the rack bar 217 is in a second intermediate position corresponding to the partially closed configuration of the magnetic latch mechanism and the nearly latched position of the hook-shaped pawls 234, 236 shown in FIGS. 128-132. Each of the notches 293, 295 has a side that is perpendicular to the direction of the rectilinear motion of the rack bar 217 and a side that is gently sloping relative to the direction of the rectilinear motion of the rack bar 217. When either control pin 281, 282 is in the extended position its respective lug 285 is positioned in the respective notch 293, 295 such that it is seated in the deepest part of the notch and prevents movement of the rack bar 217 from the second intermediate position, which is near the latched position, to the latched position by engagement of the lug 285 with the side of the notch that is perpendicular to the direction of rectilinear motion of the rack bar 217. The gently sloping side of each notch 293, 295 can act as a cam and move the corresponding control pin 281, 282 to the retracted position. Accordingly, the control pins 281, 282 cannot prevent the movement of the rack bar 217 to the unlatched position. Therefore, when either one or both of the doors 202, 204 is out of the fully closed position its respective control pin will prevent movement of the rack bar 217 to the latched position where it can be locked in place by the engagement of the ball bearing 272 with the recess 273, and the situation wherein the striker of the lagging door 202, 204 collides with the corresponding hook-shaped pawl 234, 236 with the rack bar 217 locked in the latched position will be avoided.

In the nearly latched or the second intermediate position the hook-shaped pawls 234, 236 can be pushed out of the way of the strikers 224, 226 as previously described and allow the lagging door to move to the closed position whereupon the control pins 281, 282 will both be in the retracted position and both hook-shaped pawls and rotary magnets can move to their latched positions to secure both doors in the closed position. The leading door will remain closed due to magnetic attraction until the lagging door is fully closed. It should be evident from the relative proportions of the hook-shaped pawls and their respective strikers, that the movement, if any, of the rotary magnets during the closing of the lagging door will be slight enough such that a strong enough attraction exists at all times during the closing of the lagging door between the striker of the lagging door and the respective rotary magnet to accomplish the closing of the lagging door as just described.

The magnetic latch mechanism 200 may also include a motor drive 221 for selectively moving the rack bar 217 in the direction of its longitudinal axis between the latched position and the unlatched position. Thus the motor drive 221 serves the same function as the Bowden cable 220 and is provided as an adjunct system to the Bowden cable 220 for use in applications where, for example, the motor drive 221 is provided to allow the magnetic latch mechanism 200 to be electrically actuated while the Bowden cable provides a manual override. It is also possible for the Bowden cable 220 to be electrically actuated for applications where a redundant electrical actuation system is desirable.

The motor drive 221 includes a motor 225 that has an output shaft 227 that is coupled to the drive screw 231. The drive screw 231 is rotationally supported by the housing 232. The drive screw 231 has at least one male helical thread that is in engagement with a matching female groove or thread in a bore formed in the slider 243. The male helical thread of the drive screw 231 may be continuous or interrupted as in the illustrated embodiment. The slider 243 is supported for rectilinear motion by the housing 232 in response to the rotation of the drive screw 231. The slider 243 has a projection 255 that can engage the projection 247 of the sliding bar 215.

With the rack bar 217 in the latched position and the sliding bar 215 in the locked position the projection 247 of the sliding bar 215 will be positioned near the projection 255 with the slider 243 located distally from the motor 225. This is the latched position of the slider 243. When the motor 225 is energized it causes rotation of the drive screw 231. Rotation of the drive screw 231 in this first direction causes rectilinear motion of the slider 243 and brings the projection 255 into engagement with the projection 247. Continued rotation of the drive screw 231 will cause continued rectilinear motion of the slider 243 toward the motor 225, which in turn will cause the rectilinear movement of the sliding bar 215 from the locked position to the unlocked position. This initial movement of the sliding bar 215 frees the rack bar 217 for movement to the unlatched position. The range of motion of the sliding bar 215 from the locked position to the unlocked position is relatively limited, and further rotation of the drive screw 231 will cause continued rectilinear motion of the slider 243 toward the motor 225, which in turn will cause the rectilinear movement of both the sliding bar 215 and the rack bar 217 together such that the rack bar 217 is moved from the latched position to the unlatched position. Consequently, the rotary magnets 206, 208, magnet carriers 218, 219, and hook-shaped pawls 234, 236 are caused to rotate from their latched positions, assuming them to initially be in the latched position, to their unlatched positions. The slider 243 will then be in its unlatched position. Movement of the rack bar 217 and the magnet carriers 218, 219 to their unlatched positions in turn allows opening of the doors 202, 204.

Once the unlatching operation is complete, using appropriate control circuitry and software, the current to the motor 225 is reversed to rotate the drive screw 231 in a second direction that is the reverse of the first direction and return the slider 243 to its latched position ready to repeat the latching cycle again. Returning the slider 243 to its latched position, disengages the projection 255 from the projection 247, and the magnetic attraction of the north pole of one of the magnets 206, 208 for the south pole of the other one of the magnets 206, 208, or vice versa, will maintain the rotary magnets 206, 208, the magnet carriers 218, 219, and the hook-shaped pawls 234, 236 in the first intermediate positions shown in FIGS. 124-126 ready for latching the doors 202, 204 as the doors 202, 204 move to the closed position.

Also as previously described, once the doors 202, 204 are opened, the attraction between the opposite poles of the magnets 206, 208 will maintain the magnet carriers 218, 219 near their unlatched positions until the doors 202, 204 are once again moved toward their closed positions. The latch 200 will thus be ready to repeat its operating cycle the next time the doors 202, 204 are moved toward their closed positions.

A fin 297 is provided that projects from the underside of the rack bar 217. In addition, a sensor 299 is provided in the housing 232. The sensor 299 may, for example, be of a type having a light emitting diode (LED) illuminating a photo-diode. When the rack bar 217 is in the second intermediate position, i.e. the position nearer the latched position where its movement toward the latched position may be prevented by one of the control pins 281, 282 being in the extended position, the fin 297 interrupts the illumination of the photo-diode of the sensor 299 by the LED (not shown) such that a signal indicative of one of the control pins being in the extended position would be generated. This signal would in turn correspond to one of the doors 202, 204 not being properly closed, for example, due to the contents of the glove box obstructing the movement of one of the doors to the closed position. The signal is supplied to the control circuit or printed circuit board (PCB) (not shown) controlling the operation of the magnetic latch mechanism. The control circuit can be programmed such that if the signal indicating that one of the doors 202, 204 is ajar persists for a time period that equals or exceeds a predetermined time limit, then the control circuit energizes the motor 225 to open the doors 202, 204, thus prompting the user, i.e. the occupant of the vehicle, to close the doors again and ensure that this time the doors are closed properly.

Figure 175:
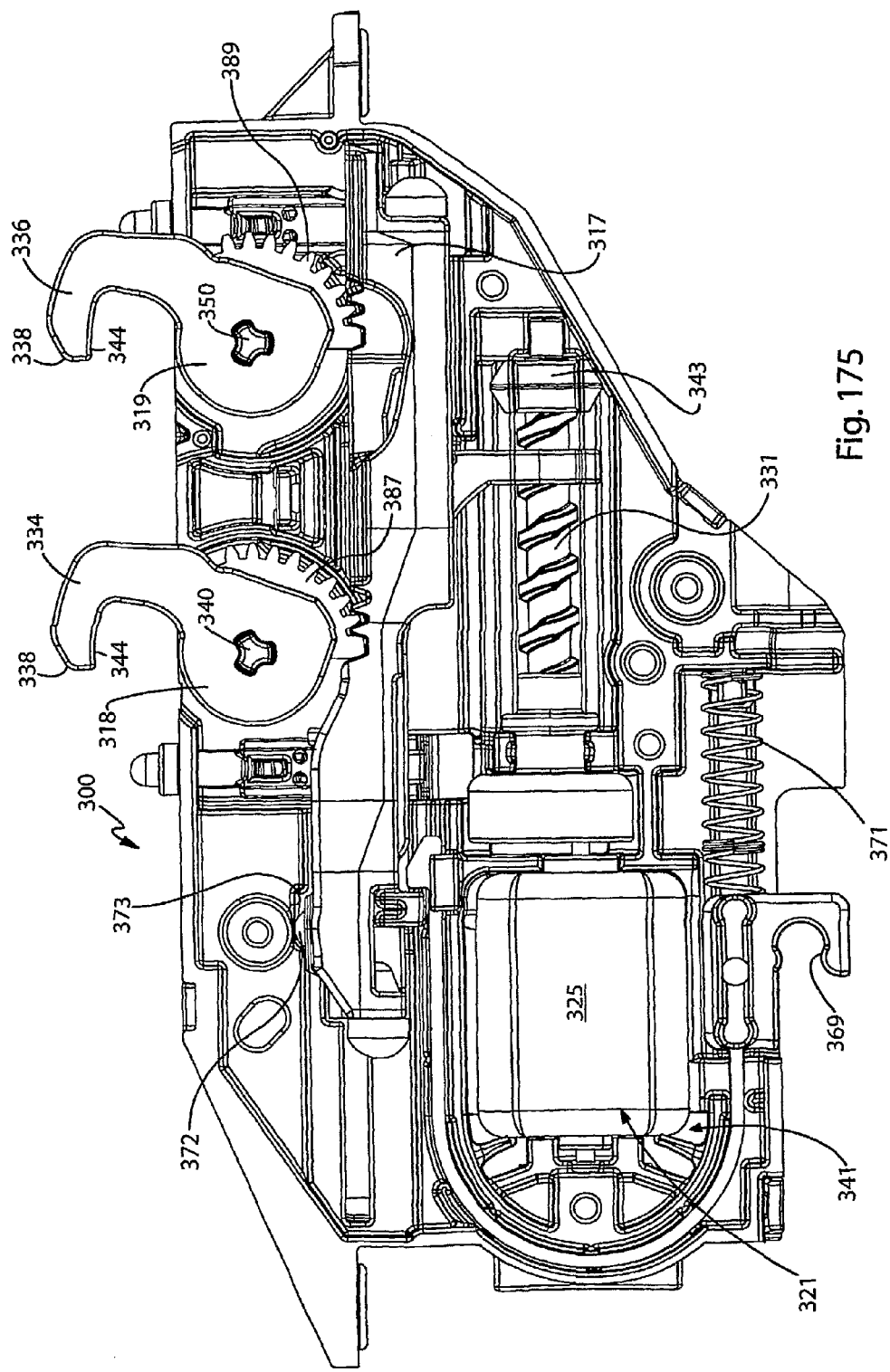
FIGS. 175-297 are views showing yet another magnetic latch mechanism according to the present invention.
Figure 176:
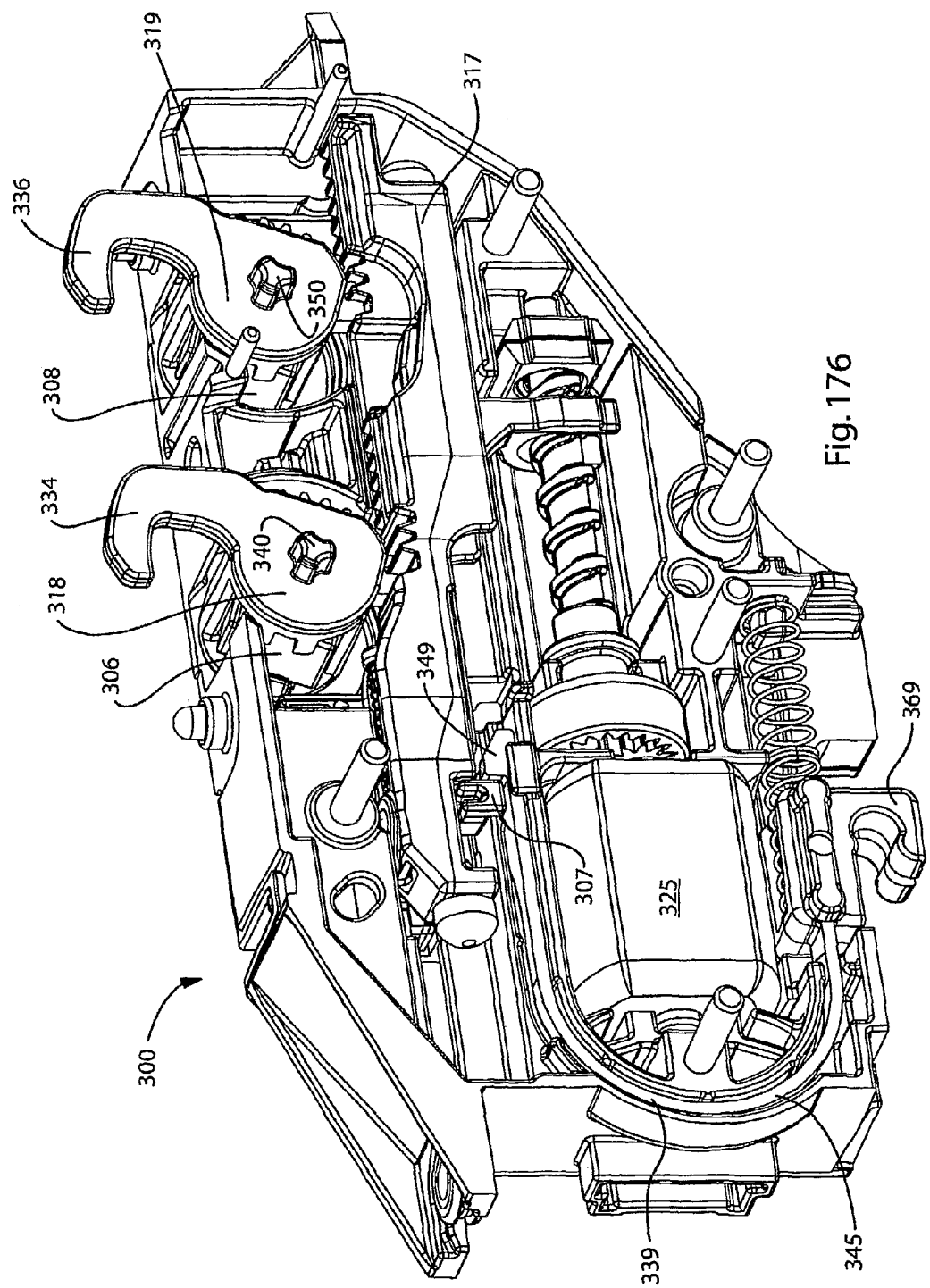
Figure 297:
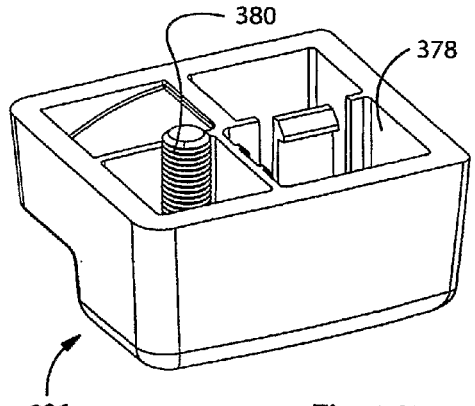

Referring to FIGS. 175-297, the present invention is directed to a magnetic latch mechanism for securing a first member in a closed position relative to a second member, the first member being movable between the closed position and an open position relative to the second member. The first member may, for example, be a door and the second member may, for example, be a compartment or a doorframe. In the illustrated example, the one or more doors-provide closures for the compartment. The latch according to the present invention is particularly well suited for use in applications where dual doors that are mechanically linked are to be secured in the closed position. In such applications closing one of the doors also moves the other door to the closed position. However, the mechanical linkage between the doors is not perfect and the closing of the doors is not always simultaneous. Often one door will slightly lag behind the other door in closing. With the magnetic latch of the present invention, once the door is within the region of the influence of the magnetic field of the latch magnet, the door will be pulled to the final closed position by magnetic attraction. Therefore, movement of each door to the final closed position in a dual door application will be properly effected regardless of significant variations in relative positions of the doors as the doors approach their closed positions. Accordingly, the latch of the present invention is designed to effect proper securing of the doors in the closed position even when one door lags behind the other.

Referring to FIGS. 175-297, an embodiment 300 of the magnetic latch mechanism with dual rotary magnets according to the present invention can be seen. The latch mechanism 300 is a remotely operated latch mechanism designed to secure two doors 302 and 304 in the closed position substantially simultaneously, using two rotating magnets 306 and 308. The latch mechanism 300 is designed to be installed between the pivots or hinges of the doors 302, 304 with the rotary magnets 306, 308 supported for rotation about parallel and spaced-apart axes of rotation. Also, the rotary magnets 306, 308 rotate in the same direction. Each of the rotary magnets 306 and 308 are supported by a separate magnet carrier 318, 319, respectively. Each magnet carrier 318, 319 is rotationally supported by the housing 332. Each of the rotary magnets 306, 308 are attached to the respective magnet carrier 318, 319 such that the rotary magnet and its respective magnet carrier rotate as one unit. Each of the rotary magnets 306, 308, and their respective magnet carriers 318, 319, are rotationally movable between respective latched and unlatched positions.

The magnetic latch mechanism 300 also includes a pair of hook-shaped pawls 334, 336. Each hook-shaped pawl 334, 336 is supported by a respective magnet carrier 318, 319 such that the hook-shaped pawl 334, 336 and the respective magnet carrier 318, 319 rotate as a unit. Each hook-shaped pawl 334, 336 has a hooked head 322 with a cam surface 338 that faces away from the respective magnet carrier 318, 319 and a catch surface 344 that faces toward the respective magnet carrier 318, 319.

The magnetic latch mechanism 300 also includes magnetic inserts 314 and 316 that can be attached to the doors 302 and 304, respectively. Each of the magnetic inserts 314 and 316 corresponds to a respective one of the rotary magnets 306, 308. When the rotary magnets 306, 308 are in their latched positions and the doors 302 and 304 are in their closed positions, the pole of each of each of the rotary magnets 306, 308 facing the respective magnetic insert 314, 316 is of an opposite type (i.e. north, south) as compared to the pole of the magnetic insert 314, 316 facing its respective rotary magnet 306, 308. For example, the magnetic inserts 314, 316 may be positioned such that their south poles face their respective rotary magnet 306, 308 when the doors 302 and 304 are in their closed positions. In this case, the rotary magnets 306, 308 would be positioned in their carriers 318, 319 such that their north poles substantially face their respective magnetic inserts 314, 316 when the rotary magnets 306, 308 and their carriers are in their latched positions and the doors 302 and 304 are in their closed positions. Accordingly, an attractive force is exerted between each rotary magnet 306, 308 and its respective magnetic insert 314, 316 with the result that the doors 302, 304 to which the magnetic inserts 314, 316 are attached are held in the closed position.

Furthermore, the hook-shaped pawls 334, 336 engage respective strikers 324, 326 to mechanically block the movement of the doors 302, 304 from the closed position to the open position. This feature prevents the doors 302, 304 from being forcibly pried open from the exterior of the compartment being secured by the doors 302, 304.

Figure 280:
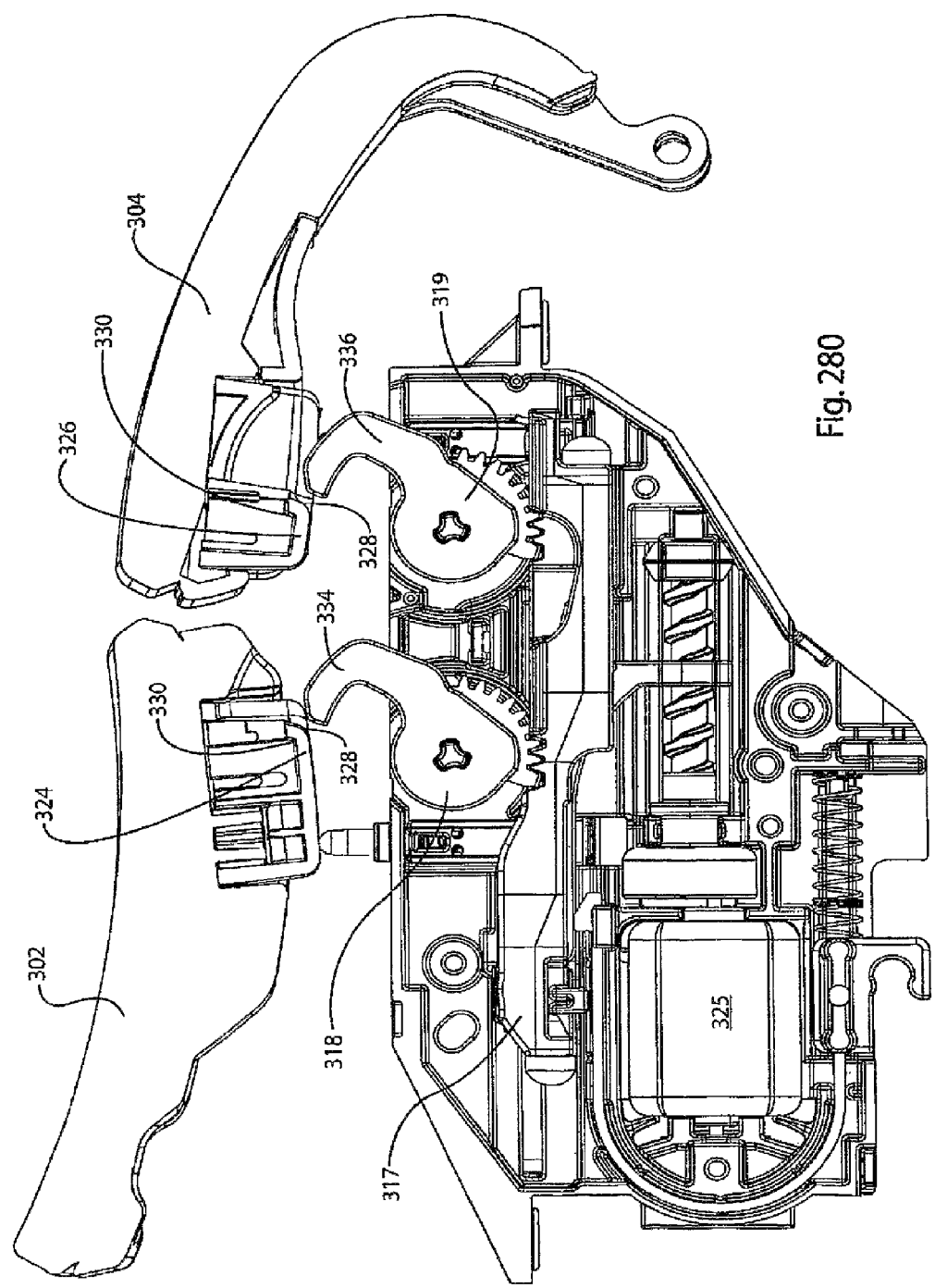
Figure 281:
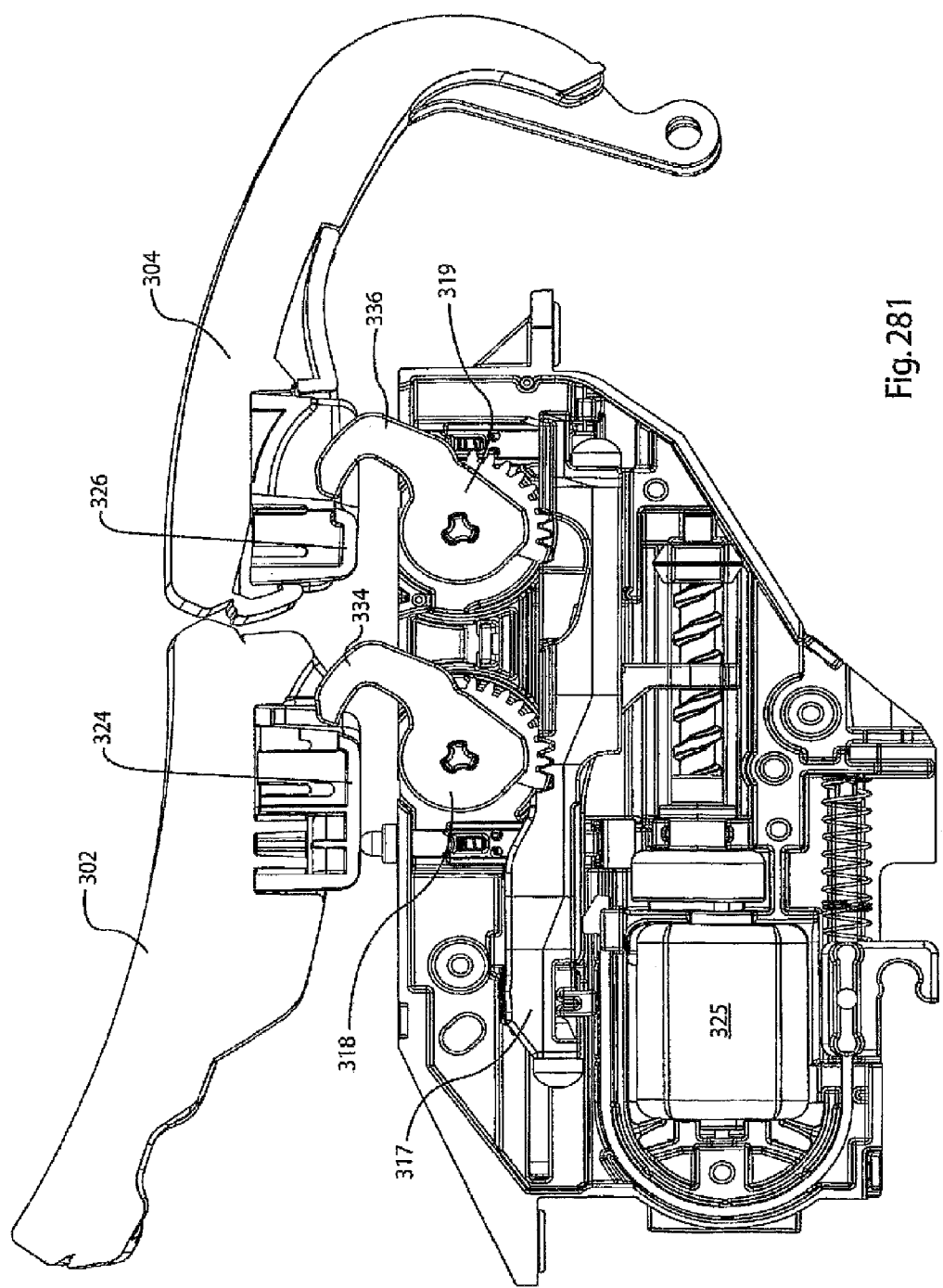

The magnetic latch mechanism 300 includes the pair of strikers 324, 326 each of which corresponds to a respective one of the pair of hook-shaped pawls 334, 336. Each striker 324, 326 is supported by a respective door 302, 304 such that the striker is spaced apart from the respective door's interior surface and the head 322 of the hook-shaped pawl 334, 336 can fit between the respective striker 324, 326 and the respective door 302, 304. Each striker 324, 326 has a cam surface 328 that faces away from the respective door 302, 304 and a catch surface 330 that faces toward the respective door 302, 304. The cam surface 328 of each striker can interact with the cam surface 338 of the respective hook-shaped pawl 334, 336 to move the pawl out of the way of the striker 324, 326 and allow the respective door to move to the closed position if the respective hook-shaped pawl happens to be near the latched position, illustrated in FIG. 280, when the respective door is being moved to the closed position. Once the door 302, 304 is in the closed position, the magnetic attraction between the respective rotary magnet 306, 308 and the respective magnetic insert 314, 316 moves the respective hook-shaped pawl 334, 336 to the latched position. In the latched position, the head 322 of the respective hook-shaped pawl 334, 336 is positioned between the respective striker 324, 326 and the respective door 302, 304, where the catch surface 344 of the respective hook-shaped pawl 334, 336 can engage the catch surface 330 of the respective striker 324, 326 to thereby mechanically block the movement of the respective door 302, 304 from the closed position to the open position.

Figure 278:
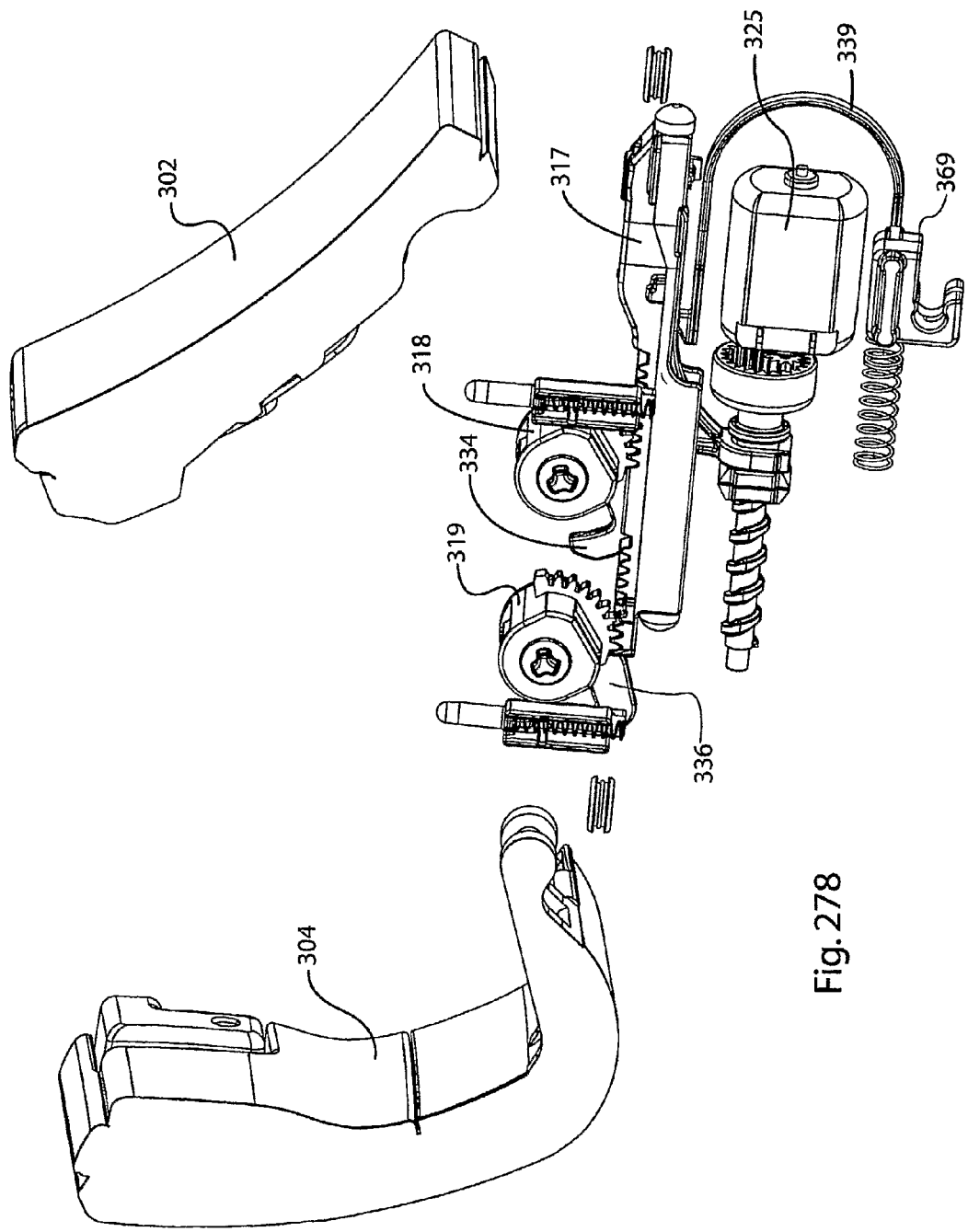
Figure 279:
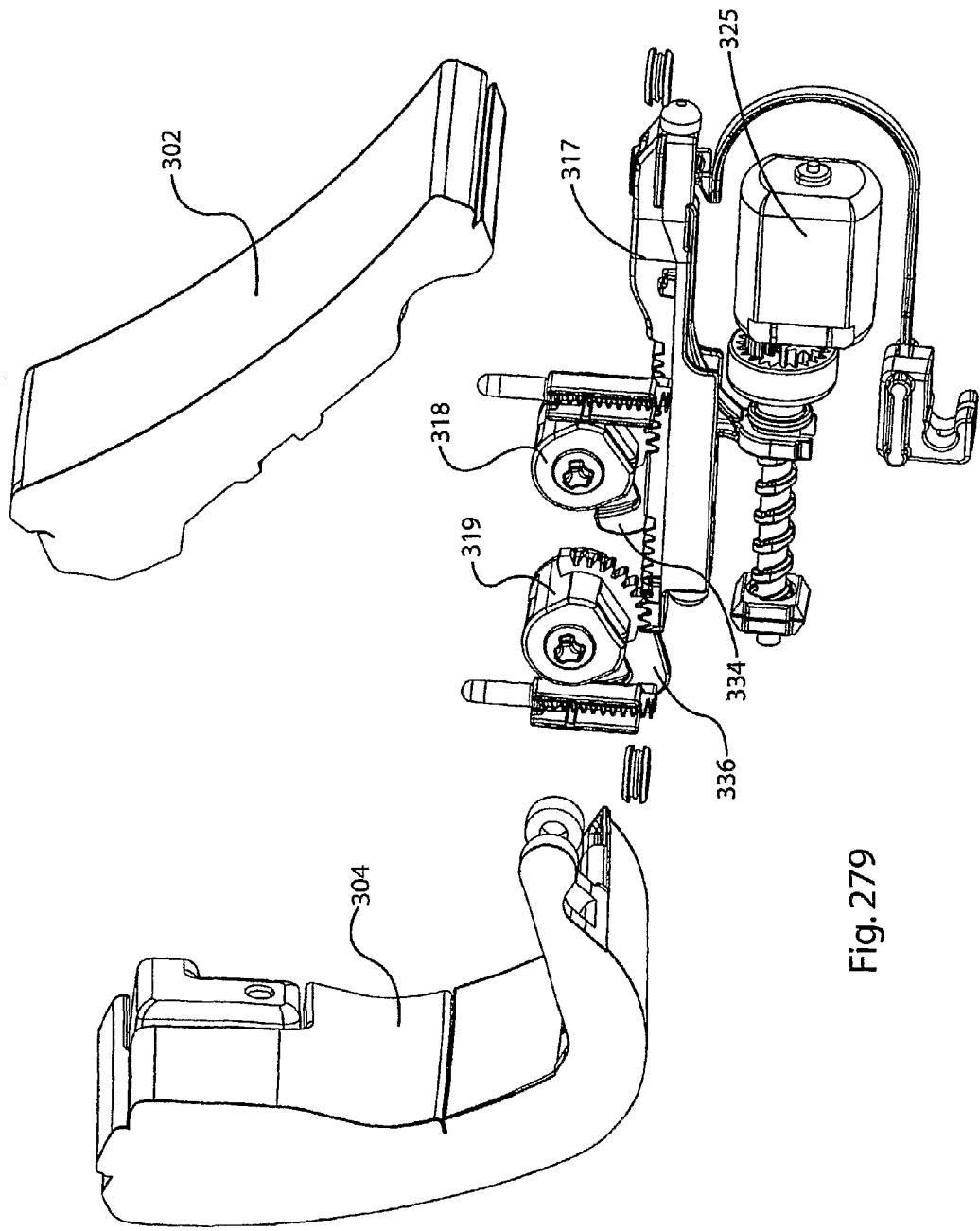
Figure 282:
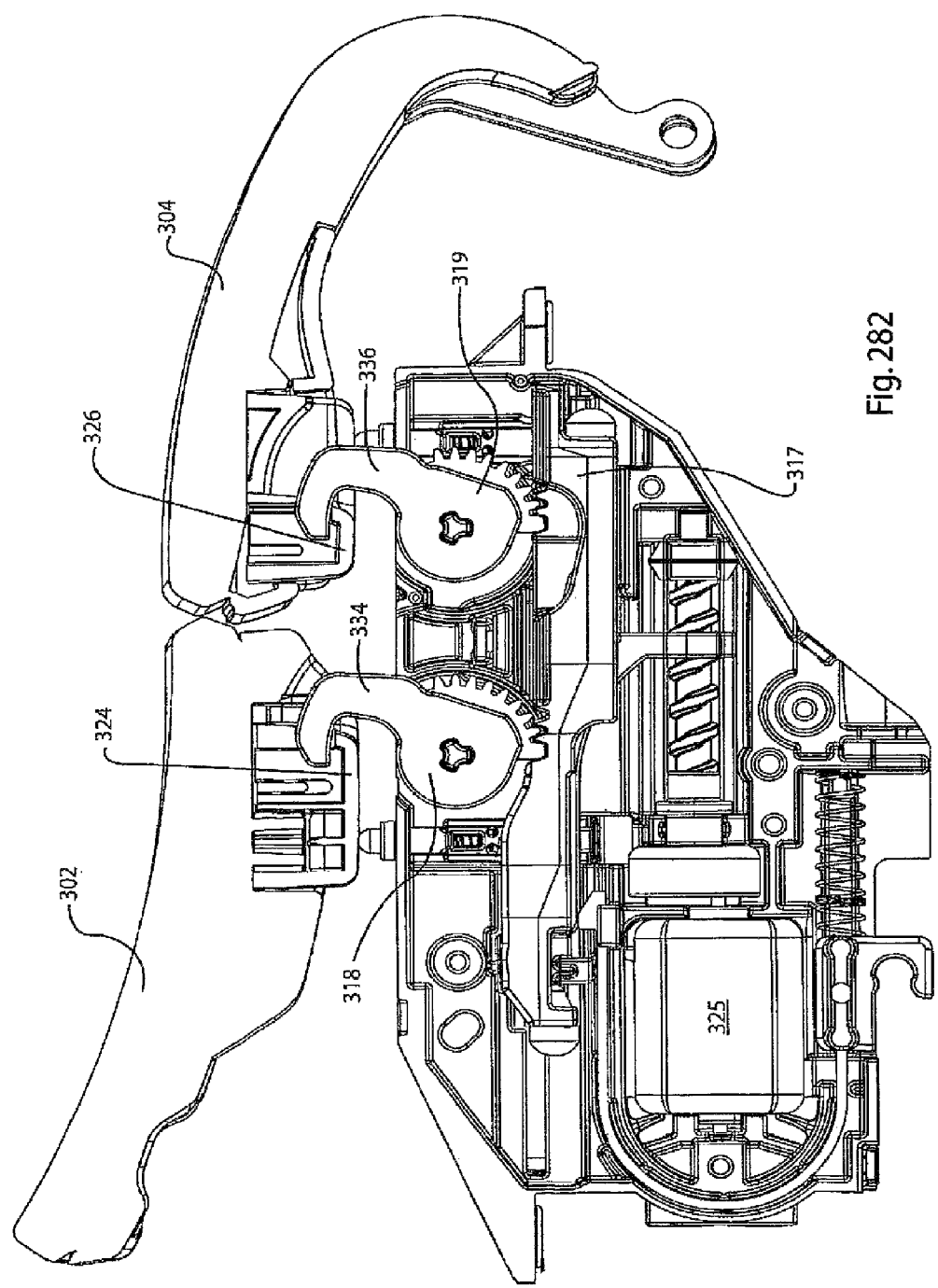
Figure 283:
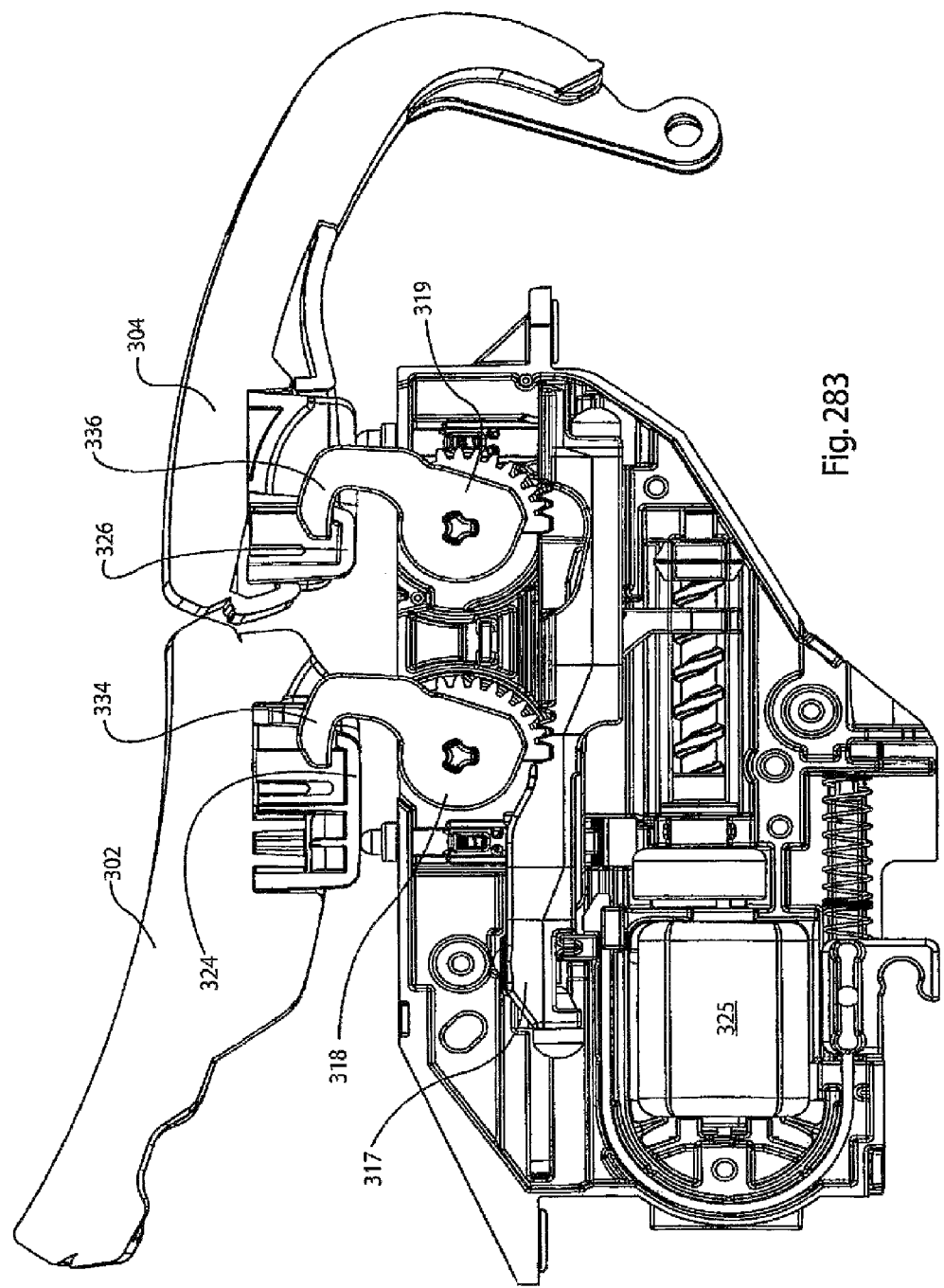
Figure 284:
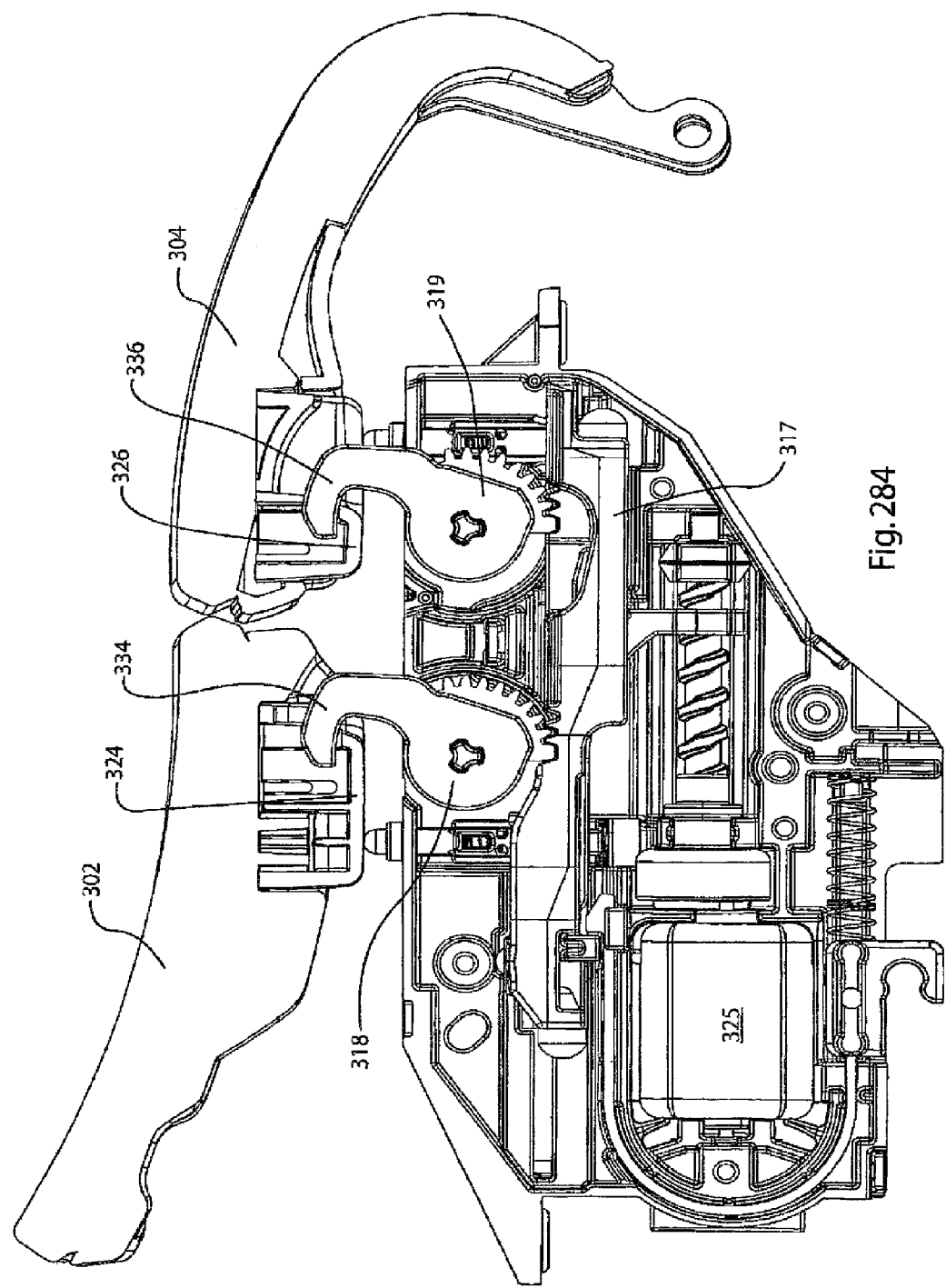
Figure 285:
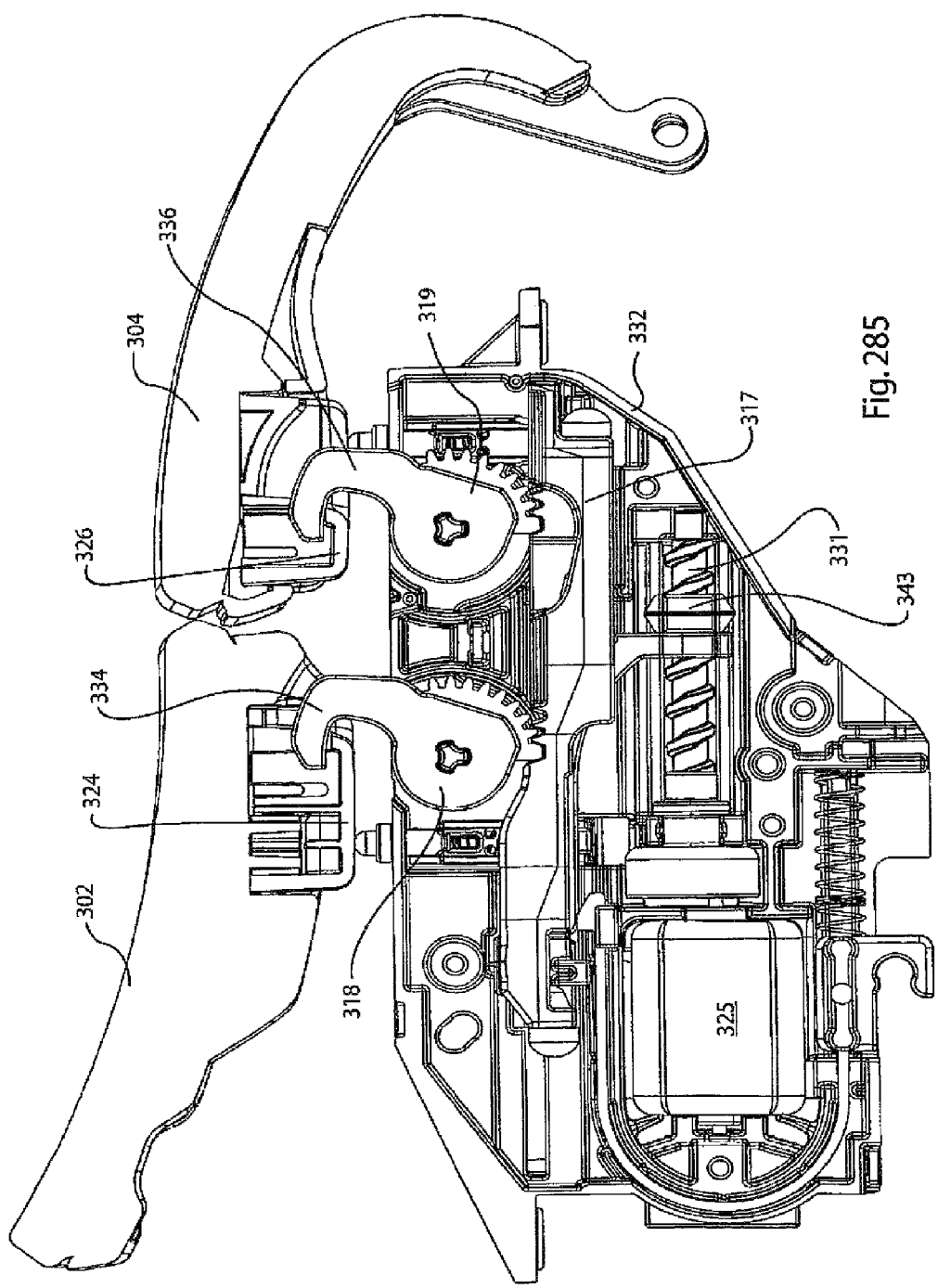
Figure 286:
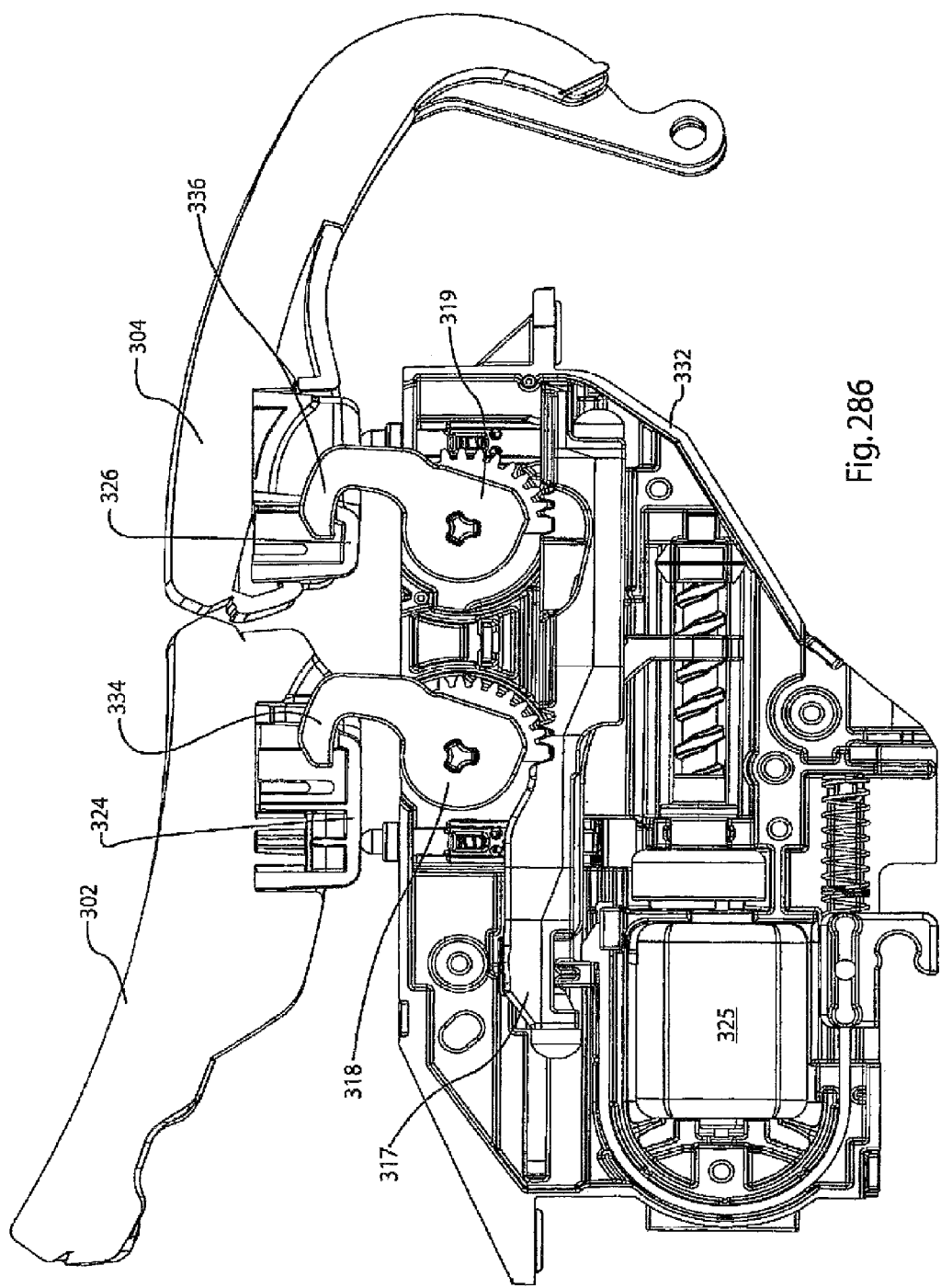
Figure 287:
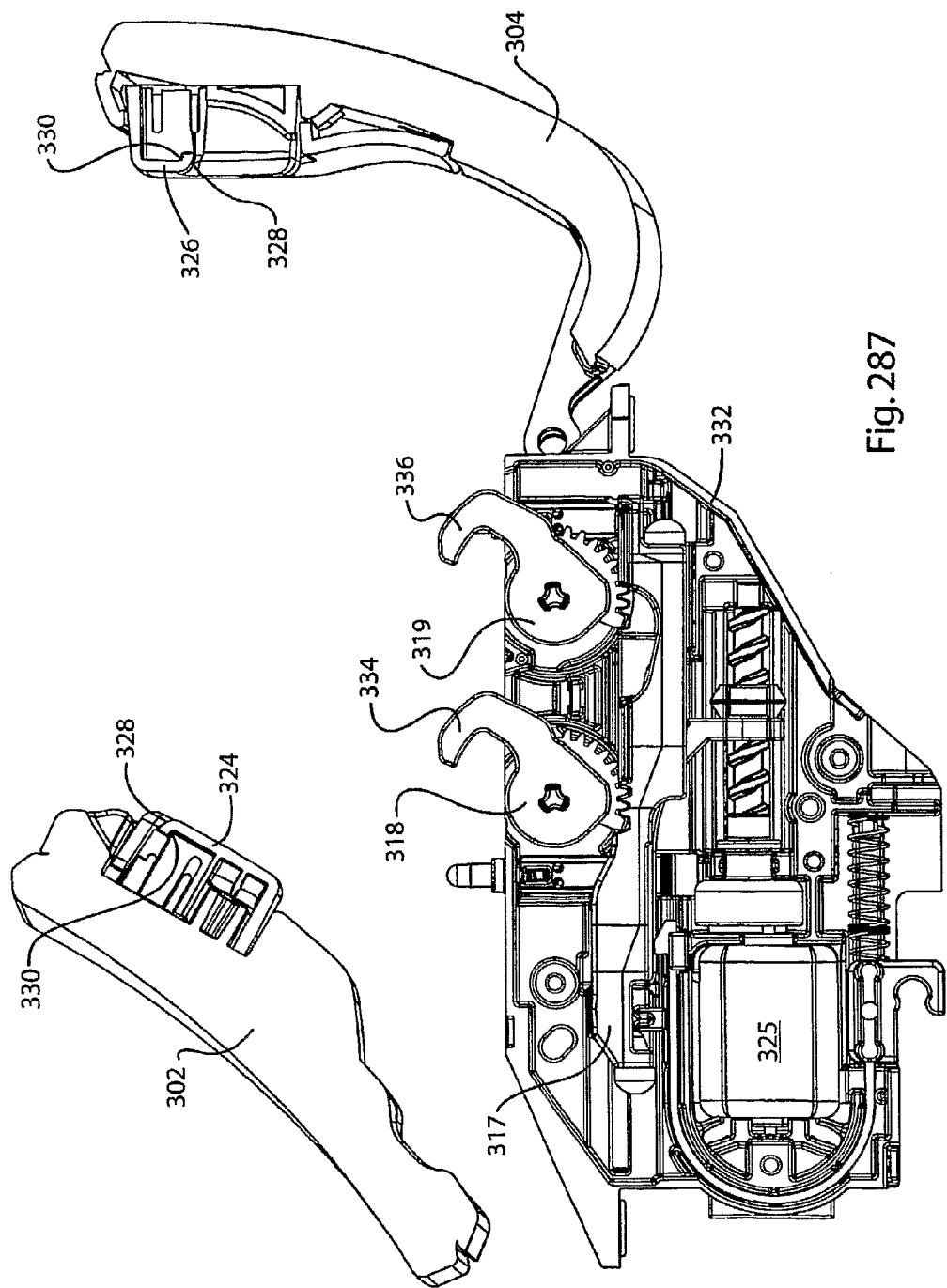
Figure 288:
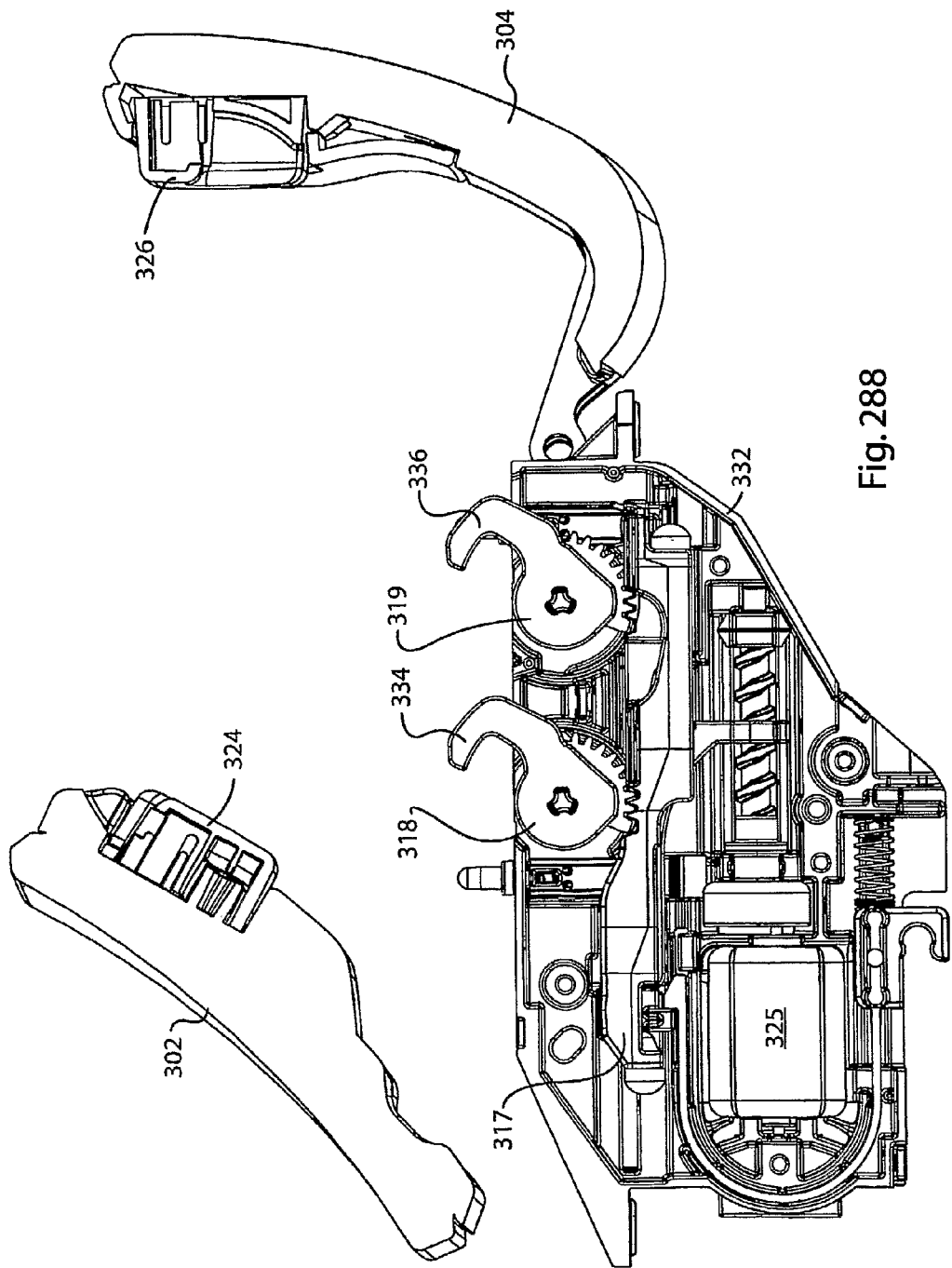
Figure 289:
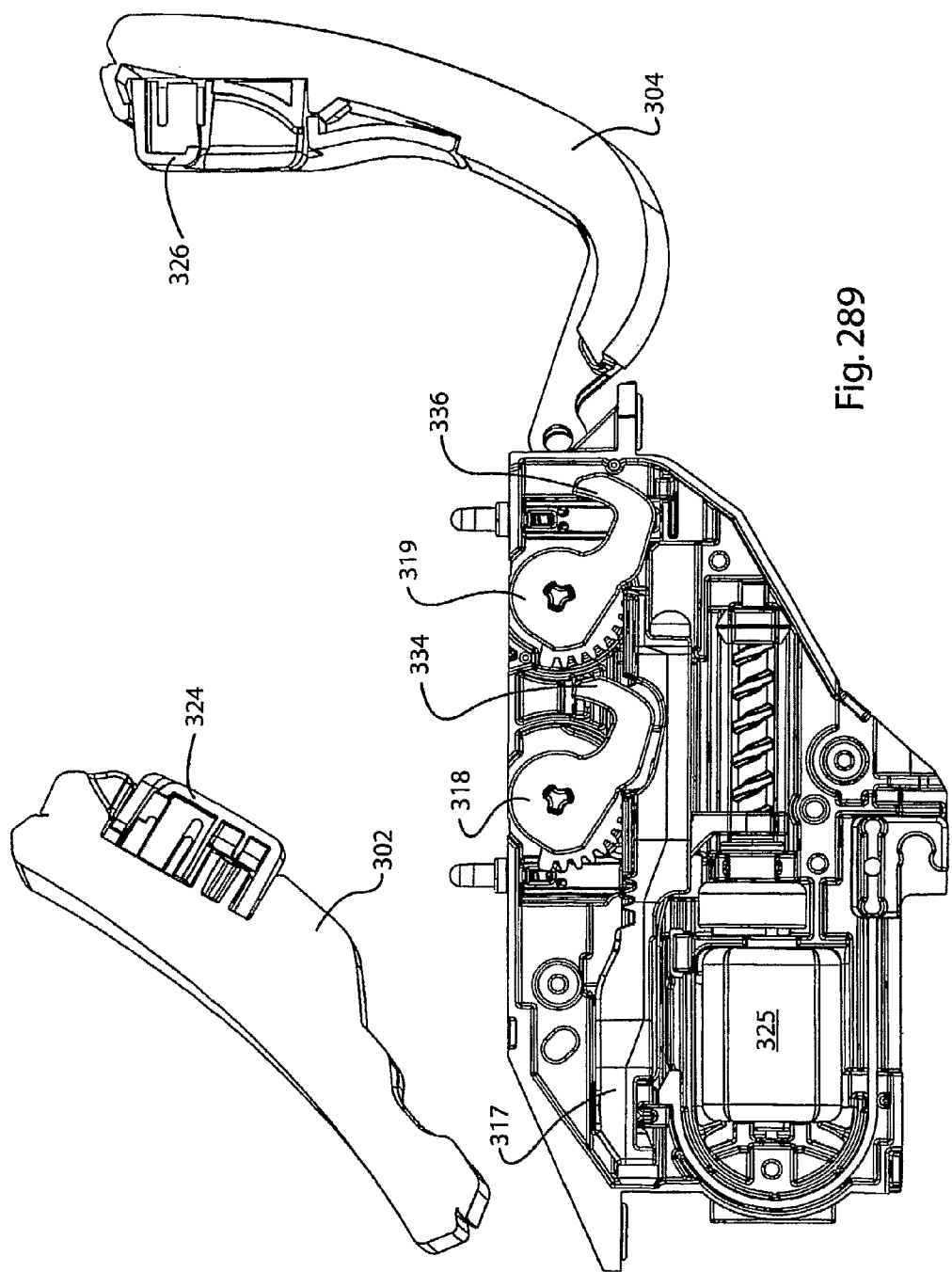

When the rotary magnets 306, 308 are in their unlatched positions (illustrated in FIGS. 278 and 289) and the doors 302 and 304 are in their closed positions (illustrated in FIGS. 282-284), the pole of each of each of the rotary magnets 306, 308 that is of an opposite type compared to the pole of the respective magnetic insert 314, 316 facing the rotary magnet 306, 308, is positioned farther from the respective magnetic insert 314, 316, while the pole of each of the rotary magnets 306, 308 that is of the same type compared to the pole of the respective magnetic insert 314, 316 facing toward the rotary magnet 306, 308, is positioned closer to the respective magnetic insert 314, 316, in comparison to the latched position of the rotary magnets 306, 308. In the unlatched position, the repulsive force between the like poles of each rotary magnet 306, 308 and the respective magnetic insert 314, 316 overcomes the attractive force between the opposite poles of each rotary magnet 306, 308 and the respective magnetic insert 314, 316. Accordingly, a net repulsive force is exerted between each rotary magnet 306, 308 and its respective magnetic insert 314, 316. In addition, the hook-shaped pawls 334, 336 rotate to their unlatched positions along with the rotary magnets 306, 308 and their magnet carriers 318, 319, which removes the mechanical impediment to the opening of the doors 302, 304, with the result that the doors 302, 304 to which the magnetic inserts 314, 316 are attached are moved from the closed position toward the open position.

Again, for example, we can assume that the magnetic inserts 314, 316 are positioned such that their south poles face their respective rotary magnet 306, 308 when the doors 302 and 304 are in their closed positions. In this case, the north poles of the rotary magnets 306, 308 move away from the south poles of their respective magnetic inserts 314, 316 and the south poles of the rotary magnets 306, 308 move toward the south poles of their respective magnetic inserts 314, 316 as the rotary magnets 306, 308 and their carriers 318, 319 move from the latched position to the unlatched position, such that a net repulsive force is exerted between each rotary magnet 306, 308 and its respective magnetic insert 314, 316 when the rotary magnets 306, 308 reach their unlatched positions.

The opposite type pole of the respective rotary magnet 306, 308 need not directly face the pole of the magnetic insert 314, 316 facing its respective rotary magnet 306, 308 in the latched position. In the unlatched position, the rotary magnets 306, 308 may deviate from the direct facing relationship between the opposite type poles of the rotary magnets and of their respective magnetic inserts as long as the net attractive force between the rotary magnet 306, 308 and the respective magnetic insert 314, 316 is sufficiently strong to produce reliable simultaneous latching of the doors 302, 304 even when one door lags the other during closing as previously described. As long as this result is achieved, the poles of the rotary magnets 306, 308 having a polarity opposite the poles of the respective magnetic inserts 314, 316 facing toward the magnets 306, 308, can be said to be substantially facing the poles of the respective magnetic inserts 314, 316 facing toward the magnets 306, 308. Of course, the direct facing relationship between the opposite type poles of the rotary magnets and of their respective magnetic inserts gives the greatest holding power to the latch mechanism and it would be desirable for the north poles of the rotary magnets 306, 308 to approach the direct facing relationship with the south poles of their respective magnetic inserts as closely as possible in the latched position. The key consideration is that the angular position of the rotary magnets 306, 308 in the latched position must be selected such that the north poles of the rotary magnets 306, 308 are closer to the south poles of their respective magnetic inserts as compared to the south poles of the rotary magnets 306, 308 to such an extent that the net attractive force between the rotary magnets 306, 308 and their respective magnetic inserts is strong enough for the rotary magnets to draw in and hold the doors 302, 304 in the closed position as described herein. In the example being considered, the north poles of the rotary magnets 306, 308 deviate from the direct facing relationship with the south poles of their respective magnetic inserts by a few degrees in the latched position.

Each magnetic insert 314, 316 is attached to a respective one of the doors 302, 304 by being inserted in a magnetic insert housing 376, 378, respectively, which in turn are attached to a respective one of the doors 302, 304. In the illustrated example, the magnetic insert housings 376, 378 are attached to the doors 302, 304 by screws 380 whose heads are embedded in the material of the magnetic insert housings 376, 378. The screws 380 engage threaded holes in the doors 302, 304, such that turning the screws 380 adjusts the height of the magnetic insert housings 376, 378, and therefore the height of the strikers 324, 326, above the interior surfaces of the doors 302, 304.

The means for attaching the magnetic insert housings 376, 378 to the doors 302, 304 is not critical to the present invention and any suitable fastening means including screws, rivets, pins, nails and adhesives may be used. Furthermore, the magnetic insert housings 376, 378 may be of unitary construction with the doors 302, 304. The magnetic insert housings 376, 378 may also be dispensed with entirely and the magnetic inserts 314, 316 may be attached to the doors 302, 304 directly. As with the housings 376, 378, any suitable fastening means including screws, rivets, pins, nails and adhesives may be used to attach the magnetic inserts 314, 316 to the doors 302, 304. As yet another alternative, the magnetic inserts 314, 316 may be embedded in the material of the doors 302, 304.

However, it is preferred to use the illustrated means for attaching the magnetic insert housings 376, 378 to the doors 302, 304, because the illustrated means allows for the adjustment of the height of the strikers 324, 326 above the interior surfaces of the doors 302, 304 to accommodate variations in the gap between the doors 302, 304 in the closed position and the housing 332.

In the illustrated embodiment, the strikers 324, 326 are of unitary construction with the magnetic insert housings 376, 378, respectively. As with the housings 376, 378, the means for attaching the strikers 324, 326 to the doors 302, 304 are not critical to the present invention. Any suitable structure that supports the striker 324, 326 such that the striker is spaced apart a sufficient amount from the respective door's interior surface in order for the head 322 of the hook-shaped pawl 334, 336 to fit between the respective striker 324, 326 and the respective door 302, 304 may be employed and any suitable fastening means including screws, rivets, pins, nails and adhesives may be used to attach the structure to the respective door. Furthermore, the strikers 324, 326 may be of unitary construction with the doors 302, 304.

The magnetic latch mechanism 300 includes a housing 332 that rotationally supports the magnet carriers 318, 319 having the rotary magnets 306, 308, respectively, attached thereto. The top openings 305, 329 of the housing 332 allow the hook-shaped pawls 334, 336 to extend out of the housing 332 to engage the strikers 324, 326 in the latched position.

Each magnet carrier 318, 319 includes a receptacle 384, 386 for receiving the respective rotary magnet 306, 308. Each magnet carrier 318, 319 has a pair of spindles, 340, 342 and 350, 352, respectively, with each pair of spindles projecting outward on opposite sides of the respective receptacle 384, 386. The receptacles 384, 386, and consequently carriers 318, 319, are positioned in tandem along the longitudinal axis of the housing 332 with their axes of rotation being transverse, i.e. perpendicular, to the longitudinal axis of the housing 332. The spindles 340, 342, 350, 352 are received in and rotationally supported by the holes 354, 356, 358, 360 in the sides of the housing 332, respectively. Thus the magnet carriers 318, 319 are rotationally supported by the housing 332. In the illustrated example, the spindles 340, 342, 350, 352 are fluted. The housing 332 has a motor compartment 341. A cover 335 is provided for the circuit board 363. The holes 356, 360 are provided in a cover plate 333 that forms part of the housing 332. Again, the particular modality used for rotationally supporting the magnet carriers 318, 319 in the housing 332 is not critical to the present invention.

Each hook-shaped pawl 334, 336 is integrally formed with its respective magnet carrier 318, 319. Thus, there is no relative rotation between each receptacle 384, 386 and the respective hook-shaped pawl 334, 336; and each hook-shaped pawl 334, 336 and the respective receptacle 384, 386, and consequently the respective magnet carrier 318, 319, rotate as a unit.

Each magnet carrier 318, 319 also has a plurality of gear teeth 387 and 389, respectively. Each set of gear teeth 387, 389 is distributed along an arc defined by a sector of a circle centered at the axis of rotation of the respective magnet carrier 318, 319. The axis of rotation of each magnet carrier 318, 319 is of course defined by the central axis of the respective pair of spindles 340, 342 or 350, 352 of each magnet carrier 318, 319. The gear teeth 387, 389 of each magnet carrier 318, 319 are supported by, and are integral with, the respective receptacle 384, 386 of each magnet carrier. The first and second sets of gear teeth 313 and 337 of the rack bar 317 engage the gear teeth 387 and 389 of the magnet carriers 318 and 319, respectively.

The latch mechanism 300 includes a rack bar 317 that has first and second sets of gear teeth 313, 337 distributed along its length. Each set of gear teeth 313, 337 includes a plurality of gear teeth. The gear teeth 313, 337 are in constant mesh with the gear teeth 387, 389, respectively, such that the magnet carriers 318, 319 are linked by the rack bar 317. The rack bar 317 is supported for rectilinear motion back and forth in the direction of its longitudinal axis between a latched position, illustrated in FIGS. 175 and 282-286, and an unlatched position, illustrated in FIGS. 278 and 289. The rack bar 317 causes the magnet carriers 318, 319 to move in unison such that they and the rotary magnets 306, 308 can be moved from the latched position to the unlatched position by a common actuation mechanism in order to provide for the simultaneous opening of the dual doors 302, 304. The rack bar 317 supports a sliding bar 315 for limited rectilinear movement relative to the rack bar 317. A portion of the sliding bar 315 is at least partially surrounded by the rack bar 317 such that the gear teeth 313, 337 are positioned intermediate the sliding bar 315 and the gear teeth 387, 389. A projection 307 projects from the sliding bar 315 and is capable of engagement by a flexible link 339. The flexible link 339 includes a flexible ribbon or strap portion 345, a receptacle 369 for attachment of a Bowden cable 220, and a barb or projection 349 adapted for engaging the projection 307 of the sliding bar 315 in order to move the sliding bar 315 from a locked position to an unlocked position relative to the rack bar 317 and then to pull both the sliding bar 315 and the rack bar 317 until the rack bar 317 is in the unlatched position. The strap portion 345 of the link 339 is flexible but is of sufficiently high tensile strength to pull the sliding bar 315 to the unlocked position relative to the rack bar 317 and then to pull both the sliding bar 315 and the rack bar 317 until the rack bar 317 is in the unlatched position without yielding. The receptacle 369 is adapted for receiving the spherical enlargement 209 at the end of the Bowden cable 220 for actuating the latch mechanism 300. The strap portion 345 of the link 339 is positioned in a U-shaped track 351 in the housing 332. This arrangement allows the sliding bar 315 and the rack bar 317 to be pulled in a direction opposite to the direction in which the Bowden cable 220 is pulled outside the housing 332. In an alternative embodiment the Bowden cable was directly engaged to the sliding bar 315 and routed through a U-shaped track in the housing 332, however, the illustrated arrangement is preferred for ease of assembly and manufacture. The sliding bar 315 is movable rectilinearly between the locked position and the unlocked position relative to the rack bar 317. A spring 370 is provided that acts between the sliding bar 315 and the rack bar 317 and that biases the sliding bar 315 toward the locked position. The spring 370 is housed in a cavity 353 in the rack bar 317. When the sliding bar 315 is in the locked position it pushes the ball bearing 372 outward from the opening 374 on the top side of the rack bar 317 such that the ball bearing 372 projects outward from the top side of the rack bar 317. When the sliding bar 315 is in the locked position and the rack bar 317 is in the latched position, the ball bearing 372 engages the recess 373 in the housing 332 such that the rack bar 317 cannot move unless the sliding bar 315 is moved to the unlocked position first. The rate of the spring 370 is selected such that the sliding bar 315 cannot move due to its own inertia under the forces expected during collisions. Thus, the engagement of the ball bearing 372 with the recess 373 essentially prevents the latch 300 from unlatching during a collision and makes the latch 300 resistant to unlatching due to collisions.

The sliding bar 315 has a depression 375 that registers with the opening 374 when the sliding bar 315 is in the unlocked position. The depression 375 allows the ball bearing 372 to retract into the rack bar 317 once the sliding bar 315 is in the unlocked position, which in turn frees the rack bar 317 for movement to the unlatched position.

The receptacle 369 has an opening at one end and a slot 311 extending down one side and partway through the bottom of the receptacle 369. The slot 311 extends along the length of the receptacle 369 from the open end of the receptacle 369 to the bottom of the receptacle 369 and along a portion of a diameter of the bottom of the receptacle. The slot 311 is wide enough to allow the Bowden cable 220 to extend through the slot 311. The spherical enlargement 209 may have any other shape and size such that it will not fit through the slot 311 but that it will fit into the receptacle 369.

The housing 332 has a bracket 303 with a U-shaped slot 310 that can support one end of the sheath 223 of the Bowden cable 220. The Bowden cable 220 allows the remote operation of the latch mechanism 300. With the one end of the sheath 223 of the Bowden cable 220 installed in the U-shaped slot 310 of the bracket 303 and with the spherical enlargement 209 positioned in the receptacle 369, pulling the remote end (not illustrated) of the Bowden cable 220 will cause the rectilinear movement of the sliding bar 315 from the locked position to the unlocked position. This initial movement of the sliding bar 315 frees the rack bar 317 for movement to the unlatched position. The range of motion of the sliding bar 315 from the locked position to the unlocked position is relatively limited, and further pulling the remote end (not illustrated) of the Bowden cable 220 will cause the rectilinear movement of both the sliding bar 315 and the rack bar 317 together such that the rack bar 317 is moved from the latched position to the unlatched position. Consequently, the rotary magnets 306, 308, magnet carriers 318, 319, and hook-shaped pawls 334, 336 are caused to rotate from their latched positions, assuming them to initially be in the latched position, to their unlatched positions.

The remote end of the Bowden cable 220 can be pulled manually or by using an electrical actuator. Generally some type of remotely located handle or push button would be provided as a user interface for the manual or electrical operation of the latch mechanism 300, respectively.

The latch mechanism 300 is mounted to the compartment secured by the doors 302, 304.

The magnets 306, 308 pull the doors 302, 304 in to ensure they both latch correctly. The magnets 306, 308 control the final movement and positions of the doors 302, 304 during closing. The magnets 306, 308 also aid the opening of the doors 302, 304 when the mechanism is unlatched.

Figure 177:
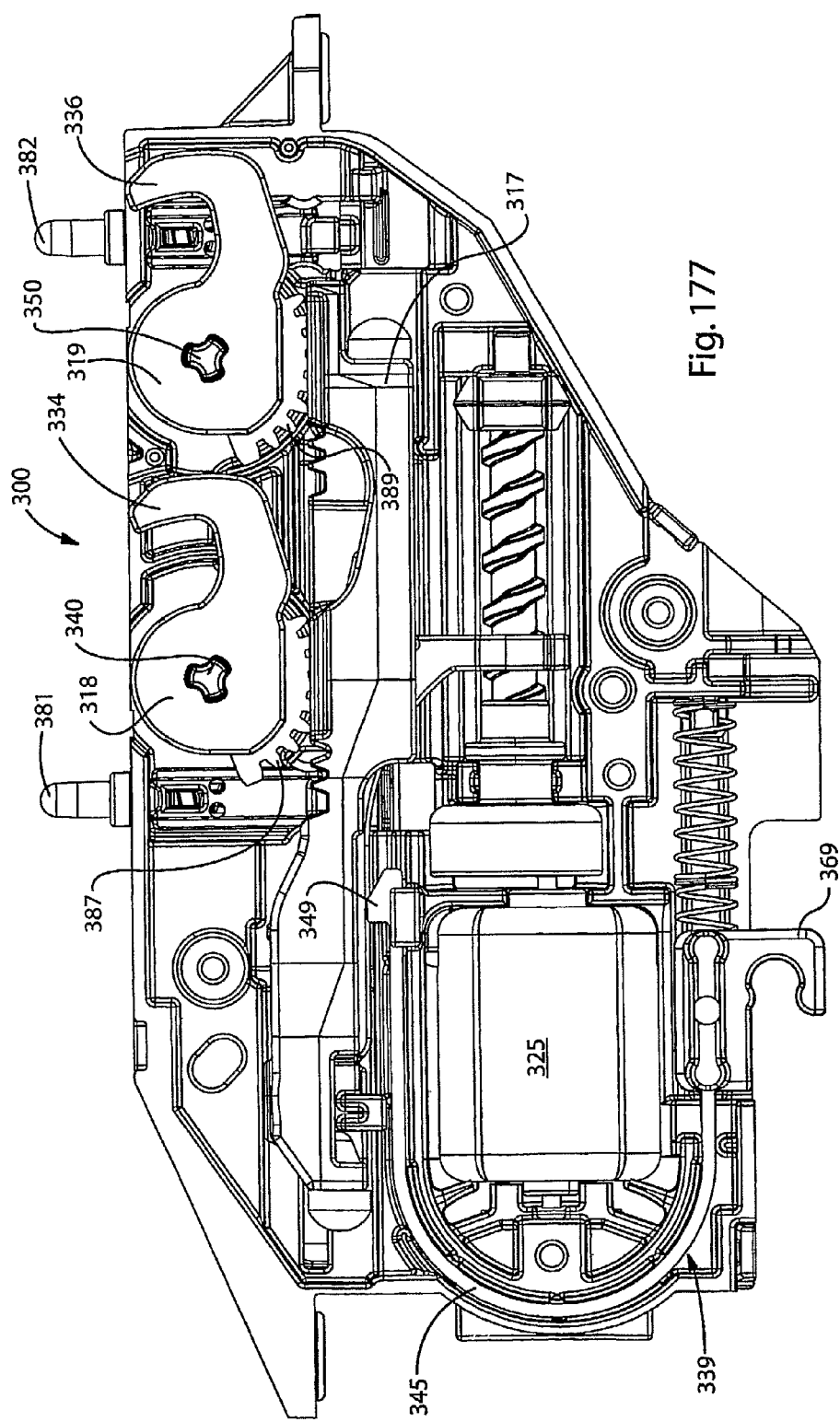
Figure 178:
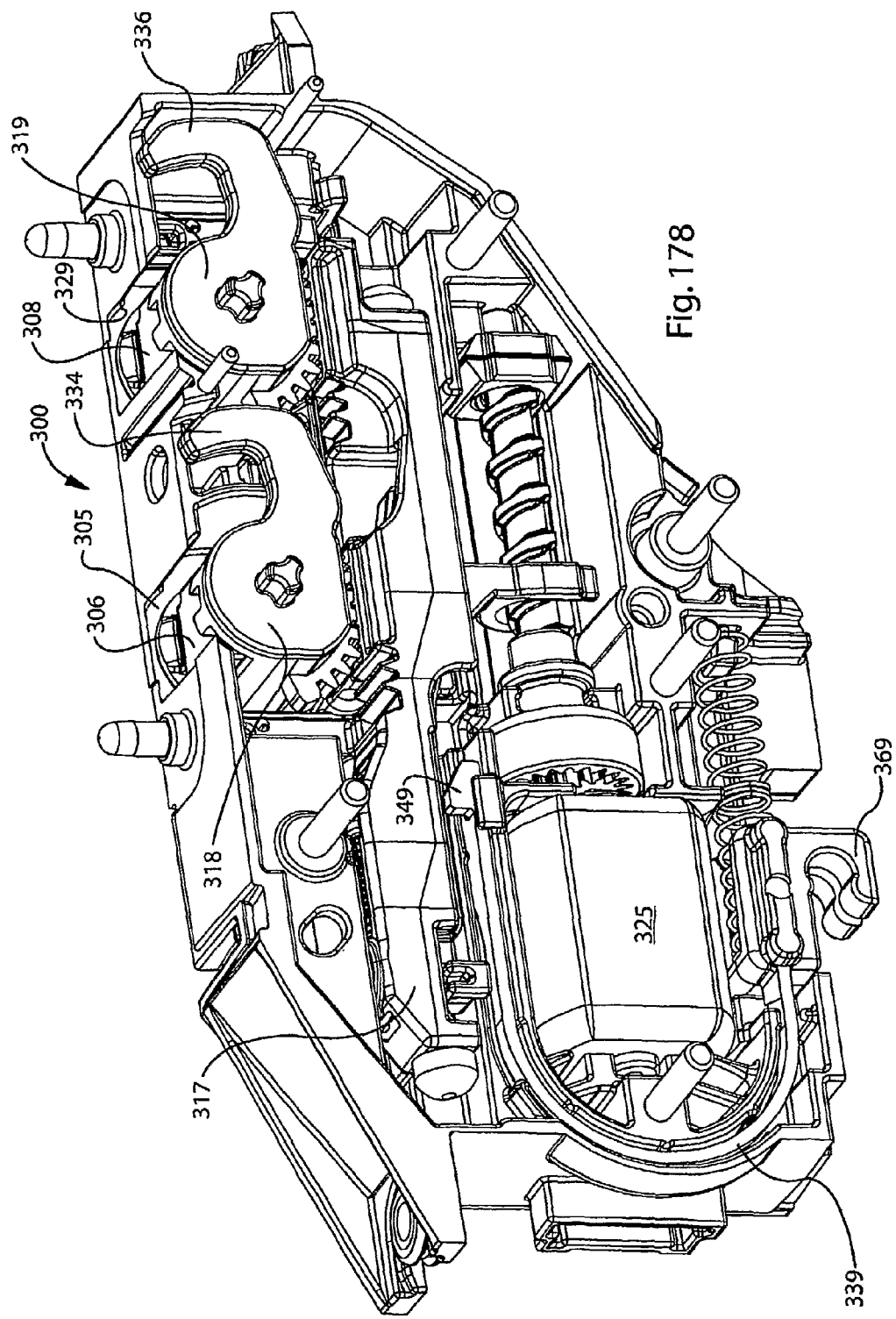
Figure 179:
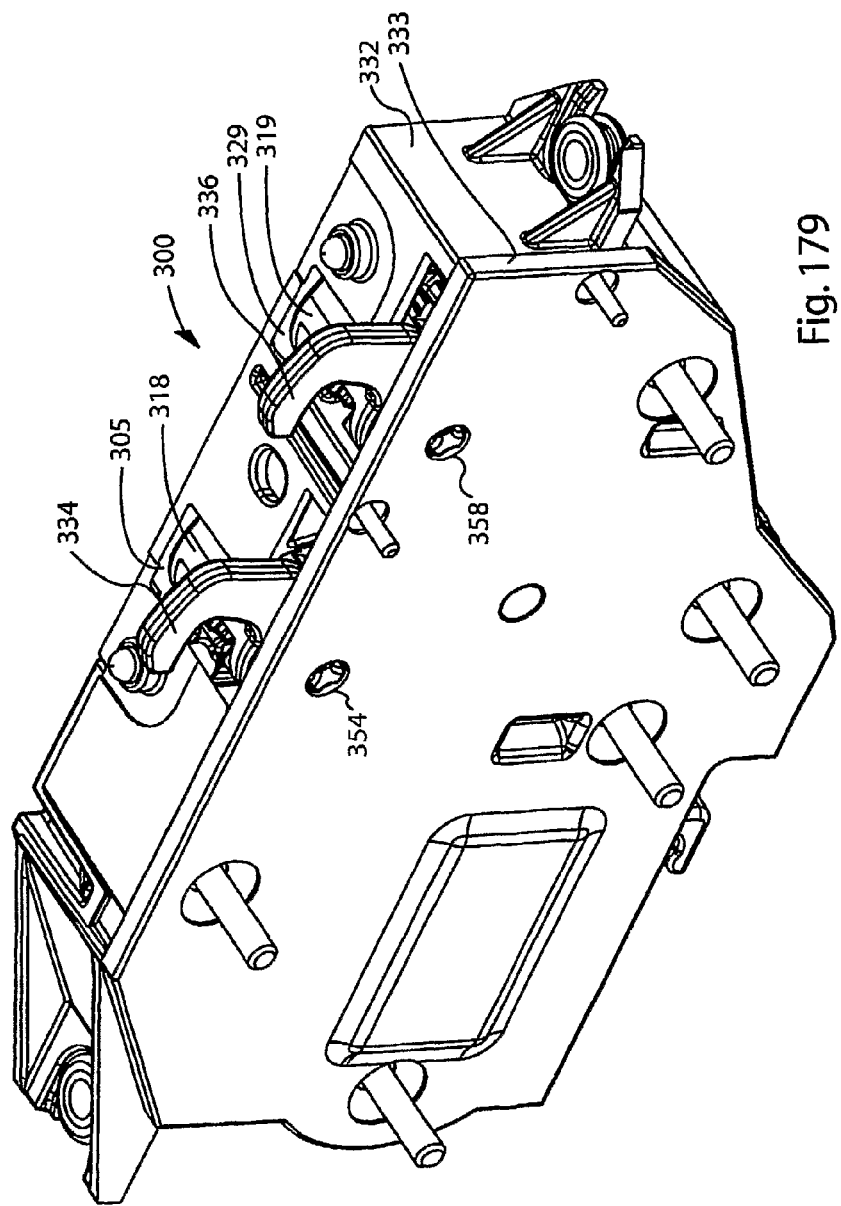
Figure 180:
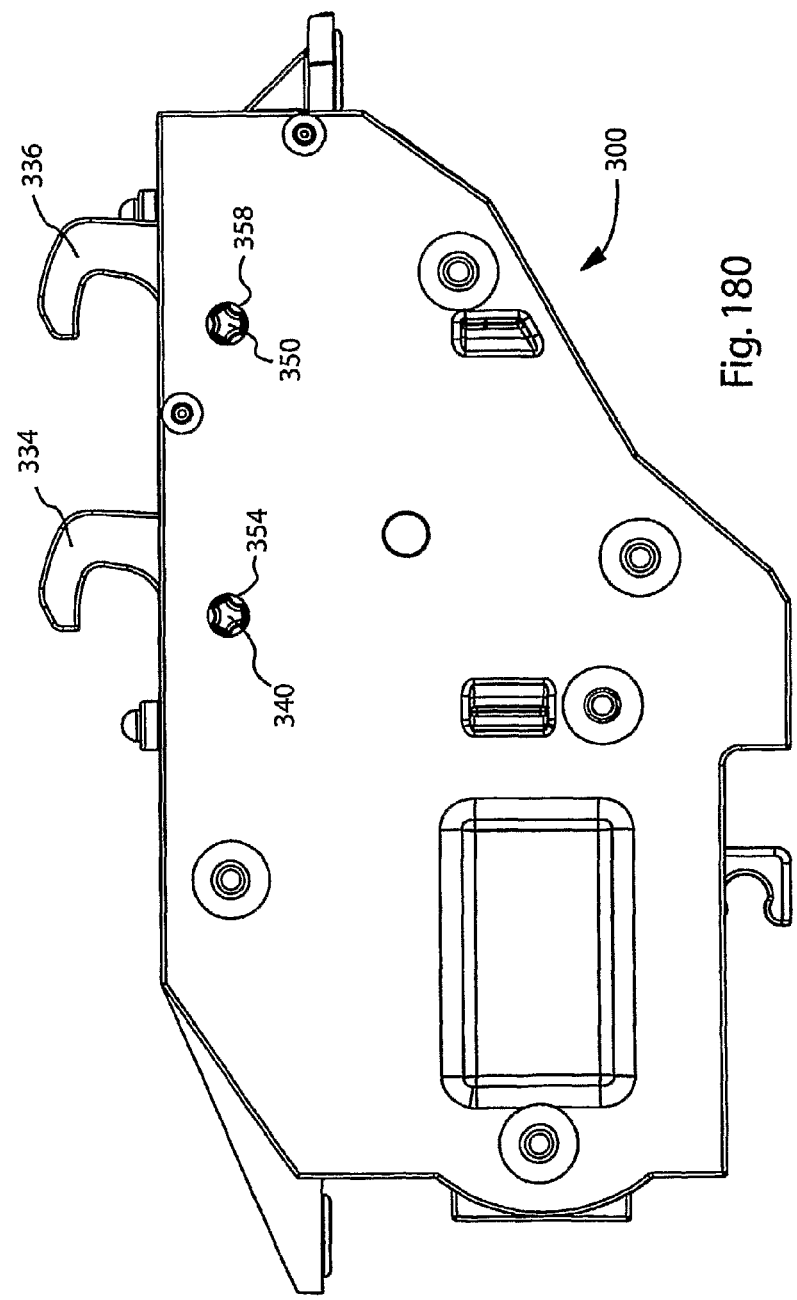
Figure 181:
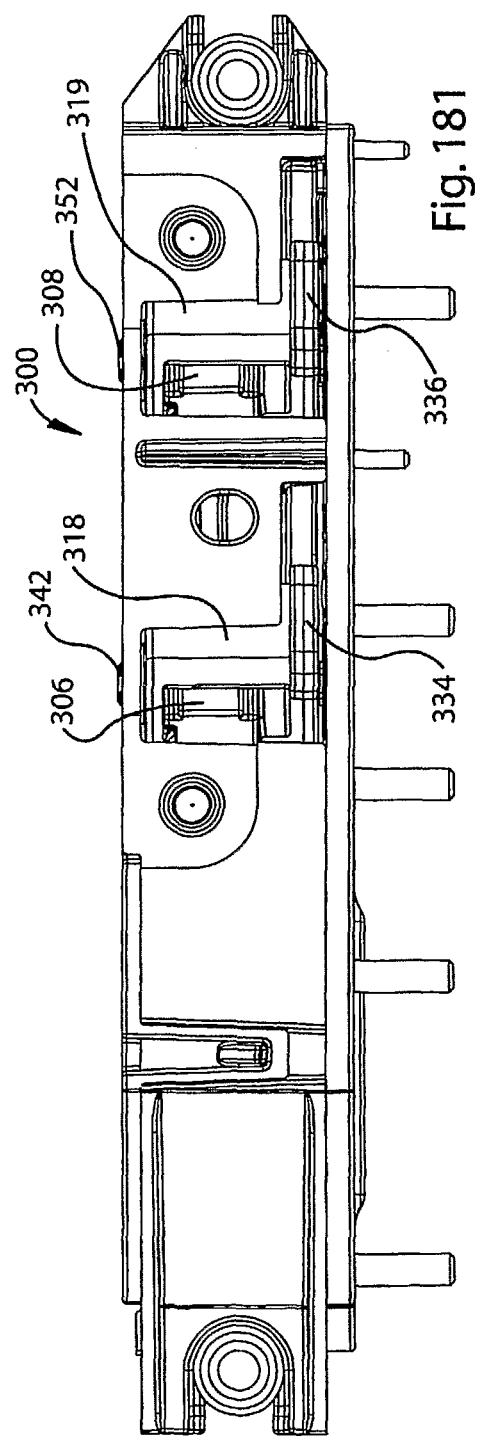
Figure 182:
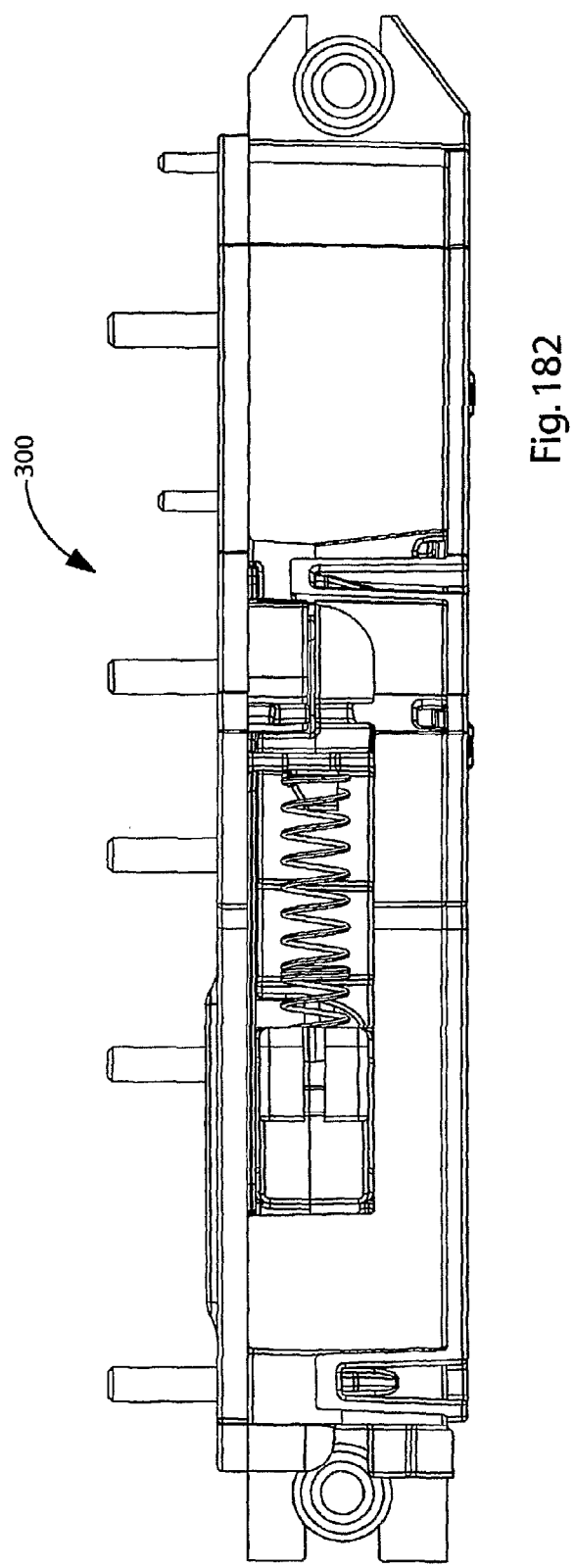
Figure 183:
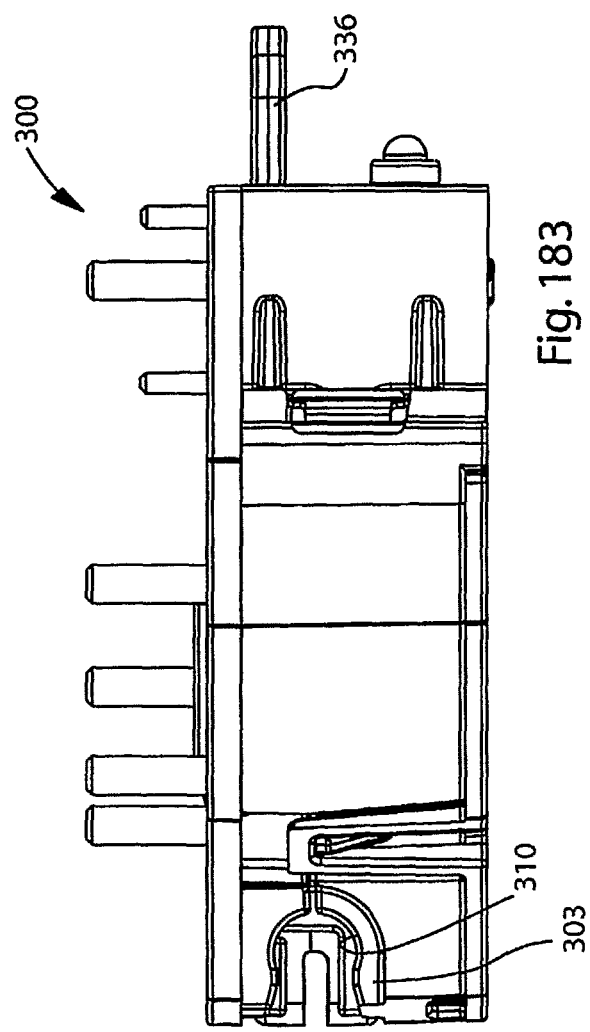
Figure 184:
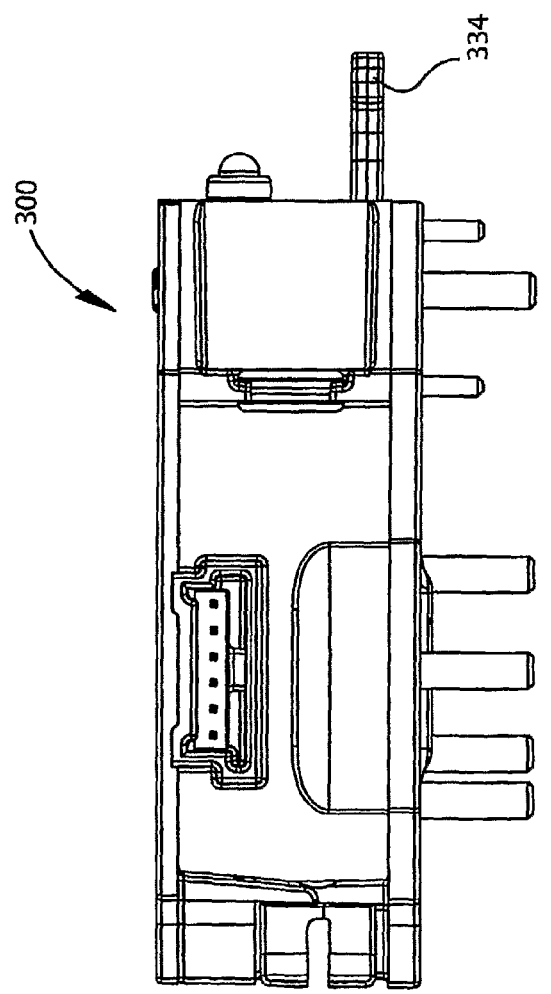
Figure 185:
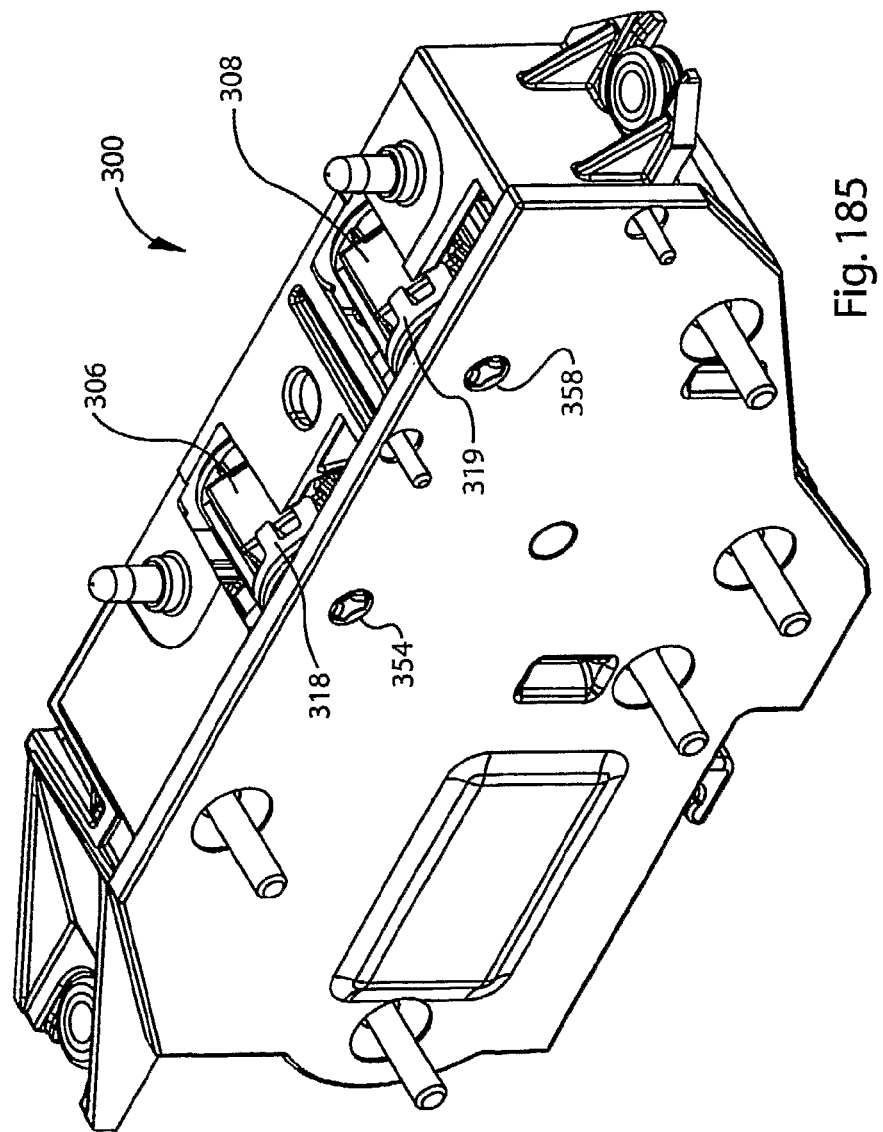
Figure 186:
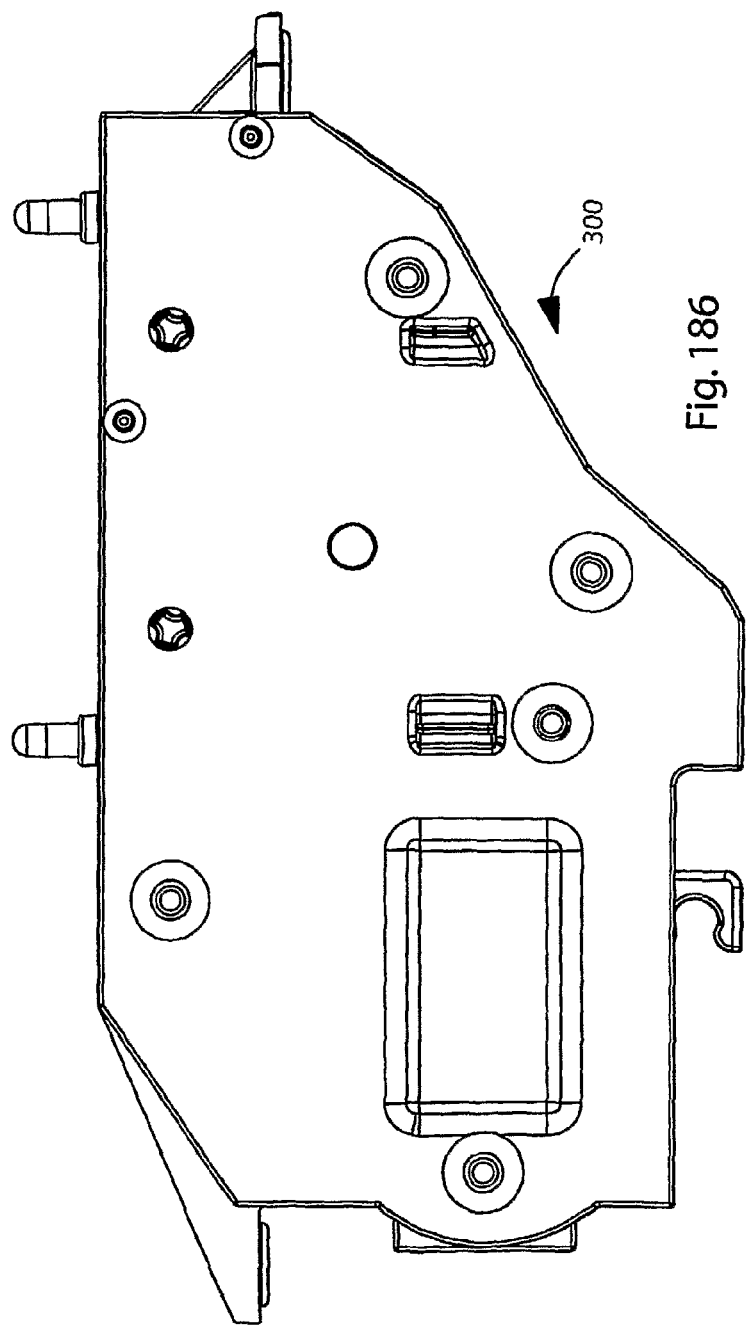
Figure 187:
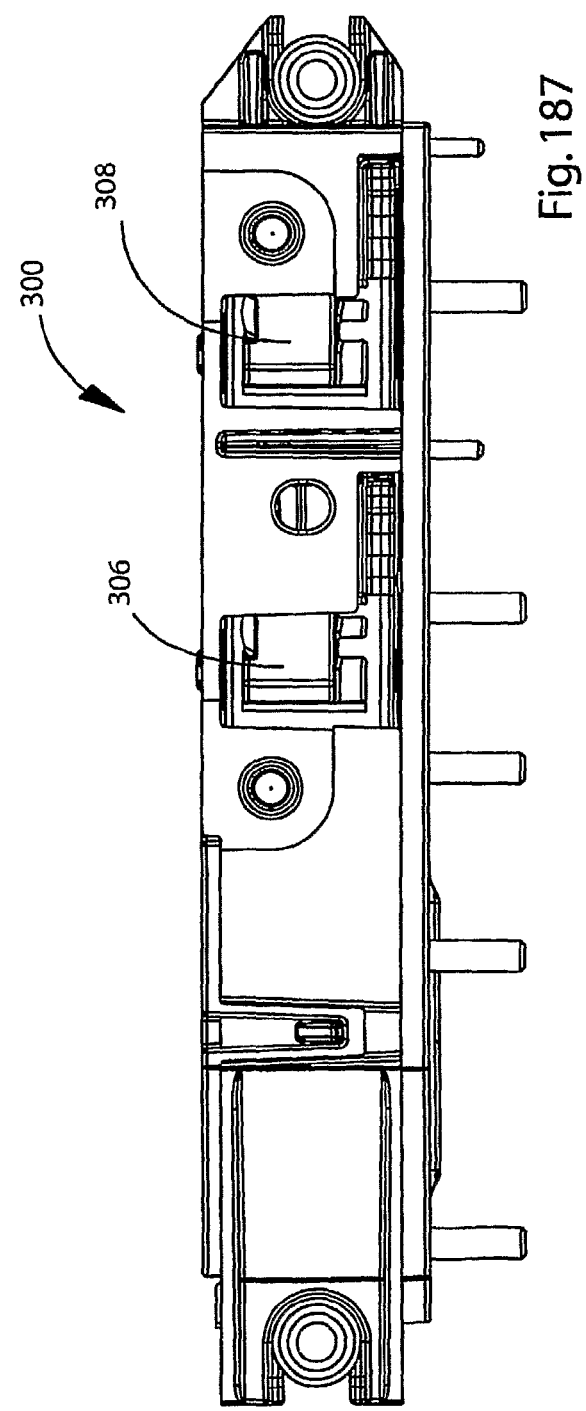
Figure 188:
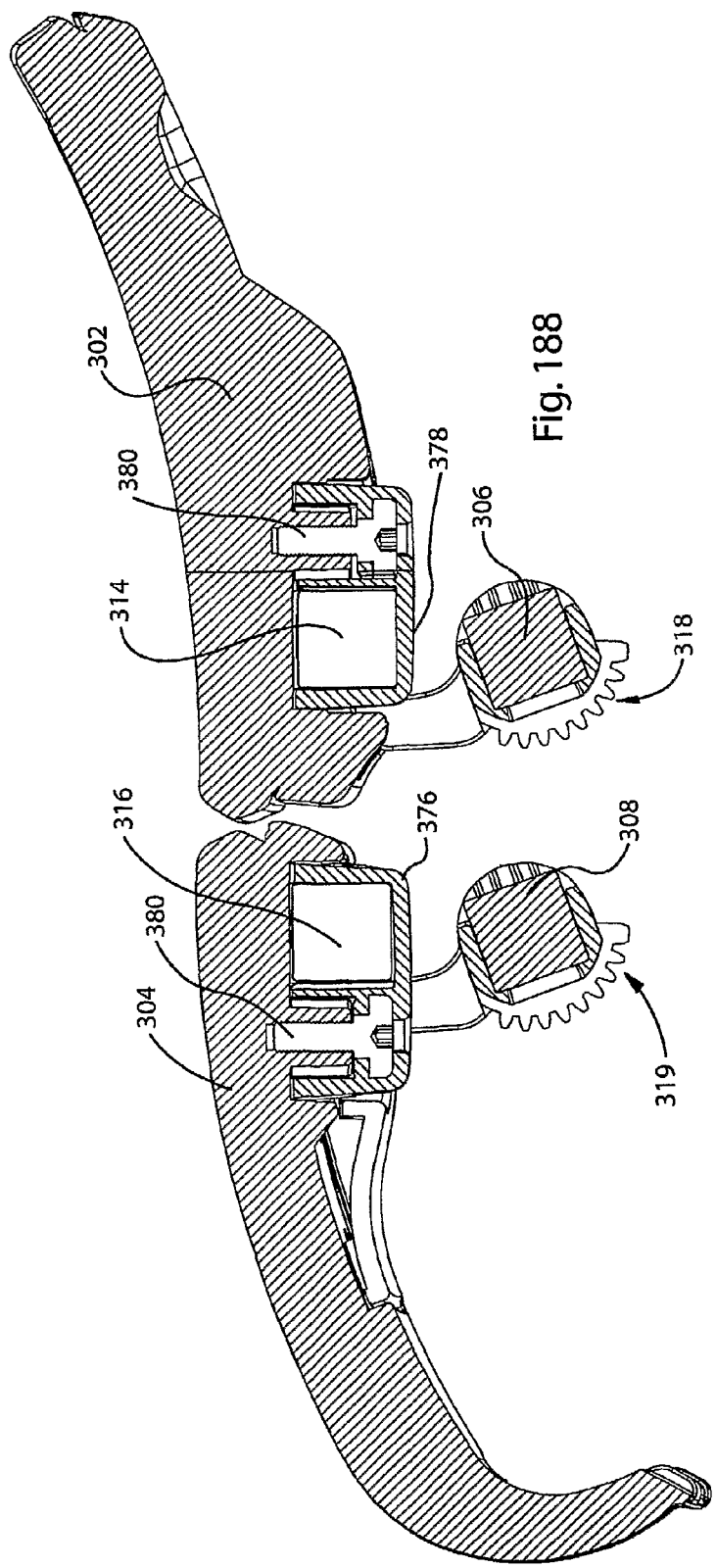
Figure 189:
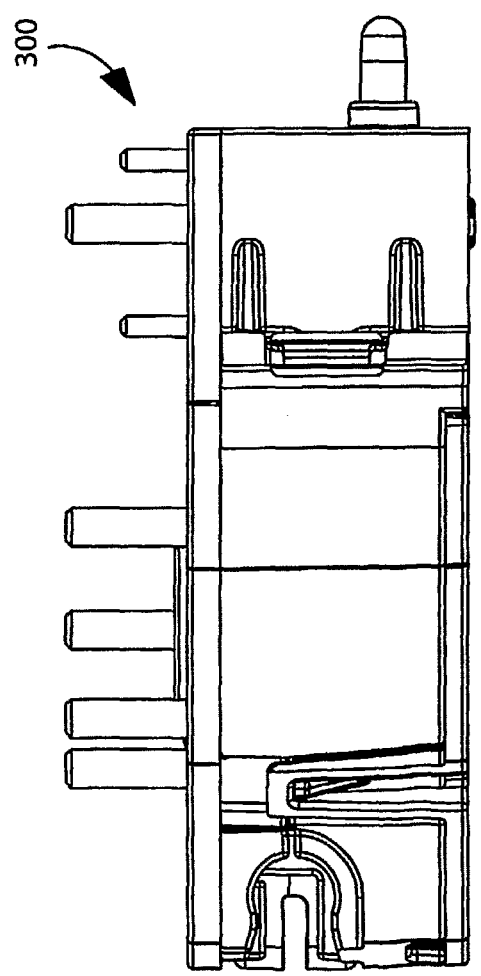
Figure 190:
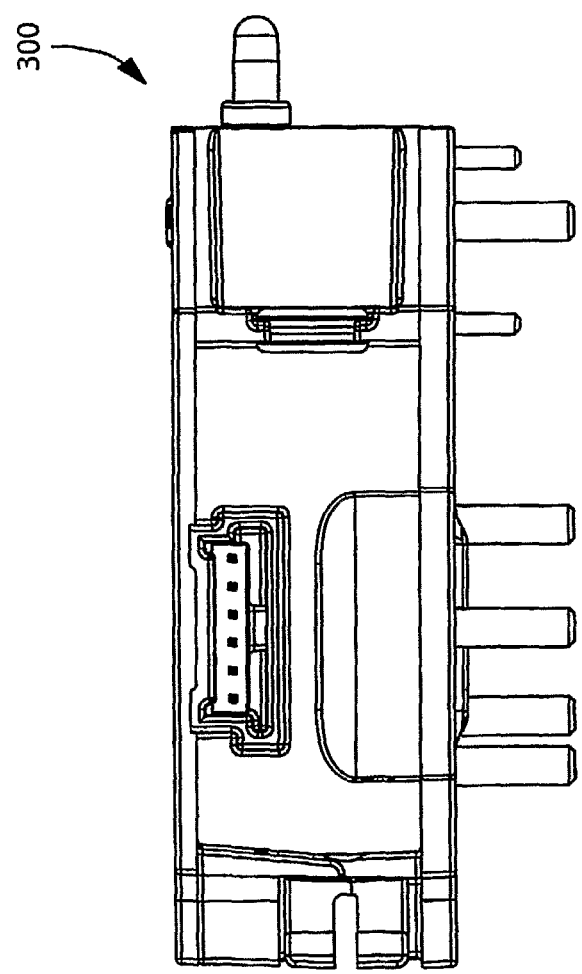
Figure 191:
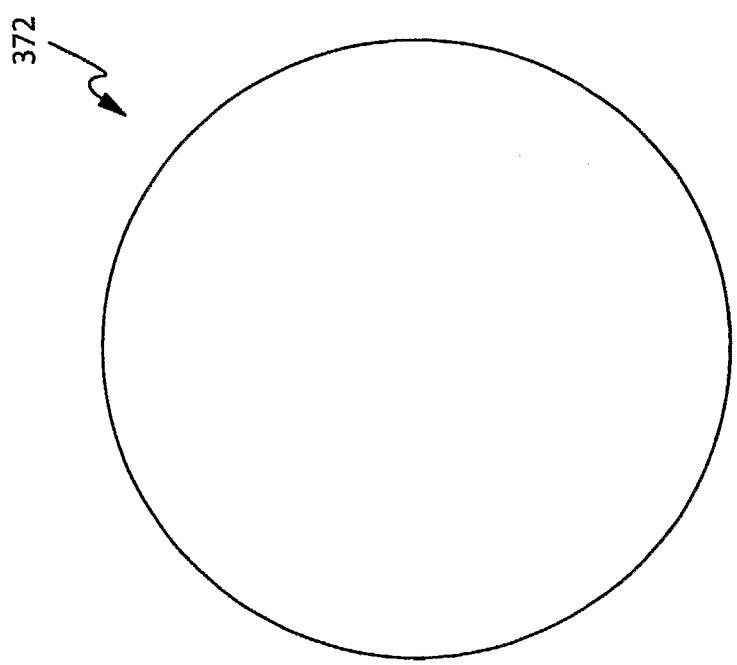
Figure 193:
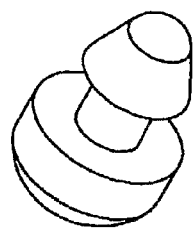
Figure 196:
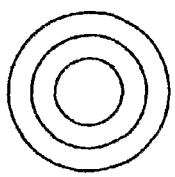
Figure 192:
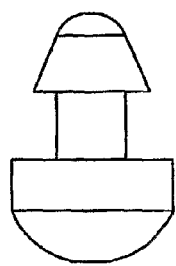
Figure 195:
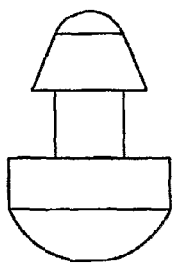
Figure 197:
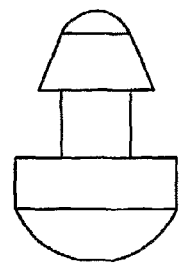
Figure 194:
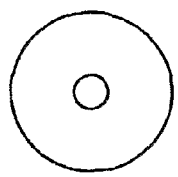
Figure 199:
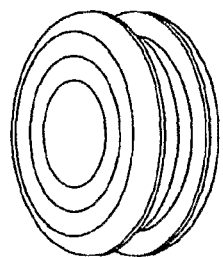
Figure 202:
Figure 198:
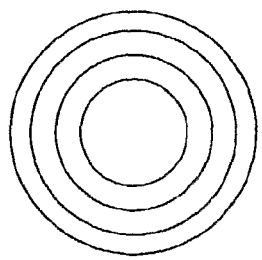
Figure 201:
Figure 203:
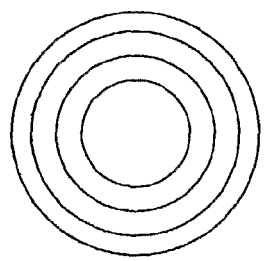
Figure 200:
Figure 204:
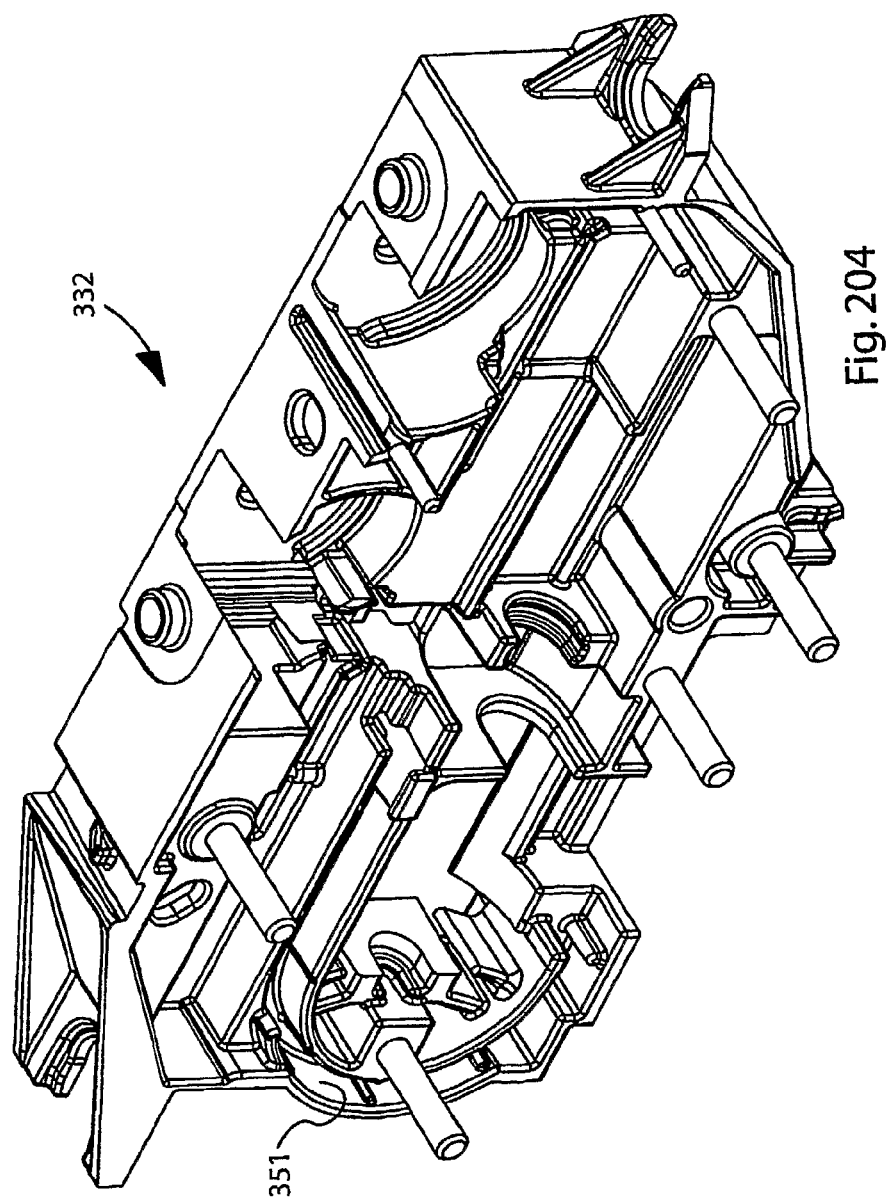
Figure 205:
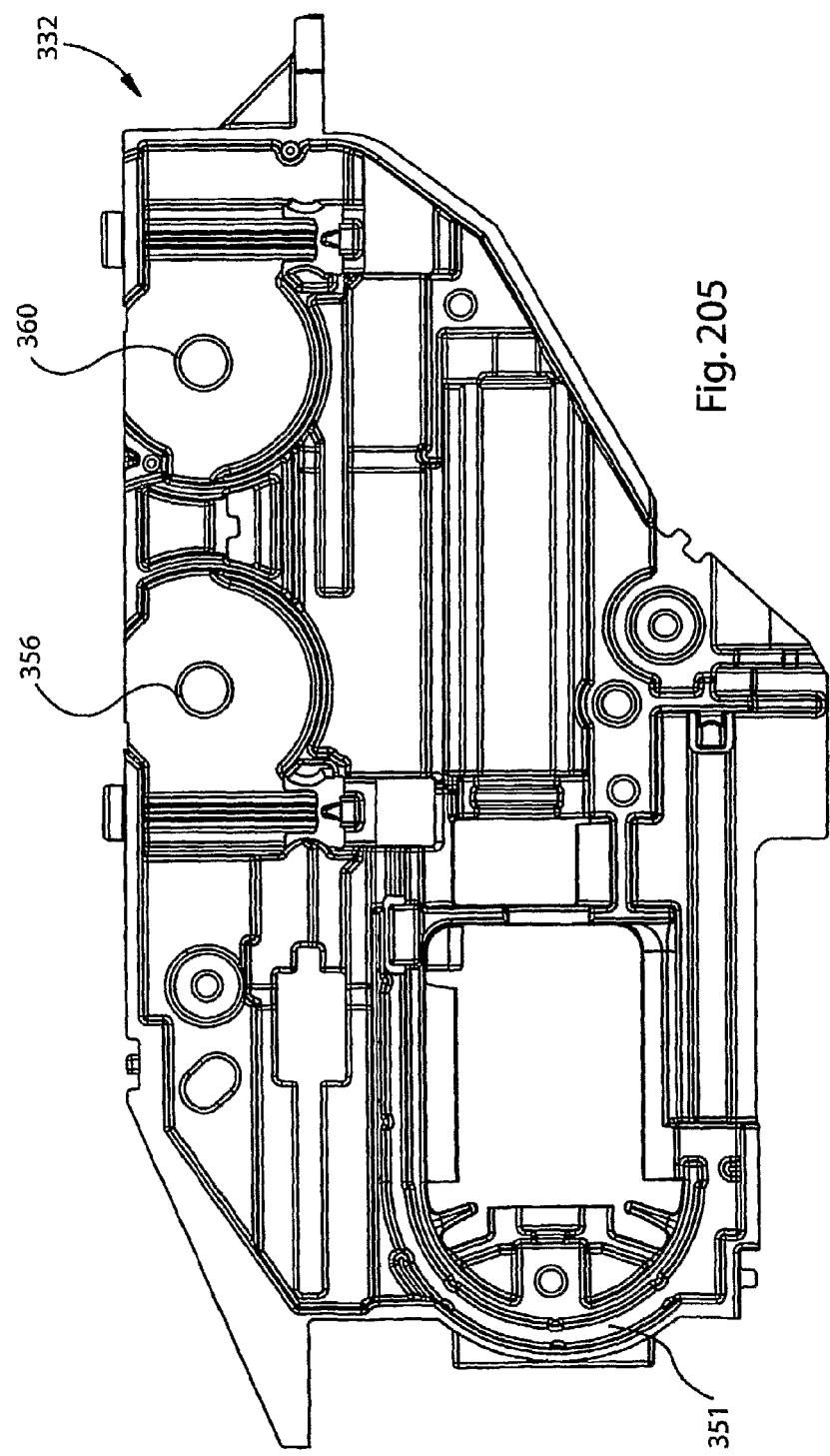
Figure 207:
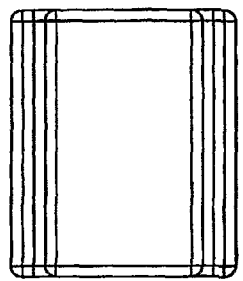
Figure 210:
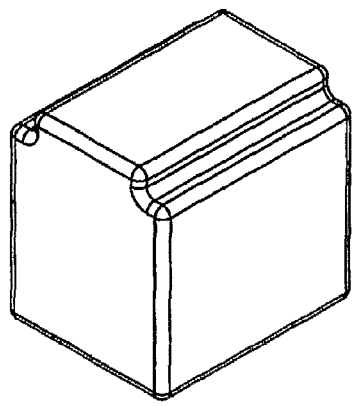
Figure 208:
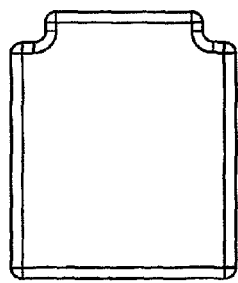
Figure 209:
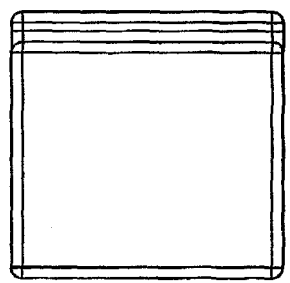
Figure 206:
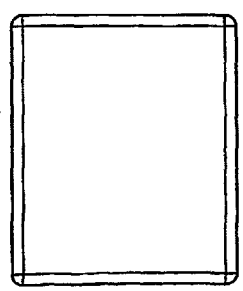
Figure 213:
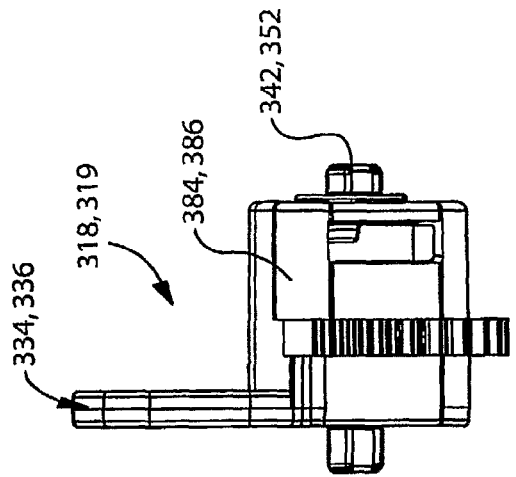
Figure 212:
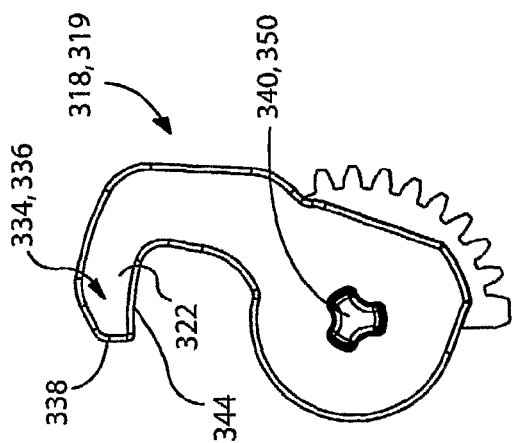
Figure 211:
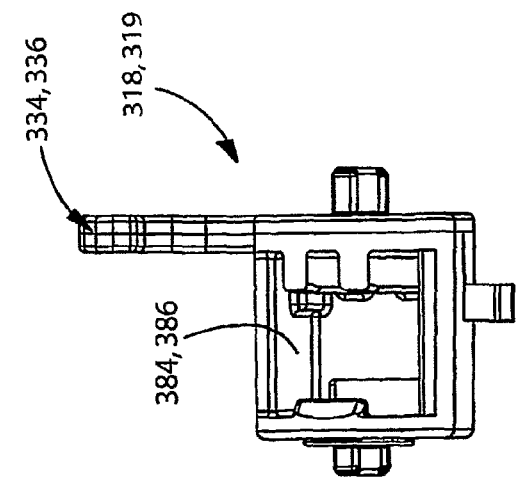
Figure 216:
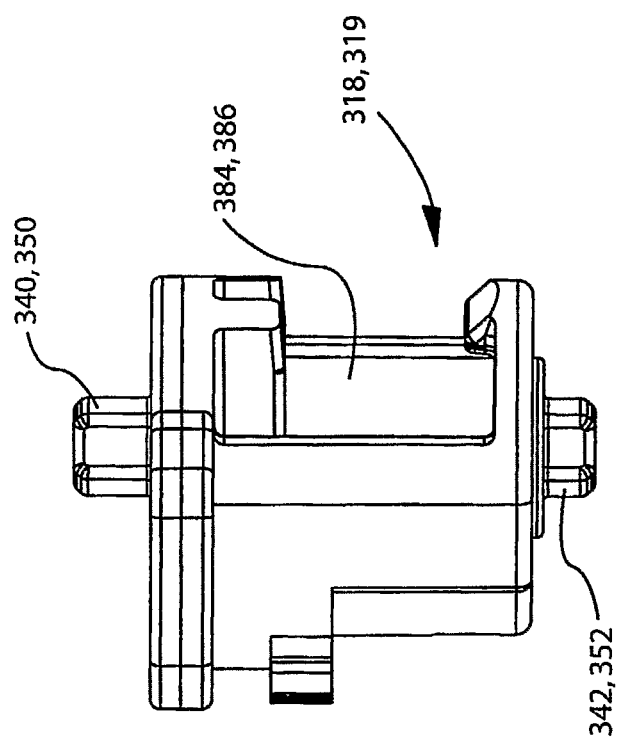
Figure 223:
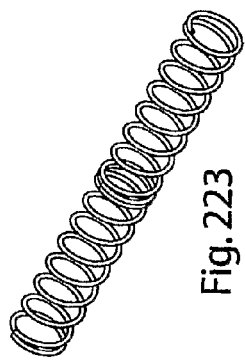
Figure 227:
Figure 224:
Figure 226:
Figure 228:
Figure 225:
Figure 231:
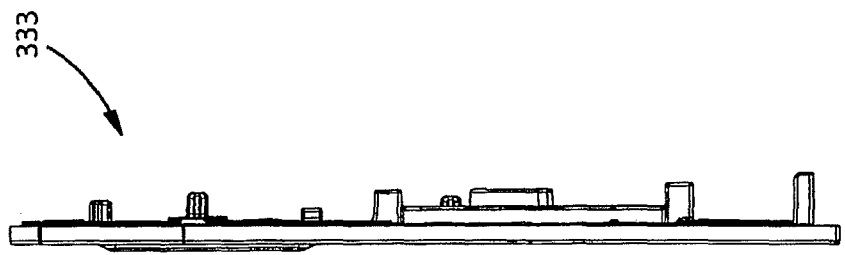
Figure 230:
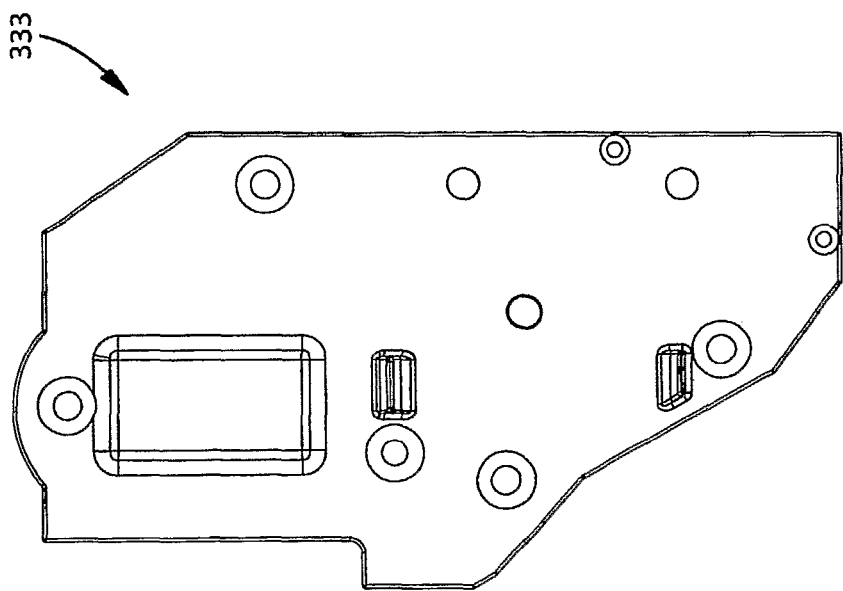
Figure 229:
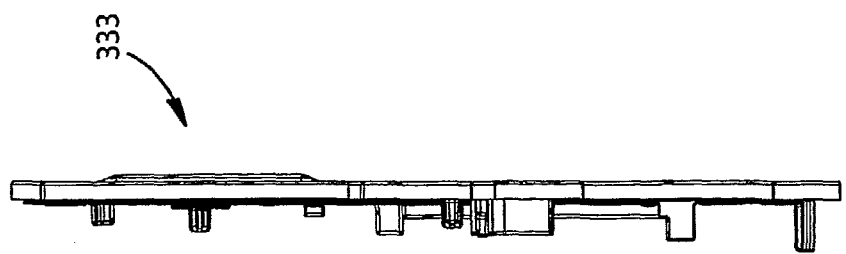
Figures 232, 233:
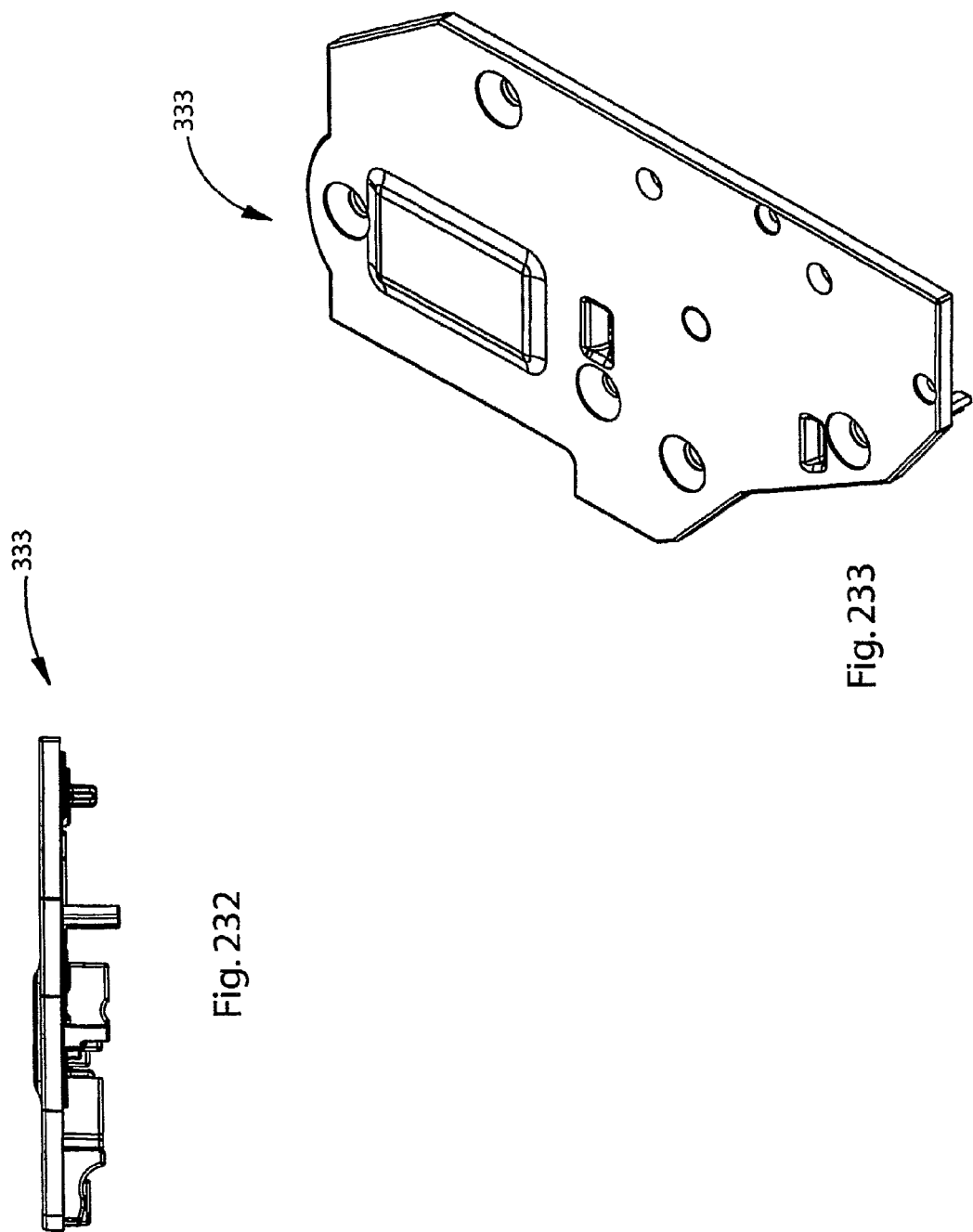
Figure 235:
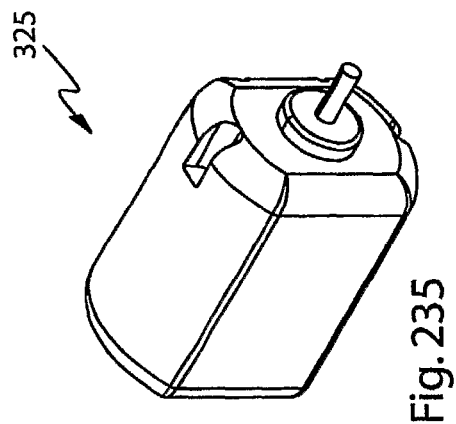
Figure 237:
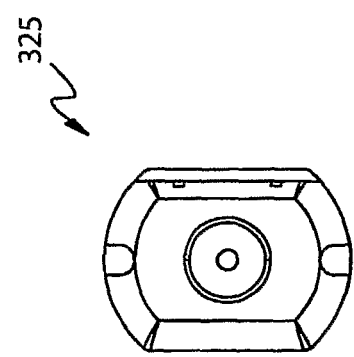
Figure 234:
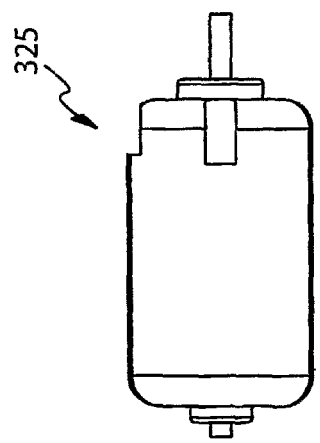
Figure 236:
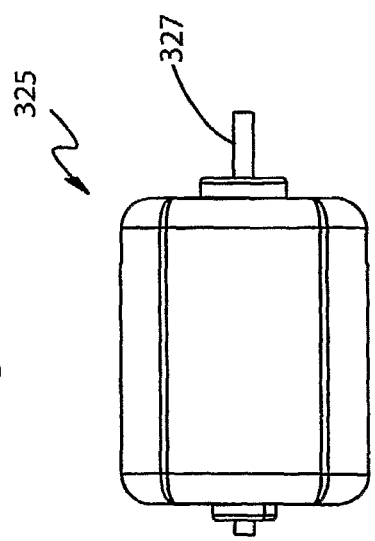
Figure 239:
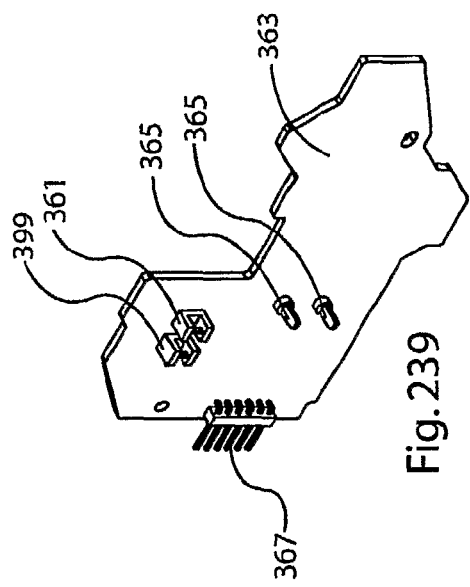
Figure 241:
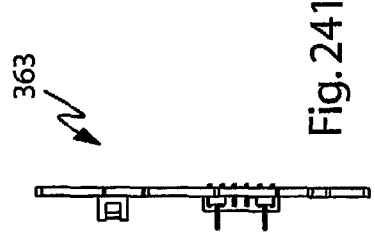
Figure 238:
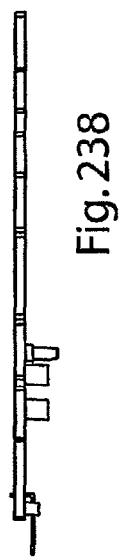
Figure 240:
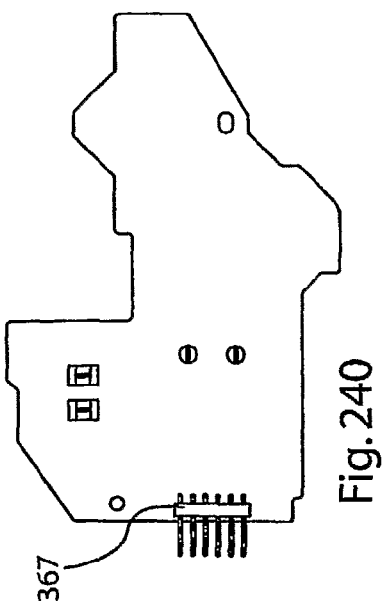
Figure 242:
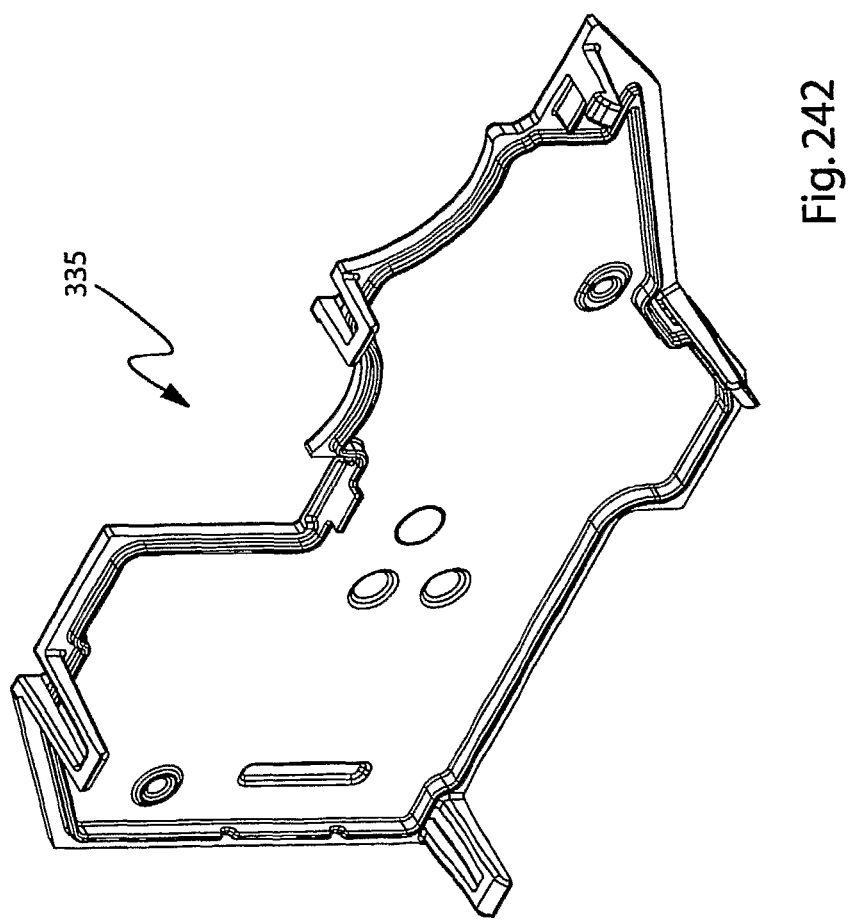
Figure 245:
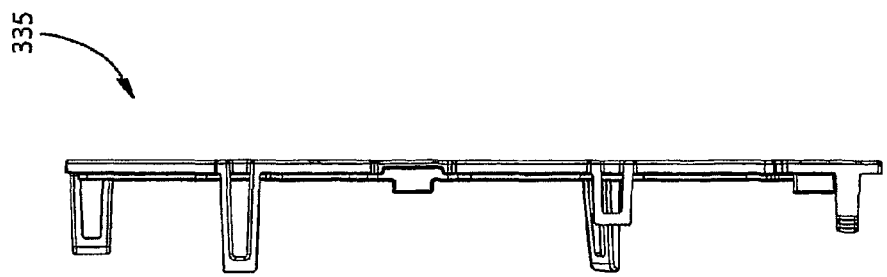
Figure 244:
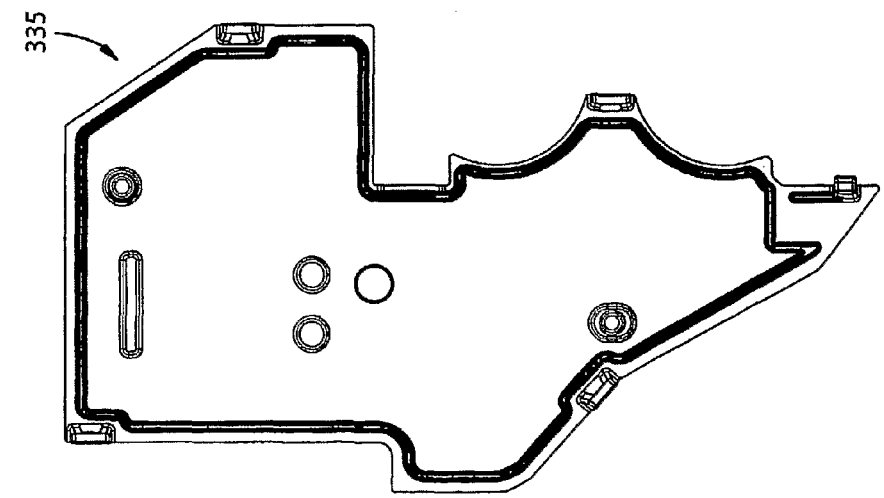
Figure 243:
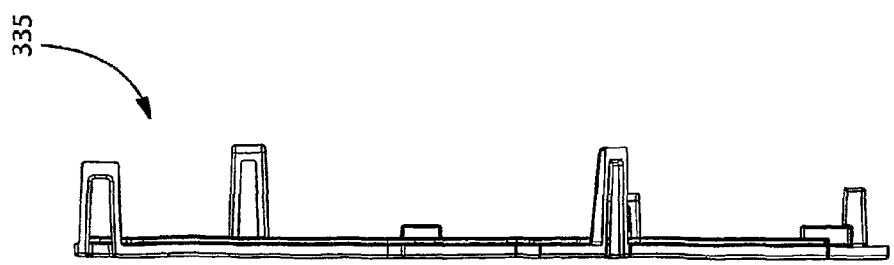
Figure 246:
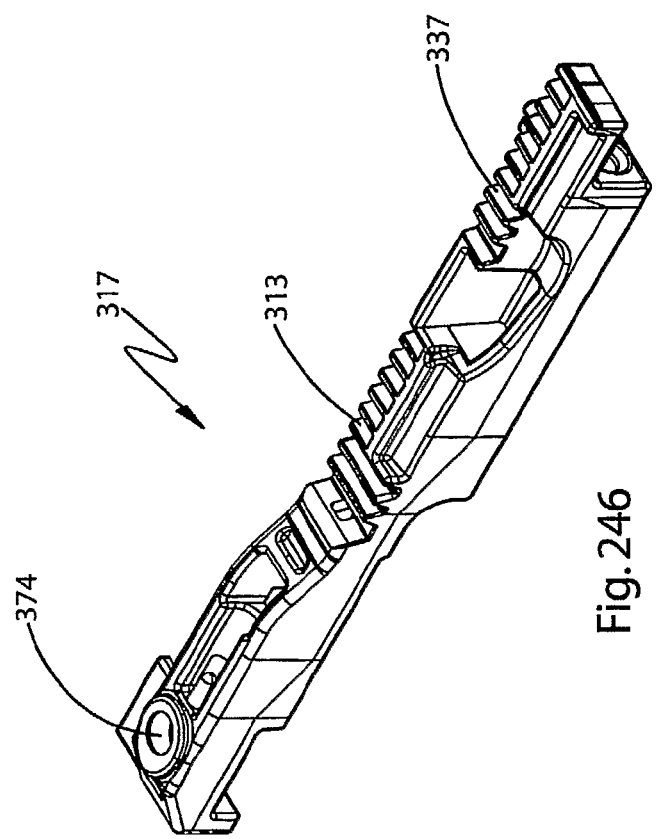
Figure 248:
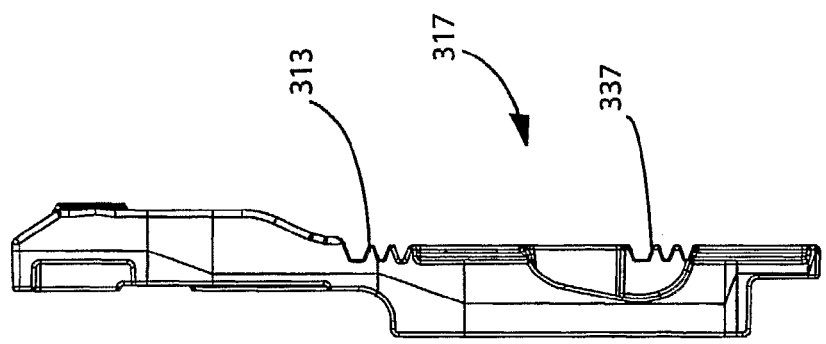
Figure 247:
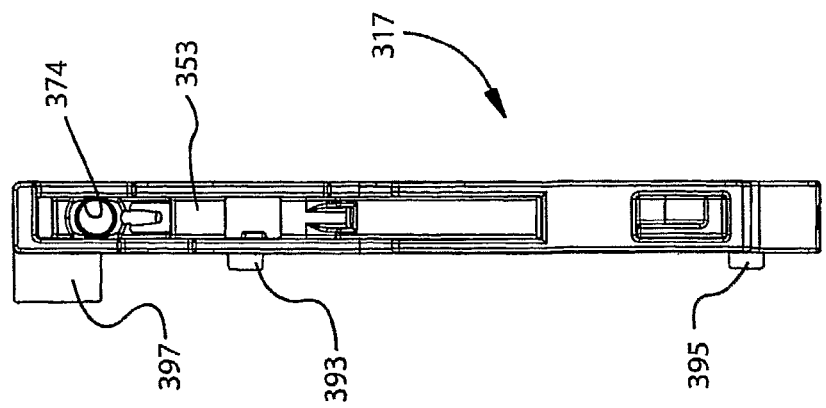
Figure 249:
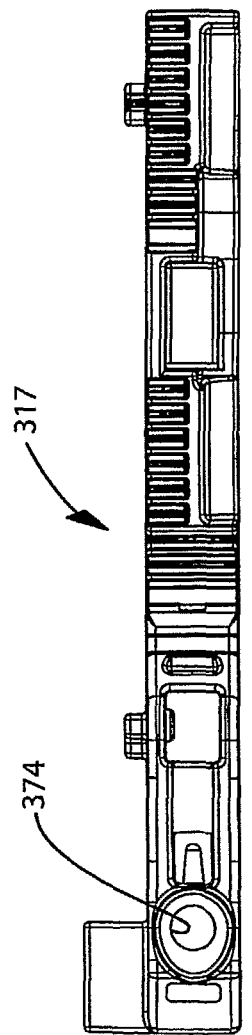
Figure 252:
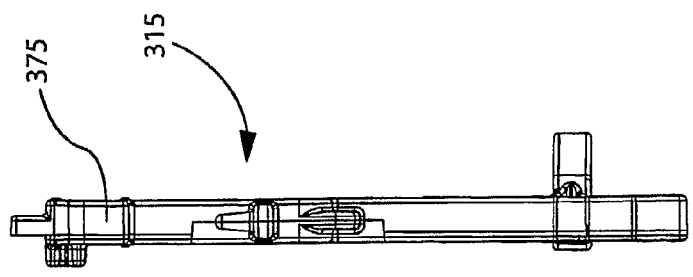
Figure 251:
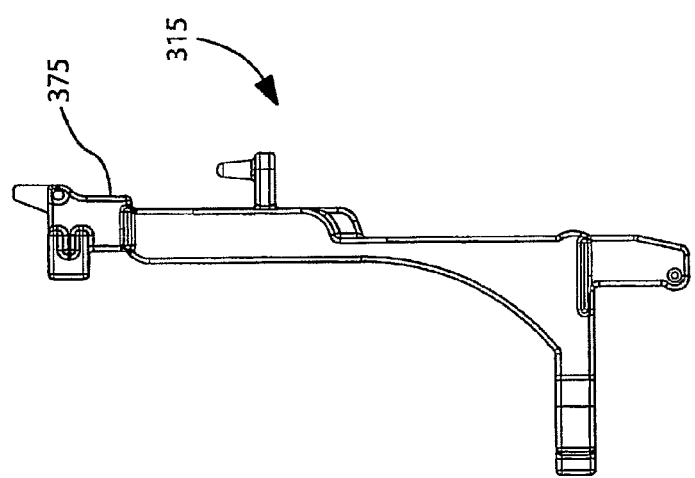
Figure 250:
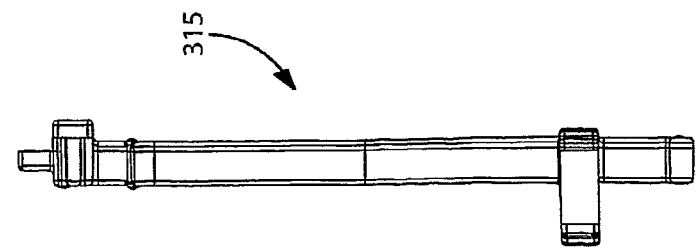
Figures 253, 254:
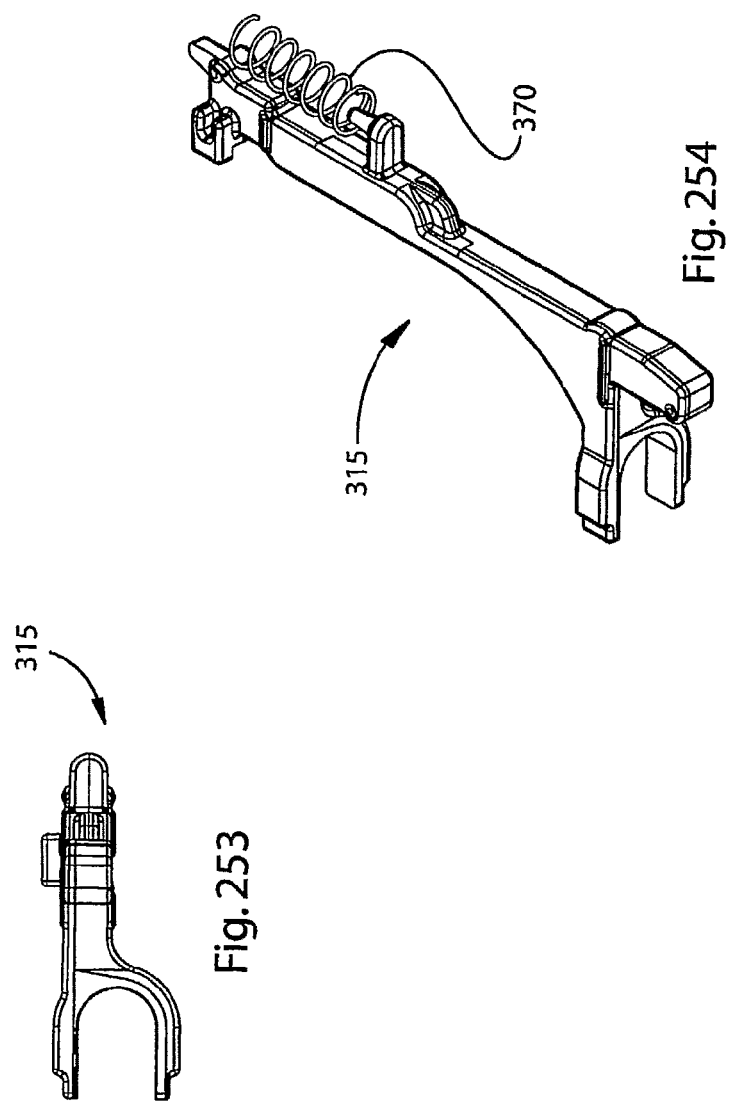
Figure 260:
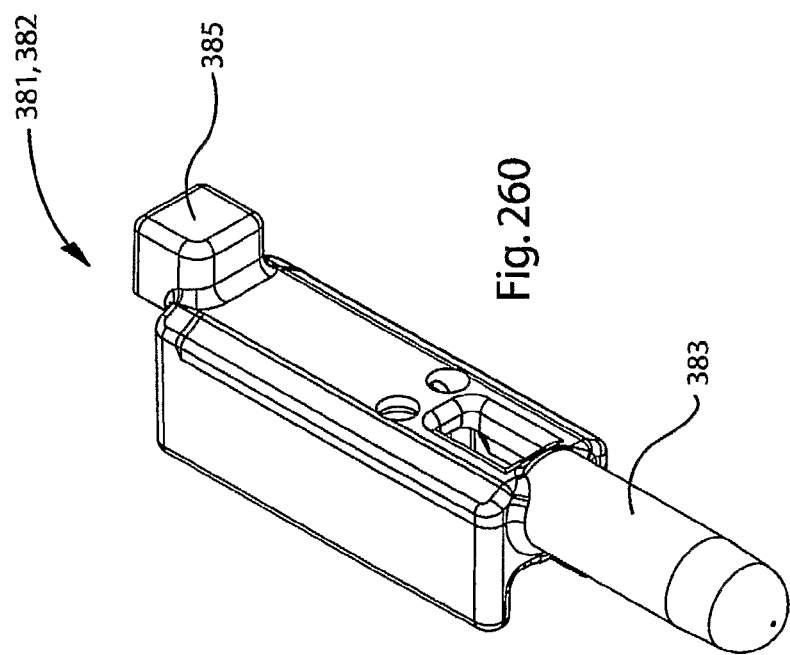
Figure 259:
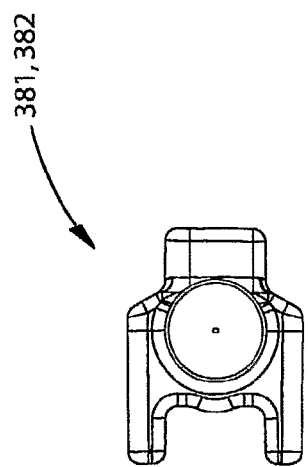
Figure 262:
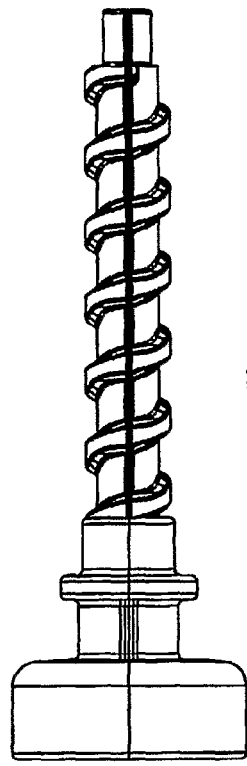
Figure 263:
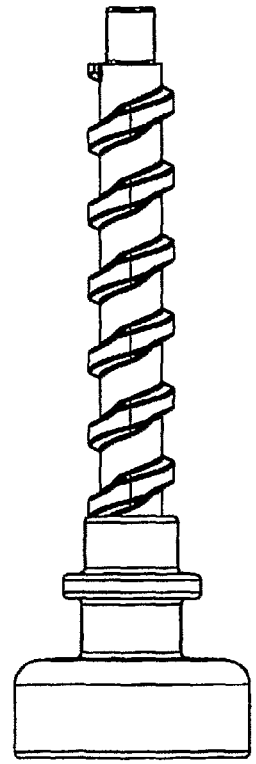
Figure 261:
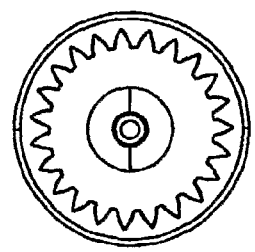
Figure 265:
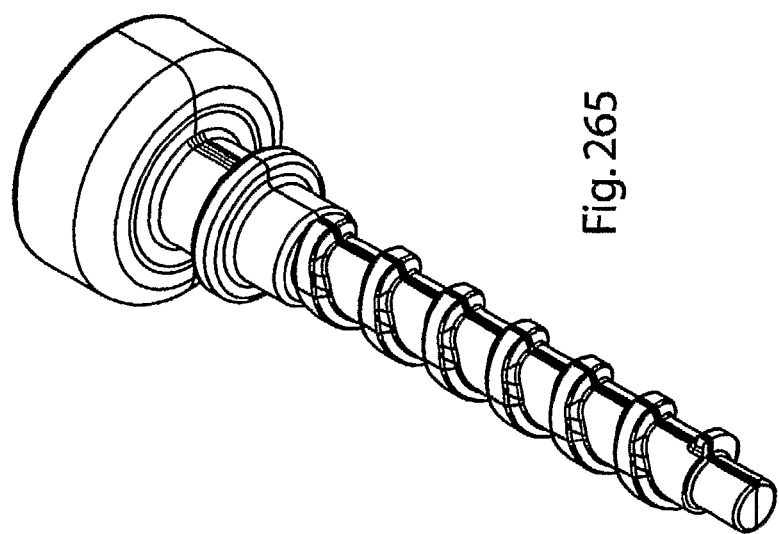
Figure 264:
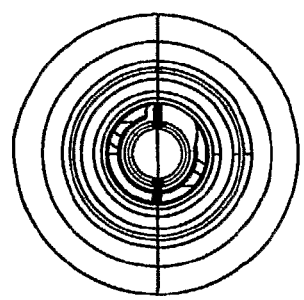
Figure 267:
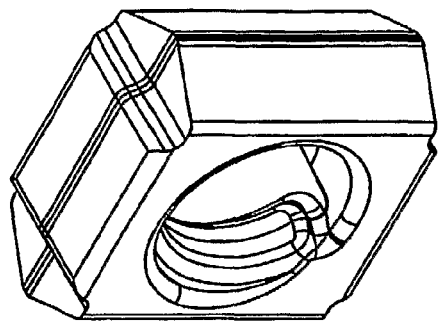
Figure 269:
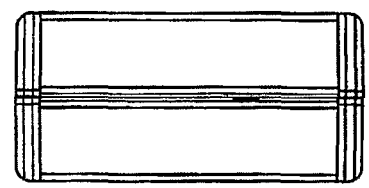
Figure 266:
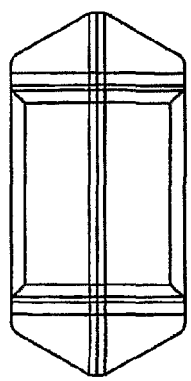
Figure 268:
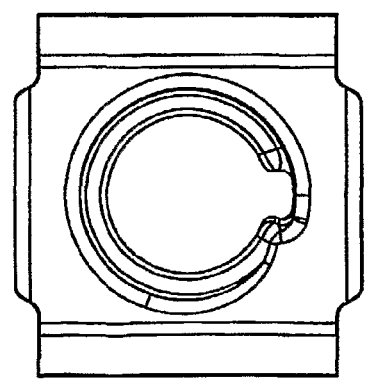
Figure 270:
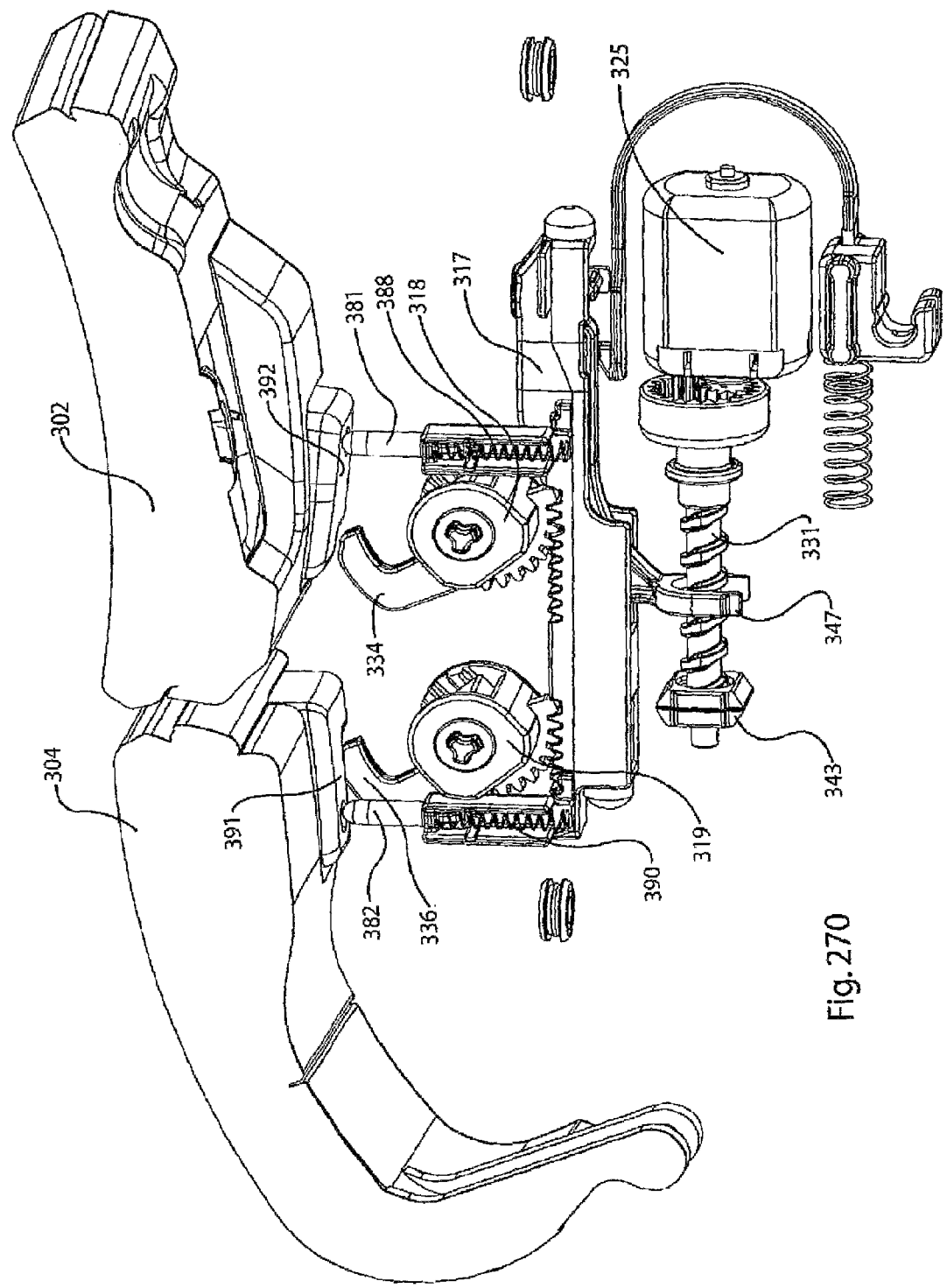
Figure 271:
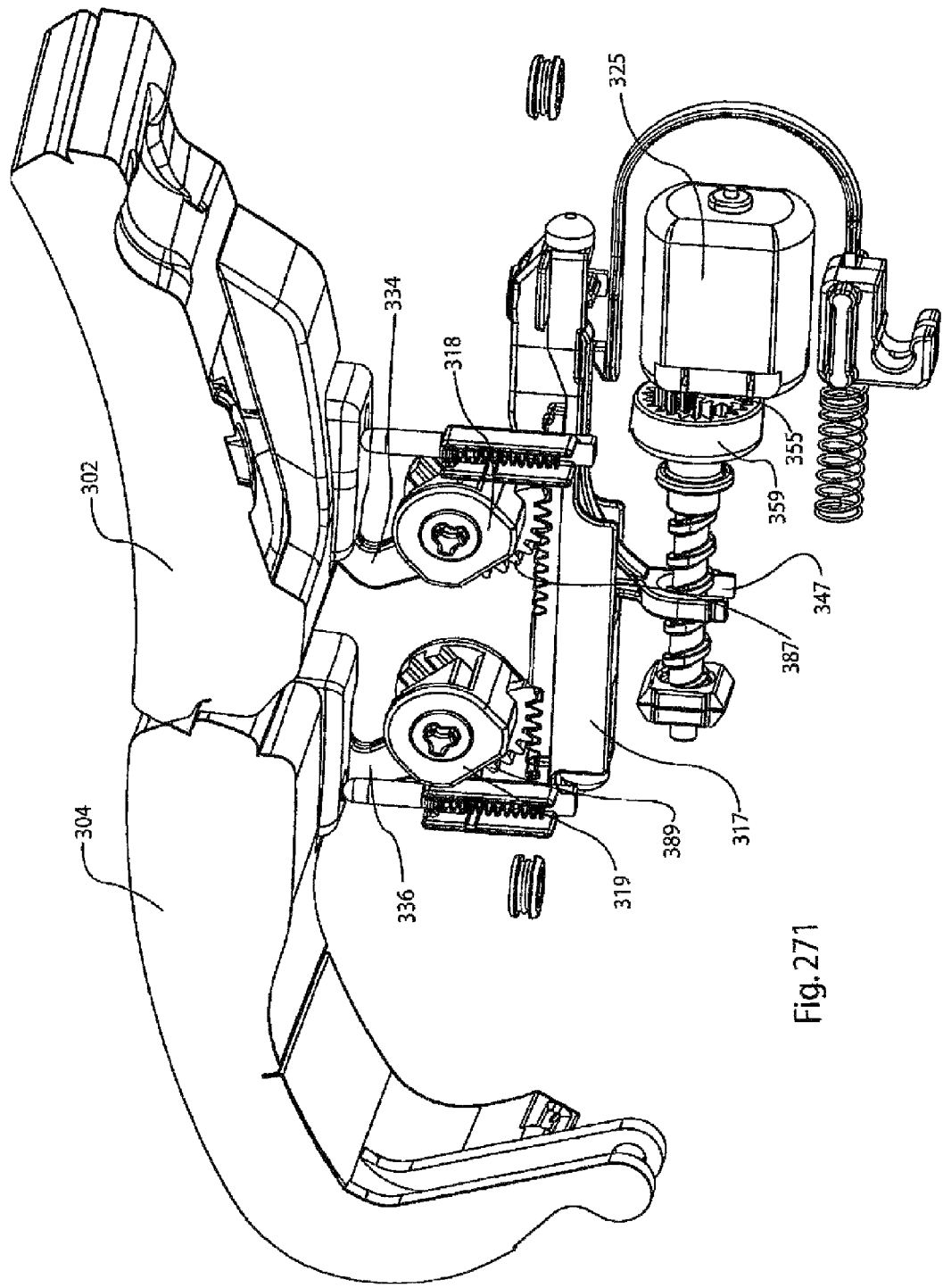
Figure 272:
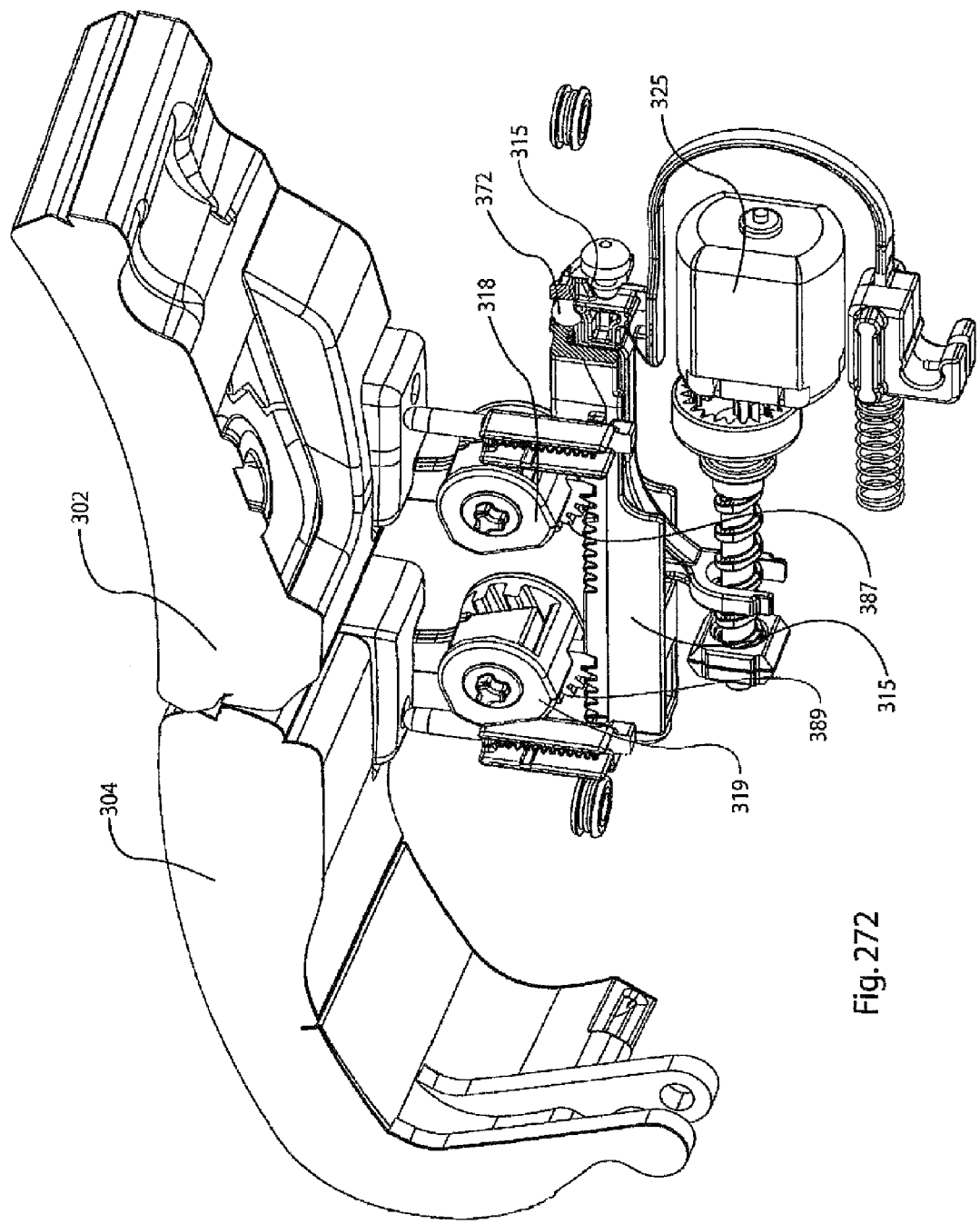
Figure 273:
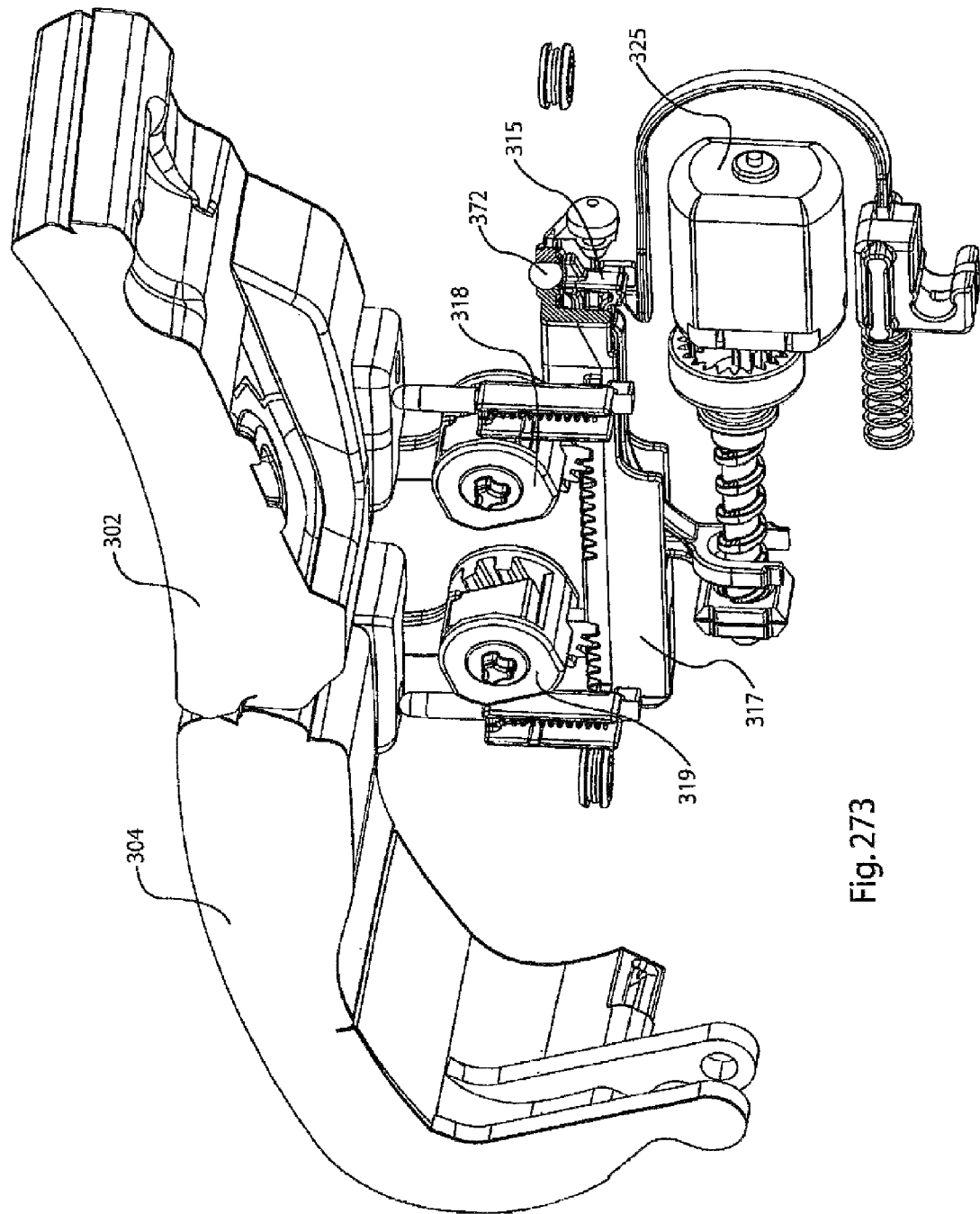
Figure 274:
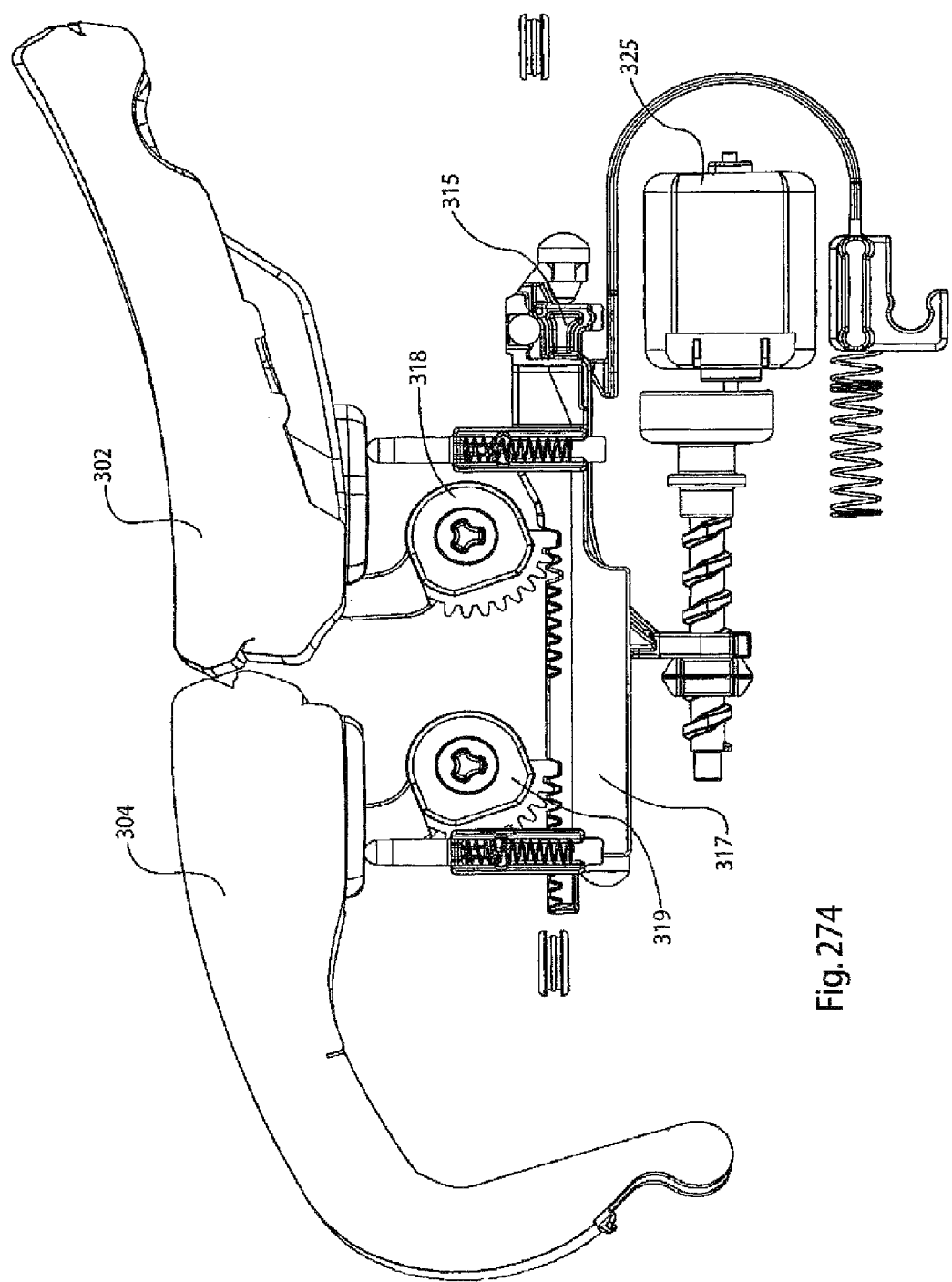
Figure 275:
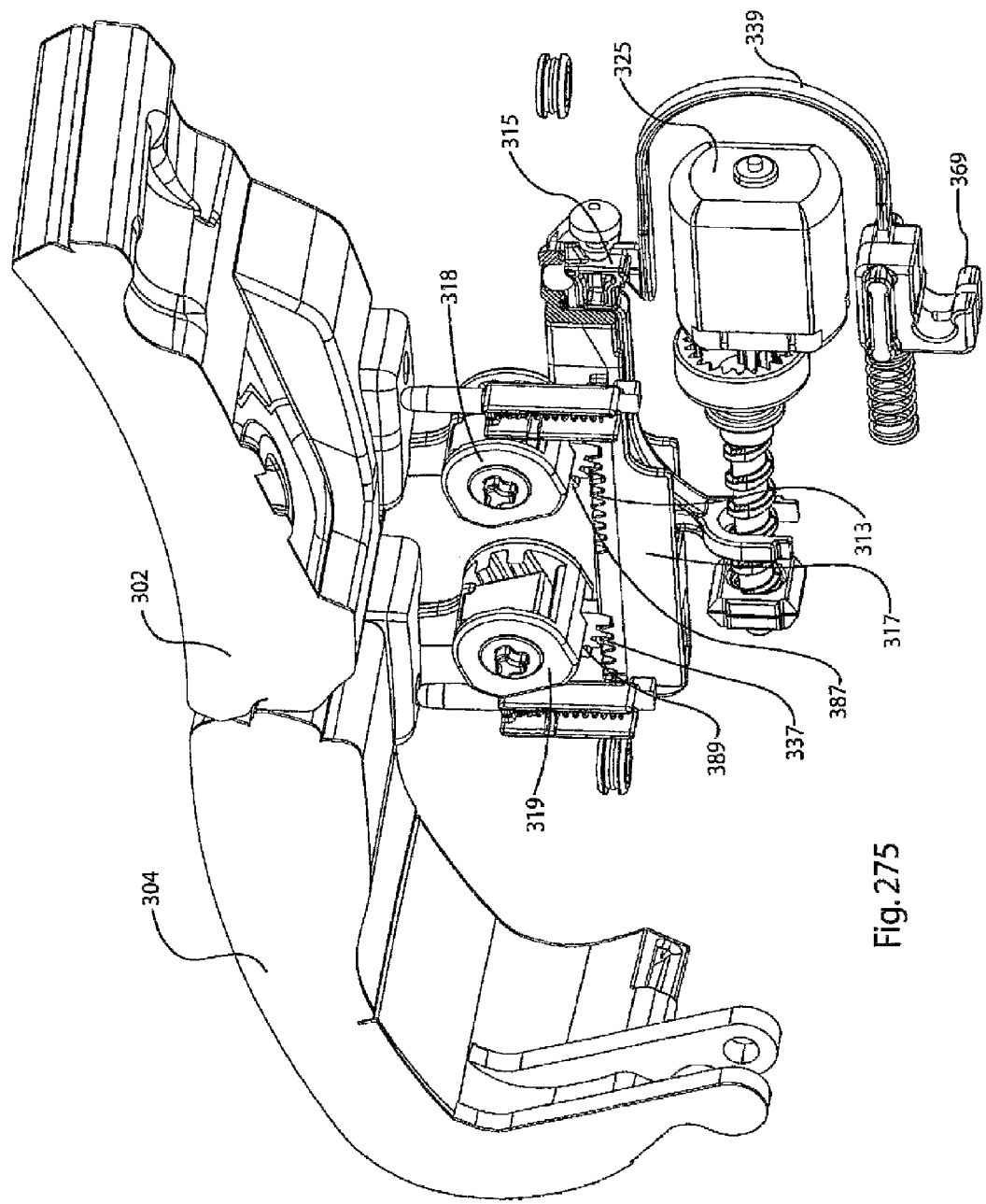
Figure 276:
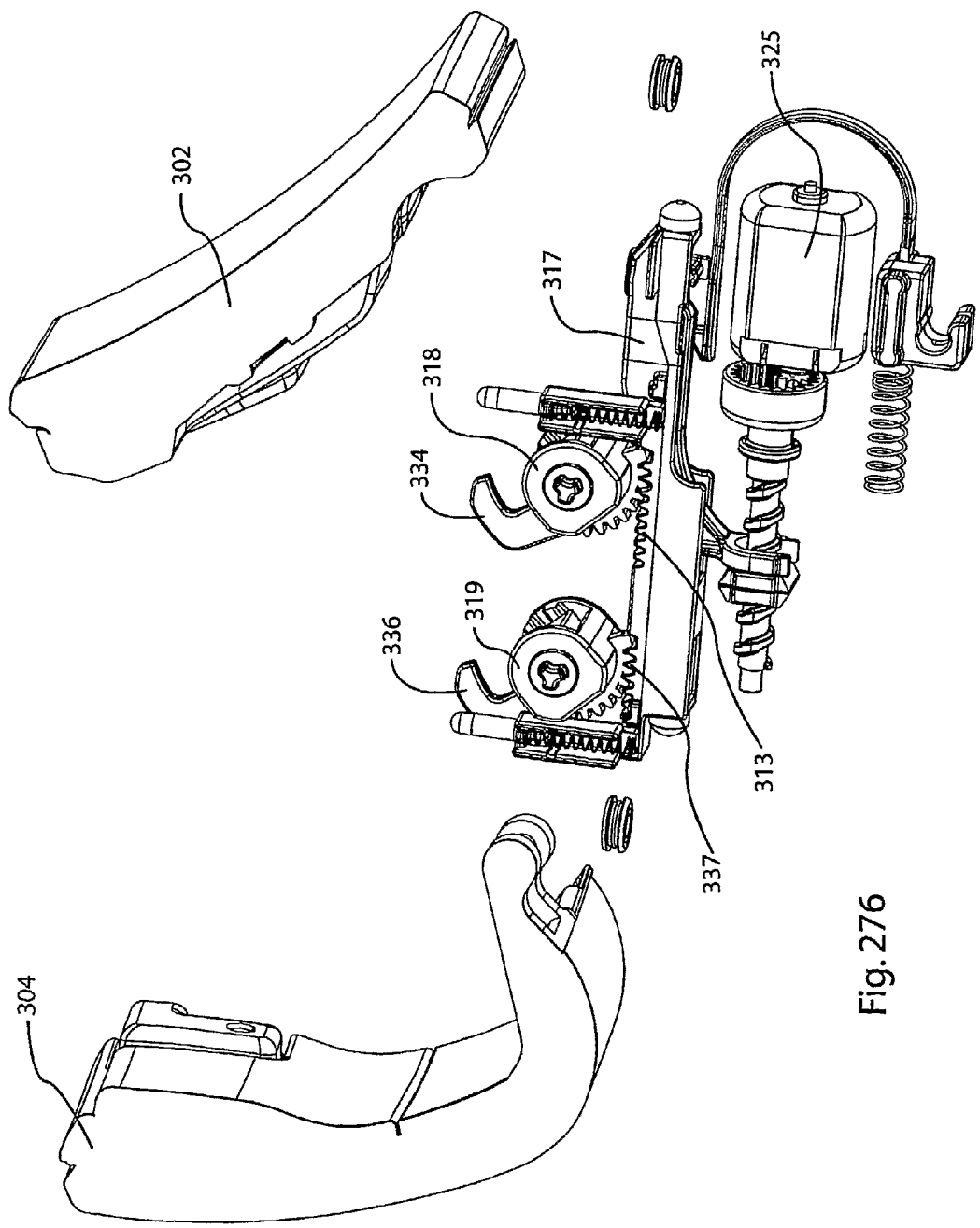
Figure 277:
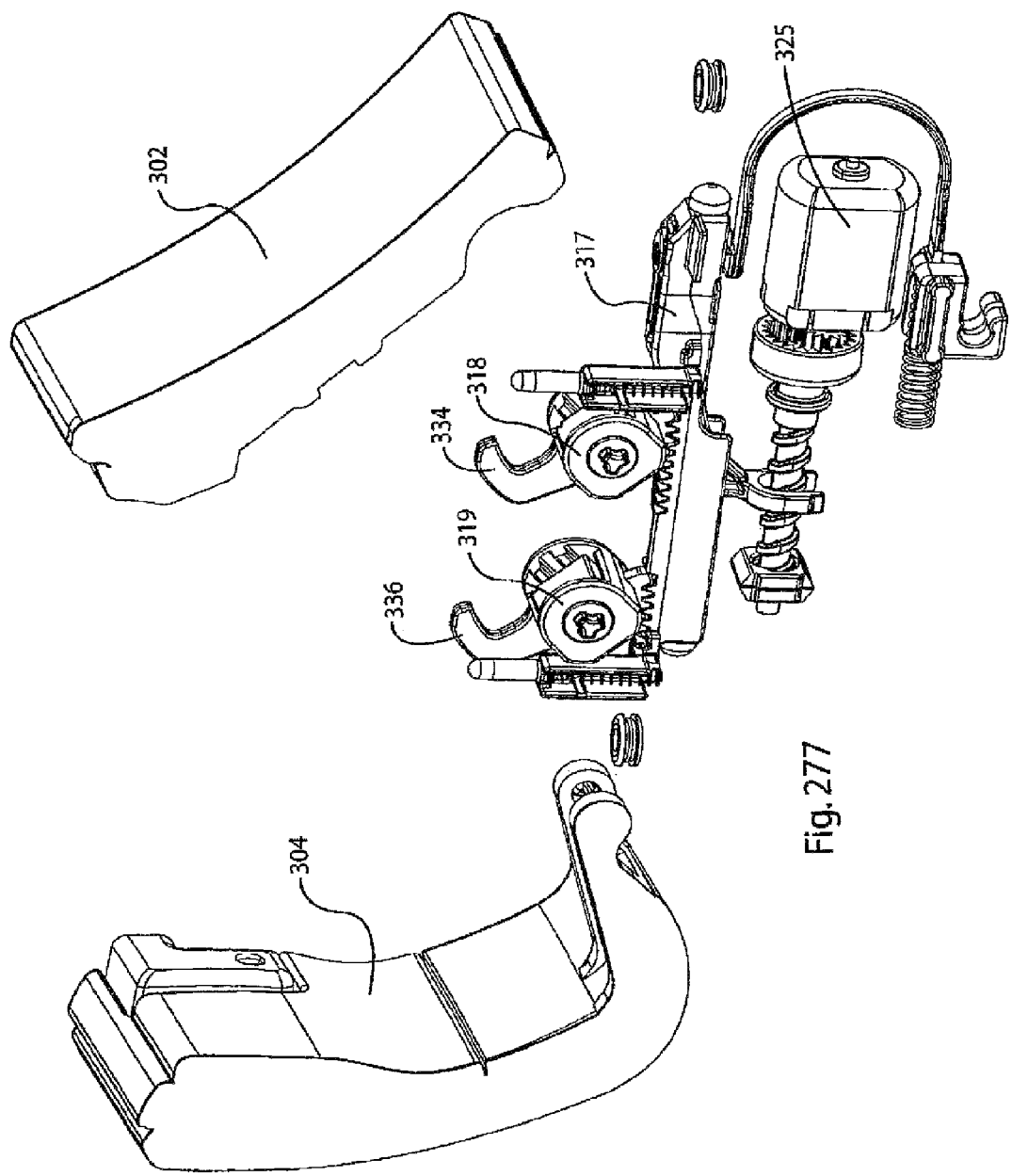
Figure 290:
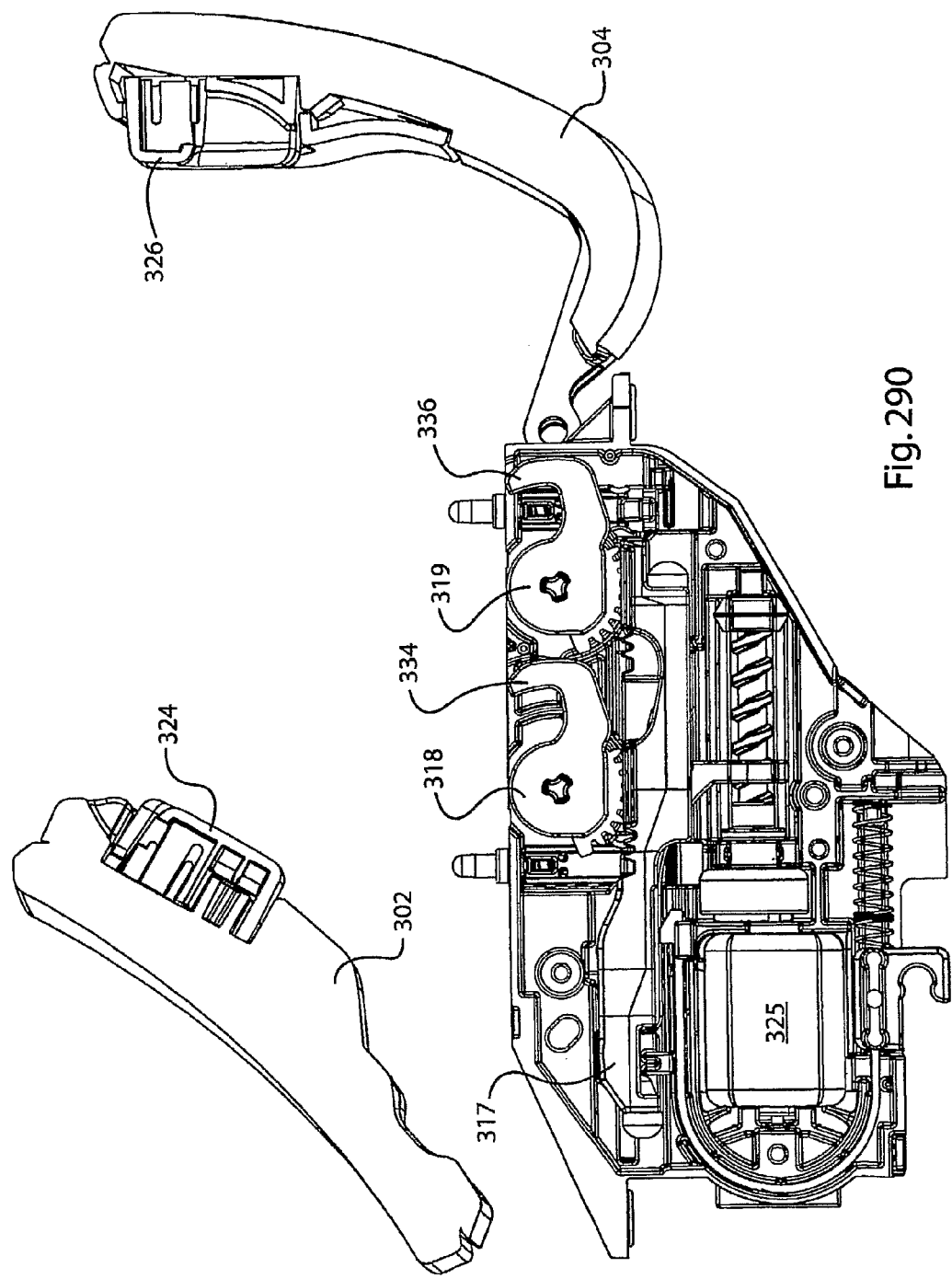
Figure 291:
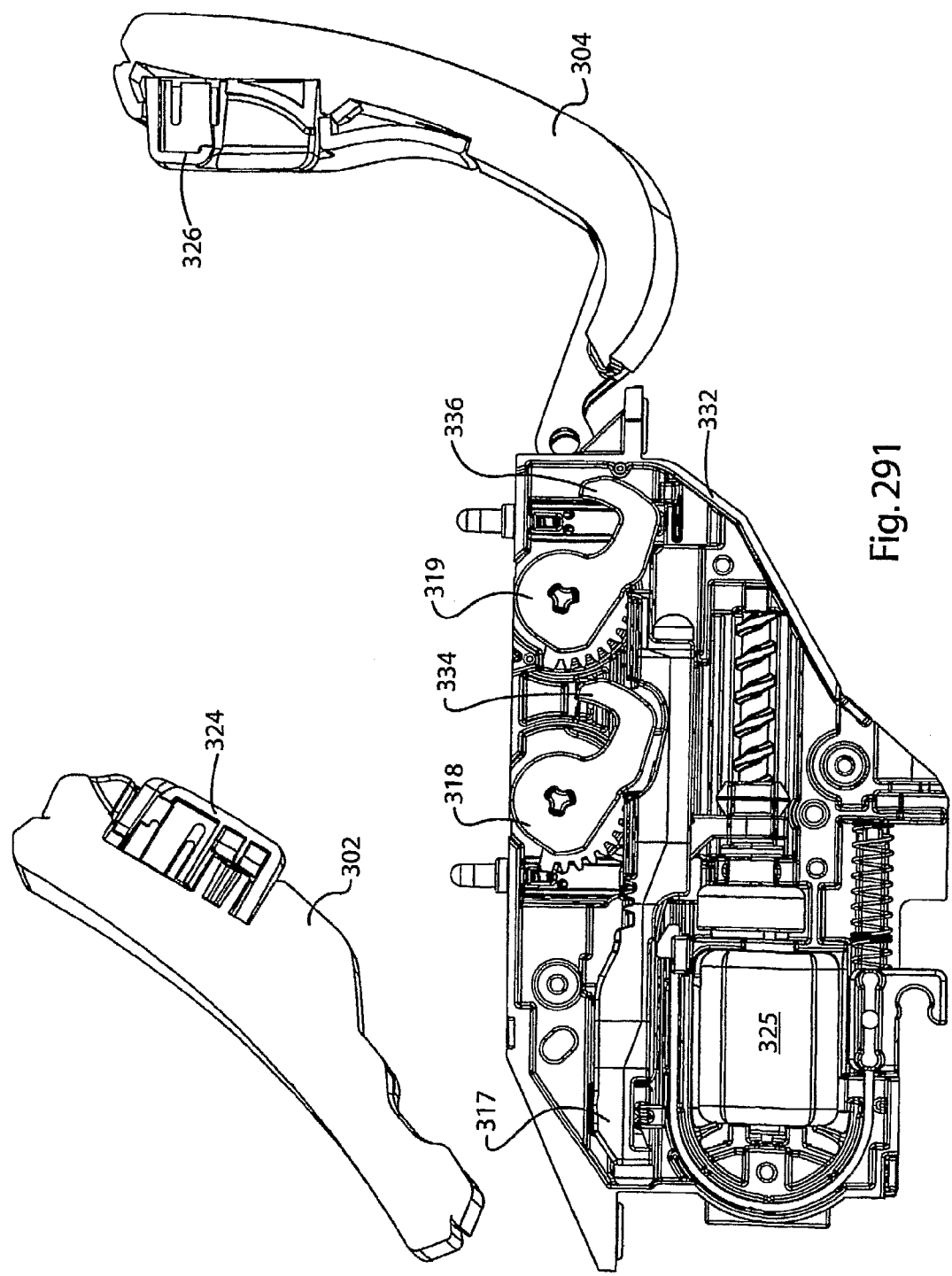
Figure 292:
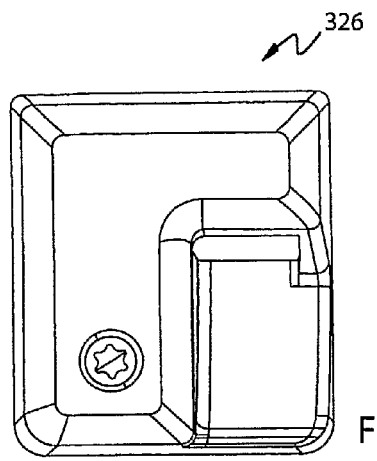
Figure 295:
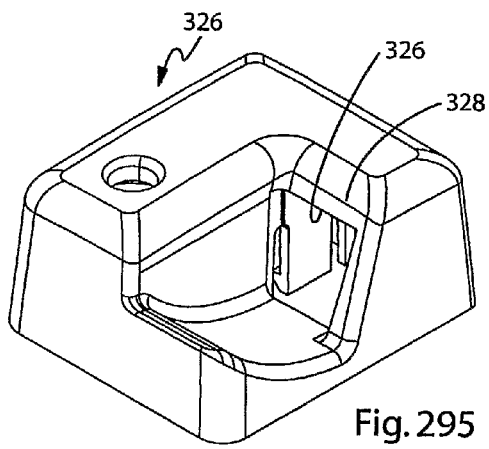
Figure 293:
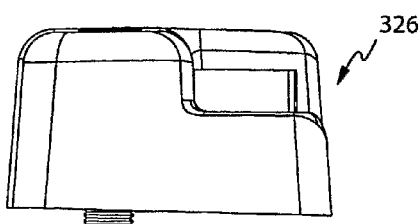
Figure 296:
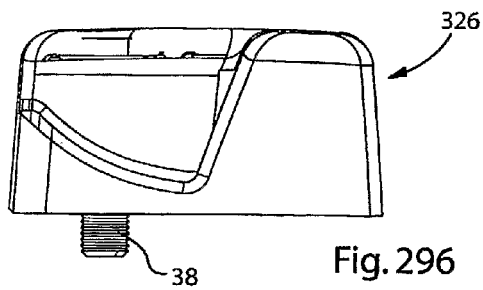
Figure 294:
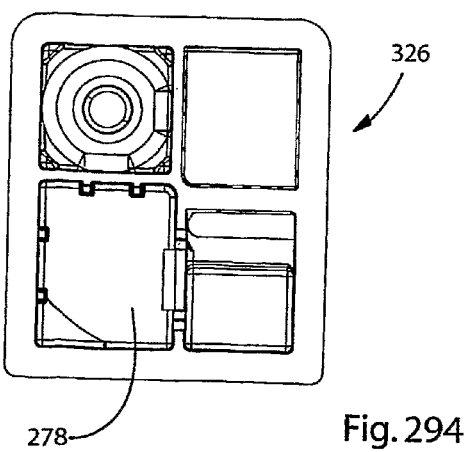

To open the latch mechanism 300 the button (not shown), for example, is pushed. This would cause the remote end of the Bowden cable 220 to be pulled by one of the mechanisms previously mentioned. The pulling of the Bowden cable 220 causes the rotation of the rotary magnets 306, 308, magnet carriers 318, 319, and hook-shaped pawls 334, 336 from their latched positions to their unlatched positions. This action disengages the hook-shaped pawls 334, 336 from their respective strikers 324, 326, which mechanically releases the doors 302 and 304. In addition, the magnets 306, 308 are rotated to their unlatched positions where these magnets repel the magnetic inserts 314, 316 attached to the doors 302, 304, forcing the doors to swing open. Once the magnets 306, 308 are clear of the influence of the magnetic field of the magnetic inserts 314, 316 and the Bowden cable 220 is released, the magnetic attraction of the north pole of one of the magnets 306, 308 for the south pole of the other one of the magnets 306, 308, or vice versa, will maintain the rotary magnets 306, 308, the magnet carriers 318, 319, and the hook-shaped pawls 334, 336 in first intermediate positions (corresponding to the open but un-actuated, at rest, condition of the magnetic latch mechanism illustrated in FIGS. 177, 178, and 290) near their unlatched positions ready for latching the doors 302, 304 as the doors 302, 304 move to the closed position. In the illustrated embodiment, the magnetic attraction of the north pole of the rotary magnet 306 for the south pole of the rotary magnet 308 maintains the rotary magnets 306, 308, the magnet carriers 318, 319, and the hook-shaped pawls 334, 336 in their first intermediate positions.

To close the doors 302, 304, one of the doors 302, 304 is pushed closed. This action pulls the other door shut through the mechanical linkage between the doors (not shown), however, one door will sometimes lag behind the other due to the free play of the linkage. Once the doors 302, 304 are almost closed the rotary magnets 306, 308, the magnet carriers 318, 319, and the hook-shaped pawls 334, 336 will begin to rotate toward their latched positions under the influence of the magnetic field of the magnetic inserts 314, 316, such that they will be in a second intermediate position nearer their latched positions. At this point the strong magnetic attraction between the magnetic inserts 314, 316 and their respective rotary magnets 306, 308 causes the lagging door to accelerate such that both doors close simultaneously, and the rotary magnets 306, 308 and the hook-shaped pawls 334, 336 simultaneously rotate to their latched positions. At this point the hook-shaped pawls 334, 336 engage the strikers 324, 326 and there is strong magnetic attraction between the magnetic inserts 314, 316 and their respective rotary magnets 306, 308. Accordingly, both doors are held in the closed position mechanically and magnetically. This condition is illustrated in FIGS. 282-286. Thus, the magnetic latch mechanism 300 provides a latching system that tolerates the free play of the mechanical linkage of the doors 302, 304 and the positional difference between the doors near closing, but still closes the doors flush and simultaneously. In addition, at this time the ball bearing 372 engages the recess 373 in the housing 332 such that the rack bar 317 is locked in place and cannot move unless the sliding bar 315 is moved to the unlocked position.

If the lag between the doors 302, 304 is great enough, one door may close completely, causing both rotary magnets 306, 308 and both hook-shaped pawls 334, 336 to move to their respective latched positions, before the lagging door reaches its closed position. In such an event, the ball bearing 372 would lock the rack bar 317 and consequently the hook-shaped pawls 334, 336 in the latched position. The striker of the lagging door will collide with the top of the respective hook-shaped pawl and the lagging door cannot move to the fully closed position. To prevent this outcome the control pins 381 and 382 are provided. Each of the control pins 381 and 382 is in the form of an elongated shaft 383 having a projecting lug 385 at one end thereof. The control pins 381 and 382 are supported by the housing 332 for rectilinear movement in the direction of the longitudinal axes of the shafts 383 between extended and retracted positions. The control pins 381 and 382 are spring biased toward the extended position by springs 388 and 390, respectively. The strikers 324, 326 are each provided with a portion or pad 391 and 392, respectively, that engage and move the respective control pin 381, 382 to the retracted position when the corresponding door 302, 304 is moved to the fully closed position.

With the control pins 381, 382 in the retracted position, the rack bar 317 is free to move between the latched and unlatched positions. The rack bar 317 is provided with tabs 393 and 395 each of which is engaged by the lug 385 of a respective control pin 381, 382 when the rack bar 317 is in a second intermediate position corresponding to the partially closed configuration of the magnetic latch mechanism and the nearly latched position of the hook-shaped pawls 334, 336 shown in FIG. 28D. Each of the tabs 393, 395 has a side that is perpendicular to the direction of the rectilinear motion of the rack bar 317. When either control pin 381, 382 is in the extended position its respective lug 385 is positioned to block the respective tab 393, 395 such that it prevents movement of the rack bar 317 from the second intermediate position, which is near the latched position, to the latched position by engagement of the lug 385 with the side of the tab that is perpendicular to the direction of rectilinear motion of the rack bar 317. Therefore, when either one or both of the doors 302, 304 is out of the fully closed position its respective control pin will prevent movement of the rack bar 317 to the latched position where it can be locked in place by the engagement of the ball bearing 372 with the recess 373, and the situation wherein the striker of the lagging door 302, 304 collides with the corresponding hook-shaped pawl 334, 336 with the rack bar 317 locked in the latched position will be avoided.

In the nearly latched or the second intermediate position the hook-shaped pawls 334, 336 can be pushed out of the way of the strikers 324, 326 as previously described and allow the lagging door to move to the closed position whereupon the control pins 381, 382 will both be in the retracted position and both hook-shaped pawls and rotary magnets can move to their latched positions to secure both doors in the closed position. The leading door will remain closed due to magnetic attraction until the lagging door is fully closed. It should be evident from the relative proportions of the hook-shaped pawls and their respective strikers, that the movement, if any, of the rotary magnets during the closing of the lagging door will be slight enough such that a strong enough attraction exists at all times during the closing of the lagging door between the striker of the lagging door and the respective rotary magnet to accomplish the closing of the lagging door as just described.

The magnetic latch mechanism 300 may also include a motor drive 321 for selectively moving the rack bar 317 in the direction of its longitudinal axis between the latched position and the unlatched position. Thus the motor drive 321 serves the same function as the Bowden cable 220 and is provided as an adjunct system to the Bowden cable 220 for use in applications where, for example, the motor drive 321 is provided to allow the magnetic latch mechanism 300 to be electrically actuated while the Bowden cable provides a manual override. It is also possible for the Bowden cable 220 to be electrically actuated for applications where a redundant electrical actuation system is desirable.

The motor drive 321 includes a motor 325 that has an output shaft 327 that is coupled to the drive screw 331. The drive screw 331 is rotationally supported by the housing 332. The drive screw 331 has at least one male helical thread that is in engagement with a matching female groove or thread in a bore formed in the slider 343. The male helical thread of the drive screw 331 may be continuous or interrupted as in the illustrated embodiment. The slider 343 is supported for rectilinear motion by the housing 332 in response to the rotation of the drive screw 331. The slider 343 engages a fork 347 of the sliding bar 315 that straddles the drive screw 331 to move the sliding bar 315 to the unlocked position and then to rectilinearly move the sliding bar 315 and the rack bar 317 such that the rack bar 317 is moved to the unlatched position.

The coupling between the motor 325 and the drive screw 331 comprises a pinion gear 355 fixed to the output shaft 327 that is in mesh with the internal gear teeth of the ring gear 359 that is fixedly attached to one end of the drive screw 331. The drive screw 331 and the ring gear 359 are attached such that they rotate as a unit and may be of one-piece construction. This arrangement reduces the torque output required of the motor 325.

With the rack bar 317 in the latched position and the sliding bar 315 in the locked position the fork 347 of the sliding bar 315 will be positioned near the slider 343 located distally from the motor 325. This is the latched position of the slider 343. When the motor 325 is energized it causes rotation of the drive screw 331. Rotation of the drive screw 331 in this first direction causes rectilinear motion of the slider 343 and brings it into engagement with the fork 347. Continued rotation of the drive screw 331 will cause continued rectilinear motion of the slider 343 toward the motor 325, which in turn will cause the rectilinear movement of the sliding bar 315 from the locked position to the unlocked position. This initial movement of the sliding bar 315 frees the rack bar 317 for movement to the unlatched position. The range of motion of the sliding bar 315 from the locked position to the unlocked position is relatively limited, and further rotation of the drive screw 331 will cause continued rectilinear motion of the slider 343 toward the motor 325, which in turn will cause the rectilinear movement of both the sliding bar 315 and the rack bar 317 together such that the rack bar 317 is moved from the latched position to the unlatched position. Consequently, the rotary magnets 306, 308, magnet carriers 318, 319, and hook-shaped pawls 334, 336 are caused to rotate from their latched positions, assuming them to initially be in the latched position, to their unlatched positions. The slider 343 will then be in its unlatched position. Movement of the rack bar 317 and the magnet carriers 318, 319 to their unlatched positions in turn allows opening of the doors 302, 304.

Once the unlatching operation is complete, using appropriate control circuitry and software, the current to the motor 325 is reversed to rotate the drive screw 331 in a second direction that is the reverse of the first direction and return the slider 343 to its latched position ready to repeat the latching cycle again. Returning the slider 343 to its latched position, disengages the slider 343 from the fork 347, and the magnetic attraction of the north pole of one of the magnets 306, 308 for the south pole of the other one of the magnets 306, 308, or vice versa, will maintain the rotary magnets 306, 308, the magnet carriers 318, 319, and the hook-shaped pawls 334, 336 in the first intermediate positions shown in FIG. 290 ready for latching the doors 302, 304 as the doors 302, 304 move to the closed position.

Also as previously described, once the doors 302, 304 are opened, the attraction between the opposite poles of the magnets 306, 308 will maintain the magnet carriers 318, 319 near their unlatched positions until the doors 302, 304 are once again moved toward their closed positions. The latch 300 will thus be ready to repeat its operating cycle the next time the doors 302, 304 are moved toward their closed positions.

A fin 397 is provided that projects from one side of the rack bar 317. In addition, sensors 399, 361 are provided on the circuit board 363 that is supported by the housing 332. The sensors 399, 361 may, for example, be of a type having a light emitting diode (LED) illuminating a photo-diode. When the rack bar 317 is in the second intermediate position, i.e. the position nearer the latched position where its movement toward the latched position may be prevented by one of the control pins 381, 382 being in the extended position, the fin 397 interrupts the illumination of the photo-diode of one of the sensors 399, 361 by the corresponding LED (not shown) such that a signal indicative of a fault condition corresponding to one of the control pins being in the extended position would be generated. This signal would in turn correspond to one of the doors 302, 304 not being properly closed, for example, due to the contents of the glove box obstructing the movement of one of the doors to the closed position. The signal is supplied to the control circuit or printed circuit board (PCB) 363 controlling the operation of the magnetic latch mechanism. The control circuit is microprocessor based and is programmable. The control circuit can be programmed such that if the signal indicating that one of the doors 302, 304 is ajar persists for a time period that equals or exceeds a predetermined time limit, then the control circuit energizes the motor 325 to open the doors 302, 304, thus prompting the user, i.e. the occupant of the vehicle, to close the doors again and ensure that this time the doors are closed properly.

The circuit board 363 also carries prongs 365 that plug into the motor 325 to supply power to the motor 325. The circuit board 363 also carries a jack 367 for connection of power supply and signal lines.

When the rack bar 317 is in the latched position, the fin 397 interrupts the illumination of the photo-diode of both of the sensors 399, 361 by their corresponding LEDs such that a signal indicative of the doors 302, 304 being closed would be generated. This signal will cause the circuit board 363 to enter a sleep mode until receiving the next signal to open the doors.

When the rack bar 317 is in the unlatched position, the illumination of the photo-diode of neither of the sensors 399, 361 by their corresponding LEDs is interrupted by the fin 397, which generates a signal indicative of the doors 302, 304 being open. The circuit board 363 remains active and keeps the compartment light on until the doors are closed. After a power failure with the doors open, the circuit board 363 turns on the compartment light after powering on.

A spring 371 biases the flexible link 339 to the latched position illustrated in FIG. 175.

It is to be understood that the present invention is not limited to the embodiments described above. Furthermore, it is to be understood that the embodiments of the present invention disclosed above are susceptible to various modifications, changes and adaptations by those skilled in the art, without departing from the spirit and scope of the invention.

The invention claimed is:

1. A magnetic latch mechanism for securing a first member in a closed position relative to a second member, the first member being movable between the closed position and an open position relative to the second member, the magnetic latch mechanism comprising:
   a magnetic insert capable of attachment to the first member;
   a housing adapted for attachment to the second member;
   at least one magnet rotationally supported by said housing, said at least one magnet being rotationally movable between latched and unlatched positions, said at least one magnet being positioned when in said latched position such that with the first member in the closed position relative to the second member said at least one magnet holds the first member with said magnetic insert attached thereto in the closed position through magnetic attraction between said at least one magnet and said magnetic insert, and said at least one magnet being positioned when in said unlatched position such that with the first member in the closed position relative to the second member said at least one magnet repels said magnetic insert that is attached to the first member so as to cause the first member to move from the closed position toward an open position relative to the second member; and
   an actuation mechanism capable of selectively moving said at least one magnet from said latched position to said unlatched position responsive to an input from a user, said actuation mechanism comprising:
   gear teeth supported for rotation with said at least one magnet;
   a rack bar supported for rectilinear movement by said housing, said rack bar having a plurality of gear teeth that are capable of engaging said gear teeth that rotate with said magnet such that said magnet rotates between said latched and unlatched positions as said rack bar moves rectilinearly between its latched and unlatched positions, respectively, relative to said housing;
   a ball bearing carried by said rack bar; and
   a sliding bar supported for rectilinear movement relative to said rack bar between a locked and an unlocked position relative to said rack bar, said ball bearing being capable of movement relative to said rack bar in response to movement of said sliding bar relative to said rack bar, said ball bearing moving into engagement with said housing in order to prevent movement of said rack bar from said latched position to said unlatched position when said rack bar is in said latched position relative to said housing and said sliding bar is in said locked position relative to said rack bar, said ball bearing being capable of disengagement from said housing when said sliding bar is in said unlocked position relative to said rack bar, said rack bar moving from its latched position to its unlatched position relative to said housing in response to further rectilinear movement of said sliding bar relative to said housing.

2. The magnetic latch mechanism according to claim 1, wherein the magnetic latch mechanism further comprises:
   a striker capable of attachment to the first member;
   a hook-shaped pawl supported for rotation with said at least one magnet, said at least one magnet and said hook-shaped pawl rotating together between their latched and unlatched positions as said rack bar moves rectilinearly between its latched and unlatched positions, respectively, relative to said housing, said pawl engaging said striker to mechanically prevent the first member from being moved to the open position when said at least one magnet is in said latched position.

3. The magnetic latch mechanism according to claim 2, further comprising a motor that drives said sliding bar.

4. The latching system according to claim 2, wherein said latch housing has a U-shaped track, wherein said latch mechanism further comprises:
a flexible link movably supported by said latch housing, said sliding bar being capable of engagement by said flexible link, said flexible link including a flexible strap portion and a receptacle for attachment of said cable, said strap portion extending at least in part along said U-shaped track, said receptacle of said flexible link being engaged by said cable such that, when said cable is pulled, said sliding bar is moved to said unlocked position relative to said rack bar and said rack bar is moved toward said unlatched position as pulling of said cable is continued.

5. The latching system according to claim 1, wherein said latch housing has a U-shaped track, wherein said latch mechanism further comprises:
a flexible link movably supported by said latch housing, said sliding bar being capable of engagement by said flexible link, said flexible link including a flexible strap portion and a receptacle for attachment of said cable, said strap portion extending at least in part along said U-shaped track, said receptacle of said flexible link being engaged by said cable such that, when said cable is pulled, said sliding bar is moved to said unlocked position relative to said rack bar and said rack bar is moved toward said unlatched position as pulling of said cable is continued.

6. A magnetic latch mechanism for securing a first door and a second door in closed positions relative to a third member, the first and second doors each being movable between the respective closed position and a respective open position relative to the third member, the magnetic latch mechanism comprising:
a first magnetic insert capable of attachment to the first door;
a second magnetic insert capable of attachment to the second door;
a housing adapted for attachment to the third member;
a first magnet rotationally supported by said housing, said first magnet being rotationally movable between latched and unlatched positions, said first magnet being positioned when in said latched position such that with the first door in the closed position relative to the third member said first magnet holds the first door with said first magnetic insert attached thereto in the closed position through magnetic attraction between said first magnet and said first magnetic insert, and when said first magnet is in said unlatched position with the first door being in the closed position relative to the third member said first magnet is positioned such that said first magnet repels said first magnetic insert that is attached to the first door so as to cause the first door to move from the closed position toward the open position relative to the third member;
a second magnet rotationally supported by said housing, said second magnet being rotationally movable between latched and unlatched positions, said second magnet being positioned when in said latched position such that with the second door in the closed position relative to the third member said second magnet holds the second door with said second magnetic insert attached thereto in the closed position through magnetic attraction between said second magnet and said second magnetic insert, and when said second magnet is in said unlatched position with the second door being in the closed position relative to the third member said second magnet is positioned such that said second magnet repels said second magnetic insert that is attached to the second door so as to cause the second door to move from the closed position toward the open position relative to the third member; and
an actuation mechanism capable of selectively moving said first magnet and said second magnet from their latched positions to their unlatched positions responsive to an input from a user, said actuation mechanism comprising:
a first set of gear teeth supported for rotation with said first magnet;
a second set of gear teeth supported for rotation with said second magnet;
a rack bar supported for rectilinear movement by said housing, said rack bar having a first plurality of gear teeth that are capable of engaging said first set gear teeth that rotate with said first magnet such that said first magnet rotates between its latched and unlatched positions as said rack bar moves rectilinearly between its latched and unlatched positions, respectively, relative to said housing, said rack bar having a second plurality of gear teeth that are capable of engaging said second set gear teeth that rotate with said second magnet such that said second magnet rotates between its latched and unlatched positions as said rack bar moves rectilinearly between its latched and unlatched positions, respectively, relative to said housing;
a ball bearing carried by said rack bar; and
a sliding bar supported for rectilinear movement relative to said rack bar between a locked and an unlocked position relative to said rack bar, said ball bearing being capable of movement relative to said rack bar in response to movement of said sliding bar relative to said rack bar, said ball bearing moving into engagement with said housing in order to prevent movement of said rack bar from said latched position to said unlatched position when said rack bar is in said latched position relative to said housing and said sliding bar is in said locked position relative to said rack bar, said ball bearing being capable of disengagement from said housing when said sliding bar is in said unlocked position relative to said rack bar, said rack bar moving from its latched position to its unlatched position relative to said housing in response to further rectilinear movement of said sliding bar relative to said housing.

7. The magnetic latch mechanism according to claim 6, wherein the magnetic latch mechanism further comprises:
a first striker capable of attachment to the first door;
a first hook-shaped pawl supported for rotation with said first magnet, said first magnet and said first hook-shaped pawl rotating together between their latched and unlatched positions as said rack bar moves rectilinearly between its latched and unlatched positions, respectively, relative to said housing, said first pawl engaging said first striker to mechanically prevent the first door from being moved to the open position when said first magnet is in its latched position;
a second striker capable of attachment to the second door; and
a second hook-shaped pawl supported for rotation with said second magnet, said second magnet and said second hook-shaped pawl rotating together between their latched and unlatched positions as said rack bar moves rectilinearly between its latched and unlatched positions, respectively, relative to said housing, said second pawl engaging said second striker to mechanically prevent the second door from being moved to the open position when said second magnet is in its latched position.

8. The magnetic latch mechanism according to claim 7, further comprising a motor that drives said sliding bar.

9. The magnetic latch mechanism according to claim 7, wherein said first hook-shaped pawl and said first magnet rotate together about an axis of rotation, and said second hook-shaped pawl and said second magnet rotate together about an axis of rotation, wherein said axis of rotation of said first hook-shaped pawl and said first magnet is spaced apart from but parallel to said axis of rotation of said second hook-shaped pawl and said second magnet, and wherein said first hook-shaped pawl and said first magnet rotate in the same direction as said second hook-shaped pawl and said second magnet.

10. The magnetic latch mechanism according to claim 9, further comprising a first control pin and a second control pin that can move between extended and retracted positions, said rack bar being free to move to said latched position when both said first and second control pins are in said retracted position, but either one of said first and second control pins engaging said rack bar to prevent movement of said rack bar to said latched position when either one of said first and second control pins is not in its retracted position, and where said first control pin is moved to said retracted position when said first door is in the closed position and said second control pin is moved to said retracted position when said second door is in the closed position.

11. The magnetic latch mechanism according to any one of claim 10, wherein said first hook-shaped pawl and said first magnet rotate to a position intermediate their latched and unlatched positions and said second hook-shaped pawl and said second magnet rotate to a position intermediate their latched and unlatched positions when the first and second doors are both in their open positions, such that said first hook-shaped pawl and said first magnet and said second hook-shaped pawl and said second magnet are ready to latch the first and second doors if the first and second doors are moved to the closed position.

12. The magnetic latch mechanism according to any one of claim 9, wherein said first hook-shaped pawl and said first magnet rotate to a position intermediate their latched and unlatched positions and said second hook-shaped pawl and said second magnet rotate to a position intermediate their latched and unlatched positions when the first and second doors are both in their open positions, such that said first hook-shaped pawl and said first magnet and said second hook-shaped pawl and said second magnet are ready to latch the first and second doors if the first and second doors are moved to the closed position.

13. The magnetic latch mechanism according to claim 7, further comprising a first control pin and a second control pin that can move between extended and retracted positions, said rack bar being free to move to said latched position when both said first and second control pins are in said retracted position, but either one of said first and second control pins engaging said rack bar to prevent movement of said rack bar to said latched position when either one of said first and second control pins is not in its retracted position, and where said first control pin is moved to said retracted position when said first door is in the closed position and said second control pin is moved to said retracted position when said second door is in the closed position.

14. The magnetic latch mechanism according to any one of claim 13, wherein said first hook-shaped pawl and said first magnet rotate to a position intermediate their latched and unlatched positions and said second hook-shaped pawl and said second magnet rotate to a position intermediate their latched and unlatched positions when the first and second doors are both in their open positions, such that said first hook-shaped pawl and said first magnet and said second hook-shaped pawl and said second magnet are ready to latch the first and second doors if the first and second doors are moved to the closed position.

15. The magnetic latch mechanism according to any one of claim 7, wherein said first hook-shaped pawl and said first magnet rotate to a position intermediate their latched and unlatched positions and said second hook-shaped pawl and said second magnet rotate to a position intermediate their latched and unlatched positions when the first and second doors are both in their open positions, such that said first hook-shaped pawl and said first magnet and said second hook-shaped pawl and said second magnet are ready to latch the first and second doors if the first and second doors are moved to the closed position.

16. The latching system according to claim 7, wherein said latch housing has a U-shaped track, wherein said latch mechanism further comprises:
   a flexible link movably supported by said latch housing, said sliding bar being capable of engagement by said flexible link, said flexible link including a flexible strap portion and a receptacle for attachment of said cable, said strap portion extending at least in part along said U-shaped track, said receptacle of said flexible link being engaged by said cable such that, when said cable is pulled, said sliding bar is moved to said unlocked position relative to said rack bar and said rack bar is moved toward said unlatched position as pulling of said cable is continued.

17. The latching system according to claim 6, wherein said latch housing has a U-shaped track, wherein said latch mechanism further comprises:
   a flexible link movably supported by said latch housing, said sliding bar being capable of engagement by said flexible link, said flexible link including a flexible strap portion and a receptacle for attachment of said cable, said strap portion extending at least in part along said U-shaped track, said receptacle of said flexible link being engaged by said cable such that, when said cable is pulled, said sliding bar is moved to said unlocked position relative to said rack bar and said rack bar is moved toward said unlatched position as pulling of said cable is continued.

18. A magnetic latch mechanism for securing a first door and a second door in closed positions relative to a third member, the first and second doors each being movable between the respective closed position and a respective open position relative to the third member, the magnetic latch mechanism comprising:
   a first magnetic insert capable of attachment to the first door;
   a second magnetic insert capable of attachment to the second door;
   a housing adapted for attachment to the third member;
   a first magnet rotationally supported by said housing, said first magnet being rotationally movable between latched and unlatched positions, said first magnet being positioned when in said latched position such that with the first door in the closed position relative to the third member said first magnet holds the first door with said first magnetic insert attached thereto in the closed position through magnetic attraction between said first magnet and said first magnetic insert, and when said first magnet is in said unlatched position with the first door being in the closed position relative to the third member said first magnet is positioned such that said first magnet repels said first magnetic insert that is attached to the first door so as to cause the first door to move from the closed position toward the open position relative to the third member;

a second magnet rotationally supported by said housing, said second magnet being rotationally movable between latched and unlatched positions, said second magnet being positioned when in said latched position such that with the second door in the closed position relative to the third member said second magnet holds the second door with said second magnetic insert attached thereto in the closed position through magnetic attraction between said second magnet and said second magnetic insert, and when said second magnet is in said unlatched position with the second door being in the closed position relative to the third member said second magnet is positioned such that said second magnet repels said second magnetic insert that is attached to the second door so as to cause the second door to move from the closed position toward the open position relative to the third member;

a first striker capable of attachment to the first door;

a first hook-shaped pawl supported for rotation with said first magnet, said first pawl engaging said first striker to mechanically prevent the first door from being moved to the open position when said first magnet is in its latched position;

a second striker capable of attachment to the second door; and a second hook-shaped pawl supported for rotation with said second magnet, said second pawl engaging said second striker to mechanically prevent the second door from being moved to the open position when said second magnet is in its latched position;

a first control pin and a second control pin that can move between extended and retracted positions; and an actuation mechanism capable of selectively moving said first magnet and said second magnet from their latched positions to their unlatched positions responsive to an input from a user, said actuation mechanism comprising:

a first set of gear teeth supported for rotation with said first magnet;

a second set of gear teeth supported for rotation with said second magnet;

a rack bar supported for rectilinear movement by said housing, said rack bar having a first plurality of gear teeth that are capable of engaging said first set gear teeth that rotate with said first magnet such that said first magnet and said first hook-shaped pawl rotate together between their latched and unlatched positions as said rack bar moves rectilinearly between its latched and unlatched positions, respectively, relative to said housing, said rack bar having a second plurality of gear teeth that are capable of engaging said second set gear teeth that rotate with said second magnet such that said second magnet and said second hook-shaped pawl rotate together between their latched and unlatched positions as said rack bar moves rectilinearly between its latched and unlatched positions, respectively, relative to said housing, said rack bar being free to move to said latched position when both said first and second control pins are in said retracted position, but either one of said first and second control pins engaging said rack bar to prevent movement of said rack bar to said latched position when either one of said first and second control pins is not in its retracted position, and wherein said first control pin is moved to said retracted position when said first door is in the closed position and said second control pin is moved to said retracted position when said second door is in the closed position.

19. The magnetic latch mechanism according to any one of claim 18, wherein said first hook-shaped pawl and said first magnet rotate to a position intermediate their latched and unlatched positions and said second hook-shaped pawl and said second magnet rotate to a position intermediate their latched and unlatched positions when the first and second doors are both in their open positions, such that said first hook-shaped pawl and said first magnet and said second hook-shaped pawl and said second magnet are ready to latch the first and second doors if the first and second doors are moved to the closed position.

20. The magnetic latch mechanism according to claim 19, wherein said first hook-shaped pawl and said first magnet rotate together about an axis of rotation, and said second hook-shaped pawl and said second magnet rotate together about an axis of rotation, wherein said axis of rotation of said first hook-shaped pawl and said first magnet is spaced apart from but parallel to said axis of rotation of said second hook-shaped pawl and said second magnet, and wherein said first hook-shaped pawl and said first magnet rotate in the same direction as said second hook-shaped pawl and said second magnet.

* * * * *